(12) United States Patent
Browy et al.

(10) Patent No.: US 12,267,545 B2
(45) Date of Patent: Apr. 1, 2025

(54) CONTENT PROVISIONING SYSTEM AND METHOD

(71) Applicant: Magic Leap, Inc., Plantation, FL (US)

(72) Inventors: Eric C. Browy, Meridian, ID (US); Andrew Rabinovich, San Francisco, CA (US); David C. Lundmark, Los Altos, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/807,600

(22) Filed: Jun. 17, 2022

(65) Prior Publication Data
US 2022/0337899 A1 Oct. 20, 2022

Related U.S. Application Data

(62) Division of application No. 16/864,721, filed on May 1, 2020, now Pat. No. 11,445,232.

(60) Provisional application No. 62/841,806, filed on May 1, 2019.

(51) Int. Cl.
H04N 21/41 (2011.01)
G06T 19/00 (2011.01)
H04N 21/414 (2011.01)
H04W 4/021 (2018.01)
(Continued)

(52) U.S. Cl.
CPC ....... *H04N 21/4126* (2013.01); *G06T 19/003* (2013.01); *H04N 21/41407* (2013.01); *H04W 4/021* (2013.01); *G02B 27/017* (2013.01); *G06F 3/011* (2013.01)

(58) Field of Classification Search
CPC ................ G06F 3/011; H04N 21/4126; H04N 21/41407; G06T 19/003; G02B 27/017
See application file for complete search history.

(56) References Cited

U.S. PATENT DOCUMENTS

| 4,344,092 A | 8/1982 | Miller |
| 4,652,930 A | 3/1987 | Crawford |
| 4,810,080 A | 3/1989 | Grendol et al. |

(Continued)

FOREIGN PATENT DOCUMENTS

| CN | 100416340 C | 9/2008 |
| CN | 101449270 A | 6/2009 |

(Continued)

OTHER PUBLICATIONS

"Communication Pursuant to Rule 164(1) EPC mailed on Feb. 23, 2022", European Patent Application No. 20753144.3, (11 pages).

(Continued)

*Primary Examiner* — Nicholas Augustine
(74) *Attorney, Agent, or Firm* — Stephen M. De Klerk

(57) ABSTRACT

The invention provides a content provisioning system. A mobile device has a mobile device processor. The mobile device mobile device has communication interface connected to the mobile device processor and a first resource device communication interface and under the control of the mobile device processor to receive first content transmitted by the first resource device transmitter The mobile device mobile device has a mobile device output device connected to the mobile device processor and under control of the mobile device processor capable of providing an output that can be sensed by a user.

36 Claims, 77 Drawing Sheets

(51) Int. Cl.
    *G02B 27/01*        (2006.01)
    *G06F 3/01*         (2006.01)

(56)            References Cited

U.S. PATENT DOCUMENTS

| | | | |
|---|---|---|---|
| 4,997,268 | A | 3/1991 | Dauvergne |
| 5,007,727 | A | 4/1991 | Kahaney et al. |
| 5,074,295 | A | 12/1991 | Willis |
| 5,240,220 | A | 8/1993 | Elberbaum |
| 5,251,635 | A | 10/1993 | Dumoulin et al. |
| 5,410,763 | A | 5/1995 | Bolle |
| 5,455,625 | A | 10/1995 | Englander |
| 5,495,286 | A | 2/1996 | Adair |
| 5,497,463 | A | 3/1996 | Stein et al. |
| 5,659,701 | A | 8/1997 | Amit et al. |
| 5,682,255 | A | 10/1997 | Friesem et al. |
| 5,689,669 | A * | 11/1997 | Lynch .............. G06F 3/0481 715/848 |
| 5,689,835 | A | 11/1997 | Chao |
| 5,826,092 | A | 10/1998 | Flannery |
| 5,854,872 | A | 12/1998 | Tai |
| 5,864,365 | A | 1/1999 | Sramek et al. |
| 5,937,202 | A | 8/1999 | Crosetto |
| 6,002,853 | A * | 12/1999 | de Hond .............. G06F 16/954 709/219 |
| 6,012,811 | A | 1/2000 | Chao et al. |
| 6,016,160 | A | 1/2000 | Coombs et al. |
| 6,064,749 | A | 5/2000 | Hirota et al. |
| 6,076,927 | A | 6/2000 | Owens |
| 6,079,982 | A * | 6/2000 | Meader .............. A63F 13/54 434/30 |
| 6,117,923 | A | 9/2000 | Amagai et al. |
| 6,119,147 | A * | 9/2000 | Toomey .............. G06Q 10/109 719/329 |
| 6,124,977 | A | 9/2000 | Takahashi |
| 6,179,619 | B1 * | 1/2001 | Tanaka .............. A63G 7/00 472/60 |
| 6,191,809 | B1 | 2/2001 | Hori et al. |
| 6,219,045 | B1 * | 4/2001 | Leahy .............. H04L 67/10 709/204 |
| 6,243,091 | B1 * | 6/2001 | Berstis .............. G06F 3/04815 715/205 |
| 6,271,843 | B1 * | 8/2001 | Lection .............. G06T 15/00 715/848 |
| 6,362,817 | B1 * | 3/2002 | Powers .............. G06T 17/00 345/428 |
| 6,375,369 | B1 | 4/2002 | Schneider et al. |
| 6,385,735 | B1 | 5/2002 | Wilson |
| 6,396,522 | B1 * | 5/2002 | Vu .............. G06F 3/04845 715/848 |
| 6,414,679 | B1 * | 7/2002 | Miodonski .............. G06T 13/00 707/999.005 |
| 6,538,655 | B1 | 3/2003 | Kubota |
| 6,541,736 | B1 | 4/2003 | Huang et al. |
| 6,570,563 | B1 * | 5/2003 | Honda .............. A63F 13/352 345/473 |
| 6,573,903 | B2 * | 6/2003 | Gantt .............. G06F 30/00 345/619 |
| 6,590,593 | B1 * | 7/2003 | Robertson .............. G06F 3/04815 715/848 |
| 6,621,508 | B1 * | 9/2003 | Shiraishi .............. G06F 3/0481 715/764 |
| 6,690,393 | B2 * | 2/2004 | Heron .............. G06T 19/00 715/848 |
| 6,757,068 | B2 | 6/2004 | Foxlin |
| 6,784,901 | B1 * | 8/2004 | Harvey .............. H04L 67/02 715/848 |
| 6,961,055 | B2 * | 11/2005 | Doak .............. A63F 13/63 345/677 |
| 7,046,515 | B1 | 5/2006 | Wyatt |
| 7,051,219 | B2 | 5/2006 | Hwang |
| 7,076,674 | B2 | 7/2006 | Cervantes |
| 7,111,290 | B1 | 9/2006 | Yates, Jr |
| 7,119,819 | B1 * | 10/2006 | Robertson .............. G06F 3/04815 715/848 |
| 7,211,986 | B1 | 5/2007 | Flowerdew et al. |
| 7,219,245 | B1 | 5/2007 | Raghuvanshi |
| 7,382,288 | B1 * | 6/2008 | Wilson .............. G08G 5/0021 340/972 |
| 7,414,629 | B2 * | 8/2008 | Santodomingo .............. G06T 17/05 345/582 |
| 7,431,453 | B2 | 10/2008 | Hogan |
| 7,467,356 | B2 * | 12/2008 | Gettman .............. G06Q 30/02 715/850 |
| 7,542,040 | B2 * | 6/2009 | Templeman .............. G06T 13/40 345/474 |
| 7,573,640 | B2 | 8/2009 | Nivon et al. |
| 7,653,877 | B2 * | 1/2010 | Matsuda .............. G06F 16/957 463/32 |
| 7,663,625 | B2 * | 2/2010 | Chartier .............. G06T 19/20 700/182 |
| 7,724,980 | B1 | 5/2010 | Shenzhi |
| 7,746,343 | B1 * | 6/2010 | Charaniya .............. G06N 7/01 345/428 |
| 7,751,662 | B2 | 7/2010 | Kleemann |
| 7,758,185 | B2 | 7/2010 | Lewis |
| 7,788,323 | B2 * | 8/2010 | Greenstein .............. G06Q 10/10 715/744 |
| 7,804,507 | B2 * | 9/2010 | Yang .............. H04N 13/344 345/633 |
| 7,814,429 | B2 * | 10/2010 | Buffet .............. G06F 30/00 715/763 |
| 7,817,150 | B2 * | 10/2010 | Reichard .............. G06T 15/20 715/705 |
| 7,844,724 | B2 * | 11/2010 | Van Wie .............. H04L 67/131 709/227 |
| 8,060,759 | B1 | 11/2011 | Arnan et al. |
| 8,120,851 | B2 | 2/2012 | Iwasa |
| 8,214,660 | B2 | 7/2012 | Capps, Jr. |
| 8,246,408 | B2 | 8/2012 | Elliot |
| 8,353,594 | B2 | 1/2013 | Lewis |
| 8,360,578 | B2 | 1/2013 | Nummela et al. |
| 8,408,696 | B2 | 4/2013 | Hsieh |
| 8,508,676 | B2 | 8/2013 | Silverstein et al. |
| 8,547,638 | B2 | 10/2013 | Levola |
| 8,605,764 | B1 | 10/2013 | Rothaar et al. |
| 8,619,365 | B2 | 12/2013 | Harris et al. |
| 8,696,113 | B2 | 4/2014 | Lewis |
| 8,698,701 | B2 | 4/2014 | Margulis |
| 8,733,927 | B1 | 5/2014 | Lewis |
| 8,736,636 | B2 | 5/2014 | Kang |
| 8,759,929 | B2 | 6/2014 | Shiozawa et al. |
| 8,793,770 | B2 | 7/2014 | Lim |
| 8,823,855 | B2 | 9/2014 | Hwang |
| 8,847,988 | B2 | 9/2014 | Geisner et al. |
| 8,874,673 | B2 | 10/2014 | Kim |
| 9,010,929 | B2 | 4/2015 | Lewis |
| 9,015,501 | B2 | 4/2015 | Gee |
| 9,086,537 | B2 | 7/2015 | Iwasa et al. |
| 9,095,437 | B2 | 8/2015 | Boyden et al. |
| 9,239,473 | B2 | 1/2016 | Lewis |
| 9,244,293 | B2 | 1/2016 | Lewis |
| 9,244,533 | B2 * | 1/2016 | Friend .............. G09B 21/009 |
| 9,285,872 | B1 | 3/2016 | Raffle et al. |
| 9,383,823 | B2 | 7/2016 | Geisner et al. |
| 9,489,027 | B1 | 11/2016 | Ogletree |
| 9,519,305 | B2 | 12/2016 | Wolfe |
| 9,581,820 | B2 | 2/2017 | Robbins |
| 9,582,060 | B2 | 2/2017 | Balatsos |
| 9,658,473 | B2 | 5/2017 | Lewis |
| 9,671,566 | B2 | 6/2017 | Abovitz et al. |
| 9,671,615 | B1 | 6/2017 | Vallius et al. |
| 9,696,795 | B2 * | 7/2017 | Marcolina .............. G06F 3/0304 |
| 9,798,144 | B2 | 10/2017 | Sako et al. |
| 9,874,664 | B2 | 1/2018 | Stevens et al. |
| 9,880,441 | B1 | 1/2018 | Osterhout |
| 9,918,058 | B2 | 3/2018 | Takahasi et al. |
| 9,955,862 | B2 | 5/2018 | Freeman et al. |
| 9,978,118 | B1 | 5/2018 | Ozgumer et al. |
| 9,996,797 | B1 * | 6/2018 | Holz .............. G06F 3/04842 |
| 10,018,844 | B2 | 7/2018 | Levola et al. |

(56) References Cited

U.S. PATENT DOCUMENTS

| | | |
|---|---|---|
| 10,082,865 B1 | 9/2018 | Raynal et al. |
| 10,151,937 B2 | 12/2018 | Lewis |
| 10,185,147 B2 | 1/2019 | Lewis |
| 10,218,679 B1 | 2/2019 | Jawahar |
| 10,241,545 B1 | 3/2019 | Richards et al. |
| 10,317,680 B1 | 6/2019 | Richards et al. |
| 10,436,594 B2 | 10/2019 | Belt et al. |
| 10,516,853 B1* | 12/2019 | Gibson ................... H04N 7/157 |
| 10,551,879 B1 | 2/2020 | Richards et al. |
| 10,578,870 B2 | 3/2020 | Kimmel |
| 10,646,283 B2 | 5/2020 | Johnson et al. |
| 10,698,202 B2 | 6/2020 | Kimmel et al. |
| 10,856,107 B2 | 10/2020 | Mycek et al. |
| 10,825,424 B2 | 11/2020 | Zhang |
| 10,987,176 B2 | 4/2021 | Poltaretskyi et al. |
| 11,190,681 B1 | 11/2021 | Brook et al. |
| 11,209,656 B1 | 12/2021 | Choi et al. |
| 11,236,993 B1 | 2/2022 | Hall et al. |
| 11,710,430 B1 | 7/2023 | Wray |
| 2001/0010598 A1 | 8/2001 | Aritake et al. |
| 2001/0018667 A1* | 8/2001 | Kim ................... G06Q 30/0277 705/14.73 |
| 2002/0007463 A1 | 1/2002 | Fung |
| 2002/0108064 A1 | 2/2002 | Nunally |
| 2002/0063913 A1 | 5/2002 | Nakamura et al. |
| 2002/0071050 A1 | 6/2002 | Homberg |
| 2002/0095463 A1* | 7/2002 | Matsuda ............... G06F 16/957 709/204 |
| 2002/0113820 A1* | 8/2002 | Robinson .............. G06F 16/954 715/764 |
| 2002/0122648 A1 | 9/2002 | Mule' et al. |
| 2002/0140848 A1 | 10/2002 | Cooper et al. |
| 2003/0028816 A1 | 2/2003 | Bacon |
| 2003/0048456 A1 | 3/2003 | Hill |
| 2003/0067685 A1 | 4/2003 | Niv |
| 2003/0077458 A1 | 4/2003 | Korenaga et al. |
| 2003/0080976 A1 | 5/2003 | Satoh et al. |
| 2003/0115494 A1 | 6/2003 | Cervantes |
| 2003/0218614 A1 | 11/2003 | Lavelle et al. |
| 2003/0219992 A1 | 11/2003 | Schaper |
| 2003/0226047 A1 | 12/2003 | Park |
| 2004/0001533 A1 | 1/2004 | Tran et al. |
| 2004/0021600 A1 | 2/2004 | Wittenberg |
| 2004/0025069 A1 | 2/2004 | Gary et al. |
| 2004/0042377 A1 | 3/2004 | Nikoloai et al. |
| 2004/0073822 A1 | 4/2004 | Greco |
| 2004/0073825 A1 | 4/2004 | Itoh |
| 2004/0111248 A1 | 6/2004 | Granny et al. |
| 2004/0113887 A1* | 6/2004 | Pair ........................ G09B 25/08 345/156 |
| 2004/0174496 A1 | 9/2004 | Ji et al. |
| 2004/0186902 A1 | 9/2004 | Stewart |
| 2004/0193441 A1* | 9/2004 | Altieri ................... A63F 13/216 709/203 |
| 2004/0201857 A1 | 10/2004 | Foxlin |
| 2004/0238732 A1 | 12/2004 | State et al. |
| 2004/0240072 A1 | 12/2004 | Schindler et al. |
| 2004/0246391 A1 | 12/2004 | Travis |
| 2004/0268159 A1 | 12/2004 | Aasheim et al. |
| 2005/0001977 A1 | 1/2005 | Zelman |
| 2005/0034002 A1 | 2/2005 | Flautner |
| 2005/0093719 A1* | 5/2005 | Okamoto ........... G01C 21/3697 705/14.62 |
| 2005/0128212 A1* | 6/2005 | Edecker ................... G06T 17/05 345/581 |
| 2005/0157159 A1 | 7/2005 | Komiya et al. |
| 2005/0177385 A1 | 8/2005 | Hull |
| 2005/0231599 A1 | 10/2005 | Yamasaki |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0019723 A1 | 1/2006 | Vorenkamp |
| 2006/0038880 A1 | 2/2006 | Starkweather et al. |
| 2006/0050224 A1 | 3/2006 | Smith |
| 2006/0090092 A1 | 4/2006 | Verhulst |
| 2006/0126181 A1 | 6/2006 | Levola |
| 2006/0126182 A1 | 6/2006 | Tapani |
| 2006/0129852 A1 | 6/2006 | Bonola |
| 2006/0132914 A1 | 6/2006 | Weiss et al. |
| 2006/0179329 A1 | 8/2006 | Terechko |
| 2006/0221448 A1 | 10/2006 | Nivon et al. |
| 2006/0228073 A1 | 10/2006 | Mukawa et al. |
| 2006/0250322 A1 | 11/2006 | Hall et al. |
| 2006/0259621 A1 | 11/2006 | Ranganathan |
| 2006/0268220 A1 | 11/2006 | Hogan |
| 2007/0058248 A1 | 3/2007 | Nguyen et al. |
| 2007/0103836 A1 | 5/2007 | Oh |
| 2007/0124730 A1 | 5/2007 | Pytel |
| 2007/0159673 A1 | 7/2007 | Freeman et al. |
| 2007/0185398 A1 | 8/2007 | Kimura et al. |
| 2007/0188837 A1 | 8/2007 | Shimizu et al. |
| 2007/0198886 A1 | 8/2007 | Saito |
| 2007/0204672 A1 | 9/2007 | Huang et al. |
| 2007/0213952 A1 | 9/2007 | Cirelli |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0030429 A1* | 2/2008 | Hailpern ................... G06T 7/73 345/8 |
| 2008/0043334 A1 | 2/2008 | Itzkovitch et al. |
| 2008/0046773 A1 | 2/2008 | Ham |
| 2008/0063802 A1 | 3/2008 | Maula et al. |
| 2008/0068557 A1 | 3/2008 | Menduni et al. |
| 2008/0084533 A1 | 4/2008 | Jannard et al. |
| 2008/0125218 A1* | 5/2008 | Collins ................... G06Q 90/00 463/31 |
| 2008/0146942 A1 | 6/2008 | Dala-Krishna |
| 2008/0173036 A1 | 7/2008 | Williams |
| 2008/0177506 A1 | 7/2008 | Kim |
| 2008/0183190 A1 | 7/2008 | Adcox et al. |
| 2008/0205838 A1 | 8/2008 | Crippa et al. |
| 2008/0215907 A1 | 9/2008 | Wilson |
| 2008/0225393 A1 | 9/2008 | Rinko |
| 2008/0235570 A1* | 9/2008 | Sawada ................... G06Q 10/10 356/3 |
| 2008/0246693 A1* | 10/2008 | Hailpern ................. G06T 7/246 345/8 |
| 2008/0316768 A1 | 12/2008 | Travis |
| 2009/0076791 A1* | 3/2009 | Rhoades ................. A63F 13/53 703/21 |
| 2009/0091583 A1* | 4/2009 | McCoy ................. G06T 19/006 345/419 |
| 2009/0153797 A1 | 6/2009 | Allon et al. |
| 2009/0177445 A1 | 7/2009 | Capps, Jr. et al. |
| 2009/0224416 A1 | 9/2009 | Laakkonen et al. |
| 2009/0245730 A1 | 10/2009 | Kleemann |
| 2009/0287728 A1* | 11/2009 | Martine ................... G06Q 30/02 715/810 |
| 2009/0300528 A1* | 12/2009 | Stambaugh ......... G06F 3/04817 715/764 |
| 2009/0310633 A1 | 12/2009 | Ikegami |
| 2010/0005326 A1 | 1/2010 | Archer |
| 2010/0019962 A1 | 1/2010 | Fujita |
| 2010/0056274 A1 | 3/2010 | Uusitalo et al. |
| 2010/0060970 A1 | 3/2010 | Harris et al. |
| 2010/0063854 A1 | 3/2010 | Purvis et al. |
| 2010/0070378 A1* | 3/2010 | Trotman ................. G06Q 30/02 705/26.1 |
| 2010/0079841 A1 | 4/2010 | Levola |
| 2010/0115428 A1* | 5/2010 | Shuping ................. G06F 3/0481 715/277 |
| 2010/0153934 A1 | 6/2010 | Lachner |
| 2010/0194632 A1 | 8/2010 | Raento et al. |
| 2010/0205541 A1* | 8/2010 | Rapaport ................. G06Q 30/02 715/753 |
| 2010/0214284 A1* | 8/2010 | Rieffel ..................... G06T 17/00 382/154 |
| 2010/0232016 A1 | 9/2010 | Landa et al. |
| 2010/0232031 A1 | 9/2010 | Batchko et al. |
| 2010/0244168 A1 | 9/2010 | Shiozawa et al. |
| 2010/0274567 A1* | 10/2010 | Carlson ................... G06Q 40/02 235/487 |

(56) References Cited

U.S. PATENT DOCUMENTS

| | | |
|---|---|---|
| 2010/0274627 A1* | 10/2010 | Carlson .................. G06Q 20/20 705/16 |
| 2010/0277803 A1 | 11/2010 | Pockett et al. |
| 2010/0284085 A1 | 11/2010 | Laakkonen |
| 2010/0287485 A1 | 11/2010 | Bertolami et al. |
| 2010/0296163 A1 | 11/2010 | Sarikko |
| 2010/0306715 A1 | 12/2010 | Geisner et al. |
| 2010/0309687 A1 | 12/2010 | Sampsell et al. |
| 2011/0010636 A1* | 1/2011 | Hamilton, II .......... G06Q 10/10 705/26.7 |
| 2011/0021263 A1 | 1/2011 | Anderson et al. |
| 2011/0022870 A1 | 1/2011 | Mcgrane |
| 2011/0041083 A1* | 2/2011 | Gabai .................... G06Q 10/00 715/753 |
| 2011/0050640 A1 | 3/2011 | Lundback et al. |
| 2011/0050655 A1 | 3/2011 | Mukawa |
| 2011/0064268 A1 | 3/2011 | Cobb et al. |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0011389 A1 | 1/2012 | Driesen |
| 2012/0050535 A1 | 3/2012 | Densham et al. |
| 2012/0075501 A1 | 3/2012 | Oyagi et al. |
| 2012/0079466 A1 | 3/2012 | Gonion |
| 2012/0081392 A1 | 4/2012 | Arthur |
| 2012/0089854 A1 | 4/2012 | Breakstone |
| 2012/0113235 A1 | 5/2012 | Shintani |
| 2012/0127062 A1 | 5/2012 | Bar-Zeev et al. |
| 2012/0154557 A1 | 6/2012 | Perez et al. |
| 2012/0215094 A1 | 8/2012 | Rahimian et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1* | 10/2012 | Maciocci .............. G06T 19/006 348/51 |
| 2012/0260083 A1 | 10/2012 | Andrews |
| 2012/0307075 A1 | 12/2012 | Margalit |
| 2012/0307362 A1 | 12/2012 | Silverstein et al. |
| 2012/0314959 A1 | 12/2012 | White et al. |
| 2012/0320460 A1 | 12/2012 | Levola |
| 2012/0326948 A1 | 12/2012 | Crocco et al. |
| 2013/0021486 A1 | 1/2013 | Richardon |
| 2013/0050258 A1 | 2/2013 | Liu et al. |
| 2013/0050642 A1 | 2/2013 | Lewis et al. |
| 2013/0050833 A1 | 2/2013 | Lewis et al. |
| 2013/0051730 A1 | 2/2013 | Travers et al. |
| 2013/0061240 A1 | 3/2013 | Yan et al. |
| 2013/0077049 A1 | 3/2013 | Bohn |
| 2013/0077170 A1 | 3/2013 | Ukuda |
| 2013/0094148 A1 | 4/2013 | Sloane |
| 2013/0129282 A1 | 5/2013 | Li |
| 2013/0162940 A1 | 6/2013 | Kurtin et al. |
| 2013/0169923 A1 | 7/2013 | Schnoll et al. |
| 2013/0205126 A1 | 8/2013 | Kruglick |
| 2013/0222386 A1 | 8/2013 | Tannhauser et al. |
| 2013/0268257 A1 | 10/2013 | Hu |
| 2013/0278633 A1 | 10/2013 | Ahn et al. |
| 2013/0314789 A1 | 11/2013 | Saarikko et al. |
| 2013/0318276 A1 | 11/2013 | Dalal |
| 2013/0336138 A1 | 12/2013 | Venkatraman et al. |
| 2013/0342564 A1 | 12/2013 | Kinnebrew et al. |
| 2013/0342570 A1 | 12/2013 | Kinnebrew et al. |
| 2013/0342571 A1 | 12/2013 | Kinnebrew et al. |
| 2013/0343408 A1 | 12/2013 | Cook |
| 2014/0002329 A1 | 1/2014 | Nishimaki et al. |
| 2014/0013098 A1 | 1/2014 | Yeung |
| 2014/0016821 A1 | 1/2014 | Arth et al. |
| 2014/0022819 A1 | 1/2014 | Oh et al. |
| 2014/0078023 A1 | 3/2014 | Ikeda et al. |
| 2014/0082526 A1* | 3/2014 | Park ...................... H04L 65/403 715/757 |
| 2014/0119598 A1 | 5/2014 | Ramachandran et al. |
| 2014/0123015 A1 | 5/2014 | Sako et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0204438 A1 | 7/2014 | Yamada et al. |
| 2014/0244983 A1 | 8/2014 | Mcdonald et al. |
| 2014/0266987 A1 | 9/2014 | Magyari |
| 2014/0267419 A1 | 9/2014 | Ballard et al. |
| 2014/0274391 A1 | 9/2014 | Stafford |
| 2014/0282105 A1* | 9/2014 | Nordstrom .............. G06F 3/016 715/753 |
| 2014/0292645 A1 | 10/2014 | Tsurumi et al. |
| 2014/0309031 A1 | 10/2014 | Suzuki |
| 2014/0313228 A1 | 10/2014 | Kasahara |
| 2014/0333612 A1 | 11/2014 | Itoh et al. |
| 2014/0340449 A1 | 11/2014 | Plagemann et al. |
| 2014/0359589 A1 | 12/2014 | Kodsky et al. |
| 2014/0375680 A1 | 12/2014 | Ackerman et al. |
| 2015/0005785 A1 | 1/2015 | Olson |
| 2015/0009099 A1 | 1/2015 | Queen |
| 2015/0015842 A1 | 1/2015 | Chen |
| 2015/0077312 A1 | 3/2015 | Wang |
| 2015/0097719 A1 | 4/2015 | Balachandreswaran et al. |
| 2015/0123966 A1 | 5/2015 | Newman |
| 2015/0130790 A1 | 5/2015 | Vasquez, II et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0168221 A1 | 6/2015 | Mao et al. |
| 2015/0205126 A1 | 7/2015 | Schowengerdt |
| 2015/0235427 A1 | 8/2015 | Nobori et al. |
| 2015/0235431 A1 | 8/2015 | Schowengerdt |
| 2015/0253651 A1 | 9/2015 | Russell et al. |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0310657 A1 | 10/2015 | Eden |
| 2015/0338915 A1 | 11/2015 | Publicover et al. |
| 2015/0355481 A1 | 12/2015 | Hilkes et al. |
| 2016/0004102 A1 | 1/2016 | Nisper et al. |
| 2016/0015470 A1 | 1/2016 | Border |
| 2016/0027215 A1 | 1/2016 | Burns et al. |
| 2016/0033770 A1 | 2/2016 | Fujimaki et al. |
| 2016/0051217 A1 | 2/2016 | Douglas et al. |
| 2016/0077338 A1 | 3/2016 | Robbins et al. |
| 2016/0085285 A1 | 3/2016 | Mangione-Smith |
| 2016/0085300 A1 | 3/2016 | Robbins et al. |
| 2016/0091720 A1 | 3/2016 | Stafford et al. |
| 2016/0093099 A1 | 3/2016 | Bridges |
| 2016/0093269 A1 | 3/2016 | Buckley et al. |
| 2016/0103326 A1 | 4/2016 | Kimura et al. |
| 2016/0123745 A1 | 5/2016 | Cotier et al. |
| 2016/0139402 A1 | 5/2016 | Lapstun |
| 2016/0139411 A1 | 5/2016 | Kang et al. |
| 2016/0155273 A1 | 6/2016 | Lyren et al. |
| 2016/0163063 A1 | 6/2016 | Ashman |
| 2016/0180596 A1 | 6/2016 | Gonzalez del Rosario |
| 2016/0187654 A1 | 6/2016 | Border et al. |
| 2016/0191887 A1 | 6/2016 | Casas |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0267708 A1 | 9/2016 | Nistico et al. |
| 2016/0274733 A1 | 9/2016 | Hasegawa et al. |
| 2016/0287337 A1 | 10/2016 | Aram et al. |
| 2016/0300388 A1 | 10/2016 | Stafford et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0060225 A1 | 3/2017 | Zha et al. |
| 2017/0061696 A1 | 3/2017 | Li et al. |
| 2017/0064066 A1 | 3/2017 | Das et al. |

(56) References Cited

U.S. PATENT DOCUMENTS

| | | |
|---|---|---|
| 2017/0100664 A1 | 4/2017 | Osterhout et al. |
| 2017/0102544 A1 | 4/2017 | Vallius et al. |
| 2017/0115487 A1 | 4/2017 | Travis |
| 2017/0122725 A1 | 5/2017 | Yeoh et al. |
| 2017/0123526 A1 | 5/2017 | Trail et al. |
| 2017/0127295 A1 | 5/2017 | Black et al. |
| 2017/0131569 A1 | 5/2017 | Aschwanden et al. |
| 2017/0147066 A1 | 5/2017 | Katz et al. |
| 2017/0160518 A1 | 6/2017 | Lanman et al. |
| 2017/0161951 A1 | 6/2017 | Fix et al. |
| 2017/0172409 A1 | 6/2017 | Cavin et al. |
| 2017/0185261 A1* | 6/2017 | Perez ................ G06F 3/04845 |
| 2017/0192239 A1 | 7/2017 | Nakamura et al. |
| 2017/0201709 A1 | 7/2017 | Igarashi et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0214907 A1 | 7/2017 | Lapstun |
| 2017/0219841 A1 | 8/2017 | Popovich et al. |
| 2017/0232345 A1 | 8/2017 | Rofougaran et al. |
| 2017/0235126 A1 | 8/2017 | DiDomenico |
| 2017/0235129 A1 | 8/2017 | Kamakura |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1* | 8/2017 | Daniels ................. G06F 3/1454 |
| 2017/0246070 A1 | 8/2017 | Osterhout et al. |
| 2017/0254832 A1 | 9/2017 | Ho et al. |
| 2017/0256096 A1 | 9/2017 | Faaborg et al. |
| 2017/0258526 A1 | 9/2017 | Lang |
| 2017/0266529 A1 | 9/2017 | Reikmoto |
| 2017/0270712 A1 | 9/2017 | Tyson et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0307886 A1 | 10/2017 | Stenberg et al. |
| 2017/0307891 A1 | 10/2017 | Bucknor et al. |
| 2017/0312032 A1 | 11/2017 | Amanatullah et al. |
| 2017/0322418 A1 | 11/2017 | Liu et al. |
| 2017/0322426 A1 | 11/2017 | Tervo |
| 2017/0329137 A1 | 11/2017 | Tervo |
| 2017/0332098 A1 | 11/2017 | Rusanovskyy et al. |
| 2017/0336636 A1 | 11/2017 | Amitai et al. |
| 2017/0336867 A1 | 11/2017 | Wilairat et al. |
| 2017/0357332 A1 | 12/2017 | Balan et al. |
| 2017/0363871 A1 | 12/2017 | Vallius |
| 2017/0371394 A1 | 12/2017 | Chan |
| 2017/0371661 A1 | 12/2017 | Sparling |
| 2018/0014266 A1 | 1/2018 | Chen |
| 2018/0024289 A1 | 1/2018 | Fattal |
| 2018/0039673 A1 | 2/2018 | Hen et al. |
| 2018/0044173 A1 | 2/2018 | Netzer |
| 2018/0052007 A1 | 2/2018 | Teskey et al. |
| 2018/0052501 A1 | 2/2018 | Jones, Jr. et al. |
| 2018/0056305 A1 | 3/2018 | Sankey et al. |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0084245 A1 | 3/2018 | Lapstun |
| 2018/0088185 A1 | 3/2018 | Woods et al. |
| 2018/0101214 A1 | 4/2018 | Mahindru et al. |
| 2018/0102981 A1 | 4/2018 | Kurtzman et al. |
| 2018/0108179 A1 | 4/2018 | Tomlin et al. |
| 2018/0114298 A1 | 4/2018 | Malaika et al. |
| 2018/0129112 A1 | 5/2018 | Osterhout |
| 2018/0131907 A1* | 5/2018 | Schmirler .......... G05B 23/0216 |
| 2018/0136466 A1 | 5/2018 | Ko |
| 2018/0144691 A1 | 5/2018 | Choi et al. |
| 2018/0150971 A1 | 5/2018 | Adachi et al. |
| 2018/0151796 A1 | 5/2018 | Akahane |
| 2018/0172995 A1 | 6/2018 | Lee et al. |
| 2018/0188115 A1 | 7/2018 | Hsu et al. |
| 2018/0189568 A1 | 7/2018 | Powderly et al. |
| 2018/0190017 A1 | 7/2018 | Mendez et al. |
| 2018/0191990 A1 | 7/2018 | Motoyama et al. |
| 2018/0196084 A1 | 7/2018 | Tustaniwskyj |
| 2018/0217395 A1 | 8/2018 | Lin et al. |
| 2018/0218545 A1 | 8/2018 | Garcia et al. |
| 2018/0250589 A1 | 9/2018 | Cossairt et al. |
| 2018/0260218 A1 | 9/2018 | Gopal |
| 2018/0284877 A1 | 10/2018 | Klein |
| 2018/0292654 A1 | 10/2018 | Wall et al. |
| 2018/0299678 A1 | 10/2018 | Singer et al. |
| 2018/0357472 A1* | 12/2018 | Dreessen ................ G06V 20/49 |
| 2019/0005069 A1 | 1/2019 | Filgueiras de Araujo et al. |
| 2019/0011691 A1 | 1/2019 | Peyman |
| 2019/0056591 A1 | 2/2019 | Tervo et al. |
| 2019/0087015 A1* | 3/2019 | Lam ..................... A63F 13/213 |
| 2019/0101758 A1 | 4/2019 | Zhu et al. |
| 2019/0107723 A1 | 4/2019 | Lee et al. |
| 2019/0137788 A1 | 5/2019 | Suen |
| 2019/0155034 A1 | 5/2019 | Singer et al. |
| 2019/0155439 A1 | 5/2019 | Mukherjee et al. |
| 2019/0158926 A1 | 5/2019 | Kang et al. |
| 2019/0162950 A1 | 5/2019 | Lapstun |
| 2019/0167095 A1 | 6/2019 | Krueger |
| 2019/0172216 A1 | 6/2019 | Ninan et al. |
| 2019/0178654 A1 | 6/2019 | Hare |
| 2019/0179654 A1 | 6/2019 | Hare |
| 2019/0182415 A1 | 6/2019 | Sivan |
| 2019/0196690 A1 | 6/2019 | Chong et al. |
| 2019/0206116 A1 | 7/2019 | Xu et al. |
| 2019/0219815 A1 | 7/2019 | Price et al. |
| 2019/0243123 A1 | 8/2019 | Bohn |
| 2019/0287270 A1 | 9/2019 | Nakamura et al. |
| 2019/0318502 A1 | 10/2019 | He et al. |
| 2019/0318540 A1 | 10/2019 | Piemonte et al. |
| 2019/0321728 A1 | 10/2019 | Imai et al. |
| 2019/0347853 A1 | 11/2019 | Chen et al. |
| 2019/0380792 A1 | 12/2019 | Poltaretskyi et al. |
| 2019/0388182 A1 | 12/2019 | Kumar et al. |
| 2020/0066045 A1 | 2/2020 | Stahl et al. |
| 2020/0098188 A1 | 3/2020 | Bar-Zeev et al. |
| 2020/0100057 A1 | 3/2020 | Galon et al. |
| 2020/0110928 A1* | 4/2020 | Al Jazaery .......... G05B 19/042 |
| 2020/0117267 A1* | 4/2020 | Gibson ................... G06F 3/011 |
| 2020/0117270 A1* | 4/2020 | Gibson ................... G06F 3/011 |
| 2020/0184217 A1 | 6/2020 | Faulkner |
| 2020/0184219 A1 | 6/2020 | Magura et al. |
| 2020/0184653 A1 | 6/2020 | Faulker |
| 2020/0202759 A1 | 6/2020 | Ukai et al. |
| 2020/0242848 A1 | 7/2020 | Ambler et al. |
| 2020/0309944 A1 | 10/2020 | Thoresen et al. |
| 2020/0356161 A1 | 11/2020 | Wagner |
| 2020/0368616 A1 | 11/2020 | Delamont |
| 2020/0391115 A1 | 12/2020 | Leeper et al. |
| 2020/0409528 A1 | 12/2020 | Lee |
| 2021/0008413 A1* | 1/2021 | Asikainen ............ G06F 3/0304 |
| 2021/0033871 A1 | 2/2021 | Jacoby et al. |
| 2021/0041951 A1* | 2/2021 | Gibson ..................... G06T 7/74 |
| 2021/0053820 A1 | 2/2021 | Gurin et al. |
| 2021/0093391 A1 | 4/2021 | Poltaretskyi et al. |
| 2021/0093410 A1 | 4/2021 | Gaborit et al. |
| 2021/0093414 A1 | 4/2021 | Moore et al. |
| 2021/0097886 A1 | 4/2021 | Kuester et al. |
| 2021/0124901 A1 | 4/2021 | Liu et al. |
| 2021/0132380 A1 | 5/2021 | Wieczorek |
| 2021/0141225 A1 | 5/2021 | Meynen et al. |
| 2021/0142582 A1 | 5/2021 | Jones et al. |
| 2021/0158023 A1 | 5/2021 | Fu et al. |
| 2021/0158627 A1 | 5/2021 | Cossairt et al. |
| 2021/0173480 A1 | 6/2021 | Osterhout et al. |
| 2022/0366598 A1 | 11/2022 | Azimi et al. |

FOREIGN PATENT DOCUMENTS

| | | |
|---|---|---|
| CN | 102448566 A | 5/2012 |
| CN | 103460255 A | 12/2013 |
| CN | 104040410 A | 9/2014 |
| CN | 104603675 A | 5/2015 |
| CN | 105938426 A | 9/2016 |
| CN | 106662754 A | 5/2017 |
| CN | 107004303 A | 8/2017 |

(56) References Cited

FOREIGN PATENT DOCUMENTS

| | | |
|---|---|---|
| CN | 107683497 A1 | 2/2018 |
| CN | 109223121 A | 1/2019 |
| CN | 105190427 B | 11/2019 |
| EP | 0504930 A1 | 3/1992 |
| EP | 0535402 A1 | 4/1993 |
| EP | 0632360 A1 | 1/1995 |
| EP | 1215522 A2 | 6/2002 |
| EP | 13451682 A2 | 2/2003 |
| EP | 1494110 A2 | 1/2005 |
| EP | 1938141 A1 | 7/2008 |
| EP | 1943556 A2 | 7/2008 |
| EP | 2290428 A2 | 3/2011 |
| EP | 2350774 A1 | 8/2011 |
| EP | 1237067 B1 | 1/2016 |
| EP | 3139245 A1 | 3/2017 |
| EP | 3164776 B1 | 5/2017 |
| EP | 3236211 A1 | 10/2017 |
| EP | 2723240 B1 | 8/2018 |
| EP | 2896986 B1 | 2/2021 |
| GB | 2499635 A | 8/2013 |
| GB | 2542853 A | 4/2017 |
| IN | 938/DEL/2004 A | 6/2006 |
| JP | H03-036974 U | 4/1991 |
| JP | 09-121370 A | 5/1997 |
| JP | H10-333094 A | 12/1998 |
| JP | 2002-015222 A | 1/2002 |
| JP | 2002-529806 | 9/2002 |
| JP | 2003-029198 A | 1/2003 |
| JP | 2003-141574 A | 5/2003 |
| JP | 2003-228027 A | 8/2003 |
| JP | 2003-329873 A | 11/2003 |
| JP | 2004-348169 A | 12/2004 |
| JP | 2005-151224 A | 6/2005 |
| JP | 2005-303843 A | 10/2005 |
| JP | 2007-012530 A | 1/2007 |
| JP | 2007-86696 A | 4/2007 |
| JP | 2007-273733 A | 10/2007 |
| JP | 2008-257127 A | 10/2008 |
| JP | 2009-090689 A | 4/2009 |
| JP | 2009-244869 A | 10/2009 |
| JP | 2010-014443 A | 1/2010 |
| JP | 2010-139575 | 6/2010 |
| JP | 2010-146030 A | 7/2010 |
| JP | 2010-271526 A | 12/2010 |
| JP | 2011-033993 A | 2/2011 |
| JP | 2011-257203 A | 12/2011 |
| JP | 2011-530131 A | 12/2011 |
| JP | 2012-015774 A | 1/2012 |
| JP | 2012-088777 A | 5/2012 |
| JP | 2012-235036 A | 11/2012 |
| JP | 2013-525872 A1 | 6/2013 |
| JP | 2013-206322 A | 10/2013 |
| JP | 2014-500522 A | 1/2014 |
| JP | 2014-90386 A | 5/2014 |
| JP | 2014-174366 A | 9/2014 |
| JP | 2014-192550 A | 10/2014 |
| JP | 2015-191032 A | 11/2015 |
| JP | 2016-502120 A | 1/2016 |
| JP | 2016-85463 A | 5/2016 |
| JP | 2016-516227 A | 6/2016 |
| JP | 2016-126134 A | 7/2016 |
| JP | 2017-015697 A | 1/2017 |
| JP | 2017-108444 A | 6/2017 |
| JP | 2017-153498 | 9/2017 |
| JP | 2017-531840 A | 10/2017 |
| JP | 2017-535825 A | 11/2017 |
| JP | 6232763 B2 | 11/2017 |
| JP | 2018-503165 A | 2/2018 |
| JP | 6333965 B2 | 5/2018 |
| JP | 2018-173739 A | 11/2018 |
| JP | 2019-177134 A | 10/2019 |
| KR | 2005-0010775 A | 1/2005 |
| KR | 10-2006-0059992 A | 6/2006 |
| KR | 10-2011-0006408 | 1/2011 |
| KR | 10-1372623 B1 | 3/2014 |
| KR | 10-2017-0017243 | 2/2017 |
| TW | 201219829 A | 5/2012 |
| TW | 201803289 A | 1/2018 |
| WO | 1991/000565 A2 | 1/1991 |
| WO | 2000/030368 A1 | 6/2000 |
| WO | 2002/071315 A2 | 9/2002 |
| WO | 2004095248 A | 11/2004 |
| WO | 2006132614 A1 | 12/2006 |
| WO | 2007037089 A1 | 4/2007 |
| WO | 2007041678 A2 | 4/2007 |
| WO | 2007/085682 A1 | 8/2007 |
| WO | 2007/102144 A1 | 9/2007 |
| WO | 2008148927 A1 | 12/2008 |
| WO | 2009/101238 A1 | 8/2009 |
| WO | 2010015807 A1 | 2/2010 |
| WO | 2014203440 A1 | 12/2010 |
| WO | 2012030787 A2 | 3/2012 |
| WO | 2013/049012 A1 | 4/2013 |
| WO | 2013062701 A1 | 5/2013 |
| WO | 2013/145536 A1 | 10/2013 |
| WO | 2014033306 A1 | 3/2014 |
| WO | 2015/079610 A1 | 6/2015 |
| WO | 2015143641 A1 | 10/2015 |
| WO | 2015194597 A1 | 12/2015 |
| WO | 2016/054092 A1 | 4/2016 |
| WO | 2017004695 A1 | 1/2017 |
| WO | 2017044761 A1 | 3/2017 |
| WO | 2017049163 A1 | 3/2017 |
| WO | 2017051595 A1 | 3/2017 |
| WO | 2017120475 A1 | 7/2017 |
| WO | 2017176861 A1 | 10/2017 |
| WO | 2017203201 A1 | 11/2017 |
| WO | 2018008232 A1 | 1/2018 |
| WO | 2018/031261 A1 | 2/2018 |
| WO | 2018022523 A1 | 2/2018 |
| WO | 2018/044537 A1 | 3/2018 |
| WO | 2018039273 A1 | 3/2018 |
| WO | 2018057564 A1 | 3/2018 |
| WO | 2018085287 A1 | 5/2018 |
| WO | 2018087408 A1 | 5/2018 |
| WO | 2018097831 A1 | 5/2018 |
| WO | 2018166921 A1 | 9/2018 |
| WO | 2018236587 A1 | 12/2018 |
| WO | 2019040493 A1 | 2/2019 |
| WO | 2019148154 A1 | 8/2019 |
| WO | 2020010226 A1 | 1/2020 |

OTHER PUBLICATIONS

"Extended European Search Report issued on Aug. 24, 2022", European Patent Application No. 20846338.0, (13 pages).

"Extended European Search Report issued on Aug. 8, 2022", European Patent Application No. 19898874.3, (8 pages).

"Extended European Search Report issued on Sep. 8, 2022", European Patent Application No. 20798769.4, (13 pages).

"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GPP%5FSYNC/SA4/Docs/S4%2DI90526%2Ezip [retrieved on Apr. 12, 2019], Apr. 12, 2019, (98 pages).

"Non Final Office Action mailed on Sep. 19, 2022", U.S. Appl. No. 17/263,001, (14 pages).

"Second Office Action mailed on Jul. 13, 2022 with English Translation", Chinese Patent Application No. 201880079474.6, (10 pages).

"Second Office Action mailed on Jun. 20, 2022 with English Translation", Chinese Patent Application No. 201880089255.6, (14 pages).

Anonymous , "Koi Pond: Top iPhone App Store Paid App", https://web.archive.org/web/20080904061233/https://www.iphoneincanada.ca/reviews /koi-pond-top-iphone-app-store-paid-app/—[retrieved on Aug. 9, 2022], (2 pages).

"Extended European Search Report issued on Dec. 14, 2022", European Patent Application No. 20886547.7, (8 pages).

"Extended European Search Report mailed on Nov. 3, 2022", European Patent Application No. 20770244.0, (23 pages).

(56) References Cited

OTHER PUBLICATIONS

"Final Office Action mailed on Dec. 29, 2022", U.S. Appl. No. 17/098,059, (32 pages).
"First Office Action mailed on Sep. 16, 2022 with English translation", Chinese Patent Application No. 201980063642.7, (7 pages).
"Non Final Office Action mailed on Dec. 7, 2022", U.S. Appl. No. 17/357,795, (63 pages).
"Notice of Reason for Rejection mailed on Oct. 28, 2022 with English translation", Japanese Patent Application No. 2020-531452, (3 pages).
"Office Action mailed on Nov. 24, 2022 with English Translation", Japanese Patent Application No. 2020-533730, (11 pages).
"Decision of Rejection mailed on Jan. 5, 2023 with English translation", Chinese Patent Application No. 201880079474.6, (10 pages).
"Final Office Action mailed on Mar. 10, 2023", U.S. Appl. No. 17/357,795, (15 pages).
"First Office Action mailed on Dec. 22, 2022 with English translation", Chinese Patent Application No. 201980061450.2, (11 pages).
"First Office Action mailed on Jan. 24, 2023 with English translation", Japanese Patent Application No. 2020-549034, (7 pages).
"First Office Action mailed on Jan. 30, 2023 with English translation", Chinese Patent Application No. 201980082951.9, (5 pages).
"First Office Action mailed on Mar. 27, 2023 with English translation", Japanese Patent Application No. 2020-566617, (6 pages).
"First Office Action mailed on Mar. 6, 2023 with English translation", Korean Patent Application No. 10-2020-7019685, (7 pages).
"Non Final Office Action mailed on Apr. 13, 2023", U.S. Appl. No. 17/098,043, (7 pages).
"Non Final Office Action mailed on Feb. 3, 2023", U.S. Appl. No. 17/429,100, (16 pages).
"Non Final Office Action mailed on Feb. 3, 2023", U.S. Appl. No. 17/497,965, (32 pages).
"Non Final Office Action mailed on Jan. 24, 2023", U.S. Appl. No. 17/497,940, (10 pages).
"Non Final Office Action mailed on Mar. 1, 2023", U.S. Appl. No. 18/046,739, (34 pages).
"Office Action mailed on Mar. 30, 2023 with English translation", Japanese Patent Application No. 2020-566620, (10 pages).
"Communication Pursuant to Article 94(3) EPC mailed on May 30, 2022", European Patent Application No. 19768418.6, (6 pages).
"Extended European Search Report issued on Jul. 20, 2022", European Patent Application No. 19885958.9, (9 pages).
"Extended European Search Report mailed on May 30, 2022", European Patent Application No. 20753144.3, (10 pages).
"Final Office Action mailed on Jul. 13, 2022", U.S. Appl. No. 17/262,991, (18 pages).
"First Examination Report Mailed on Jul. 27, 2022", Chinese Patent Application No. 201980036675.2, (5 pages).
"First Examination Report Mailed on Jul. 28, 2022", Indian Patent Application No. 202047024232, (6 pages).
"Non Final Office Action mailed on Jul. 26, 2022", U.S. Appl. No. 17/098,059, (28 pages).
Chittineni, C., et al., "Single filters for combined image geometric manipulation and enhancement", Proceedings of SPIE vol. 1903, Image and Video Processing, Apr. 8, 1993, San Jose, CA. (Year. 1993), pp. 111-121.
"Communication Pursuant to Article 94(3) EPC mailed on Feb. 28, 2023", European Patent Application No. 19845418.3, (6 Pages).
"Communication Pursuant to Article 94(3) EPC mailed on Jul. 28, 2023", European Patent Application No. 19843487.0, (15 pages).
"Communication Pursuant to Article 94(3) EPC mailed on May 23, 2023", European Patent Application No. 18890390.0, (5 pages).
"Extended European Search Report issued on Apr. 5, 2023", European Patent Application No. 20888716.6, (11 pages).
"Final Office Action mailed Oct. 16, 2023", U.S. Appl. No. 17/098,043, (7 pages).
"Final Office Action mailed on Sep. 8, 2023 with English translation", Japanese Patent Application No. 2020-566620, (18 pages).
"First Examination Report Mailed on Aug. 8, 2023", Australian Patent Application No. 2018379105, (3 pages).
"First Office Action mailed Apr. 21, 2023 with English translation", Japanese Patent Application No. 2021-509779, (26 pages).
"First Office Action mailed Jul. 4, 2023 with English translation", Japanese Patent Application No. 2021-505669, (6 pages).
"First Office Action mailed on Apr. 13, 2023 with English Translation", Japanese Patent Application No. 2020-567766, (7 pages).
"First Office Action mailed on Jun. 13, 2023 with English translation", Japanese Patent Application No. 2020-567853, (7 pages).
"First Office Action mailed on May 26, 2023 with English translation", Japanese Patent Application No. 2021-500607, (6 pages).
"First Office Action mailed on May 30, 2023 with English translation", Japanese Patent Application No. 2021-519873, (8 pages).
"First Office Action mailed Sep. 29, 2023 with English translation", Japanese Patent Application No. 2023-10887, (5 pages).
"Non Final Office Action mailed on Jul. 20, 2023", U.S. Appl. No. 17/650,188, (11 pages).
"Non Final Office Action mailed on Jun. 14, 2023", U.S. Appl. No. 17/516,483, (10 pages).
"Non Final Office Action mailed on May 11, 2023", U.S. Appl. No. 17/822,279, (24 pages).
"Non Final Office Action mailed on Oct. 11, 2023", U.S. Appl. No. 17/357,795, (14 pages).
"Non Final Office Action mailed on Oct. 24, 2023", U.S. Appl. No. 17/259,020, (21 pages).
"Notice of Allowance mailed on Jul. 27, 2023 with English translation", Korean Patent Application No. 10-2020-7019685, (4 pages).
"Office Action mailed on Apr. 13, 2023 with English translation", Japanese Patent Application No. 2020-533730, (13 pages).
"Office Action mailed on Jul. 20, 2023 with English translation", Japanese Patent Application No. 2021-505884, (6 pages).
"Office Action mailed on Jun. 8, 2023 with English translation", Japanese Patent Application No. 2021-503762, (6 pages).
"Second Office Action mailed on May 2, 2023 with English Translation", Japanese Patent Application No. 2020-549034, (6 pages).
"Second Office Action mailed on Sep. 25, 2023 with English translation", Japanese Patent Application No. 2020-567853, (8 pages).
"Wikipedia Dioptre", Jun. 22, 2018 (Jun. 22, 2018), XP093066995, Retrieved from the Internet: URL:https://en.wikipedia.org/w/index.php?title=Dioptre&direction=next&oldid=846451540 [retrieved on Jul. 25, 2023], (3 pages).
Li, Yujia, et al., "Graph Matching Networks for Learning the Similarity of Graph Structured Objects", arxiv.org, Cornell University Library, 201 Olin Library Cornell University Ithaca, NY 14853, XP081268608, Apr. 29, 2019.
Luo, Zixin, et al., "ContextDesc: Local Descriptor Augmentation With Cross-Modality Context", 2019 IEEE/CVF Conference on Computer Vision and Pattern Recognition (CVPR), IEEE, XP033686823, DOI: 10.1109/CVPR.2019.00263 [retrieved on Jan. 8, 2020], Jun. 15, 2019, pp. 2522-2531.
Zhang, Zen, et al., "Deep Graphical Feature Learning for the Feature Matching Problem", 2019 IEEE/CVF International Conference on Computer Vision (ICCV), IEEE, XP033723985, DOI: 10.1109/ICCV.2019.00519 [retrieved on Feb. 24, 2020], Oct. 27, 2019, pp. 5086-5095.
"ARToolKit: Hardware" https://web.archive.org/web/20051013062315/http://www.hitl.washington.edu:80/artoolkit/documentation/hardware.htm (downloaded Oct. 26, 2020), Oct. 13, 2015, (3 pages).
"Communication according to Rule 164(1) EPC mailed on Feb. 23, 2022", European Patent Application No. 20753144.3, (11 pages).
"Communication Pursuant to Article 94(3) EPC mailed on Sep. 4, 2019", European Patent Application No. 10793707.0, (4 pages).
"Communication Pursuant to Article 94(3) EPC mailed on Apr. 25, 2022", European Patent Application No. 18885707.2, (5 pages).
"Communication Pursuant to Article 94(3) EPC mailed on Jan. 4, 2022", European Patent Application No. 20154070.5, (8 pages).
"Communication Pursuant to Article 94(3) EPC mailed on Oct. 21, 2021", European Patent Application No. 16207441.3, (4 pages).
"Communication Pursuant to Rule 164(1) EPC mailed on Jul. 27, 2021", European Patent Application No. 19833664.6, (11 pages).
"European Search Report mailed on Oct. 15, 2020", European Patent Application No. 20180623.9, (10 pages).

(56) References Cited

OTHER PUBLICATIONS

"Extended European Search Report issued on May 20, 2020", European Patent Application No. 20154070.5 , (7 pages).
"Extended European Search Report issued on Jan. 22, 2021", European Patent Application No. 18890390.0 , (11 pages).
"Extended European Search Report issued on Nov. 3, 2020", European Patent Application No. 18885707.2 , (7 pages).
"Extended European Search Report issued on Jun. 30, 2021", European Patent Application No. 19811971.1 , (9 pages).
"Extended European Search Report issued on Mar. 4, 2021", European Patent Application No. 19768418.6 , (9 pages).
"Extended European Search Report issued on Nov. 4, 2020", European Patent Application No. 20190980.1 , (14 pages).
"Extended European Search Report mailed on Jun. 12, 2017", European Patent Application No. 16207441.3 , (8 pages).
"Extended European Search Report mailed on Jan. 28, 2022", European Patent Application No. 19815876.8 , (9 pages).
"Extended European Search Report mailed on Jan. 4, 2022", European Patent Application No. 19815085.6 , (9 pages).
"Extended European Search Report mailed on Jul. 16, 2021", European Patent Application No. 19810142.0 , (14 pages).
"Extended European Search Report mailed on Jul. 30, 2021", European Patent Application No. 19839970.1 , (7 pages).
"Extended European Search Report mailed on Jun. 19, 2020", European Patent Application No. 20154750.2 , (10 pages).
"Extended European Search Report mailed on Mar. 22, 2022", European Patent Application No. 19843487.0 , (14 pages).
"Extended European Search Report mailed on May 16, 2022", European Patent Application No. 19871001.4 , (9 pages).
"Extended European Search Report mailed on Oct. 27, 2021", European Patent Application No. 19833664.6 , (10 pages).
"Extended European Search Report mailed on Sep. 20, 2021", European Patent Application No. 19851373.1 , (8 pages).
"Extended European Search Report mailed on Sep. 28, 2021", European Patent Application No. 19845418.3 , (13 pages).
"Final Office Action mailed on Aug. 10, 2020", U.S. Appl. No. 16/225,961 , (13 pages).
"Final Office Action mailed on Dec. 4, 2019", U.S. Appl. No. 15/564,517 , (15 pages).
"Final Office Action mailed on Feb. 19, 2020", U.S. Appl. No. 15/552,897 , (17 pages).
"Final Office Action mailed on Feb. 23, 2022", U.S. Appl. No. 16/748,193 , (23 pages).
"Final Office Action mailed on Feb. 3, 2022", United States U.S. Appl. No. 16/864,721 , (36 pages).
"Final Office Action mailed on Jun. 15, 2021", United States U.S. Appl. No. 16/928,313 , (42 pages).
"Final Office Action mailed on Mar. 1, 2021", U.S. Appl. No. 16/214,575 , (29 pages).
"Final Office Action mailed on Mar. 19, 2021", U.S. Appl. No. 16/530,776 , (25 pages).
"Final Office Action mailed on Nov. 24, 2020", U.S. Appl. No. 16/435,933 , (44 pages).
"Final Office Action mailed on Sep. 17, 2021", U.S. Appl. No. 16/938,782 , (44 pages).
"First Examination Report Mailed on May 13, 2022", Indian Patent Application No. 202047026359 , (8 pages).
"First Office Action mailed on Feb. 11, 2022 with English translation", Chinese Patent Application No. 201880089255.6 , (17 pages).
"First Office Action mailed on Mar. 14, 2022 with English translation", Chinese Patent Application No. 201880079474.6 , (11 pages).
"International Search Report and Written Opinion mailed on Feb. 12, 2021", International Application No. PCT/US20/60555 , (25 pages).
"International Search Report and Written Opinion mailed on Mar. 12, 2020", International PCT Patent Application No. PCT/US19/67919 , (14 pages).
"International Search Report and Written Opinion mailed on Aug. 15, 2019", International PCT Patent Application No. PCT/US19/33987 , (20 pages).
"International Search Report and Written Opinion mailed on Jun. 15, 2020", International PCT Patent Application No. PCT/US2020/017023 , (13 pages).
"International Search Report and Written Opinion mailed on Oct. 16, 2019", International PCT Patent Application No. PCT/US19/43097 , (10 pages).
"International Search Report and Written Opinion mailed on Oct. 16, 2019", International PCT Patent Application No. PCT/US19/36275 , (10 pages).
"International Search Report and Written Opinion mailed on Oct. 16, 2019", International PCT Patent Application No. PCT/US19/43099 , (9 pages).
"International Search Report and Written Opinion mailed on Jun. 17, 2016", International PCT Patent Application No. PCT/FI2016/050172 , (9 pages).
"International Search Report and Written Opinion mailed on Feb. 2, 2021", International PCT Patent Application No. PCT/US20/60550 , (9 pages).
"International Search Report and Written Opinion mailed on Oct. 22, 2019", International PCT Patent Application No. PCT/US19/43751 , (9 pages).
"International Search Report and Written Opinion mailed on Dec. 23, 2019", International PCT Patent Application No. PCT/US19/44953 , (11 pages).
"International Search Report and Written Opinion mailed on May 23, 2019", International PCT Patent Application No. PCT/US18/66514 , (17 pages).
"International Search Report and Written Opinion mailed on Sep. 26, 2019", International PCT Patent Application No. PCT/US19/40544 , (12 pages).
"International Search Report and Written Opinion mailed on Aug. 27, 2019", International PCT Application No. PCT/US2019/035245, (8 pages).
"International Search Report and Written Opinion mailed on Dec. 27, 2019", International Application No. PCT/US19/47746 , (16 pages).
"International Search Report and Written Opinion mailed on Dec. 3, 2020", International Patent Application No. PCT/US20/43596 , (25 pages).
"International Search Report and Written Opinion mailed on Sep. 30, 2019", International Patent Application No. PCT/US19/40324 , (7 pages).
"International Search Report and Written Opinion mailed on Sep. 4, 2020", International Patent Application No. PCT/US20/31036 , (13 pages).
"International Search Report and Written Opinion mailed on Jun. 5, 2020", International Patent Application No. PCT/US20/19871 , (9 pages).
"International Search Report and Written Opinion mailed on Aug. 8, 2019", International PCT Patent Application No. PCT/US2019/034763 , (8 pages).
"International Search Report and Written Opinion mailed on Oct. 8, 2019", International PCT Patent Application No. PCT/US19/41151, (7 pages).
"International Search Report and Written Opinion mailed on Jan. 9, 2020", International Application No. PCT/US19/55185 , (10 pages).
"International Search Report and Written Opinion mailed on Feb. 28, 2019", International Patent Application No. PCT/US18/64686 , (8 pages).
"International Search Report and Written Opinion mailed on Feb. 7, 2020", International PCT Patent Application No. PCT/US2019/061265 , (11 pages).
"International Search Report and Written Opinion mailed on Jun. 11, 2019", International PCT Application No. PCT/US19/22620 , (7 pages).
"Invitation to Pay Additional Fees mailed Aug. 15, 2019", International PCT Patent Application No. PCT/US19/36275 , (2 pages).
"Invitation to Pay Additional Fees mailed Sep. 24, 2020", International Patent Application No. PCT/US2020/043596 , (3 pages).

(56) References Cited

OTHER PUBLICATIONS

"Invitation to Pay Additional Fees mailed on Oct. 22, 2019", International PCT Patent Application No. PCT/US19/47746 , (2 pages).
"Invitation to Pay Additional Fees mailed on Apr. 3, 2020", International Patent Application No. PCT/US20/17023 , (2 pages).
"Invitation to Pay Additional Fees mailed on Oct. 17, 2019", International PCT Patent Application No. PCT/US19/44953 , (2 pages).
"multi-core processor", TechTarget , 2013 , (1 page).
"Non Final Office Action mailed Nov. 19. 2019", U.S. Appl. No. 16/355,611 , (31 pages).
"Non Final Office Action mailed on Apr. 1, 2022", U.S. Appl. No. 17/256,961 , (65 pages).
"Non Final Office Action mailed on Apr. 11, 2022", U.S. Appl. No. 16/938,782 , (52 pages).
"Non Final Office Action mailed on Apr. 12, 2022", U.S. Appl. No. 17/262,991 , (60 pages).
"Non Final Office Action mailed on Aug. 21, 2019", U.S. Appl. No. 15/564,517 , (14 pages).
"Non Final Office Action mailed on Aug. 4, 2021", U.S. Appl. No. 16/864,721 , (21 pages).
"Non Final Office Action mailed on Feb. 2, 2022", U.S. Appl. No. 16/783,866 , (8 pages).
"Non Final Office Action mailed on Jan. 26, 2021", U.S. Appl. No. 16/928,313 , (33 pages).
"Non Final Office Action mailed on Jan. 27, 2021", U.S. Appl. No. 16/225,961 (15 pages).
"Non Final Office Action mailed on Jul. 27, 2020", U.S. Appl. No. 16/435,933 , (16 pages).
"Non Final Office Action mailed on Jul. 9, 2021", U.S. Appl. No. 17/002,663 , (43 pages).
"Non Final Office Action mailed on Jul. 9, 2021", U.S. Appl. No. 16/833,093 , (47 pages).
"Non Final Office Action mailed on Jun. 10, 2021", U.S. Appl. No. 16/938,782 , (40 Pages).
"Non Final Office Action mailed on Jun. 17, 2020", U.S. Appl. No. 16/682,911 , (22 pages).
"Non Final Office Action mailed on Jun. 19, 2020", U.S. Appl. No. 16/225,961 (35 pages).
"Non Final Office Action mailed on Jun. 29, 2021", U.S. Appl. No. 16/698,588 , (58 pages).
"Non Final Office Action mailed on Mar. 3, 2021", U.S. Appl. No. 16/427,337 , (41 pages).
"Non Final Office Action mailed on Mar. 31, 2022", U.S. Appl. No. 17/257,814 , (60 pages).
"Non Final Office Action mailed on Mar. 9, 2022", U.S. Appl. No. 16/870,676 , (57 pages).
"Non Final Office Action mailed on May 10, 2022", U.S. Appl. No. 17/140,921 , (25 pages).
"Non Final Office Action mailed on May 17, 2022", U.S. Appl. No. 16/748,193 , (11 pages).
"Non Final Office Action mailed on May 26, 2021", U.S. Appl. No. 16/214,575 , (19 pages).
"Non Final Office Action mailed on Nov. 19, 2019", U.S. Appl. No. 16/355,611 , (31 pages).
"Non Final Office Action mailed on Nov. 5, 2020", U.S. Appl. No. 16/530,776 , (45 pages).
"Non Final Office Action mailed on Oct. 22, 2019", U.S. Appl. No. 15/859,277 , (15 pages).
"Non Final Office Action mailed on Sep. 1, 2020", U.S. Appl. No. 16/214,575 , (40 pages).
"Non Final Office Action mailed on Sep. 20, 2021", U.S. Appl. No. 17/105,848 , (56 pages).
"Non Final Office Action mailed on Sep. 29, 2021", U.S. Appl. No. 16/748,193 , (62 pages).
"Notice of Allowance mailed on Mar. 25, 2020", U.S. Appl. No. 15/564,517 (11 pages).
"Notice of Allowance mailed on Oct. 5, 2020", U.S. Appl. No. 16/682,911 , (27 pages).
"Notice of Reason of Refusal mailed on Sep. 11, 2020 with English translation", Japanese Patent Application No. 2019-140435 , (6 pages).
"Phototourism Challenge", CVPR 2019 Image Matching Workshop. https://image matching-workshop. github.io. , (16 pages).
"Summons to attend oral proceedings pursuant to Rule 115(1) EPC mailed on Jul. 15, 2019", European Patent Application No. 15162521.7, (7 pages).
Aarik, J. , et al. , "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document , (2 pages).
Altwaijry , et al. , "Learning to Detect and Match Keypoints with Deep Architectures" , Proceedings of the British Machine Vision Conference (BMVC), BMVA Press, Sep. 2016, [retrieved on Jan. 8, 2021 (Jan. 8, 2021)] < URL: http://www.bmva.org/bmvc/2016/papers/paper049/index.html >, en lire document, especially Abstract.
Arandjelović, Relja , et al. , "Three things everyone should know to improve object retrieval" , CVPR, 2012 , (8 pages).
AZOM , "Silica—Silicon Dioxide (SiO2)" , AZO Materials; Publication [Online]. Dec. 13, 2001 [retrieved Feb. 19, 2020]. Retrieved from the Internet: <URL: https://www.azom.com/article.aspx?ArticleID=1114>.
Azuma, Ronald T. , "A Survey of Augmented Reality" , Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T. , "Predictive Tracking for Augmented Reality", Department of Computer Science, Chapel Hill NC; TR95-007, Feb. 1995 , 262 pages.
Battaglia, Peter W, et al. , "Relational inductive biases, deep learning, and graph networks", arXiv:1806.01261, Oct. 17, 2018 , pp. 1-40.
Berg, Alexander C , et al. , "Shape matching and object recognition using low distortion correspondences", In CVPR, 2005 , (8 pages).
Bian, Jiawang , et al. , "GMS: Grid-based motion statistics for fast, ultra-robust feature correspondence.", In CVPR (Conference on Computer Vision and Pattern Recognition), 2017 , (10 pages).
Bimber, Oliver , et al. , "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007) , (393 pages).
Brachmann, Eric , et al. , "Neural-Guided RANSAC: Learning Where to Sample Model Hypotheses", In ICCV (International Conference on Computer Vision ), arXiv:1905.04132v2 [cs.CV] Jul. 31, 2019 , (17 pages).
Butail , et al. , "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document.
Caetano, Tiberio S , et al. , "Learning graph matching", IEEE TPAMI, 31(6):1048-1058, 2009.
Cech, Jan , et al. , "Efficient sequential correspondence selection by cosegmentation", IEEE TPAMI, 32(9):1568-1581, Sep. 2010.
Cuturi, Marco , "Sinkhorn distances: Lightspeed computation of optimal transport", NIPS, 2013 , (9 pages).
Dai, Angela , et al. , "ScanNet: Richly-annotated 3d reconstructions of indoor scenes", In CVPR, arXiv:1702.04405v2 [cs.CV] Apr. 11, 2017 , (22 pages).
Deng, Haowen , et al. , "PPFnet: Global context aware local features for robust 3d point matching" , In CVPR, arXiv:1802.02669v2 [cs.CV] Mar. 1, 2018 , (12 pages).
Detone, Daniel , et al. , "Deep image homography estimation", In RSS Work-shop: Limits and Potentials of Deep Learning in Robotics, arXiv:1606.03798v1 [cs.CV] Jun. 13, 2016 , (6 pages).
Detone, Daniel , et al., "Self-improving visual odometry", arXiv:1812.03245, Dec. 8, 2018 , (9 pages).

(56) References Cited

OTHER PUBLICATIONS

Detone, Daniel, et al., "SuperPoint: Self-supervised interest point detection and description", In CVPR Workshop on Deep Learning for Visual SLAM, arXiv:1712.07629v4 [cs.CV] Apr. 19, 2018, (13 pages).

Dusmanu, Mihai, et al., "D2-net: A trainable CNN for joint detection and description of local features", CVPR, arXiv:1905.03561v1 [cs.CV] May 9, 2019, (16 pages).

Ebel, Patrick, et al., "Beyond cartesian representations for local descriptors", ICCV, arXiv:1908.05547v1 [cs.CV] Aug. 15, 2019, (11 pages).

Fischler, Martin A, et al., "Random sample consensus: a paradigm for model fitting with applications to image analysis and automated cartography", Communications of the ACM, 24(6): 1981, pp. 381-395.

Gilmer, Justin, et al., "Neural message passing for quantum chemistry", In ICML, arXiv:1704.01212v2 [cs.LG] Jun. 12, 2017, (14 pages).

Giuseppe, Donato, et al., "Stereoscopic helmet mounted system for real time 3D environment reconstruction and indoor ego—motion estimation", Proc. SPIE 6955, Head- and Helmet-Mounted Displays XIII: Design and Applications, SPIE Defense and Security Symposium, 2008, Orlando, Florida, United States, 69550P.

Goodfellow, "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?Article1D=1179>.

Hartley, Richard, et al., "Multiple View Geometry in Computer Vision", Cambridge University Press, 2003, pp. 1-673.

Jacob, Robert J.K., "Eye Tracking in Advanced Interface Design", Human-Computer Interaction Lab, Naval Research Laboratory, Washington, D.C., date unknown. 2003, pp. 1-50.

Lee, et al., "Self-Attention Graph Pooling", Cornell University Library/Computer Science/Machine Learning, Apr. 17, 2019 [retrieved on Jan. 8, 2021 from the Internet<URL: https://arxiv.org/abs/1904.08082 >, entire document.

Lee, Juho, et al., "Set transformer: A frame-work for attention-based permutation-invariant neural networks", ICML, arXiv:1810.00825v3 [cs.LG] May 26, 2019, (17 pages).

Leordeanu, Marius, et al., "A spectral technique for correspondence problems using pairwise constraints", Proceedings of (ICCV) International Conference on Computer Vision, vol. 2, pp. 1482-1489, Oct. 2005, (8 pages).

Levola, T., "Diffractive Optics for Virtual Reality Displays", Journal of the SID Eurodisplay 14/05, 2005, XP008093627, chapters 2-3, Figures 2 and 10, pp. 467-475.

Levola, Tapani, "Invited Paper: Novel Diffractive Optical Components for Near to Eye Displays—Nokia Research Center", SID 2006 DIGEST, 2006 SID International Symposium, Society for Information Display, vol. XXXVII, May 24, 2005, chapters 1-3, figures 1 and 3, pp. 64-67.

Li, Yujia, et al., "Graph matching networks for learning the similarity of graph structured objects", ICML, arXiv:1904.12787v2 [cs.LG] May 12, 2019, (18 pages).

Li, Zhengqi, et al., "Megadepth: Learning single- view depth prediction from internet photos", In CVPR, fromarXiv: 1804.00607v4 [cs.CV] Nov. 28, 2018, (10 pages).

Libovicky, et al., "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document.

Loiola, Eliane Maria, et al., "A survey for the quadratic assignment problem", European journal of operational research, 176(2): 2007, pp. 657-690.

Lowe, David G, "Distinctive image features from scale- invariant keypoints", International Journal of Computer Vision, 60(2): 91-110, 2004, (28 pages).

Luo, Zixin, et al., "ContextDesc: Local descriptor augmentation with cross-modality context", CVPR, arXiv:1904.04084v1 [cs.CV] Apr. 8, 2019, (14 pages).

Memon, F., et al., "Synthesis, Characterization and Optical Constants of Silicon Oxycarbide", EPJ Web of Conferences; Publication [online]. Mar. 23, 2017 [retrieved Feb. 19, 2020) .<URL: https://www.epj-conferences.org/articles/epjconf/pdf/2017/08/epjconf_nanop2017 _00002.pdf>; DOI: 10.1051/epjconf/201713900002, (8 pages).

Molchanov, Pavlo, et al., "Short-range FMCW monopulse radar for hand-gesture sensing", 2015 IEEE Radar Conference (RadarCon) (2015), pp. 1491-1496.

Mrad, et al., "A framework for System Level Low Power Design Space Exploration", 1991.

Munkres, James, "Algorithms for the assignment and transportation problems", Journal of the Society for Industrial and Applied Mathematics, 5(1): 1957, pp. 32-38.

Ono, Yuki, et al., "LF-Net: Learning local features from images", 32nd Conference on Neural Information Processing Systems (NIPS 2018), arXiv:1805.09662v2 [cs.CV] Nov. 22, 2018, (13 pages).

Paszke, Adam, et al., "Automatic differentiation in Pytorch", 31st Conference on Neural Information Processing Systems (NIPS 2017), Long Beach, CA, USA, (4 pages).

Peyré, Gabriel, et al., "Computational Optimal Transport", Foundations and Trends in Machine Learning, 11(5-6):355-607, 2019; arXiv:1803.00567v4 [stat.ML] Mar. 18, 2020, (209 pages).

Qi, Charles Ruizhongtai, et al., "Pointnet++: Deep hierarchical feature learning on point sets in a metric space.", 31st Conference on Neural Information Processing Systems (NIPS 2017), Long Beach, CA, USA., Jun. 7, 2017, (10 pages).

Qi, Charles R, et al., "Pointnet: Deep Learning on Point Sets for 3D Classification and Segmentation", CVPR, arXiv:1612.00593v2 [cs.CV] Apr. 10, 2017, (19 pages).

Radenović, Filip, et al., "Revisiting Oxford and Paris: Large-Scale Image Retrieval Benchmarking", CVPR, arXiv:1803.11285v1 [cs.CV] Mar. 29, 2018, (10 pages).

Raguram, Rahul, et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).

Ranftl, René, et al., "Deep fundamental matrix estimation", European Conference on Computer Vision (ECCV), 2018, (17 pages).

Revaud, Jerome, et al., "R2D2: Repeatable and Reliable Detector and Descriptor", In NeurIPS, arXiv:1906.06195v2 [cs.CV] Jun. 17, 2019, (12 pages).

Rocco, Ignacio, et al., "Neighbourhood Consensus Networks", 32nd Conference on Neural Information Processing Systems (NeurIPS 2018), Montreal, Canada, arXiv:1810.10510v2 [cs.CV] Nov. 29, 2018, (20 pages).

Rublee, Ethan, et al., "ORB: An efficient alternative to SIFT or SURF", Proceedings of the IEEE International Conference on Computer Vision. 2564-2571. 2011; 10.1109/ICCV.2011.612654, (9 pages).

Sarlin, et al., "SuperGlue: Learning Feature Matching with Graph Neural Networks", Cornell University Library/Computer Science/Computer Vision and Pattern Recognition, Nov. 26, 2019 [retrieved on Jan. 8, 2021 from the Internet< URL: https://arxiv.org/abs/1911.11763 >, entire document.

Sattler, Torsten, et al., "SCRAMSAC: Improving RANSAC's efficiency with a spatial consistency filter", ICCV, 2009: 2090-2097., (8 pages).

Schonberger, Johannes Lutz, et al., "Pixelwise view selection for un- structured multi-view stereo", Computer Vision—ECCV 2016: 14th European Conference, Amsterdam, The Netherlands, Oct. 11-14, 2016, Proceedings, Part III, pp. 501-518, 2016.

Schonberger, Johannes Lutz, et al., "Structure-from-motion revisited", Proceedings of the IEEE Conference on Computer Vision and Pattern Recognition (CVPR), 2016, pp. 4104-4113, (11 pages).

Sheng, Liu, et al., "Time-multiplexed dual-focal plane head-mounted display with a liquid lens", Optics Letters, Optical Society

(56) References Cited

OTHER PUBLICATIONS of Amer I Ca, US, vol. 34, No. 11, Jun. 1, 2009 (Jun. 1, 2009), XP001524475, ISSN: 0146-9592 , pp. 1642-1644.
Sinkhorn, Richard , et al. , "Concerning nonnegative matrices and doubly stochastic matrices." , Pacific Journal of Mathematics, 1967, pp. 343-348.
Spencer, T. , et al. , "Decomposition of poly(propylene carbonate) with UV sensitive iodonium 11 salts", Polymer Degradation and Stability; (online]. Dec. 24, 2010 (retrieved Feb. 19, 2020]. , (17 pages).
Tanriverdi, Vildan , et al. , "Interacting With Eye Movements in Virtual Environments", Department of Electrical Engineering and Computer Science, Tufts University; Proceedings of the SIGCHI conference on Human Factors in Computing Systems, Apr. 2000 , pp. 1-8.
Thomee, Bart , et al. , "YFCC100m: The new data in multimedia research", Communications of the ACM, 59(2):64-73, 2016; arXiv: 1503.01817v2 [cs.MM] Apr. 25, 2016 , (8 pages).
Torresani, Lorenzo , et al. , "Feature correspondence via graph matching: Models and global optimization", Computer Vision—ECCV 2008, 10th European Conference on Computer Vision, Marseille, France, Oct. 12-18, 2008, Proceedings, Part II , (15 pages).
Tuytelaars, Tinne , et al. , "Wide baseline stereo matching based on local, affinely invariant regions", BMVC, 2000 , pp. 1-14.
Ulyanov, Dmitry , et al. , "Instance normalization: The missing ingredient for fast stylization", arXiv: 1607.08022v3 [cs.CV] Nov. 6, 2017 , (6 pages).
Vaswani, Ashish , et al. , "Attention is all you need", 31st Conference on Neural Information Processing Systems (NIPS 2017), Long Beach, CA, USA; arXiv:1706.03762v5 [cs.CL] Dec. 6, 2017 , (15 pages).
Veličković, Petar , et al. , "Graph attention networks", ICLR, arXiv:1710.10903v3 [stat.ML] Feb. 4, 2018 , (12 pages).
Mllani, Cédric , "Optimal transport: old and new", vol. 338. Springer Science & Business Media, Jun. 2008 , pp. 1-998.
Wang, Xiaolong , et al. , "Non-local neural networks" , CVPR, arXiv:1711.07971v3 [cs.CV] Apr. 13, 2018 , (10 pages).
Wang, Yue , et al. , "Deep Closest Point: Learning representations for point cloud registration", ICCV, arXiv:1905.03304v1 [cs.CV] May 8, 2019 , (10 pages).
Wang, Yue , et al. , "Dynamic Graph CNN for learning on point clouds", ACM Transactions on Graphics, arXiv:1801.07829v2 [cs.CV] Jun. 11, 2019 , (13 pages).
Weissel , et al. , "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>.
Yi, Kwang Moo, et al. , "Learning to find good correspondences", CVPR, arXiv:1711.05971v2 [cs.CV] May 21, 2018 , (13 pages).
Yi, Kwang Moo , et al. , "Lift: Learned invariant feature transform", ECCV, arXiv:1603.09114v2 [cs.CV] Jul. 29, 2016 , (16 pages).
Zaheer, Manzil , et al. , "Deep Sets", 31st Conference on Neural Information Processing Systems (NIPS 2017), Long Beach, CA, USA; arXiv: 1703.06114v3 [cs.LG] Apr. 14, 2018 , (29 pages).
Zhang, Jiahui , et al. , "Learning two-view correspondences and geometry using order-aware network", ICCV; aarXiv:1908.04964v1 [cs.CV] Aug. 14, 2019 , (11 pages).
Zhang, Li , et al. , "Dual graph convolutional net- work for semantic segmentation", BMVC, 2019; arXiv:1909.06121v3 [cs.CV] Aug. 26, 2020 , (18 pages).
"Communication Pursuant to Article 94(3) EPC mailed on Oct. 6, 2023", European Patent Application No. 19851373.1, (6 pages).
"Extended European Search Report issued on Jan. 8, 2024", European Patent Application No. 23195266.4, (8 pages).
"Final Office Action mailed on Dec. 1, 2023", U.S. Appl. No. 17/357,795, (18 pages).
"First Office Action mailed Dec. 12, 2023 with English translation", Japanese Patent Application No. 2021-545712, (8 pages).
"First Office Action mailed Dec. 20, 2023 with English translation", Chinese Patent Application No. 201980050600.X, (21 pages).
"First Office Action mailed Dec. 27, 2023 with English translation", Chinese Patent Application No. 201980075942.7, (7 pages).
"First Office Action mailed Nov. 2, 2023 with English translation", Chinese Patent Application No. 201980090867.1, (16 pages).
"First Office Action mailed on Dec. 11, 2023 with translation", Chinese Patent Application No. 201980032005.3, (17 pages).
"First Office Action mailed on Dec. 25, 2023 with English translation", Chinese Patent Application No. 2019800046303.8, (13 pages).
"Non Final Office Action mailed on Feb. 26, 2024", U.S. Appl. No. 18/046,739, (48 pages).
"Non Final Office Action mailed on Nov. 22, 2023", U.S. Appl. No. 17/268,376, (8 pages).
"Non Final Office Action mailed on Nov. 3, 2023", U.S. Appl. No. 17/416,248, (17 pages).
"Office Action mailed Nov. 21, 2023 with English Translation", Japanese Patent Application No. 2021-535716, (15 pages).
"Office Action mailed on Dec. 14, 2023 with English translation", Japanese Patent Application No. 2021-526564, (13 pages).
"Office Action mailed on Nov. 7, 2023 with English translation", Korean Patent Application No. 10-2023-7036734, (5 pages).
"Office Action mailed on Nov. 8, 2023 with English translation", Chinese Patent Application No. 201980060018.1, (12 pages).
"Penultimate Office Action mailed on Oct. 19, 2023 with English translation", Japanese Patent Application No. 2021-509779, (5 pages).
"Communication Pursuant to Article 94(3) EPC mailed on Feb. 21, 2024", European Patent Application No. 20770244.0, (8 pages).
"Extended European Search Report issued on Apr. 25, 2024", European Patent Application No. 23208907.8, (9 pages).
"Final Office Action mailed on May 24, 2024", U.S. Appl. No. 18/046,739, (52 pages).
"First Office Action mailed Mar. 1, 2024 with English translation", Japanese Patent Application No. 2021-553297, (5 pages).
"First Office Action mailed on Feb. 1, 2024 with English translation", Chinese Patent Application No. 202080018865.4, (9 pages).
"First Office Action mailed on Mar. 25, 2024 with English translation", Chinese Patent Application No. 202080018919.7, (21 pages).
"Non Final Office Action mailed on May 16, 2024", U.S. Appl. No. 18/361,546, (11 pages).
"Office Action mailed on Feb. 19, 2024 with English translation", Korean Patent Application No. 10-2020-7020552, (18 pages).
"Office Action mailed on Feb. 26, 2024 with English translation", Chinese Patent Application No. 201980069194.1, (11 pages).
"Office Action mailed on Mar. 6, 2024 with English translation", Chinese Patent Application No. 201980053016.X, (7 pages).
"Communication Pursuant to Article 94(3) EPC mailed on Mar. 11, 2024", European Patent Application No. 20798769.4, (12 pages).
"Extended European Search Report issued on Aug. 6, 2024", European Patent Application No. 24184599.9, (14 pages).
"Extended European Search Report issued on Jul. 9, 2024", European Patent Application No. 24166847.4, (8 pages).
"First Office Action mailed Jun. 20, 2024 with English translation", Japanese Patent Application No. 2021-564496, (14 pages).
"First Office Action mailed Jun. 24, 2024 with English translation", Japanese Patent Application No. 2022-504602, (7 pages).
"First Office Action mailed Mar. 20, 2024 with English translation", Chinese Patent Application No. 202080048293.4, (22 pages).
"Non Final Office Action mailed on Jun. 17, 2024", U.S. Appl. No. 18/348,732, (19 pages).
"Non Final Office Action mailed on Sep. 24, 2024", U.S. Appl. No. 18/597,716, (9 pages).
"Second Office Action with English translation mailed on Jul. 2, 2024", Chinese Patent Application No. 201980032005.3, (15 pages).
"Communication Pursuant to Article 94(3) EPC mailed Nov. 28, 2024", European Patent Application No. 19885958.9, (5 pages).
"Communication Pursuant to Article 94(3) EPC mailed on Nov. 21, 2024", European Patent Application No. 20846338.0, (11 pages).

(56) References Cited

OTHER PUBLICATIONS

"Extended European Search Report issued on Dec. 2, 2024", European Patent Application No. 24167829.1, (7 pages).
"First Office Action mailed Oct. 17, 2024 with English translation", Japanese Patent Application No. 2022-527990, (24 pages).
"Office Action mailed on Nov. 7, 2024 with English translation", Korean Patent Application No. 10-2024-7032937, (7 pages).
"Penultimate Office Action mailed on Sep. 17, 2024 with English translation", Japanese Patent Application No. 2023-115047, (7 pages).
"Communication Pursuant to Article 94(3) EPC mailed on Feb. 7, 2025", European Patent Application No. 20154070.5, (7 pages).
"Communication Pursuant to Article 94(3) EPC mailed on Nov. 14, 2024", European Patent Application No. 19845418.3, (4 pages).
"Final Office Action mailed on Dec. 13, 2024 with English translation", Japanese Patent Application No. 2021-564496, (13 pages).
"Non Final Office Action mailed on Jan. 3, 2025", U.S. Appl. No. 18/746,709, (31 pages).
"Office Action mailed on Jan. 22, 2025 with English translation", Japanese Patent Application No. 2024-63271, (8 pages).

\* cited by examiner

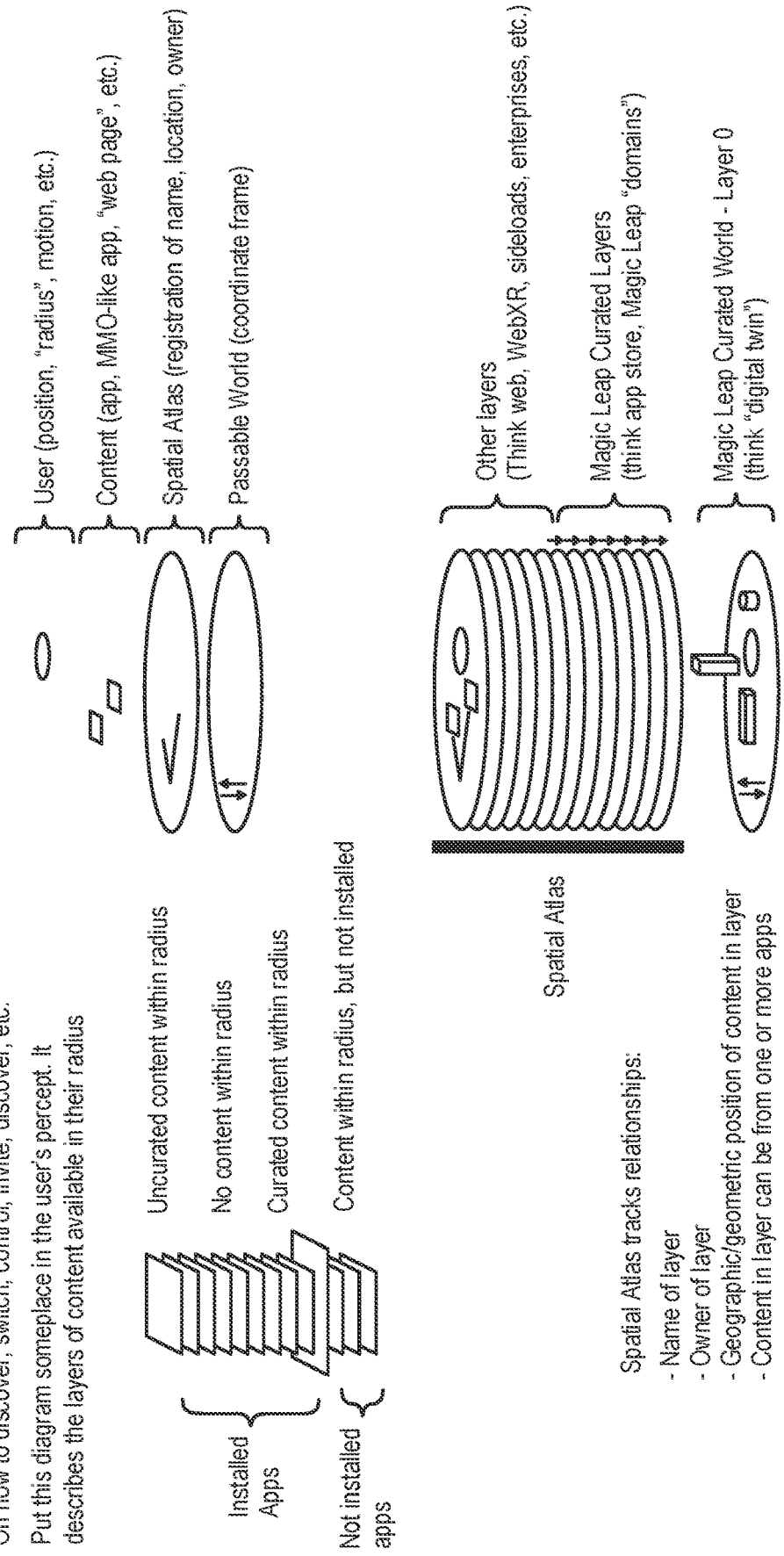

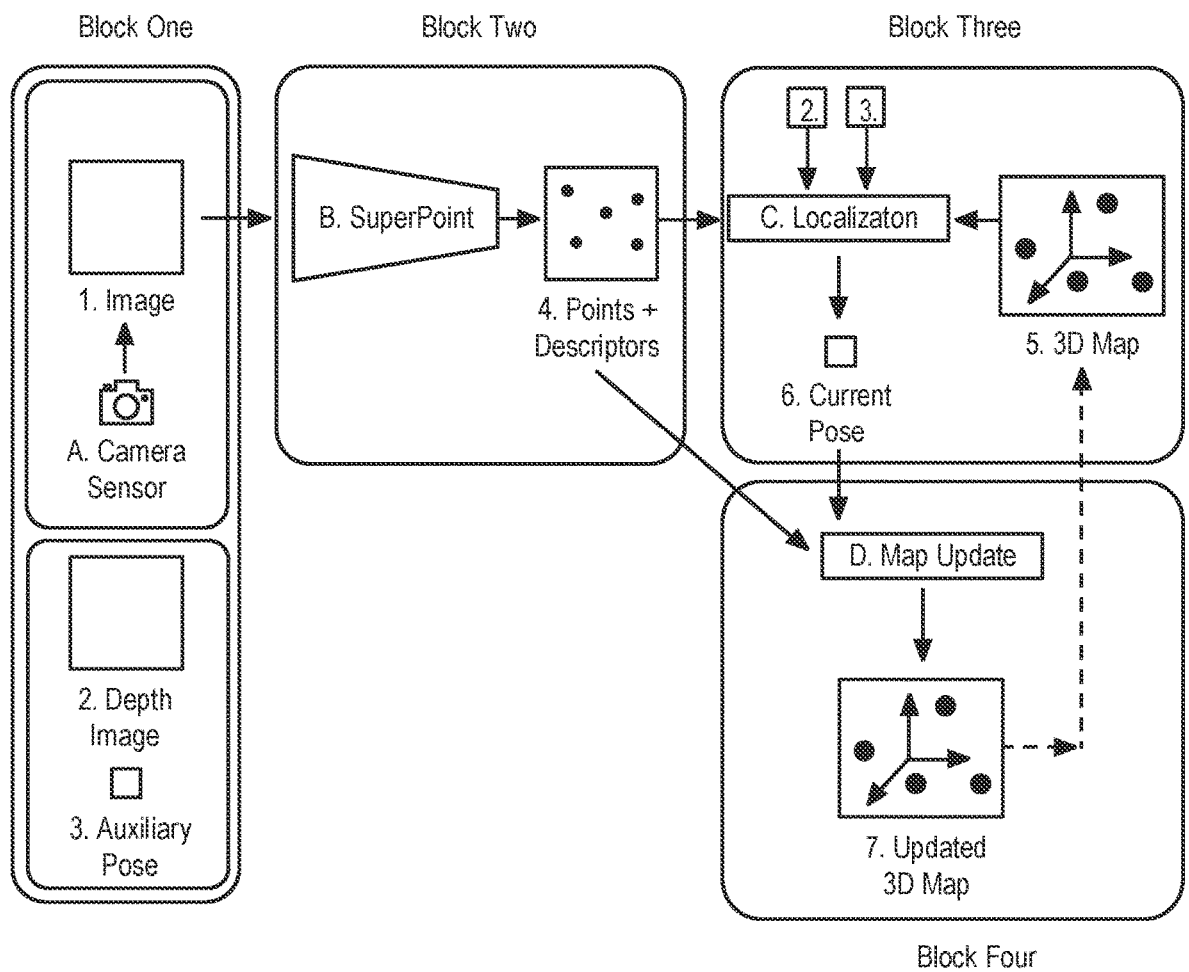

"SUPERPOINT"- BASED SLAM OVERVIEW. THE CORE INPUT DATA STRUCTURES ARE 1. THE INPUT IMAGE, 2. THE AUXILIARY DEPTH IMAGE, 3. THE AUXILIARY POSE. THE OUTPUT OF SUPER POINT IS 4. POINTS AND DESCRIPTORS. THE OUTPUT OF THE LOCALIZATION MODULE IS THE CURRENT POSE. THE OUTPUT OF THE MAP UPDATE MODULE IS AN UPDATED 3D MAP. NOTICE HOW THE AUXILIARY INPUTS (BLOCKS 2. AND 3.) CAN BE GIVEN AS INPUTS TO THE LOCALIZATION MODULE.

Figure 38

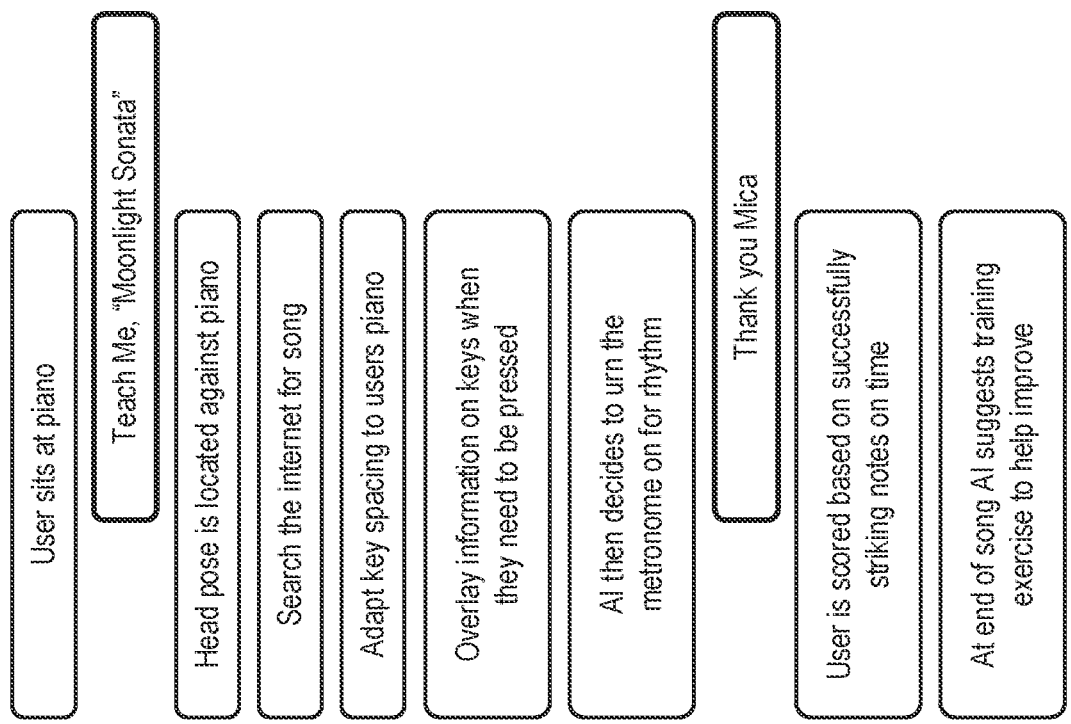
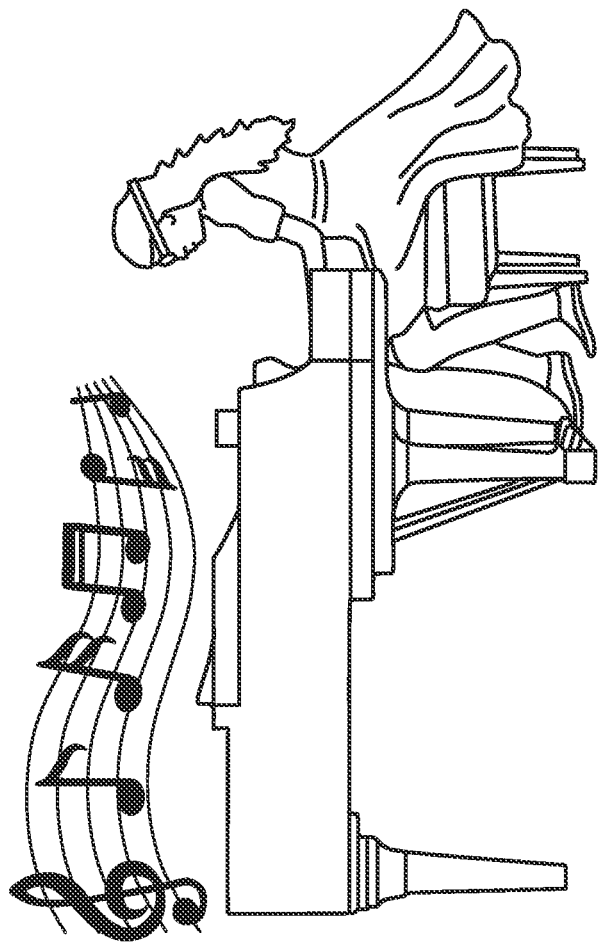
Figure 55

Model is stored in Architectural model database

Room is mapped and has Edge Node

Mica, show the Peterson House (and points at the table)

All XR devices render from Edge node to absolute coordinate system

Each XR device is sent the info based on their pose

Thank you Mica

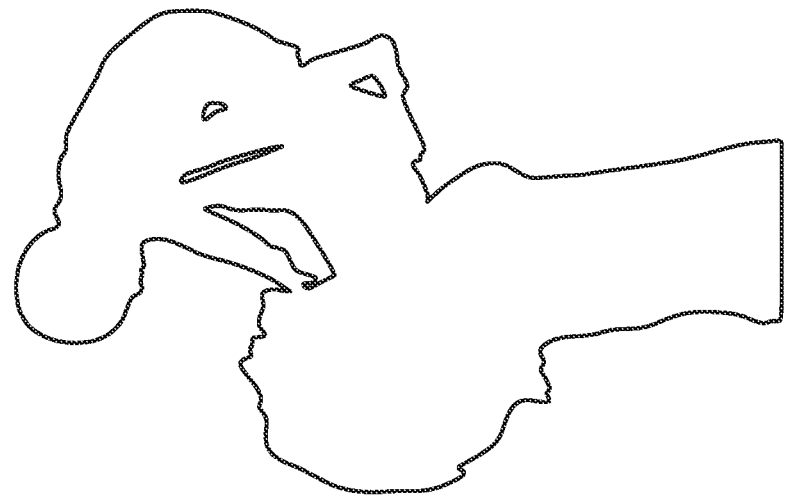
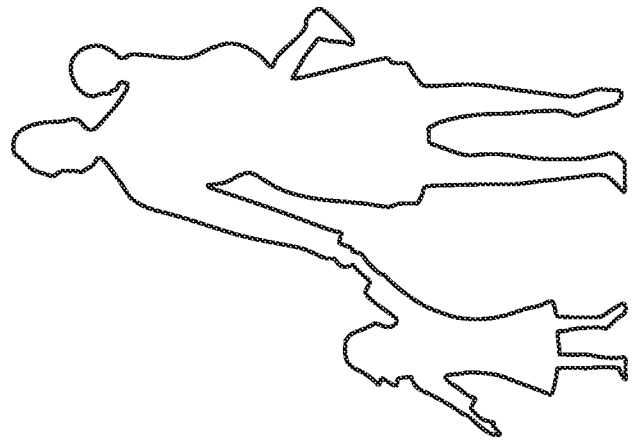
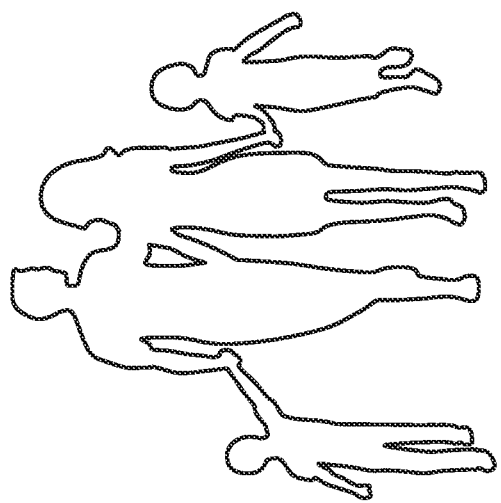
For every person who has an XR device information can be collected if user or parent/guardian opts in
This allows real time tracking and health monitoring of children and the elderly
Sensors such as GPS can be placed in backpacks and can be located in the MagicVerse
Figure 63

CONTENT PROVISIONING SYSTEM AND METHOD

CROSS-REFERENCE TO RELATED APPLICATIONS

This is a divisional application of U.S. patent application Ser. No. 16/864,721, filed on May 1, 2020, which claims priority from U.S. Provisional Patent Application No. 62/841,806, filed on May 1, 2019, all of which are incorporated herein by reference in their entirety.

BACKGROUND OF THE INVENTION

1). Field of the Invention

This invention is related to connected mobile computing systems, methods, and configurations, and more specifically to content provisioning systems, mobile computing systems, methods, and configurations featuring at least one wearable component which may be utilized for virtual and/or augmented reality operation

2). Discussion of Related Art

Content provisioning systems that have one or more augmented reality systems have become popular for viewing the real world with a superimposition of digital content. A content provisioning system may for example include a mobile device such as head-worn viewing component. The content provisioning system may further include a resource device having a resource device data set including content a storage medium. The resource device transmits the content to the mobile device. The mobile device has an output device connected capable of providing an output that can be sensed by a user.

SUMMARY OF THE INVENTION

The invention provides a content provisioning system including a mobile device that may have a mobile device processor, a mobile device communication interface connected to the mobile device processor and a first resource device communication interface and under the control of the mobile device processor to receive first content transmitted by the first resource device transmitter, and a mobile device output device connected to the mobile device processor and under control of the mobile device processor capable of providing an output that can be sensed by a user.

The content provisioning system may further include a first resource device that may have a first resource device processor, a first resource device storage medium, and a first resource device data set including first content on the first resource device storage medium, the first resource device communication interface forming part of the first resource device and connected to the first resource device processor and being under the control of the first resource device processor.

The content provisioning system may include that the first resource device is at first location, wherein the mobile device communication interface creates a first connection with the first resource device, and wherein the content is first content specific to a first geographic parameter of the first connection.

The content provisioning system may further include a second resource device that may have a second resource device processor, a second resource device storage medium, a second resource device data set including second content on the second resource device storage medium, and a second resource device communication interface forming part of the second resource device and connected to the second resource device processor and being under the control of the second resource device processor, wherein the second resource device is at second location, wherein the mobile device communication interface creates a second connection with the second resource device, and wherein the content is second content specific to a second geographic parameter of the second connection, The content provisioning system may include that the mobile device includes head-worn viewing component which is couplable to the head of the user and the first and second content provide the user with at least one of additional content, enhanced content and information that pertains to a particular view of the world as seen by the user.

The content provisioning system may further include a localization island for the user to enter wherein specific features have been pre-configured to be located and interpreted by the mobile device to determine the geographic parameter relative to the world around the user.

The content provisioning system may include that the specific features are visually-detectable features.

The content provisioning system may include that the specific features are wireless connectivity-related features.

The content provisioning system may further include a plurality of sensors connected to the head-worn viewing component that are used by the mobile device to determine the geographic parameter relative to the world around the user.

The content provisioning system may further include a user interface configured to allow the user to at least one of intake, utilize, view, and bypass certain information of the first or second content.

The content provisioning system may include that the connection is a wireless connection.

The content provisioning system may include that the first resource device is at first location, wherein the mobile device has a sensor that detects a first feature at the first location and the first feature is used to determine a first geographic parameter associated with the first feature, and wherein the content is first content specific to a first geographic parameter.

The content provisioning system may include the second resource device is at second location, wherein the mobile device has a sensor that detects a second feature at the second location and the second feature is used to determine a second geographic parameter associated with the second feature, and wherein the first content is updated with second content specific to a second geographic parameter.

The content provisioning system may include that the mobile device includes head-worn viewing component which is couplable to the head of the user and the first and second content provide the user with at least one of additional content, enhanced content and information that pertains to a particular view of the world as seen by the user.

The content provisioning system may further include a spatial computing layer between the mobile device and a resource layer having a plurality of data sources and programmed to receive data resources, integrate the data resources to determine an integrated profile, and determine the first content based on the integrated profile.

The content provisioning system may include that the spatial computing layer may include a spatial computing resource device that may have a spatial computing resource device processor, a spatial computing resource device storage medium, and a spatial computing resource device data set on the spatial computing resource device storage medium and executable by the processor to receive the data resources, integrate the data resources to determine an integrated profile, and determine the first content based on the integrated profile.

The content provisioning system may further include an abstraction and arbitration layer interposed between the mobile device and the resource layer and programmed to make workload decisions, and distribute tasks based on the workload decisions.

The content provisioning system may further include a camera device that takes images of a physical world around the mobile device, wherein the images are used to make the workload decisions.

The content provisioning system may further include a camera device that takes images of a physical world around the mobile device, wherein the images form one of the data resources.

The content provisioning system may include that the first resource device is an edge resource device, wherein the mobile device communication interface includes one or more mobile device receivers connected to the mobile device processor and to a second resource device communication interface in parallel with the connection with the first resource device to receive second content.

The content provisioning system may include that the second resource device is a fog resource device having a second latency that is slower than the first latency.

The content provisioning system may include that the mobile device communication interface includes one or more mobile device receivers connected to the mobile device processor and to a third resource device communication interface in parallel with the connection with the second resource device to receive third content transmitted by the third resource device transmitter, wherein the third resource device is a cloud resource device having a third latency that is slower than the second latency The content provisioning system may include that the connection to the edge resource device is through a cell tower and the connection to the fog resource device is through a Wi-Fi connection device.

The content provisioning system may include that the cell tower is connected to the fog resource device.

The content provisioning system may include that the Wi-Fi connection device is connected to the fog resource device.

The content provisioning system may further include at least one camera to capture at least first and second images, wherein the mobile device processor transmits the first image to the edge resource device for faster processing and the second image to the fog resource device for slower processing.

The content provisioning system may include that the at least one camera is a room camera that takes the first image of the user.

The content provisioning system may further include a sensor providing a sensor input into a processor, a pose estimator, executable by a processor, to calculate to a pose of the mobile device, including at least one of a location and an orientation of the mobile device, based on the sensor input, a steerable wireless connector that creates a steerable wireless connection between the mobile device and the edge resource device, and a steering system connected to the pose estimator and having an output that provides an input into the steerable wireless connector to steer the steerable wireless connection to at least improve the connection.

The content provisioning system may include that the steerable wireless connector is a phased array antennae.

The content provisioning system may include that the steerable wireless connector is a radar hologram type of transmission connector.

The content provisioning system may further include an arbitrator function executable by a processor to determine how many edge and fog resources are available through the edge and fog resource devices respectively send processing tasks to the edge and fog resources according to the determination of the resources that are available, and receive results back from the edge and fog resources.

The content provisioning system may include that the arbitrator function is executable by the processor to combine the results from the edge and fog resources.

The content provisioning system may further include a runtime controller function executable by the processor to determine whether a process is a runtime process or not, if the determination is made that the task is a runtime process then, executing the task immediately without making the determination with the arbitrator function, and if the determination is made that the task is not a runtime process then making the determination with the arbitrator function.

The content provisioning system may further include a plurality of edge resource devices, data exchanging between a plurality of the edge resource devices and the fog resource device, the data including points in space captured by different sensors and sent to the edge resource devices, and a superpoint calculation function, executable by a processor, to determine superpoints, being select ones of the points where the data from two or more of the edge resource devices overlap.

The content provisioning system may further include a plurality of multiple mobile devices, wherein each superpoint is used in each mobile device for localization, orientation or pose estimation of the respective mobile device.

The content provisioning system may further include a context trigger function, executable with at processor, to generate a context trigger for a group of the superpoints and store the context trigger on a computer-readable medium.

The content provisioning system may further include a rendering engine, executable by the mobile device processor, wherein the context trigger is used as a handle for a rendering of an object based on the first content.

The content provisioning system may further include a rendering function executable by the mobile device processor to connect the mobile device to a plurality of resource devices, wherein each resource device receives a respective rendering request, to receive a rendering from each one of the remote devices based on the respective rendering requests, compare the renderings to determine a preferred rendering, and select, with the mobile device processor, the preferred rendering as the first content transmitted by the first resource device transmitter.

The content provisioning system may include that the renderings form a system having a polynomial prediction for rendering frames into the future where the mobile device is predicted to be posed or looking.

The invention also provides a method of providing content including connecting, under control of a mobile device processor of a mobile device, a mobile device communication interface of the mobile device to a first resource device communication interface of a first resource device, and receiving, with the mobile device communication interface under control of the mobile device processor, first content transmitted by the first resource device transmitter.

The method may further include storing, under control of a first resource device processor, a first resource device data set including first content on a first resource device storage medium connected to the first resource device processor, and transmitting, with a first resource device communication interface connected to the first resource device processor and under the control of the first resource device processor the first content.

The method may include that the first resource device is at first location, wherein the mobile device communication interface creates a first connection with the first resource device, and wherein the content is first content specific to a first geographic parameter of the first connection.

The method may further include storing, under control of a second resource device processor, a second resource device data set including second content on a second resource device storage medium connected to the second resource device processor, and transmitting, with a second resource device communication interface connected to the second resource device processor and under the control of the second resource device processor the second content, wherein the second resource device is at second location, wherein the mobile device communication interface creates a second connection with the second resource device, and wherein the content is second content specific to a second geographic parameter of the second connection.

The method may include that the mobile device includes head-worn viewing component which is couplable to the head of the user and the first and second content provide the user with at least one of additional content, enhanced content and information that pertains to a particular view of the world as seen by the user.

The method may include that the user enters a localization island wherein specific features have been pre-configured to be located and interpreted by the mobile device to determine the geographic parameter relative to the world around the user.

The method may include that the specific features are visually-detectable features.

The method may include that the specific features are wireless connectivity-related features.

The method may include that a plurality of sensors are connected to the head-worn viewing component that are used by the mobile device to determine the geographic parameter relative to the world around the user.

The method may further include receiving through a user interface an input from the user to at least one of intake, utilize, view, and bypass certain information of the first or second content.

The method may include that the connection is a wireless connection.

The method may include that the first resource device is at first location, wherein the mobile device has a sensor that detects a first feature at the first location and the first feature is used to determine a first geographic parameter associated with the first feature, and wherein the content is first content specific to a first geographic parameter.

The method may include that the second resource device is at second location, wherein the mobile device has a sensor that detects a second feature at the second location and the second feature is used to determine a second geographic parameter associated with the second feature, and wherein the first content is updated with second content specific to a second geographic parameter.

The method may include that the mobile device includes head-worn viewing component which is couplable to the head of the user and the first and second content provide the user with at least one of additional content, enhanced content and information that pertains to a particular view of the world as seen by the user.

The method may further include receiving, by a spatial computing layer between the mobile device and a resource layer having a plurality of data sources, data resources, integrating, by the spatial computing layer, the data resources to determine an integrated profile, and determining, by the spatial computing layer, the first content based on the integrated profile.

The method may include that the spatial computing layer may include a spatial computing resource device having a spatial computing resource device processor; a spatial computing resource device storage medium, and a spatial computing resource device data set on the spatial computing resource device storage medium and executable by the processor to receive the data resources, integrate the data resources to determine an integrated profile, and determine the first content based on the integrated profile.

The method may further include making, with an abstraction and arbitration layer interposed between the mobile device and the resource layer, workload decisions, and distributing, with the abstraction and arbitration layer, tasks based on the workload The method may further include taking, with a camera device, images of a physical world around the mobile device, wherein the images are used to make the workload decisions.

The method may further include taking, with a camera device, images of a physical world around the mobile device, wherein the images form one of the data resources.

The method may include that the first resource device is an edge resource device, further including connecting, under control of a mobile device processor of a mobile device and in parallel with the connection with the first resource device, a mobile device communication interface of the mobile device to a second resource device communication interface of a second resource device, receiving, with the mobile device communication interface under control of the mobile device processor, second content transmitted by the second resource device transmitter.

The method may include that the second resource device is a fog resource device having a second latency that is slower than the first latency.

The method may further include connecting, under control of a mobile device processor of a mobile device and in parallel with the connection with the second resource device, a mobile device communication interface of the mobile device to a third resource device communication interface of a third resource device, wherein the third resource device is a cloud resource device having a third latency that is slower than the second latency, and receiving, with the mobile device communication interface under control of the mobile device processor, third content transmitted by the third resource device transmitter.

The method may include that the connection to the edge resource device is through a cell tower and the connection to the fog resource device is through a Wi-Fi connection device.

The method may include that the cell tower is connected to the fog resource device.

The method may include that the Wi-Fi connection device is connected to the fog resource device.

The method may further include capturing at least first and second images with at least one camera, wherein the mobile device processor transmits the first image to the edge resource device and the second image to the fog resource device.

The method may include that the at least one camera is a room camera that takes the first image of the user.

The method may further include receiving, by a processor, a sensor input, determining, with the processor, a pose of the mobile device, including at least one of a location and an orientation of the mobile device, based on the sensor input, and steering, with the processor, a steerable wireless connector that creates a wireless connection between the mobile device to the edge resource device based on the pose to at least improve the connection.

The method may include that the steerable wireless connector is a phased array antennae.

The method may include that the steerable wireless connector is a radar hologram type of transmission connector.

The method may further include determining, with an arbitrator function executed by a processor, how many edge and fog resources are available through the edge and fog resource devices respectively, sending, with the arbitrator function processing tasks to the edge and fog resources according to the determination of the resources that are available, and receiving, with the arbitrator function, results back from the edge and fog resources.

The method may further include combining, with the arbitrator function, the results from the edge and fog resources.

The method may further include determining, by the mobile device processor, whether a process is a runtime process or not, if the determination is made that the task is a runtime process then, executing the task immediately without making the determination with the arbitrator function, and if the determination is made that the task is not a runtime process then making the determination with the arbitrator function.

The method may further include exchanging data between a plurality of edge resource devices and the fog resource device, the data including points in space captured by different sensors and sent to the edge resource devices, and determining superpoints, being select ones of the points where the data from two or more of the edge resource devices overlap.

The method may further include using each superpoint in multiple mobile devices for localization, orientation or pose estimation of the respective mobile device.

The method may further include generating, with a processor, a context trigger for a group of the superpoints, and storing, with the processor, the context trigger on a computer-readable medium.

The method may further include using the context trigger as a handle for a rendering of an object based on the first content.

The method may further include connecting, under control of the mobile device processor, the mobile device to a plurality of resource devices, transmitting, by the mobile device processor, one or more rendering requests, wherein each resource device receives a respective rendering request, receiving, with the mobile device processor, a rendering from each one of the remote devices based on the respective rendering requests, comparing, with the mobile device processors, the renderings to determine a preferred rendering, and selecting, with the mobile device communication interface under control of the mobile device processor, the preferred rendering first content transmitted by the first resource device transmitter.

The method may include that the renderings form a system having a polynomial prediction for rendering frames into the future where the mobile device is predicted to be posed or looking.

BRIEF DESCRIPTION OF THE DRAWINGS

The invention is further described by way of example with reference to the accompanying drawings, wherein:

FIG. 37 is a schematic of a configuration for discovering, switching, and controlling elements within a mobile user's immediate radius;

FIG. 38 is a block diagram of a superpoint-based simultaneous localization and mapping ("SLAM") system;

FIGS. 48 to 66 are illustrations of various exemplary embodiments featuring various XR devices being utilized in various scenarios using aggregated spatial computing.

DETAILED DESCRIPTION OF THE INVENTION

Figure 1:
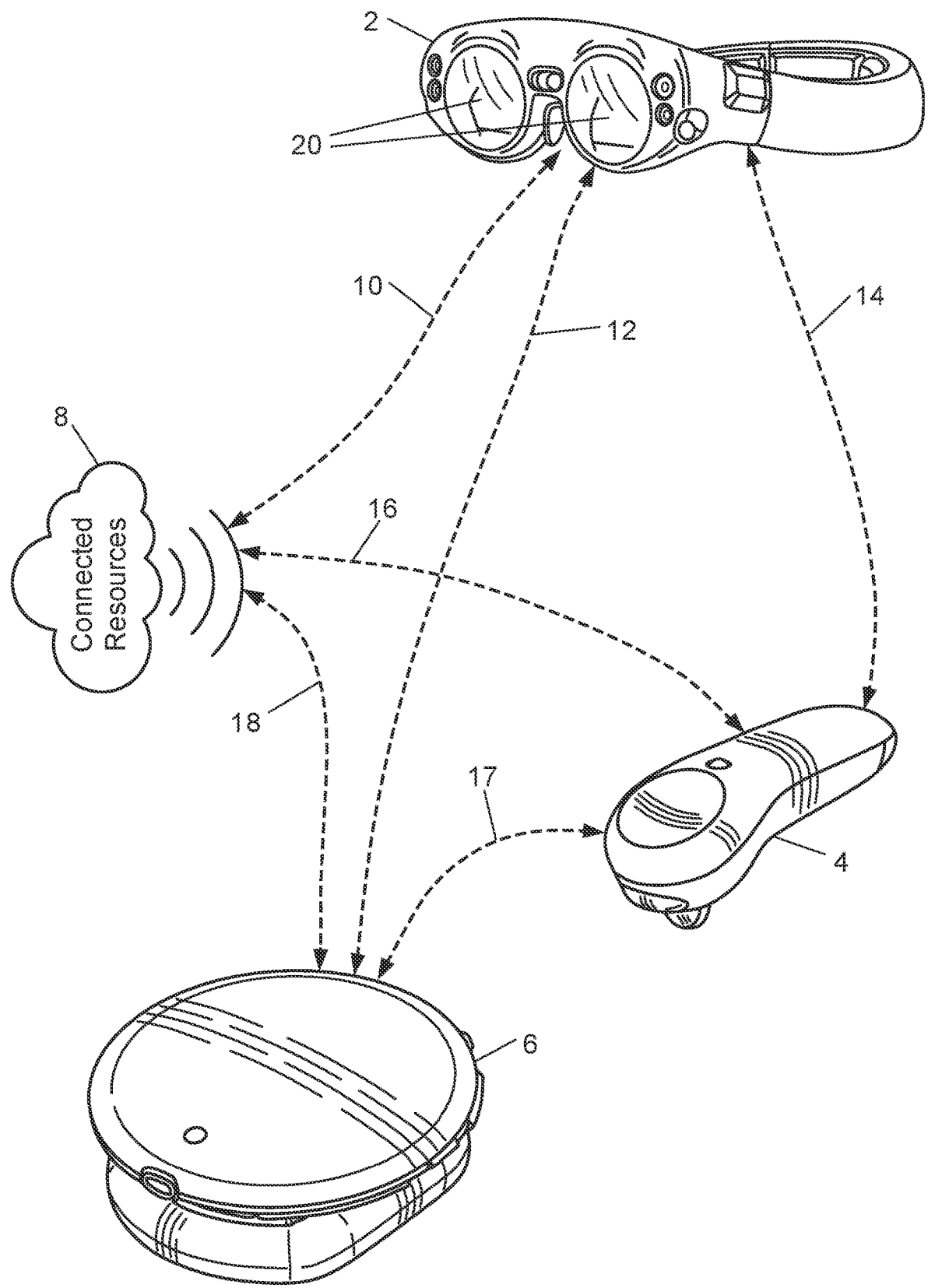
FIG. 1 is a perspective diagram of an augmented reality system, a mobile computing system, a wearable computing system and a content provisioning system according to an embodiment of the invention.

FIG. 1 illustrates a content provisioning systems featuring an augmented reality system having a head-worn viewing component (2), a hand-held controller component (4), and an interconnected auxiliary computing or controller component (6) which may be configured to be worn as a belt pack or the like on the user. Each of these components may be connected (10, 12, 14, 16, 17, 18) to each other and to other connected resources (8) such as cloud computing or cloud storage resources via wired or wireless communication configurations, such as those specified by IEEE 802.11, Bluetooth®, and other connectivity standards and configurations. As described, for example, in U.S. patent application Ser. Nos. 14/555,585, 14/690,401, 14/331,218, 15/481,255, and 62/518,539, each of which is incorporated by reference herein in its entirety, various aspects of such components are described, such as various embodiments of the two depicted optical elements (20) through which the user may see the world around them along with visual components which may be produced by the associated system components, for an augmented reality experience. There is a need for compact and persistently connected systems and assemblies which are optimized for use in wearable computing systems.

The content provisioning system of FIG. 1 is an example of a content provisioning system that includes a mobile device (the head-worn viewing component (2)) having a mobile device processor, a mobile device communication interface connected to the mobile device processor and a first resource device communication interface and under the control of the mobile device processor to receive first content transmitted by the first resource device transmitter, and a mobile device output device connected to the mobile device processor and under control of the mobile device processor capable of providing an output that can be sensed by a user. The content provisioning system further includes a first resource device (connected resources (8)) having a first resource device processor, a first resource device storage medium, and a first resource device data set including first content on the first resource device storage medium, the first resource device communication interface forming part of the first resource device and connected to the first resource device processor and being under the control of the first resource device processor.

Figure 2:
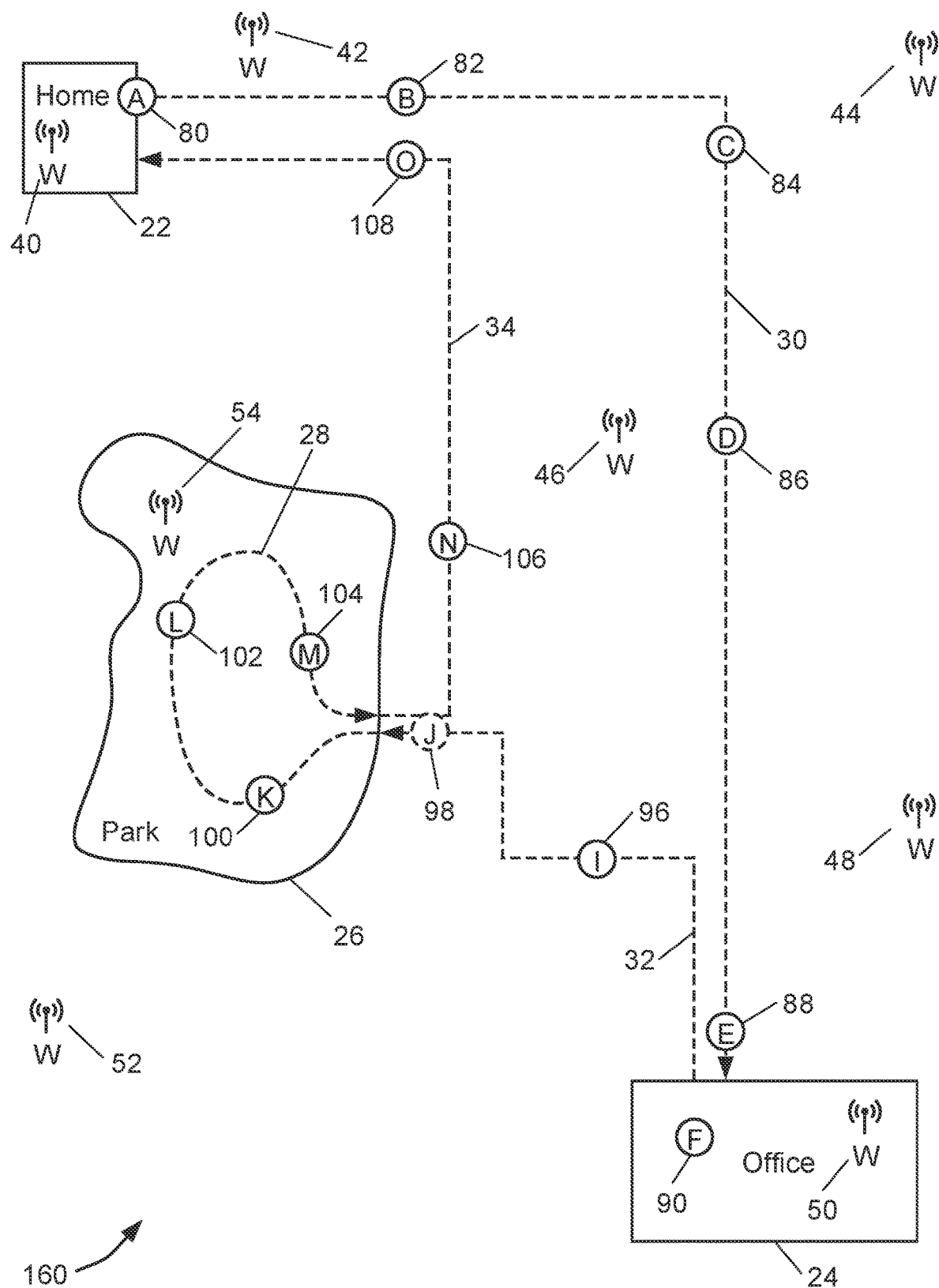
FIGS. 2 to 5 are top plan views of a travelling scenario wherein a user of a mobile computing system, such as the wearable computing system (XR) of FIG. 1, operates in the world.

Referring to FIG. 2, a travelling scenario (160) is depicted wherein a user of a mobile computing system, such as the wearable computing system described in reference to FIG. 1, operates in the world. FIG. 2 illustrates a home (22) of the user which features at least one wireless device (40) configured to connect the user's wearable computing system. As the user navigates the world around him, here in an illustrative example day wherein the user travels (30) from home (22, point A—80) to work (24, points B—82, C—84, D—86, E—88), then from work (24) he travels (32, points I—96, J—98) to a park (26) for a walk (28, points K—100, L—102, M—104) before the rest of the return (34, points N—106, O—108) to home (22)—along the way coming into wireless contact between his mobile computing system and various wireless devices (40, 42, 44, 46, 48, 50, 52, 54, and others as shown in magnified views of FIG. 3 and FIG. 4). Preferably the mobile computing system is configured to utilize various wireless devices and information exchanged therewith to provide the user with a relatively low-latency and robust connectivity experience, generally subject to user preferences which may be selected by the user.

Figure 6:
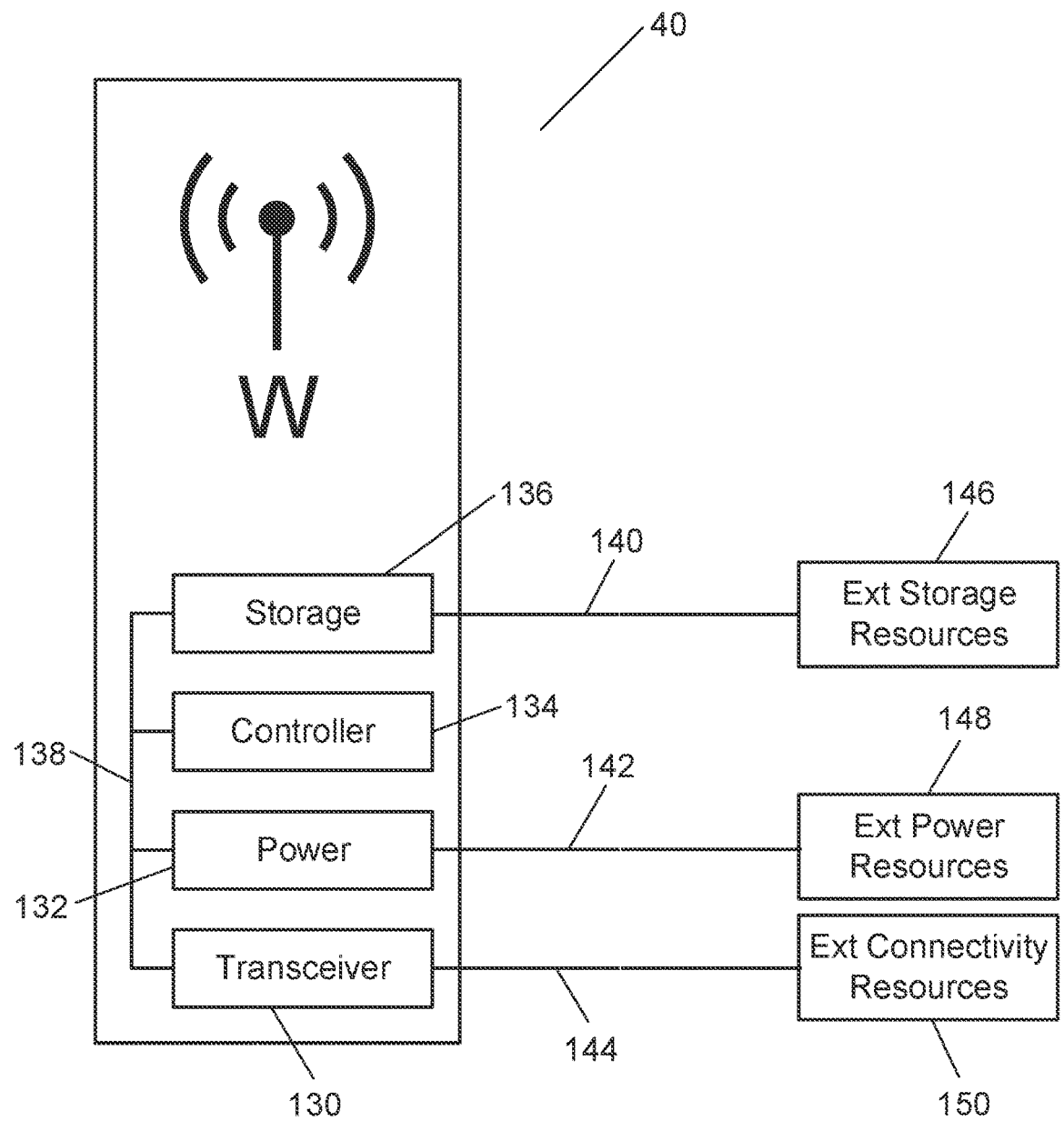
FIGS. 6 to 8 are block diagrams of wireless devices that may form part of the system of FIG. 1.
Figure 7:
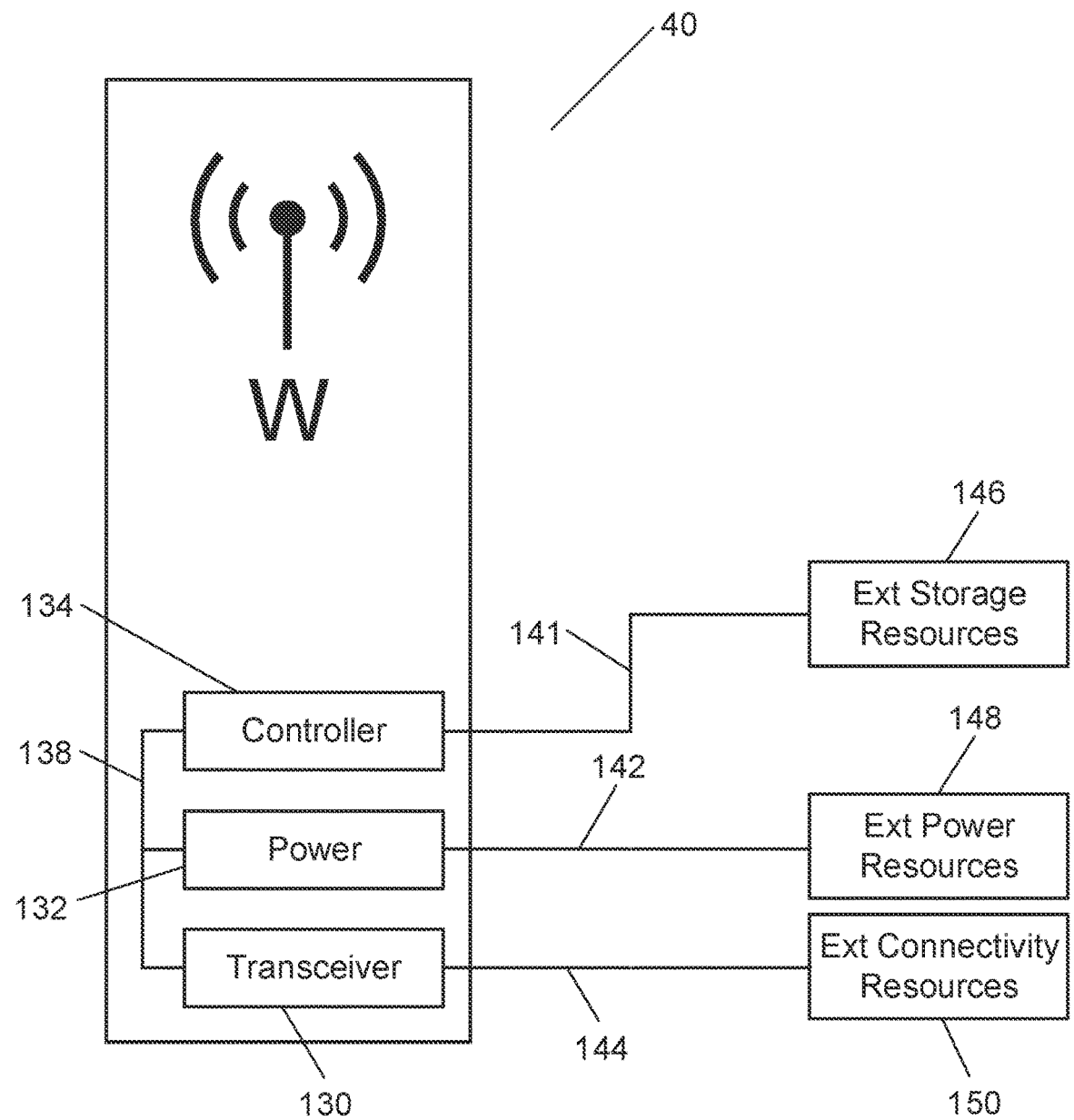

The mobile computing system may be configured such that the user selects certain aspects of his computing experience for the day. For example, through a graphical user interface, voice controls, and/or gestures, the user may input to the mobile computing system that he will have a typical workday, usual route there, stopping at the park for a brief walk on the way home. The mobile computing system has "artificial intelligence" aspects so that it uses integration with an electronic calendar of the user to provisionally understand his schedule, subject to quick confirmations. For example, as he is departing for work, the system may be configured to say or show: "headed to work, usual route and usual computing configuration", and this usual route may be garnered from previous GPS and/or mobile triangulation data through his mobile computing system. The "usual computing configuration" may be customized by the user and subject to regulations, for example, the system may be configured to only present certain non-occlusive visuals, no advertisements, and no shopping or other information not pertinent to driving while the user is driving, and to provide an audio version of a news program or current favorite audiobook while the user is driving on his way to work. As the user navigates the drive on the way to work, he may leave connectivity with his home wireless device (40) and enter or maintain connectivity with other wireless devices (42, 44, 46, 48). Each of these wireless devices may be configured to provide the user's mobile computing system with information pertinent to the user's experience at relatively low latency (i.e., by storing locally certain information which may be pertinent to the user at that location). FIGS. 6 and 7 illustrate certain aspects of wireless devices which may be utilized as described herein, the embodiments of FIGS. 8 and 9 feature non-storage beacon and/or marker configurations which also may be utilized to connect directly to locally-pertinent cloud-based information without the benefit of local storage.

For example, as the user travels from point A (80) to point B (82) to point C (84), a local wireless device (44) around point C (84) may be configured to pass to the user's mobile system geometric information which may be utilized on the user's mobile computing system for highlighting where a trench is being created at such location, so that the user clearly visualizes and/or understands the hazard while driving past, and this geometric information (which may feature a highlighted outline of the trench, for example, may also feature one or more photos or other non-geometric information) may be locally stored on the local wireless device (44) so that it does not need to be pulled from more remote resources which may involve greater latency in getting the information to the driver. In addition to lowering latency, local storage may also function to decrease the overall compute load on the user's mobile computing system, because the mobile system may receive information that it otherwise would have had to generate or build itself based upon sensors, for example, which may comprise part of the locally mobile hardware.

Once the user arrives at the parking lot of his work (24), the system may, for example, be configured to detect walking velocity and be configured by the user to review with the user his schedule for the day, via an integration with his computerized calendaring system, as he is walking up to the office. Certain additional information not resident on his locally mobile computing system may be pulled from local sources (48, 50, for example) which may feature certain storage capacity, to again facilitate smaller mobile overhead and lower latency versus direct cloud connectivity.

Figure 4:
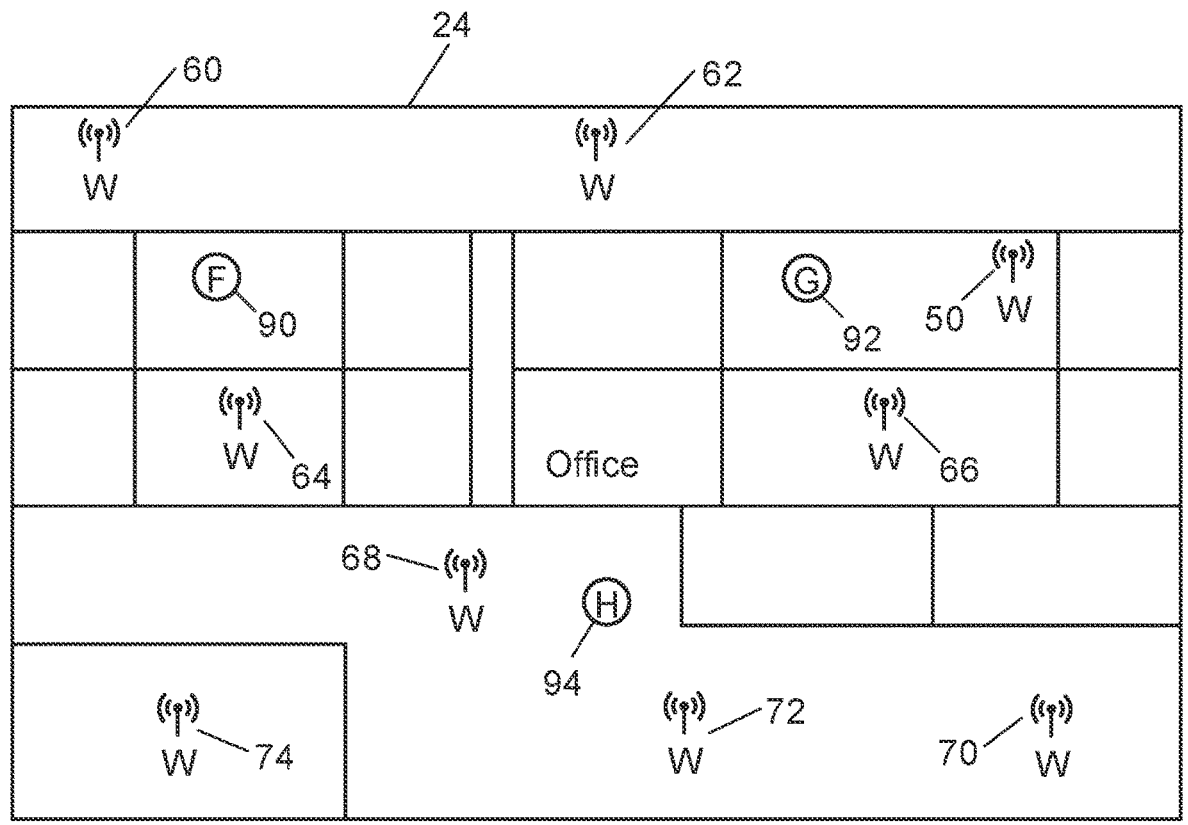

Referring to FIG. 4, once in the office (24), the user may connect with a variety of wireless devices (50, 60, 62, 64, 66, 68, 70, 72, 74), each of which may be configured to be able to provide location-based information. For example, when at point F (90), the user's mobile computing system may be configured to detect the location (such as by GPS, computer vision, marker or beacon identification, and/or wireless device (60, 62, 64) triangulation) and then quickly upload from local storage (i.e., from a wireless device 60, 62, 64) to his mobile computing system information pertinent to that location, such as a dense triangular mesh of the geometry of the room, or certain information pertaining to whose office that room is, information about that person, or other information that may be deemed relevant, such as by an artificial intelligence agent working automatically on the user's mobile computing system. Various other wireless devices (50, 66, 68, 70, 72, 74) may be positioned in other locations of the office and be configured to feature other location-based information, again to provide local users with low-latency and robust mobile computing functionality without everything, such as a determination of the room geometry, being done de novo by the sensor facilities local to the mobile computing system in real time.

Figure 3:
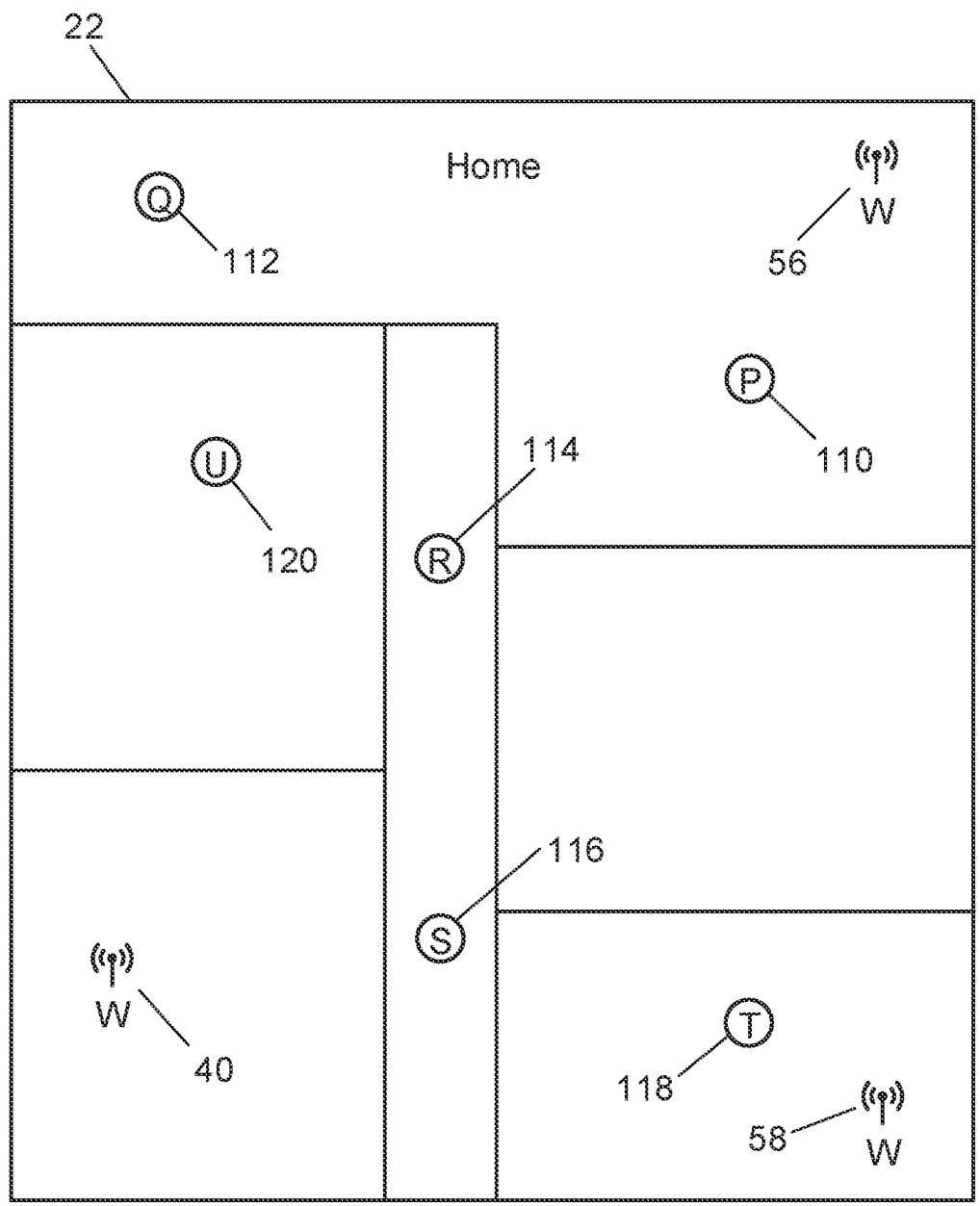

Referring to FIG. 3, similar wireless device resources (40, 56, 58) may be utilized in the home (22) to assist with location-based information as the user navigates (P—110, Q—112, R—114, S—116, T—118, U—120) the home with his mobile computing system. In the office (24) or home (22) environments, the mobile computing system may be configured to utilize external resources quite differently from driving. For example, the artificial intelligence component of the user's mobile computing system may be aware that the user likes to watch nightly news highlights from the previous week (perhaps in a display manner that would ordinarily not be acceptable when driving, but is acceptable when walking, or perhaps automatically expanding when the user stops walking around and is seated or standing still) as he is walking around on Saturday mornings between 7 and 8 am, and so when walking velocity is detected, the system may be configured to deliver such highlights from local storage between those hours, while also gathering other location-based information such as the position of various objects or structures within the house (i.e., to decrease computer vision processing load) in the pertinent location.

Figure 5:
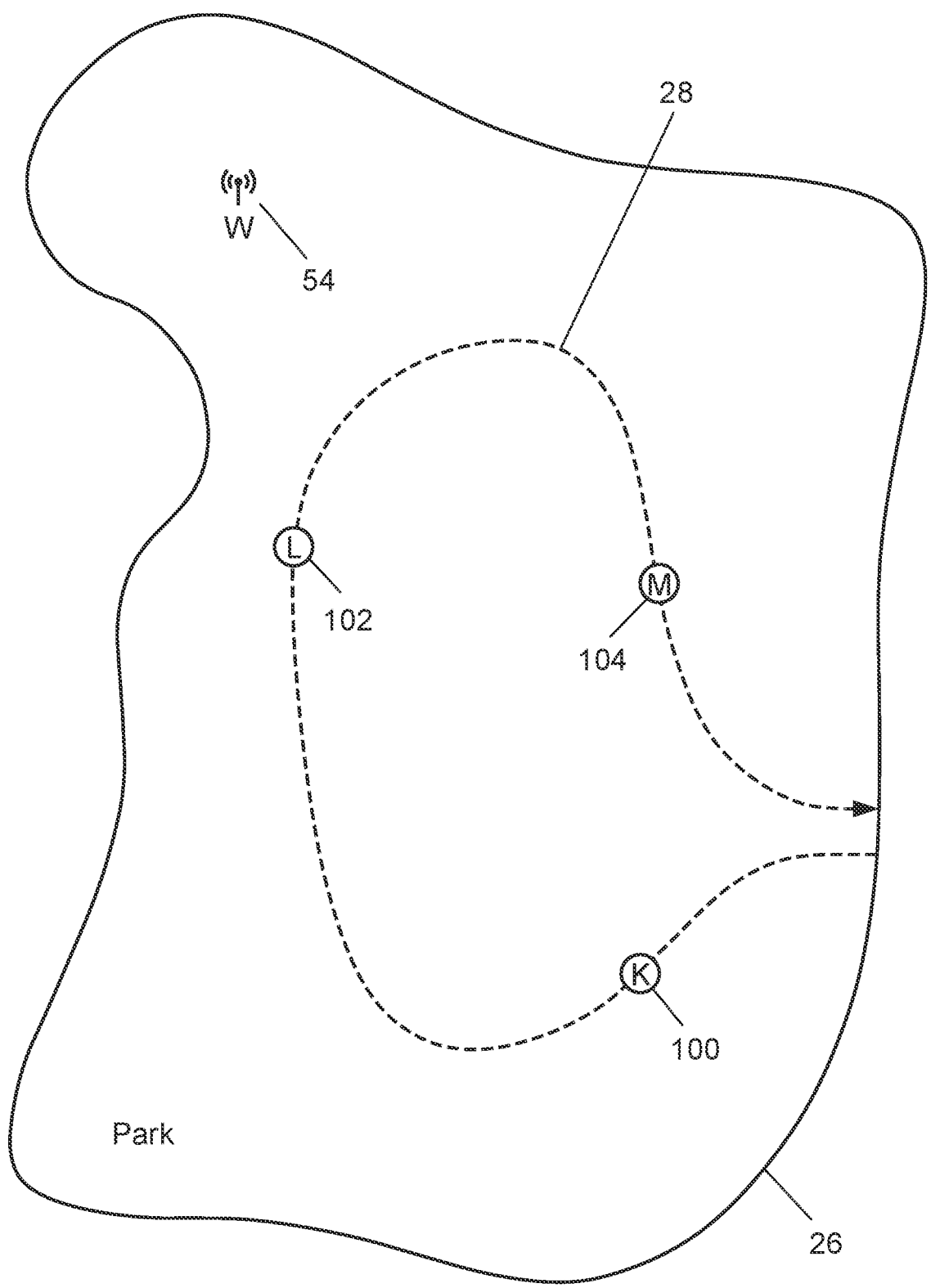

Similarly, as the user navigates a walk (28) through the park (26), shown in magnified view in FIG. 5, local wireless device resources (54) may be utilized to provide location-based information, such as background information related to a sculpture garden that the user may be observing as he walks along, such information may be displayed or reproduced as audio as the user is walking around in a manner that is tailored and/or customizable to his walking-in-a-park scenario (i.e., as opposed to driving, or walking around in the home or work).

Figure 8:
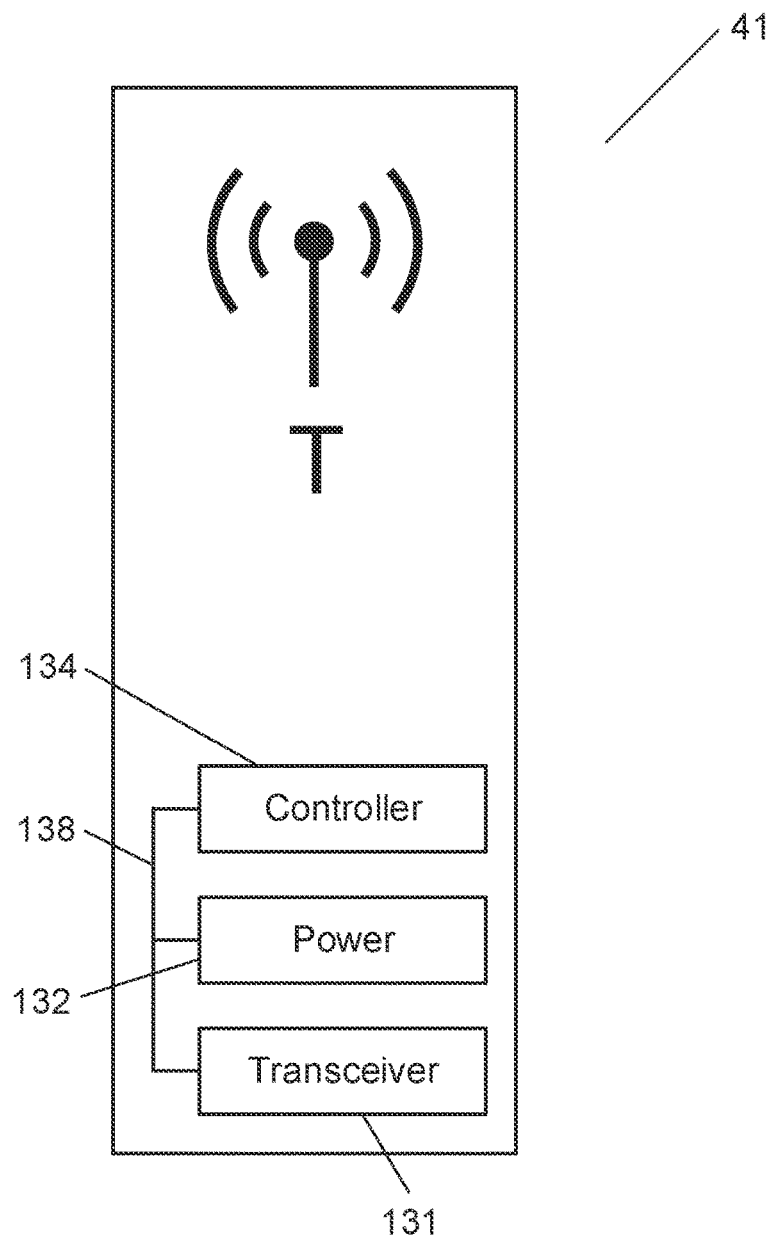
Figure 9:
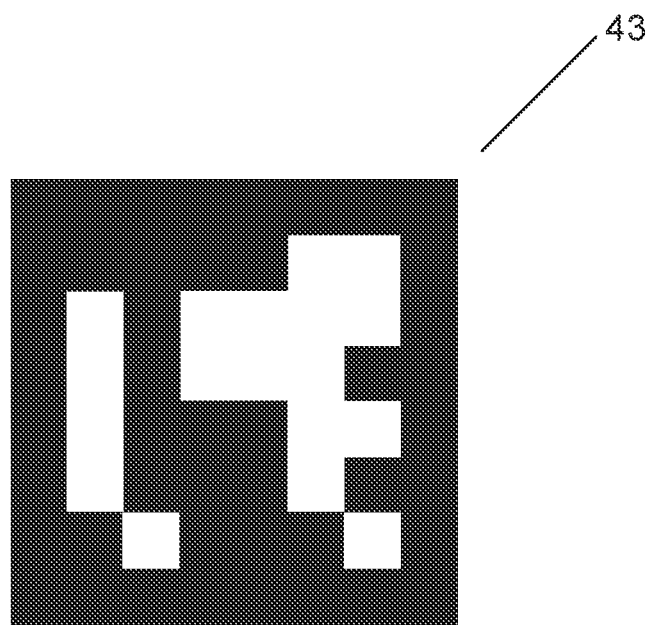
FIG. 9 is a view of an ArUco marker.

Referring to FIG. 6, one of more of the aforementioned wireless devices (40, 42, 44, 46, 48, 50, 52, 54, and others as shown in magnified views of FIG. 3 and FIG. 4) may comprise a system as shown in FIG. 6, wherein a local controller (134), such as a processor, is connected (138) to a power supply (132), such as a battery, a transceiver (130), such as a transmitting and receiving antenna configured to communicate wirelessly with mobile computing systems and other computing systems and resources, such as by using mobile telecom (i.e., GSM, EDGE, HSPA/+, 3G, 4G, 5G), Wi-Fi (i.e., IEEE 802.11 standards such as 802.11a, 802.11b, 802.11g, 802.11n, Wi-Fi 6—also known as IEEE 802.11 AX, IEEE 802.11 AY, IEEE 802.11 AX-Halo, which is a relatively low power variation which may be most useful for devices relatively close in proximity to the user), WiMax, and/or Bluetooth (®, i.e., 1.x, 2.x, 3.x, 4.x) configurations, and a local storage device (136), such as a mass storage or memory device. The storage device (136) may be connected (140) to external storage resources (146), such as cloud storage resources, the local power supply (132) may be connected (142) to external power resources (148), such as for long term charging or replenishment, the transceiver (130) may be connected (144) to external connectivity resources (150) to provide access, for example, to the internet backbone. All of these local and connected resources may be configured based upon the location of such device, to provide local users with information tailored to the local scenario, whether such information is pertinent to traffic, shopping, weather, structures, culture, etc. FIG. 7 illustrates an embodiment similar to that of FIG. 6, but without local storage facility—the components thereof are connected (141) to remote storage resources (146), such as cloud resources, such an embodiment as in FIG. 7 may be utilized in various configurations in place of embodiments such as those in FIG. 6, without the benefit of directly local storage (as described above, such local storage may be beneficial in reducing latency in terms of providing information to a mobile system in the area). Referring to FIG. 8, in further scenarios without local storage capability, a transmitter beacon (41) type of device, for example featuring only a transmitter (131, not a two-way transceiver, such as a transmitting antenna configured to communicate wirelessly with mobile computing systems and other computing systems and resources, such as by using mobile telecom (i.e., GSM, EDGE, HSPA/+, 3G, 4G, 5G), Wi-Fi (i.e., 802.11 standards such as 802.11a, 802.11b, 802.11g, 802.11n), WiMax, and/or Bluetooth (®, i.e., 1.x, 2.x, 3.x, 4.x) configurations) and a relatively long-term battery (132), may be utilized to connect to a locally positioned mobile computing device to share location or beacon identification information the functions as a pointer to connect mobile computing system with pertinent cloud resources (i.e., bypassing local storage, but providing information akin to: you are here+pointers to cloud resources that are pertinent). Referring to FIG. 9, in a very basic scenario, a non-electronic marker (43), such as an ArUco marker, may be utilized to also function as a pointer to connect mobile computing system with pertinent cloud resources (i.e., bypassing local storage, but providing information akin to: you are here+pointers to cloud resources that are pertinent).

As described above, to decrease latency and generally increase useful access to pertinent location-based information, wireless devices with localized storage resources, such as those depicted in FIG. 6, may be located throughout the interiors of structures such as homes, enterprises, etc.—and also exteriors, such as urban downtown areas, outsides of stores or shops, etc. Similarly, wireless devices without localized storage capacity—but connected to, or pointed to, remote storage resources, also may be located throughout the interiors of structures such as homes, enterprises, etc.—and also exteriors, such as urban downtown areas, outsides of stores or shops, etc.

The mobile computing system may be customizable by the user to present information filtered on a time-domain basis, such as by how old or "stale" such information is. For example, the user may be able to configure the system to only provide traffic information while he is driving that is 10 minutes old or newer, etc. (i.e., the time domain aspect may be customized/configurable). Alternatively, the user may be able to configure the system to only present architectural (i.e., position of walls within a building) that is 1 year old or newer etc. (i.e., the time domain aspect may be customized/configurable).

Referring to FIGS. 10-13, in it is often desirable to have a system configured such that position and/or orientation of the user (i.e., via determination of position and/or orientation of a coupled component, such as a head-worn viewing component 2 which is couplable to the head of the user) may be utilized to provide the user with additional and/or enhanced content and/or information that pertains to the user's particular view of the world as he or she navigates the world.

Figure 10:
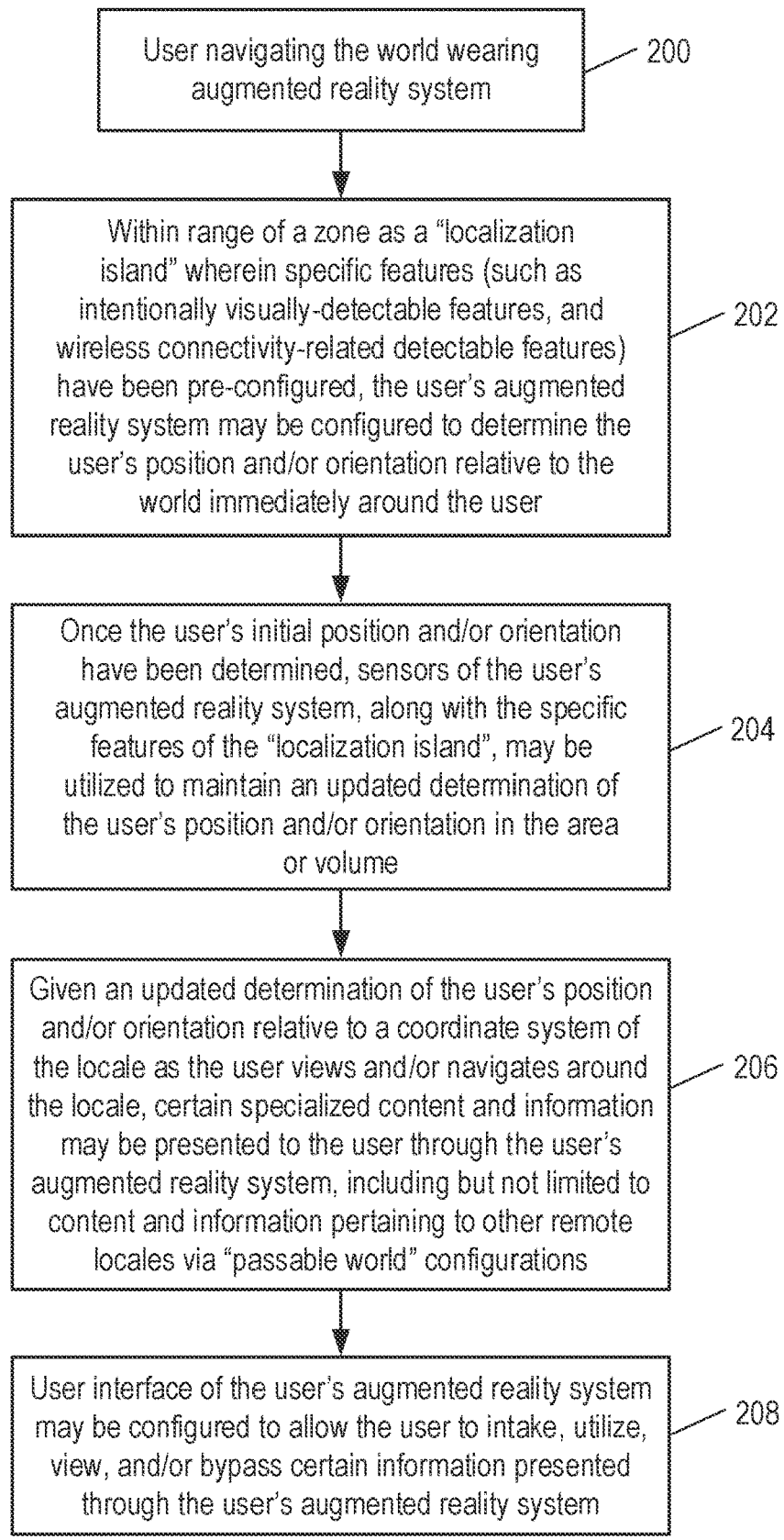
FIG. 10 is a flowchart of a user navigating the world wearing an augmented reality system using a "localization island"

For example, as shown in the example of FIG. 10, a user may be navigating the world wearing an augmented reality system (200) such as that depicted in FIG. 1. The user may enter a zone (such as a walkable area, or functional volume within or outside of a building) wherein specific features, such as intentionally visually-detectable features, and wireless connectivity-related features, have been pre-configured to be located and interpreted by the user's augmented reality system, such that the system is configured to determine the user's position and/or orientation relative to the world immediately around the user. Such a relatively information-rich zone may be termed a "localization island." For example, certain connected resources (8) may comprise wireless connectivity devices, such as 802.11 devices, which may broadcast information such as SSID and/or IP address, and for which relative signal strength may be determined and may be related to proximity. Further detectable features may for example include Bluetooth, audio, and/or infrared beacons with known locations, and/or posters or other visual features with known locations. The combined detection and analysis of these inputs, such as by the plurality of sensors connected to the head-wearable component (2) of the subject system (which may include components such as monochrome cameras, color cameras, Bluetooth detectors, microphones, depth cameras, stereo-cameras, and the like), may be utilized to determine the position and/or orientation of the user (202) based upon analysis of information pertaining to predetermined or known locations of such items, which may, for example, be contained upon connected resources (8), such as cloud storage systems like those described, for example, in reference to FIG. 6.

Referring again to FIG. 10, once the user's initial position and/or orientation have been determined, sensors of the user's augmented reality system, along with the specific features of the localization island, may be utilized to maintain an updated determination of the user's position and/or orientation in the area or volume (204). Given an updated determination of the user's position and/or orientation relative to a coordinate system of the locale as the user views and/or navigates around the locale, certain specialized content and information may be presented to the user through the user's augmented reality system, including but not limited to content and information pertaining to other remote locales via "passable world" configurations (such as those described, for example, in U.S. patent application Ser. No. 13/663,466, which is incorporated by reference herein in its entirety), which may be configured, for example, to allow other users and objects to virtually "teleport" to different locations to see imagery pertaining to the locale, and/or communicate with others who are there either in reality or virtually (206). A user interface of the user's augmented reality system may be configured to allow the user to intake, utilize, view, and/or bypass certain information presented through the user's augmented reality system. For example, if a user is walking through a particularly identifiable feature rich (i.e., such as a "localization island") and content rich shopping area but does not want to see any virtual presentation of information pertaining to shopping at the time, the user may configure his or her system to not display such information, and to rather display only information that has been selected for display, such as urgent personal messaging information.

According to additional detail described with reference to FIG. 10, the first resource device is at first location, wherein the mobile device communication interface creates a first connection with the first resource device, and wherein the content is first content specific to a first geographic parameter of the first connection. The content provisioning system further includes a second resource device having a second resource device processor, a second resource device storage medium, a second resource device data set including second content on the second resource device storage medium, and a second resource device communication interface forming part of the second resource device and connected to the second resource device processor and being under the control of the second resource device processor, wherein the second resource device is at second location, wherein the mobile device communication interface creates a second connection with the second resource device, and wherein the content is second content specific to a second geographic parameter of the second connection.

Figure 11:
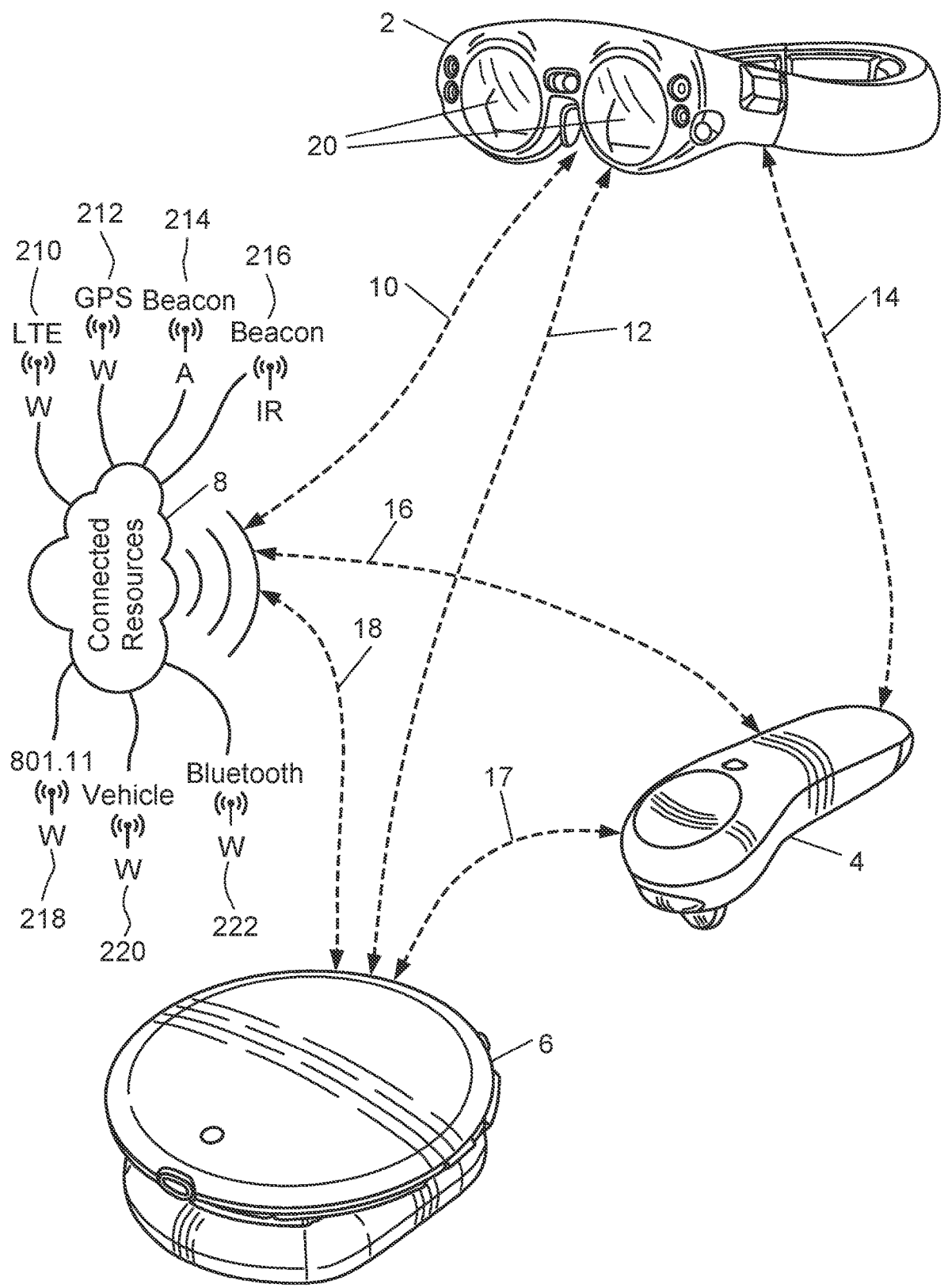
FIG. 11 is a perspective diagram of the system of FIG. 1 showing further details thereof.

Referring to FIG. 11, a system similar to that of FIG. 1 is illustrated, but also is shown highlighting several wirelessly connected resources which may be utilized to assist in the localization of the user (i.e., in the determination of position and/or orientation of components such as a head-coupleable component 2 which may be coupled to a user's head in operation). For example, referring to FIG. 11, in addition to the main system components (2, 4, 6) being connected to each other and to connected resources (8) such as cloud storage or cloud computing resources, these system components may be coupleable wirelessly to devices which may assist in the localization of the user, for example Bluetooth devices (222) such as transmitter beacons with known identifications and/or locations, 802.11 devices (218) such as Wi-Fi routers with specific SSID, IP address identifiers, and/or signal strength or proximity sensing and/or transmitting capabilities, vehicles or components thereof (220) which may be configured to transmit information pertaining to velocity, position, and/or orientation (for example, certain speedometer systems within certain motor vehicles may be configured to transmit instantaneous velocity and approximate GPS position through intercoupling with a GPS tracking capable component, such as a vehicle-mounted GPS tracking device, such velocity, position, and/or orientation information pertaining to a vehicle in which a user is located may be utilized, for example, to reduce display "jitter", and also to assist in presenting displayed imagery to users that pertains to real world features that may be seen through vehicle windows, such as labels for summits of mountains being passed by, or other features outside of the vehicle, in certain embodiments involving vehicles or other structures with viewing portals outside of such vehicles or structures, information pertaining to geometry of such vehicles, structures, and/or portals may be utilized, such as from a connected resource 8 cloud repository, to place virtual content appropriately for each user relative to the vehicle or structure), mobile connectivity network transceivers (210), such as those configured for LTE connectivity, which may not only connect a user's system, but also provide for triangulation location and/or orientation integration and also integrated GPS information, GPS transmitters and/or transceivers configured to provide location information to connected devices (212), audio transmitter or transceiver beacons (214, 216), such as those configured to assist in localizing or directing nearby systems through the use of generally non-audible frequencies (for example, in various embodiments, audio transmitters or transceivers may be utilized to assist a mobile system, such as an augmented reality system in minimally-invasively "honing in upon" or locating (i.e., akin to the way in which a first person in the dark could whistle to second person in the dark assisting that second person in finding the first person) not only the audio transmitter or transceiver, but also another adjacent or co-located localization asset such as a light, infrared, RF, or other beacon, transmitter, and/or transceiver (i.e., either automatically through the suite of sensors available on an augmented reality system such as those featured in FIGS. 1 and 11, or in other embodiments manually or semi-automatically, such that an audio transmitter and/or transceiver is represented directionally in the user interface for the user, such as via a visual indicator such as an arrow in the user interface, and/or audio indicator through integrated speakers in the head mounted component), and/or infrared beacons which may be detected by the user's augmented reality system to similarly attract and/or identify information pertaining to location and/or orientation.

Figure 12:
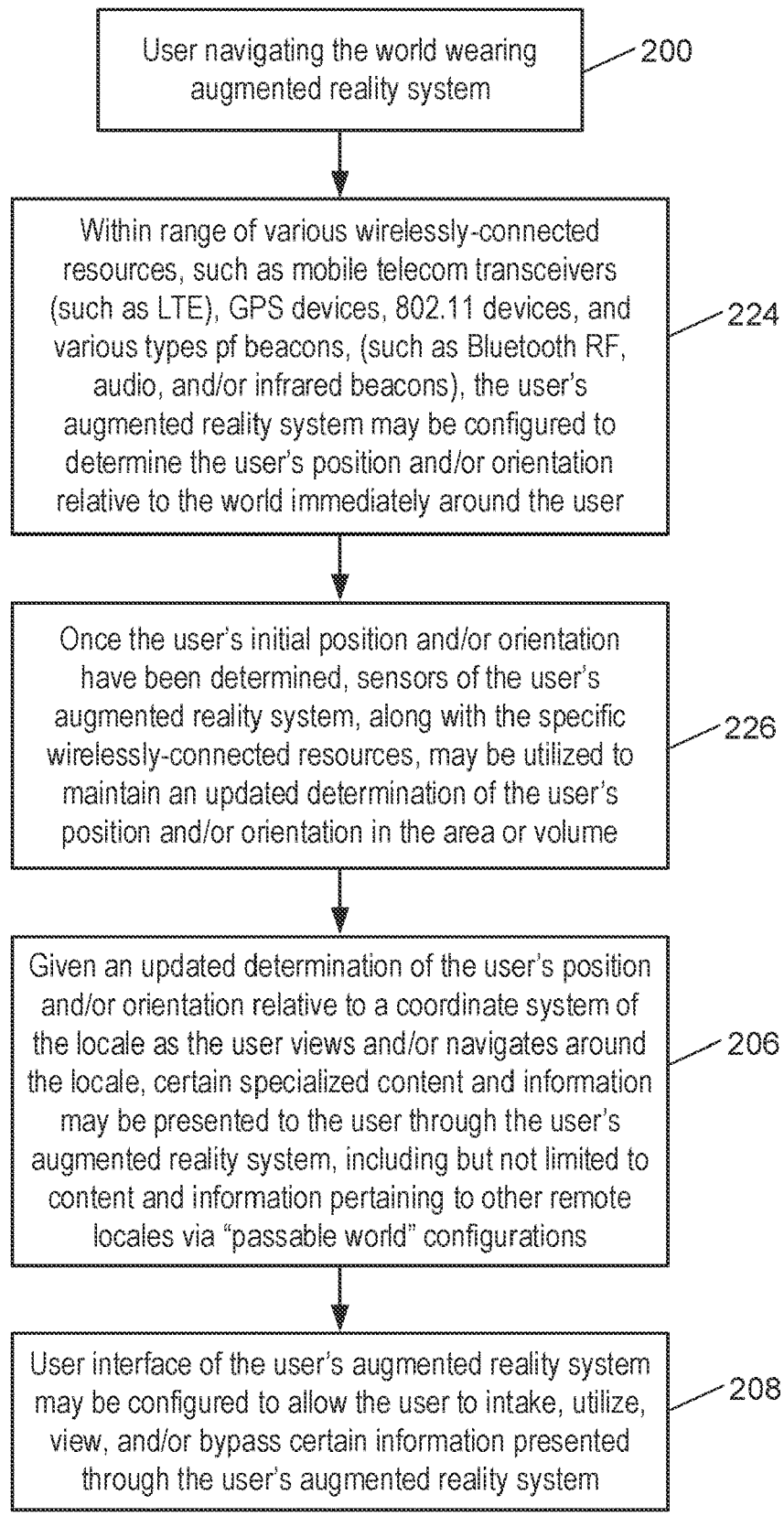
FIG. 12 is a flowchart of a user navigating the world wearing an augmented reality system using connected resources for localization.

Referring to FIG. 12, an operational embodiment pertaining to a system such as that depicted in FIG. 11 is illustrated. A user navigates the work wearing an augmented reality system (200). Within range of various wirelessly-connected resources, such as mobile telecom transceivers (such as LTE), GPS devices, 802.11 devices, and various types of beacons (such as Bluetooth RF, audio, and/or infrared beacons), the user's augmented reality system may be configured to determine the user's position and/or orientation relative to the world immediately around the user (224). Once the user's initial position and/or orientation have been determined, sensors of the user's augmented reality system, along with the specific wirelessly-connected resources, may be utilized to maintain an updated determination of the user's position and/or orientation in the area or volume (226). Given an updated determination of the user's position and/or orientation relative to a coordinate system of the locale as the user views and/or navigates around the locale, certain specialized content and information may be presented to the user through the user's augmented reality system, including but not limited to content and information pertaining to other remote locales via "passable world" configurations (such as those described, for example, in U.S. patent application Ser. No. 13/663,466, which is incorporated by reference herein in its entirety), which may be configured, for example, to allow other users and objects to virtually "teleport" to different locations to see imagery pertaining to the locale, and/or communicate with others who are there either in reality or virtually (206). A user interface of the user's augmented reality system may be configured to allow the user to intake, utilize, view, and/or bypass certain information presented through the user's augmented reality system (208), as described by way of example above in relation to FIG. 10.

Figure 13:
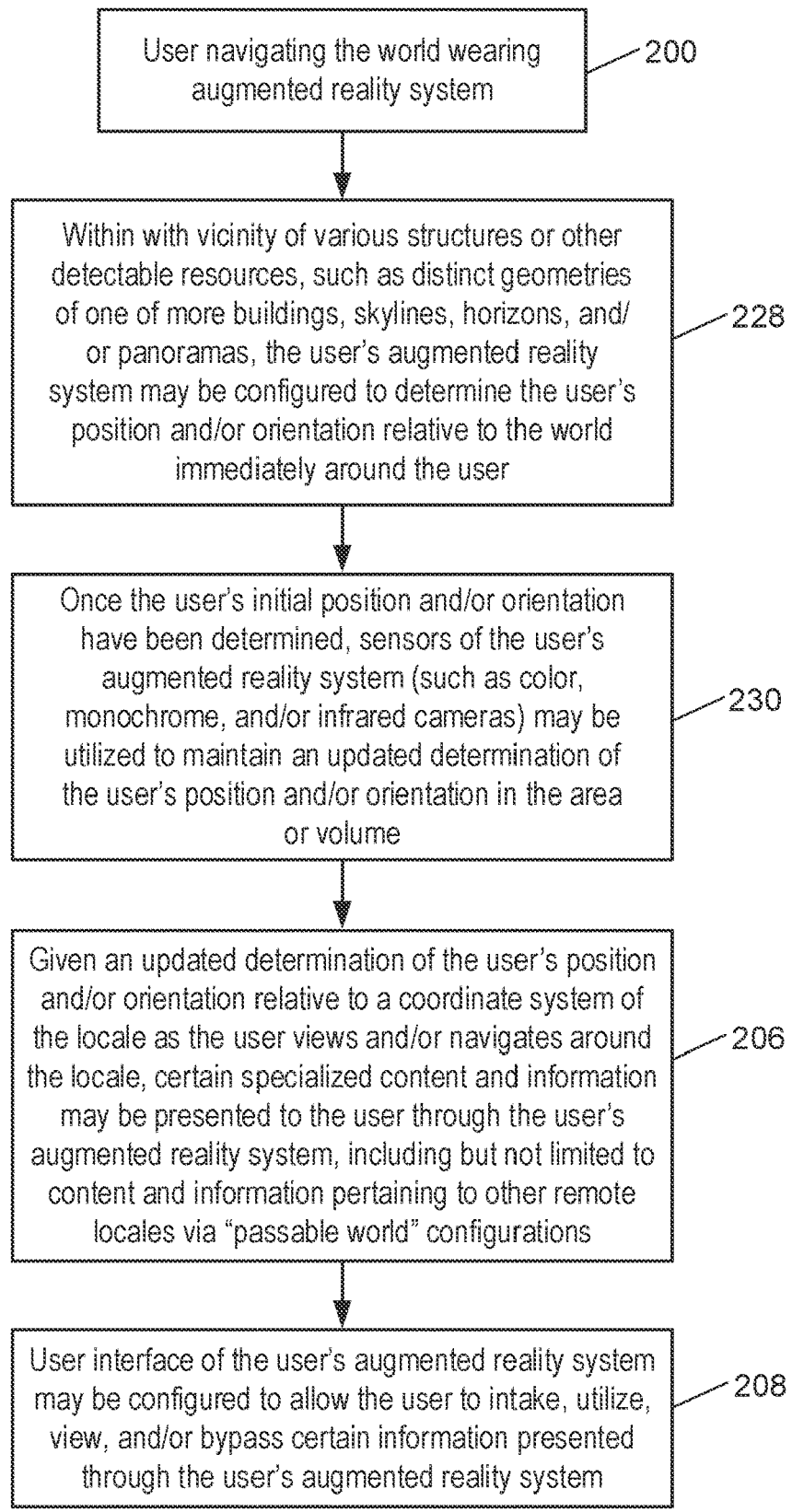
FIG. 13 is a flowchart of a user navigating the world wearing an augmented reality system using geometries for localization.

Referring to FIG. 13, in another embodiment other detectable resources such as distinct geometries of buildings, skylines, horizons, and/or panoramas may be analyzed, such as via computer vision and/or image or feature processing techniques, utilizing connected systems and resources such as those depicted in FIGS. 1 and 11 to determine a user's position and/or orientation. A user navigates the world wearing an augmented reality system (200). Within vicinity of various structures or other detectable resources, such as distinct geometries of one of more buildings, skylines, horizons, and/or panoramas, the user's augmented reality system may be configured to determine the user's position and/or orientation relative to the world immediately around the user by processing, thresholding, and/or comparing aspects of such images with known imagery pertaining to such scenes or resources (228). Once the user's initial position and/or orientation have been determined, sensors of the user's augmented reality system (such as color, monochrome, and/or infrared cameras) may be utilized to maintain an updated determination of the user's position and/or orientation in the area or volume (230). Given an updated determination of the user's position and/or orientation relative to a coordinate system of the locale as the user views and/or navigates around the locale, certain specialized content and information may be presented to the user through the user's augmented reality system, including but not limited to content and information pertaining to other remote locales via "passable world" configurations (such as those described, for example, in U.S. patent application Ser. No. 13/663,466, which is incorporated by reference herein in its entirety), which may be configured, for example, to allow other users and objects to virtually "teleport" to different locations to see imagery pertaining to the locale, and/or communicate with others who are there either in reality or virtually (206). A user interface of the user's augmented reality system may be configured to allow the user to intake, utilize, view, and/or bypass certain information presented through the user's augmented reality system (208), as described for example, above in relation to FIG. 10.

FIG. 13 thus describes the additional detail wherein the first resource device is at first location, wherein the mobile device has a sensor that detects a first feature at the first location and the first feature is used to determine a first geographic parameter associated with the first feature, and wherein the content is first content specific to a first geographic parameter.

Referring to FIGS. 14-18, a paradigm for interconnected or integrated computing is presented, which may be termed "spatial computing". As described above in reference to FIGS. 1-13, connected and portable personal computing systems such as those shown in FIG. 1 may be integrated into the immediate world of the user, such that the user is able to be present in the space around them while also interacting in a sophisticated manner with the computing system. This is due, in part, to the portable nature of such system, but also is due to the connectivity of various resources, as described above, and also due to the fact that various embodiments are designed to facilitate normal activity while also operating the computing system. In other words, in various instantiations, such a computing system may be worn and operated as a person walks around and functions through the space of daily life, whether indoors or outdoors, and the computing system may be configured and be adapted to provide specialized and tailored functionality for the user based upon, and/or in reaction to certain inputs provided as a result of the spatial environment around the user.

Figure 14:
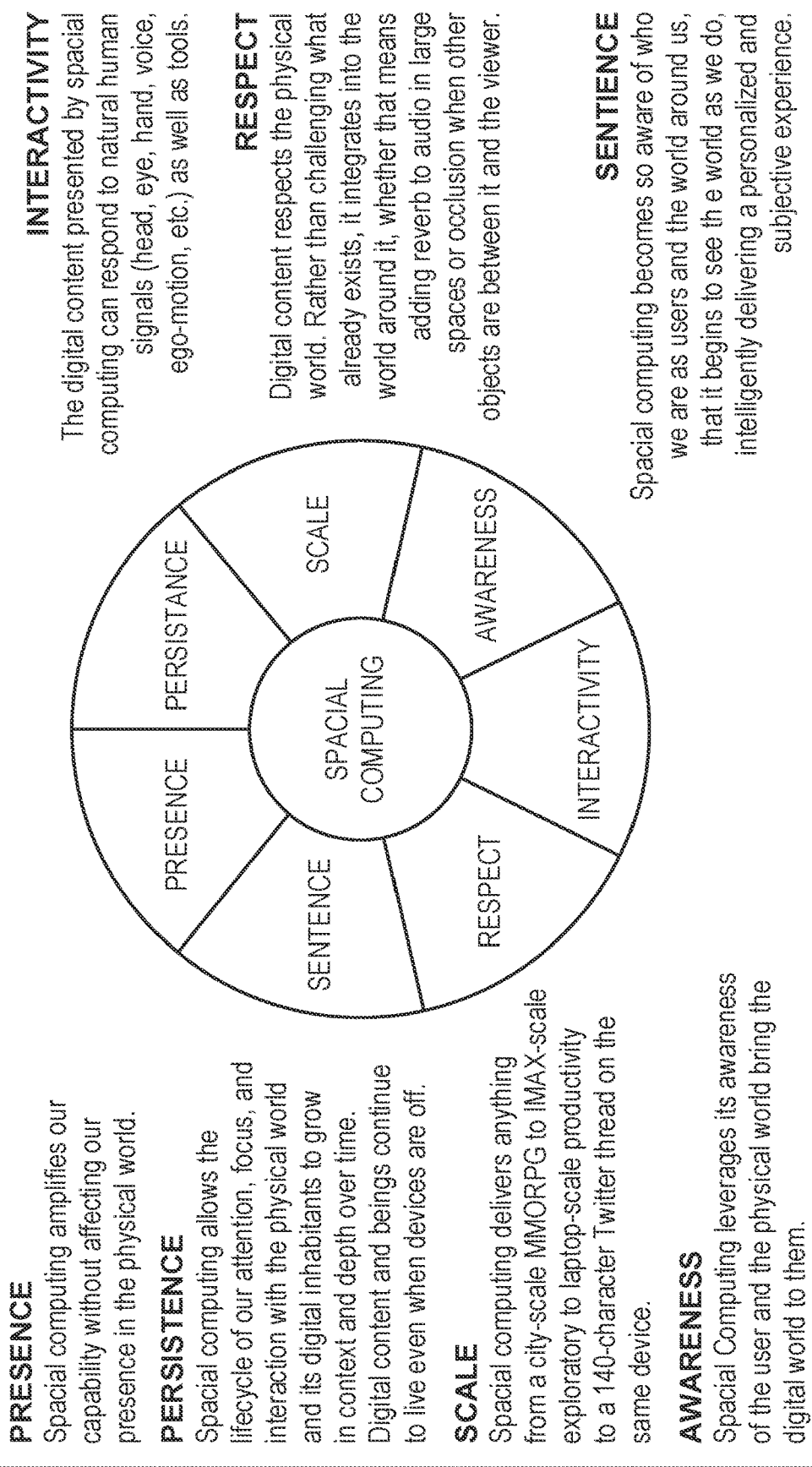
FIG. 14 is a graph illustrating the notion of "spatial computing"

Referring to FIG. 14, the notion of "spatial computing" may be defined to be associated with several attributes, including but not limited to presence, persistence, scale, awareness, interactivity, respect, and sentience. For example, in terms of presence, the subject integrated system components may be configured to amplify a user's capability without affecting the user's presence in the physical world. In terms of persistence, the subject integrated system components may be configured to facilitate the lifecycle of the user's attention, focus, and interaction with the physical world around them and any "digital inhabitants" (i.e., such as digital or virtual characters or visitors represented digitally) associated therewith, to grow in context and depth over time, with digital content and inhabitants being configurable to continue their life pathways even with the subject computing systems are not being actively utilized by a user. In terms of scale, the subject integrated system components may be configured to deliver anything from very large scale to relatively small-scale imagery or content to the user. In terms of awareness, the subject integrated system components may be configured to leverage information, signals, connected devices, and other inputs to provide the user with an enhanced understanding of the physical and digital worlds around them. In terms of interactivity, the subject integrated system components may be configured to present digital content that is responsive to natural human signals or inputs, such as head, eye, hand, voice, facial, and other inputs, as wells as those associated with various tools. In terms of respect, the subject integrated system components may be configured to provide imagery, content, and digital behavior that integrates into the world around the user, such as by providing synthetic light shadow casting to match the room, by adding reverb into audio to match the sound physics of the room, or by appropriately occluding various digital/virtual objects relative to each other as would be perceived in reality. In terms of sentience, the subject integrated system components may be configured to provide a level of synthetic awareness of who the user is and what the world is like around the user, so that the system is able to synthetically understand the world as the user does, and utilize this synthetic intelligence to deliver a personalized and subjective experience to the user.

Figure 15:
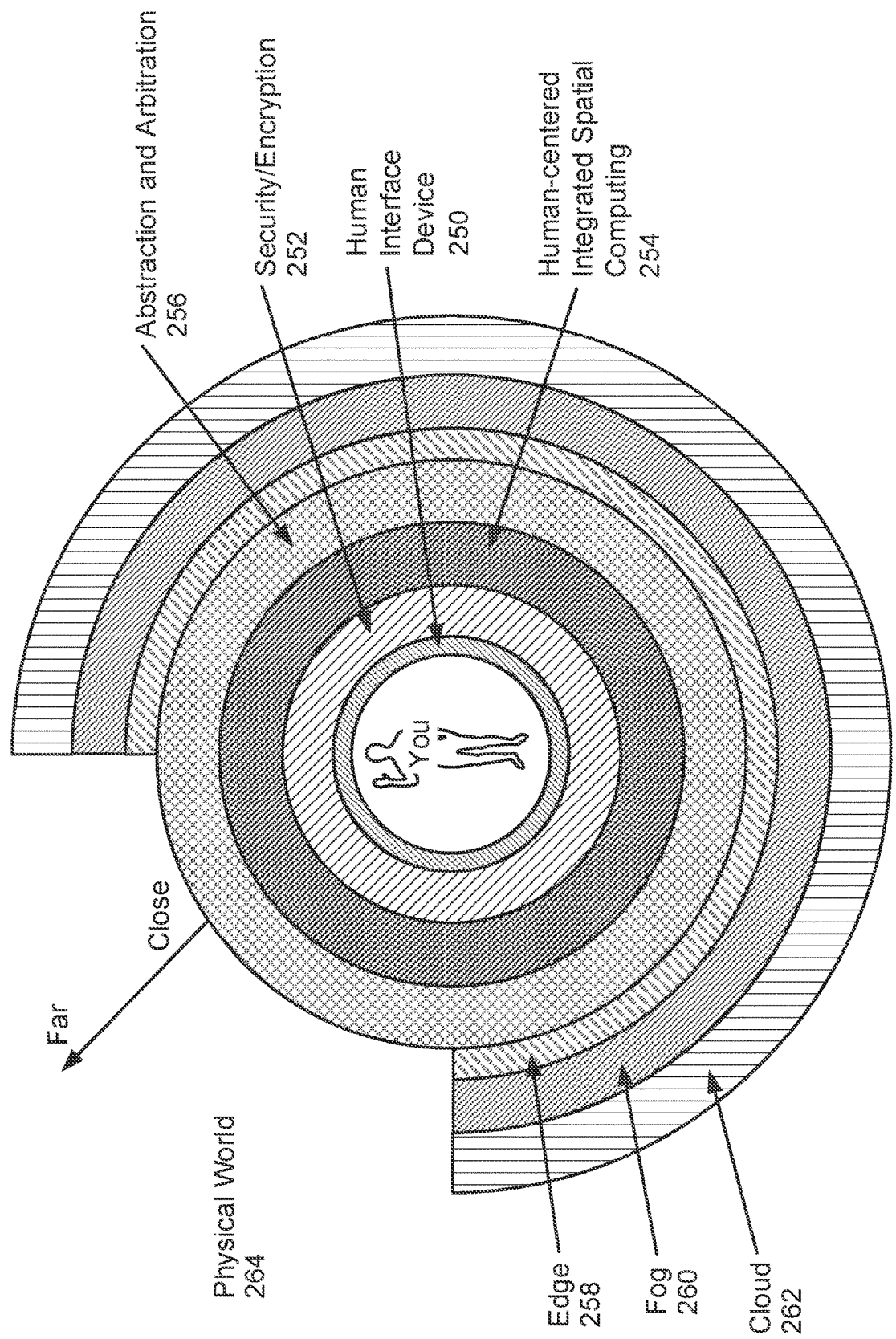
FIG. 15 is a graph illustrating yet another way of representing the relationship between the user and the physical world with a spatial computing system.

Referring to FIG. 15, a diagram illustrates yet another way of representing the relationship between the user and the physical world with a spatial computing system. With breakthroughs in computational hardware, such as in central processing units ("CPU"), graphical processing units ("GPU"), along with pervasive high-bandwidth data transfer capabilities and relatively inexpensive and high speed memory devices, there is a confluence of important factors for spatial computing configurations. At the center of the depicted spatial computing paradigm is the user, with a human computing system (i.e., the brain) that is highly evolved and highly capable. Immediately adjacent to the depicted user is an intuitive interface layer, comprising systems such as that depicted in FIG. 1, wherein a user may wear a wearable computing system and interact with it using voice commands, gestures, a hand-held component, and the like, as described in the aforementioned incorporated by reference descriptions. The human interface device (250) may also comprise computing systems such as tablet computers, smartphones, and laptop computers, vehicles (such as autonomous vehicles), wearable electronics of various types, drones, robots, and various other systems that provide the human user with access to computing and connected resources, as illustrated, for example, in FIG. 16, which illustrates yet another hierarchical depiction of connected elements pertaining to a spatial computing environment.

The next depicted layer is a security/encryption layer (252). This layer is configured to insulate and protect the user from other systems or users which may want to gain access to the user's data or meta data, which may include, for example, what the user likes, what the user does, where the user is located. Technologies such as blockchain may be utilized to assist in securing and configuring such a security layer, and interacting, for example, with a digital identification which may be configured to securely represent who the user is in the digital world, and may be facilitated by biometric authentication techniques.

Figure 16:
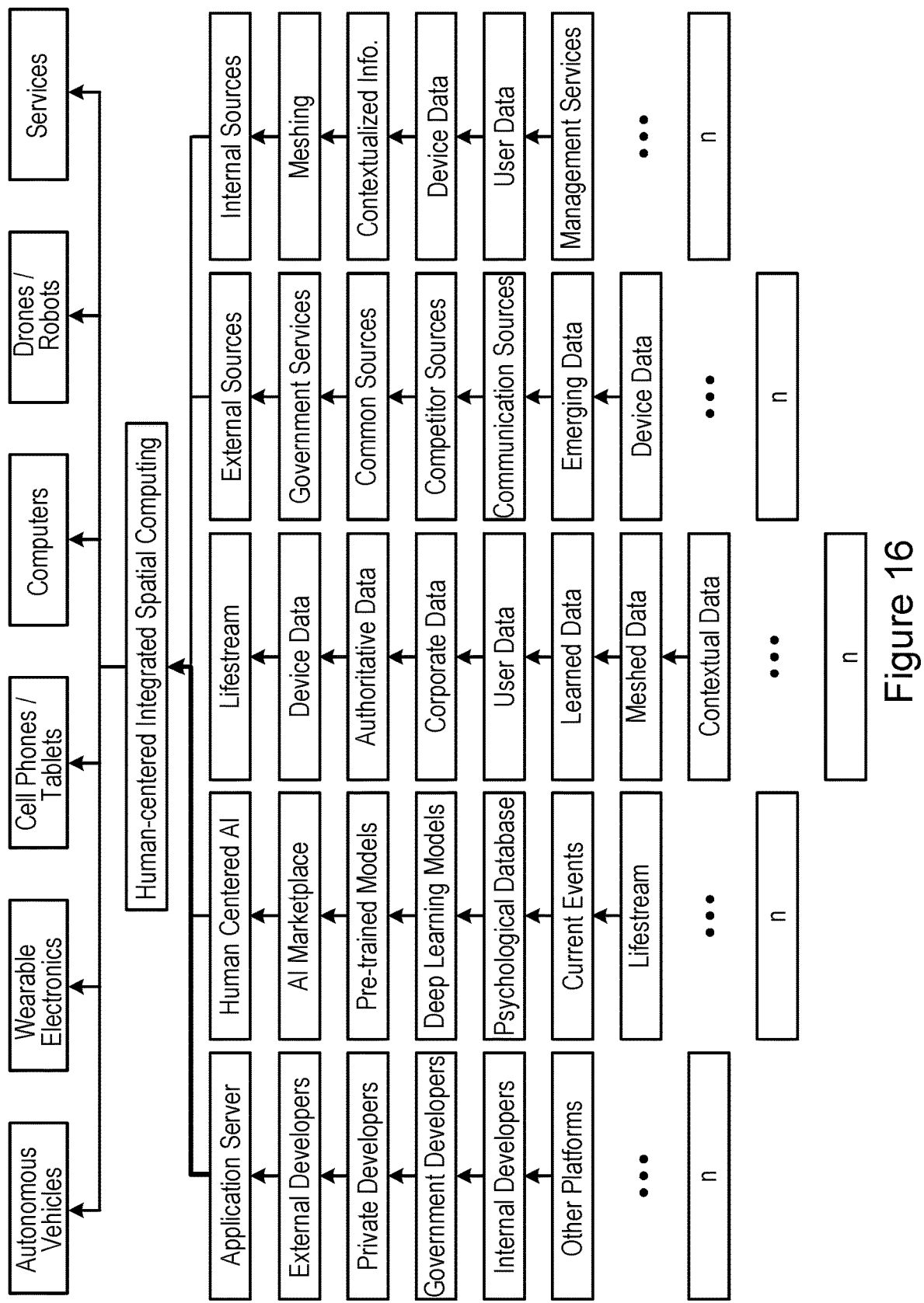
FIG. 16 is a block diagram of hierarchical depiction of connected elements pertaining to a spatial computing environment.

A next adjacently positioned layer is the human-centered integrated spatial computing layer (254), which also may be referred to under the tradename, "MagicVerse". This spatial computing layer also is shown in FIG. 16, it may be configured to receive data from many sources, including but not limited to external developers, private developers, government sources, artificial intelligence sources, pre-trained models, deep learning models, psychological databases, current events databases, data sources pertaining to the individual operations of one of more users (which also may be termed the "lifestream" of the user), device data sources, authoritative data sources, corporate data sources, learned data sources, meshed data sources, contextual data sources, government services, common sources, competitor sources, communication sources, emerging data sources, device data sources, meshing or mapping operations, contextualized information, device data sources, and management services.

Figure 17:
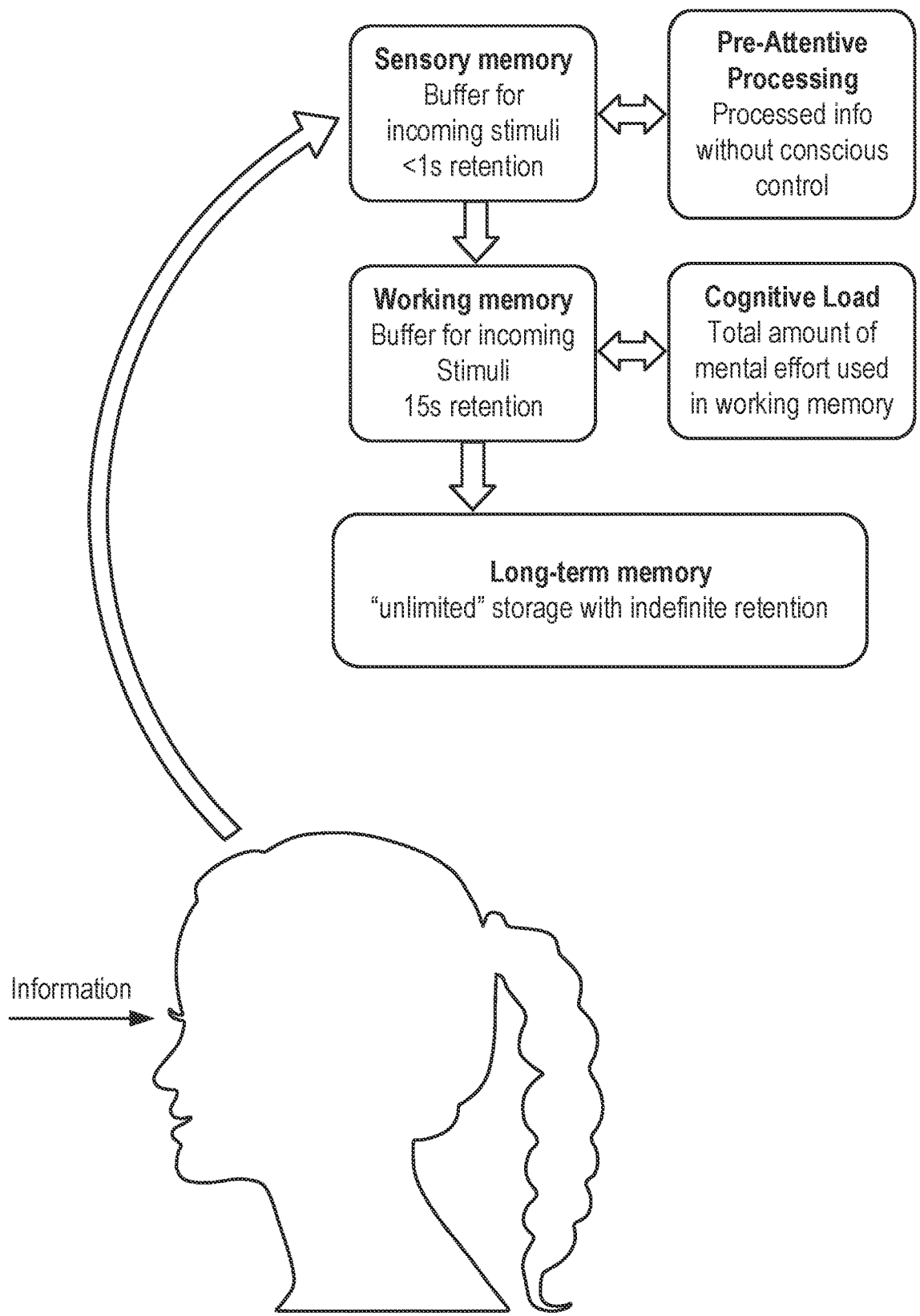
FIG. 17 is a block diagram of the basic tenets of how humans process and save information, within a spatial computing architecture and generally.
Figure 18:
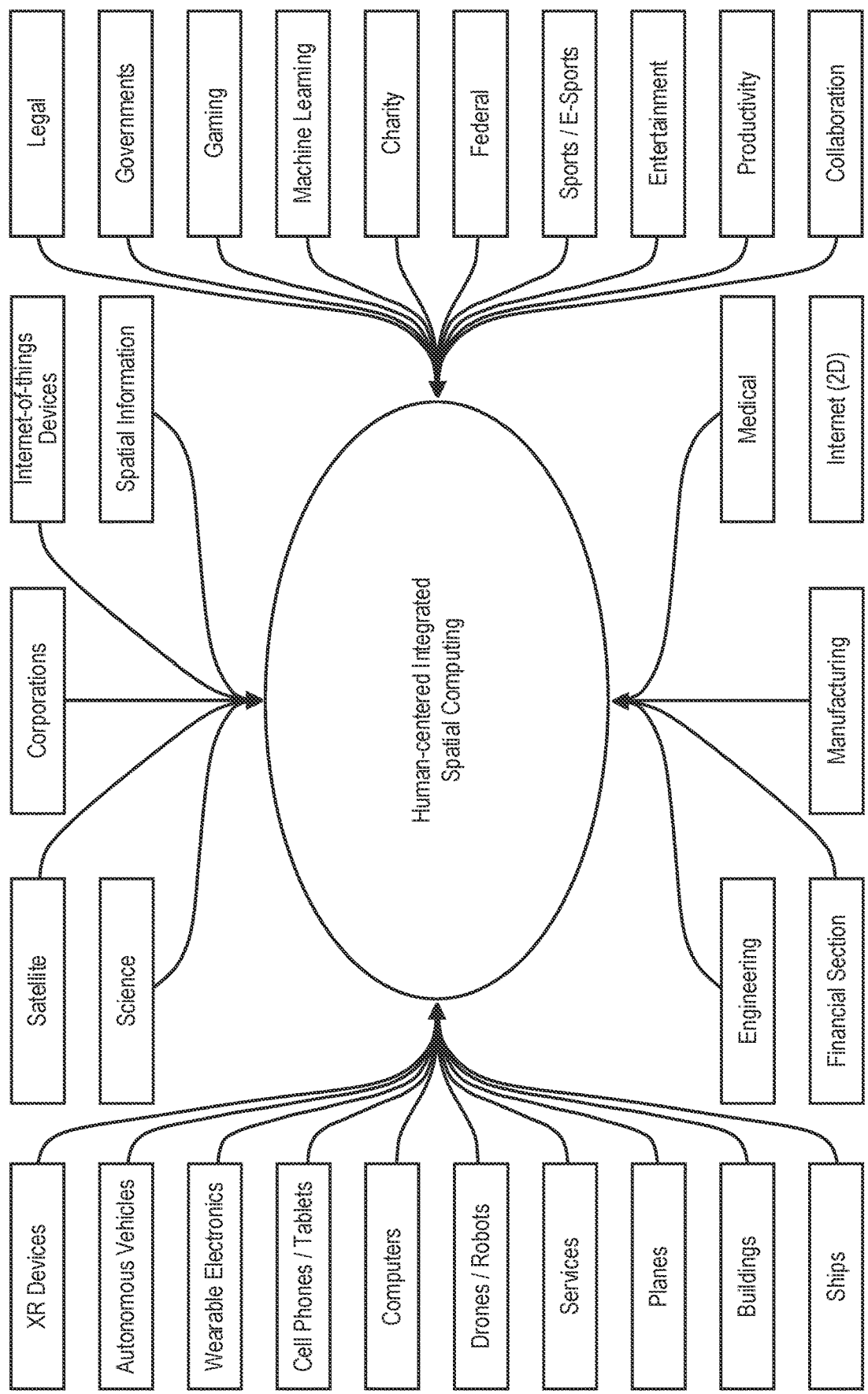
FIG. 18 is a block diagram of a human-centered spatial computing layer and informational coupling with many different sources of data.

Referring ahead to FIG. 17, it is useful to understand some of the basic tenets of how humans process and save information, as a spatial computing architecture is assembled. As shown in FIG. 17, the human brain is able to receive a lot of information due to the operation of the eyes, ears, and other human sensors, and this information can enter into a sensory memory buffer. As it turns out, a lot of this information is not retained, perhaps because it is not as useful as other retained portions. Components of information that are useful may be moved to a working memory buffer, and eventually may be moved to long-term memory, where there is potentially unlimited storage and indefinite retention. In various embodiments, a spatial computing system may be configured to increase the proportion of information pushed into working memory that is, indeed, useful information for the user. In other words, the preference is to add value to the user wherever possible, particularly is the cognitive load to the user's brain is to be increased.

Referring back to FIG. 15, the human-centered spatial computing layer, or "MagicVerse", interfaces with everything around it. For example, referring ahead to FIG. 18, the human-centered spatial computing layer is illustrated in informational coupling with many different sources of data, in various embodiments in as parallel a configuration as possible. The human-centered spatial computing layer may be understood as an integration with all of the systems around the user, from smartphones to internet-of-things integration capable devices, to virtual reality/augmented reality/mixed reality (socalled "XR") devices, to various vehicles, databases, networks, and systems.

The next layer illustrated in FIG. 15 is an abstraction and arbitration layer (256) interposed between the user, the human device interface, the human-centered spatial computing layer, and computing resource layers such as edge computing (258), fog computing (260), and cloud computing resources (262).

FIGS. 15 to 18 describe the additional detail of a spatial computing layer between the mobile device and a resource layer having a plurality of data sources and programmed to receive data resources, integrate the data resources to determine an integrated profile; and determine the first content based on the integrated profile. The spatial computing layer includes a spatial computing resource device having a spatial computing resource device processor, a spatial computing resource device storage medium, and a spatial computing resource device data set on the spatial computing resource device storage medium and executable by the processor to receive the data resources, integrate the data resources to determine an integrated profile, and determine the first content based on the integrated profile. The content provisioning system further includes an abstraction and arbitration layer interposed between the mobile device and the resource layer and programmed to make workload decisions, and distribute tasks based on the workload decisions.

One portion of the three outermost layers is depicted missing to represent the fact that the real physical world (264) is part of the integrated system, in other words, the world may be utilized to assist in computing, to make various decisions, and to identify various items. The content provisioning system includes a camera device that takes images of a physical world around the mobile device. The images may be used to make the workload decisions. The images may form one of the data resources.

Referring to FIGS. 19A-26C, various embodiments pertaining to connectivity alternatives are illustrated, which are suitable for use with various subject spatial computing configurations. For example, referring to FIG. 19A, a configuration is illustrated that takes advantage of relatively high bandwidth mobile telecommunication connectivity, such as those available using 3G, 4G, 5G, LTE, and other telecommunication technologies, and local networking connectivity, such as via Wi-Fi and cable connectivity endpoints, wherein such connectivity advancements may be utilized to connect at relatively low latency to remote (i.e., not immediately on-board the user's person) computing resources.

Figure 19A:
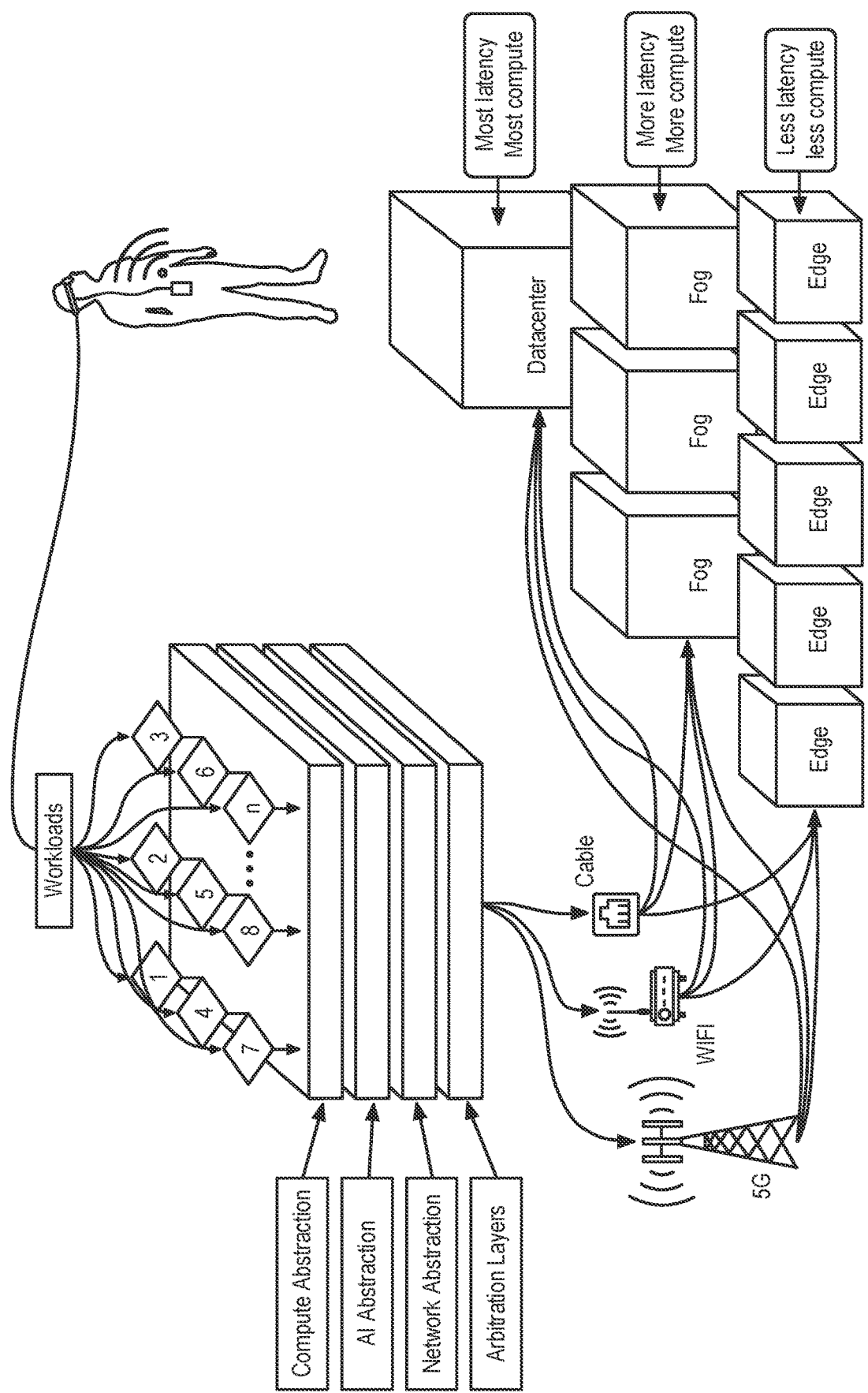
FIGS. 19A and 19B are block diagrams of a configuration wherein a user is wearing a system such as that depicted in FIG. 1 wherein "edge" computing and/or storage resources generally are positioned closer to the user than are "fog" computing and/or storage resources, which are closer than generally more powerful and more remote "cloud" resources.
Figure 19B:
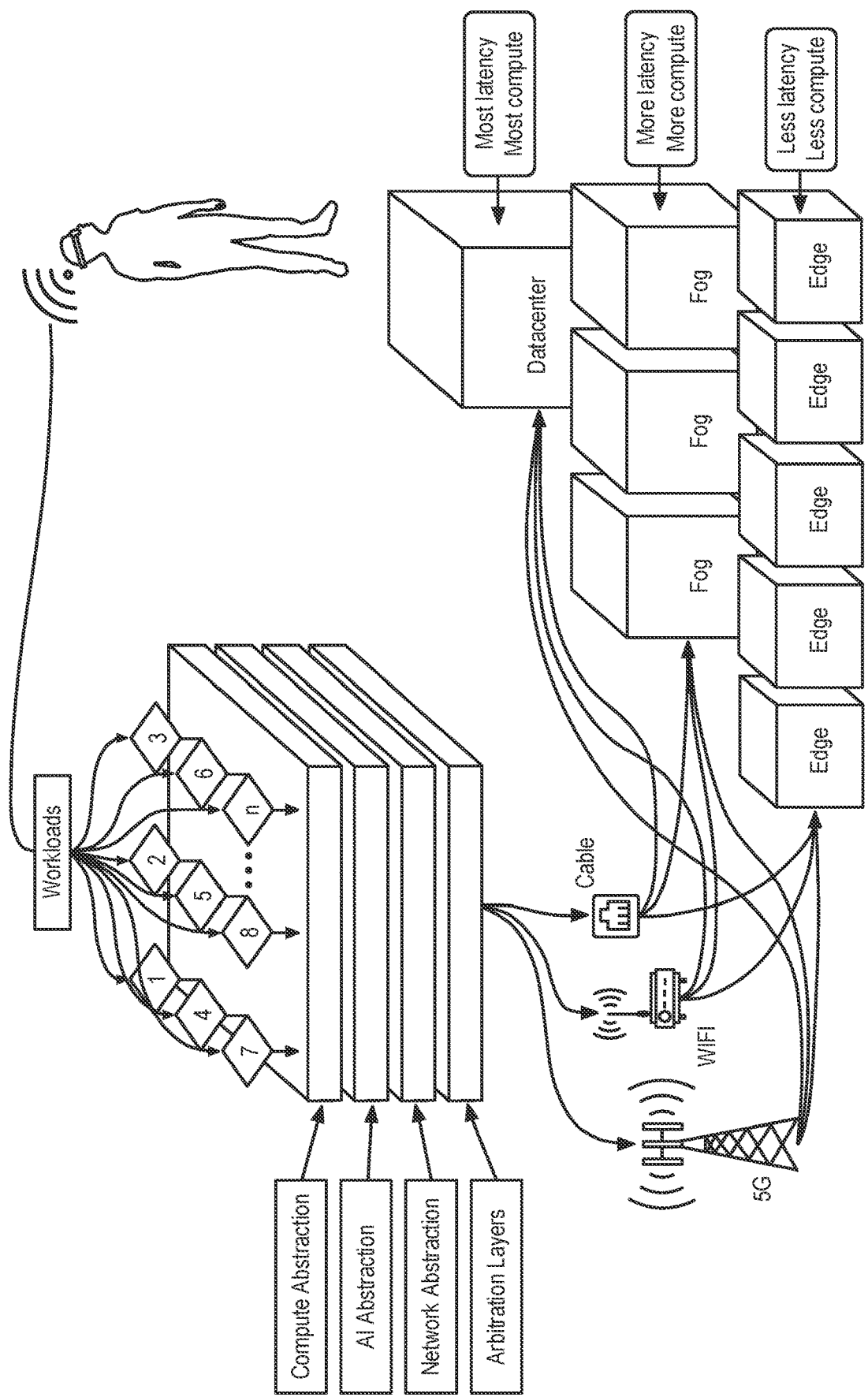
Figure 20A:
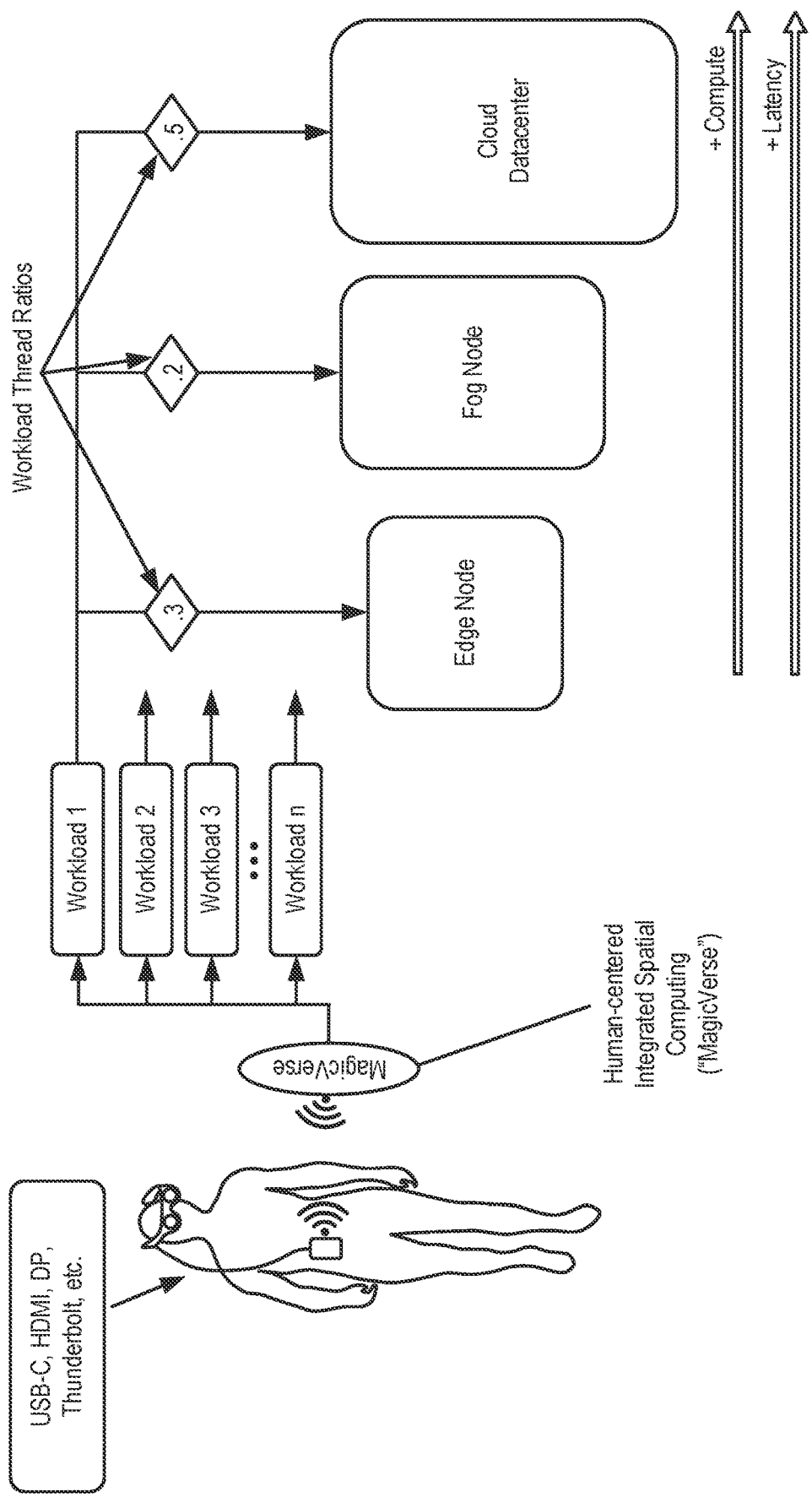
FIGS. 20A and 20B are block diagrams of users with connected computing systems similar to those illustrated in FIGS. 19A and 19B wherein computation is distributed amongst the edge, fog, and cloud computing resources based upon latency and computing requirements.
Figure 20B:
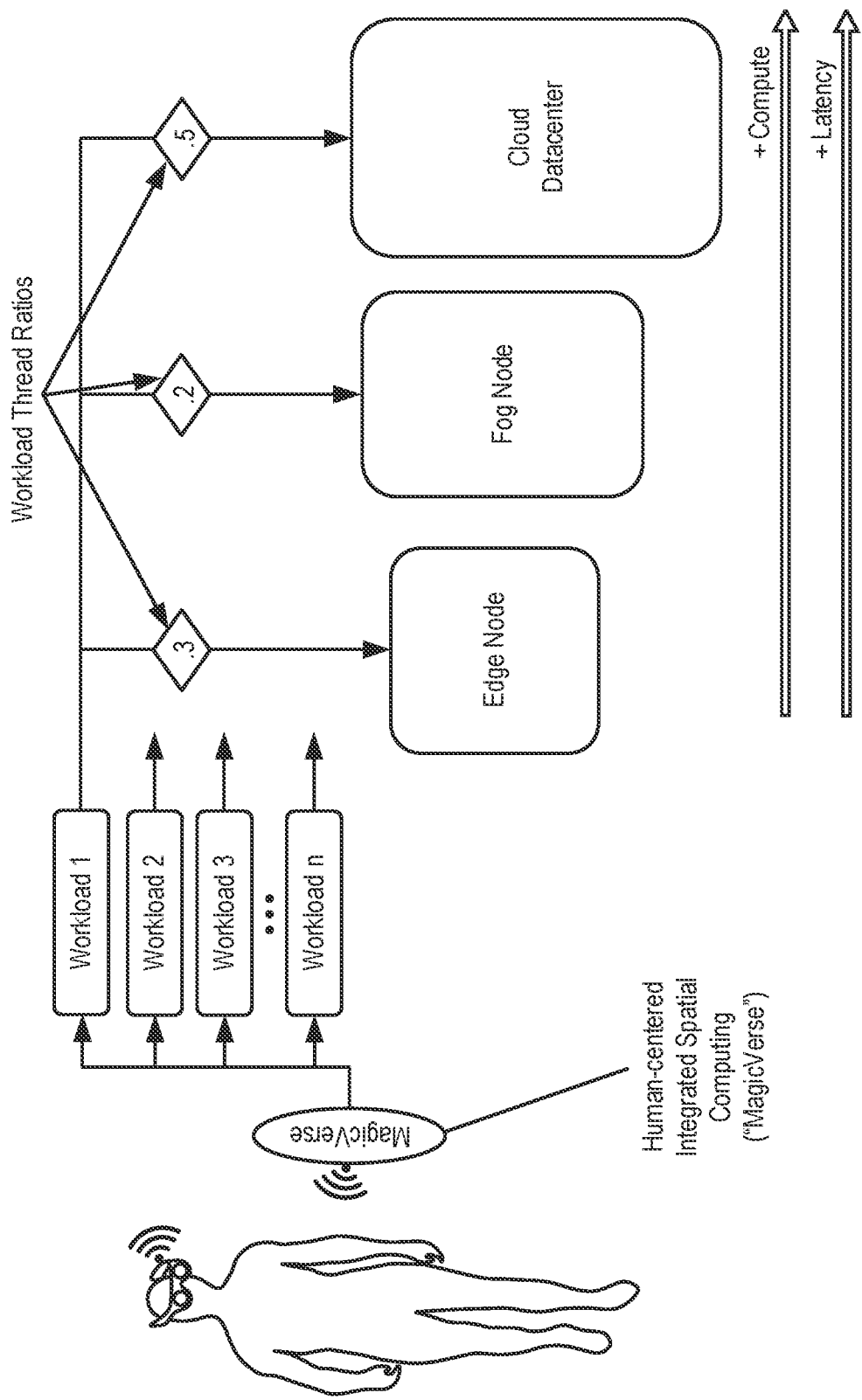

FIG. 19A illustrates a configuration wherein a user is wearing a system such as that depicted in FIG. 1, for example comprising a head wearable component (2) and interconnected auxiliary computing or controller component (6, also may be known as a "belt pack" due to the fact that in some variations, such computing component may be configured to be connected to a belt or waist area of the user). FIG. 19B illustrates a configuration similar to that of FIG. 19A, with the exception that the user is wearing a single-component configuration (i.e., it only has a head wearable component 2, with the functional replacement for the interconnected auxiliary computing or controller component 6 being off-person in the form of fog, edge, and/or cloud resources). Referring back to FIG. 19A, socalled "edge" computing and/or storage resources generally are positioned closer to the user than are "fog" computing and/or storage resources, which are closer than generally more powerful and more remote "cloud" resources. As shown in FIGS. 19A and 19B, generally closer (and generally less powerful in terms of raw compute resource) edge resources will be available to the user's local intercoupled computing resources (2, 6) with relatively lower latency than will fog resources (which generally will have an intermediate level of raw compute resource), which generally will be defined to have mid-level latency, and cloud resources, which are positioned yet farther away, with the most latency and generally also the most raw computing power. Thus, with such a configuration, as the resources are positioned farther away from the user, there is more latency and also more raw computing resource capability.

FIGS. 19A and 19B describe the additional detail wherein the mobile device communication interface includes one or more mobile device receivers connected to the mobile device processor and to a second resource device communication interface in parallel with the connection with the first resource device to receive second content. In the given example, the second resource device is a fog resource device having a second latency that is slower than the first latency. The mobile device communication interface includes one or more mobile device receivers connected to the mobile device processor and to a third resource device communication interface in parallel with the connection with the second resource device to receive third content transmitted by the third resource device transmitter, wherein the third resource device is a cloud resource device having a third latency that is slower than the second latency. The connection to the edge resource device is through a cell tower and the connection to the fog resource device is through a Wi-Fi connection device. The cell tower is connected to the fog resource device. The Wi-Fi connection device is connected to the fog resource device.

Figure 21:
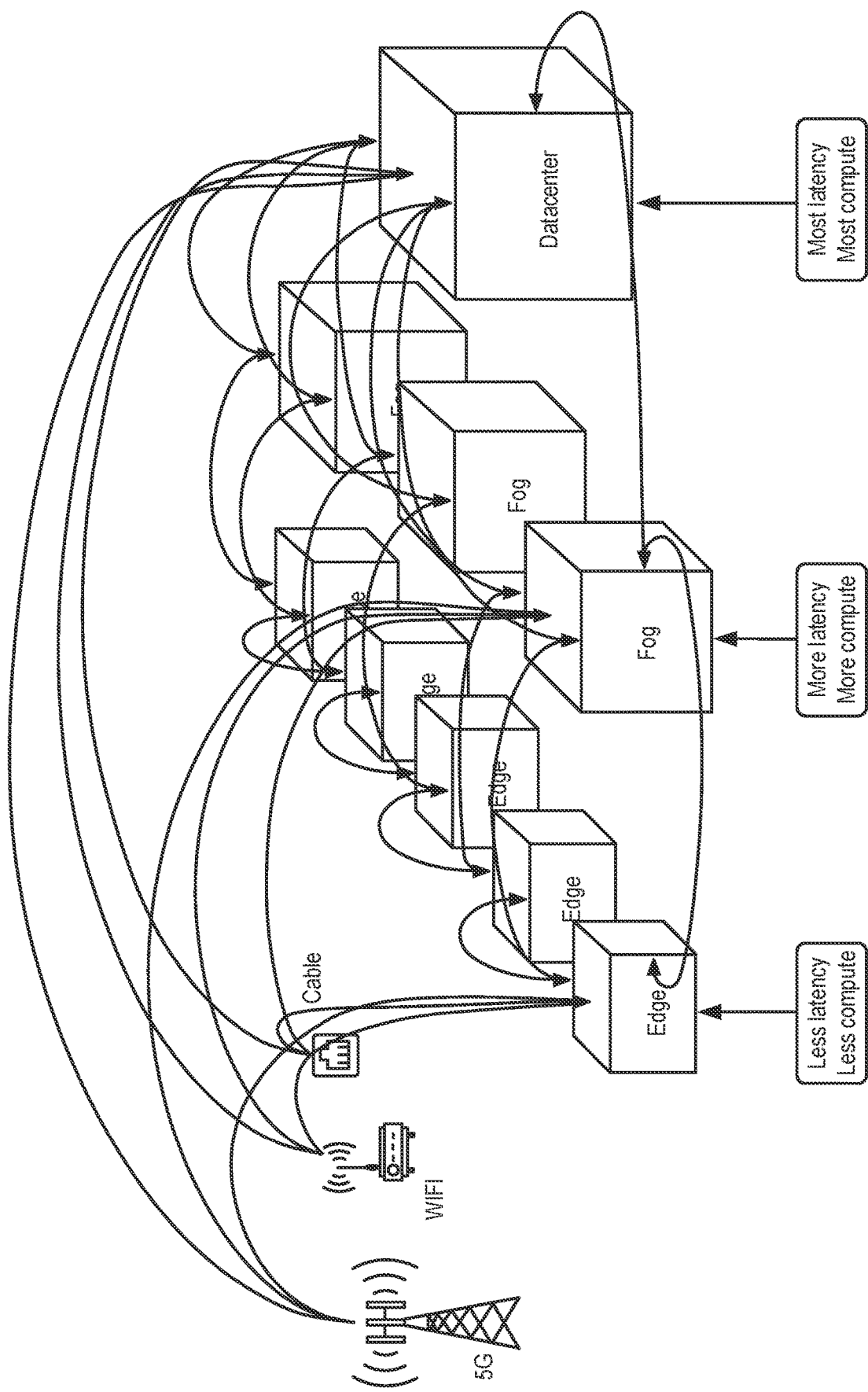
FIG. 21 is a block diagram of a human-centered spatial computing layer and informational coupling with many different sources of data.

In various embodiments, such configurations are controlled to distribute workloads to the various resources depending upon the need for computing workload versus latency. For example, referring to FIGS. 20A and 20B, which illustrate users with connected computing systems similar to those illustrated in FIGS. 19A and 19B, computation may be distributed amongst the edge, fog, and cloud computing resources based upon latency and computing requirements. Referring back to FIGS. 19A and 19B, such a computing need may be directed from the resources local to the user, through an application programming interface ("API") that is configured to do compute abstraction, artificial intelligence ("AI") abstraction, network abstraction, and arbitration computation to drive distribution of compute tasks to the various edge, fog, and cloud computing resources based upon latency and computing requirements. In other words, whichever local XR computing device (i.e., wearable system such as is shown in FIG. 1, or tablet computer, etc.) the user has locally that is to be interfaced with the human-centered integrated spatial computing system (again, which may be known as the "MagicVerse"), can separate the workload, and based upon whatever format this workload comes in, and where it needs to go for external computing and/or storage resource, and the size the type of files involved—the compute abstraction node may be configured to handle such processing and directing, such as by reading certain file formats, cache-ing packets that are of certain sizes, moving certain documents or files around as needed, etc. The AI abstraction node may be configured, for example, to receive the workload and examine what kind of processing model needs to be utilized and run, and pull particular workload elements out of memory, such that as more data is received, it can run faster. The network abstraction node may be configured to constantly analyze connected network resources, analyze their quality of connectivity, signal strength, and capabilities for various types of processes to be encountered, so that it may assist in directing workload to the various network resources as optimally as possible. The arbitration node may be configured to execute in dividing up the various tasks and subtasks and sending them out to the various resources. Referring to FIG. 21, computational loads may be distributed in many ways, many directions, so that the net result at the endpoint is optimized in terms of performance and latency. For example, head pose determination (i.e., orientation of a user's head relative to the environment around the user when wearing a head worn component 2 such as that depicted in FIG. 1, generally would affect perception by the user in an augmented reality configuration such as that shown in FIG. 1), wherein relatively low latency may be of paramount importance, may be at least primarily run using edge resources, while a semantic labelling service, for which ultra-low latency is not as important (i.e., the labels are not absolutely necessary at runtime), may be run using datacenter cloud resources. As noted above, edge resources generally are configured to have lower latency and less raw compute power, they may be positioned at the "edge" of computational need, thus the resource's name. There are many different ways to configure an edge computing resource. For example, commercially available edge type resources may include those sold under the tradenames "Movidius Neural Computer Stick" ™ by Intel, Inc., or "Jetson Nano" ™ or "Jetson TX2" ™, both by Nvidia, Inc., or "AGX Xavier" ™ by Nvidia, Inc. Each of these generally comprises both a CPU and graphics GPU resource, they may be intercoupled with camera devices, microphone devices, memory devices, and the like, and connected to the user endpoint with high-speed bandwidth connectivity, for example. Such resources also may be configured to comprise custom processors, such as application specific integrated circuits ("ASIC"), which may be specifically for deep learning or neural network tasks. Edge compute nodes also may be configured to be aggregated to increase the computing resource of whatever room a user is located within (i.e., a room with 5 edge nodes may be configured to functionally have 5× the computational power than without, with the abstraction and arbitration layers, such as those illustrated in FIGS. 19A and 19B, coordinating such activity).

Figure 22A:
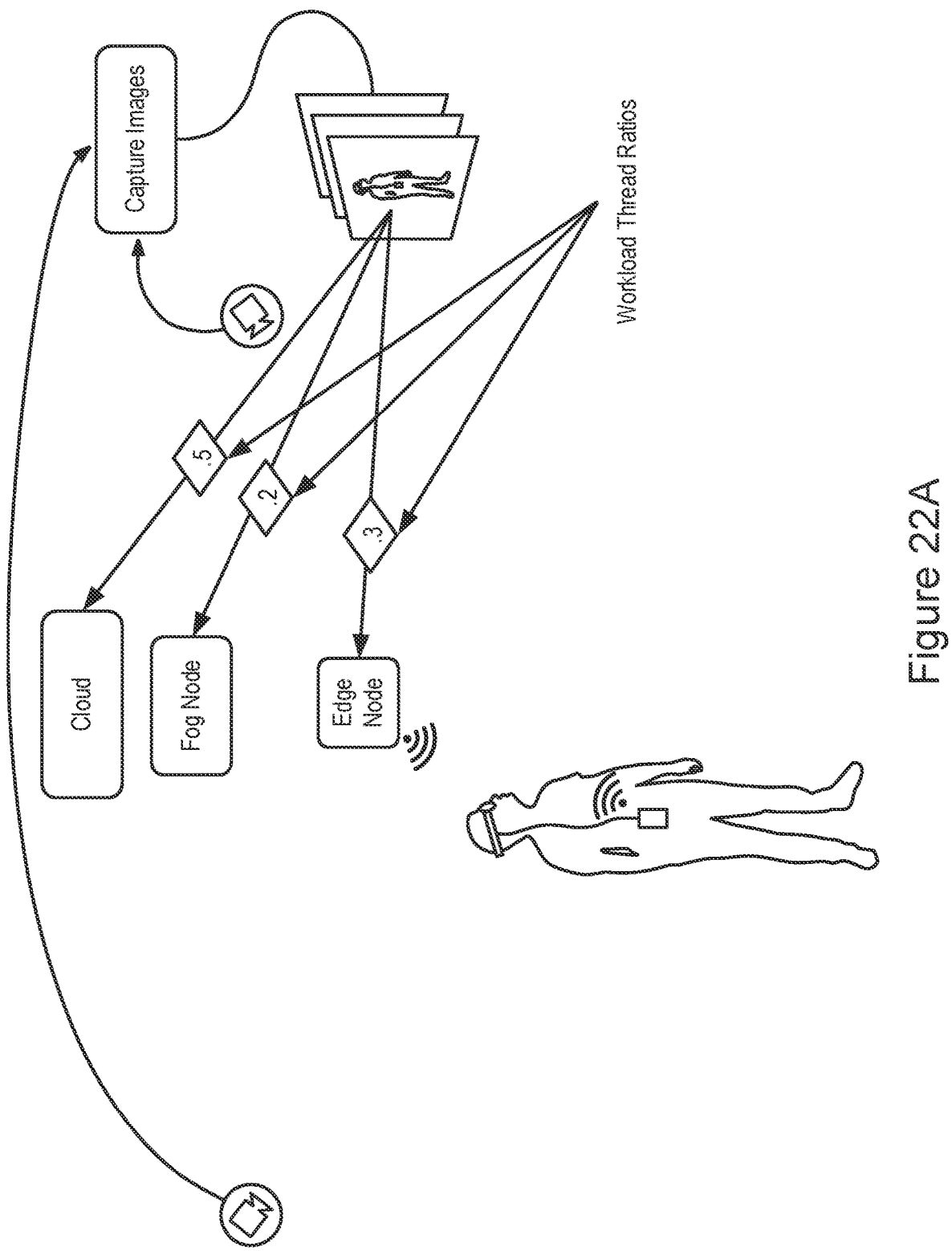
FIGS. 22A and 22B are block diagrams of configurations wherein a room with multiple cameras around the user is utilized and images from the cameras may be separated and directed into different computing resources for various reasons.
Figure 22B:
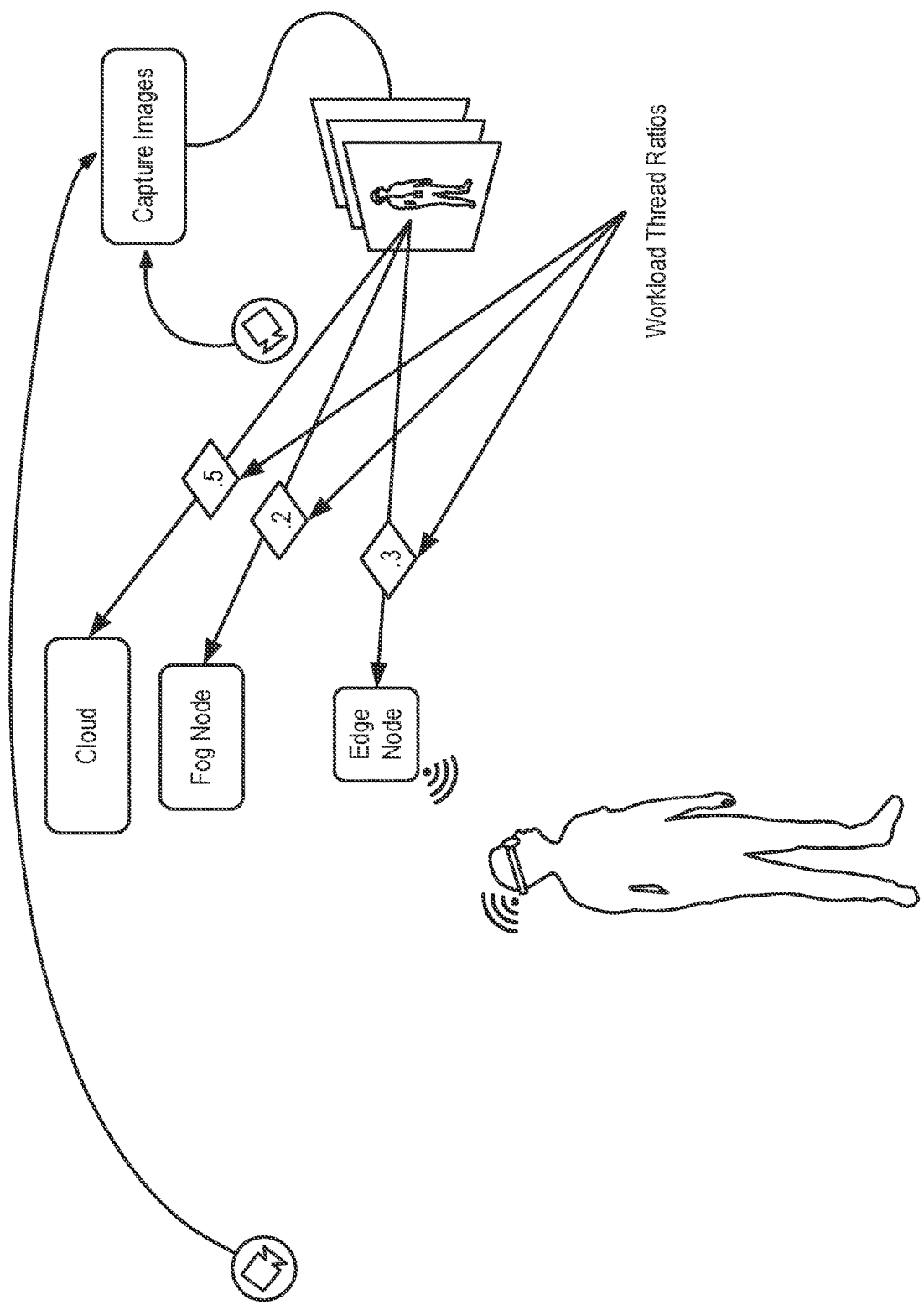

Referring to FIGS. 22A and 22B, configurations are illustrated wherein a room with multiple cameras around the user is utilized, images from the cameras may be separated and directed into different computing resources for various reasons. For example, in a scenario wherein a head pose determination process is to be conducted repeatedly at relatively high frequency, frames may be sent to the edge node for relatively low-latency processing, in parallel, what may be termed a dynamic resolution computational schema (in one variation, it may be configured for tensor training decomposition to execute dynamic downgrades in resolution, which may be simplified as taking a tensor and combining lower rank features, so that the system is only computing pieces or portions), frames may also be sent to the fog and cloud resources to be further contextualized and understood relative to the user's XR computing system (FIG. 22A illustrates a user computing configuration similar to that shown in FIG. 1, as do those of FIGS. 19A, 20A, 23A, and 24A), FIG. 22B illustrates a configuration as in FIGS. 19B, 20B, 23B, and 24B without an interconnected auxiliary computing component (6), due to the functional replacement for such resource being positioned within the aggregation of the edge, fog, and cloud resources.

FIGS. 22A and 22B show the additional detail of at least one camera to capture at least first and second images, wherein the mobile device processor transmits the first image to the edge resource device for faster processing and the second image to the fog resource device for slower processing. The at least one camera is a room camera that takes the first image of the user.

Figure 23A:
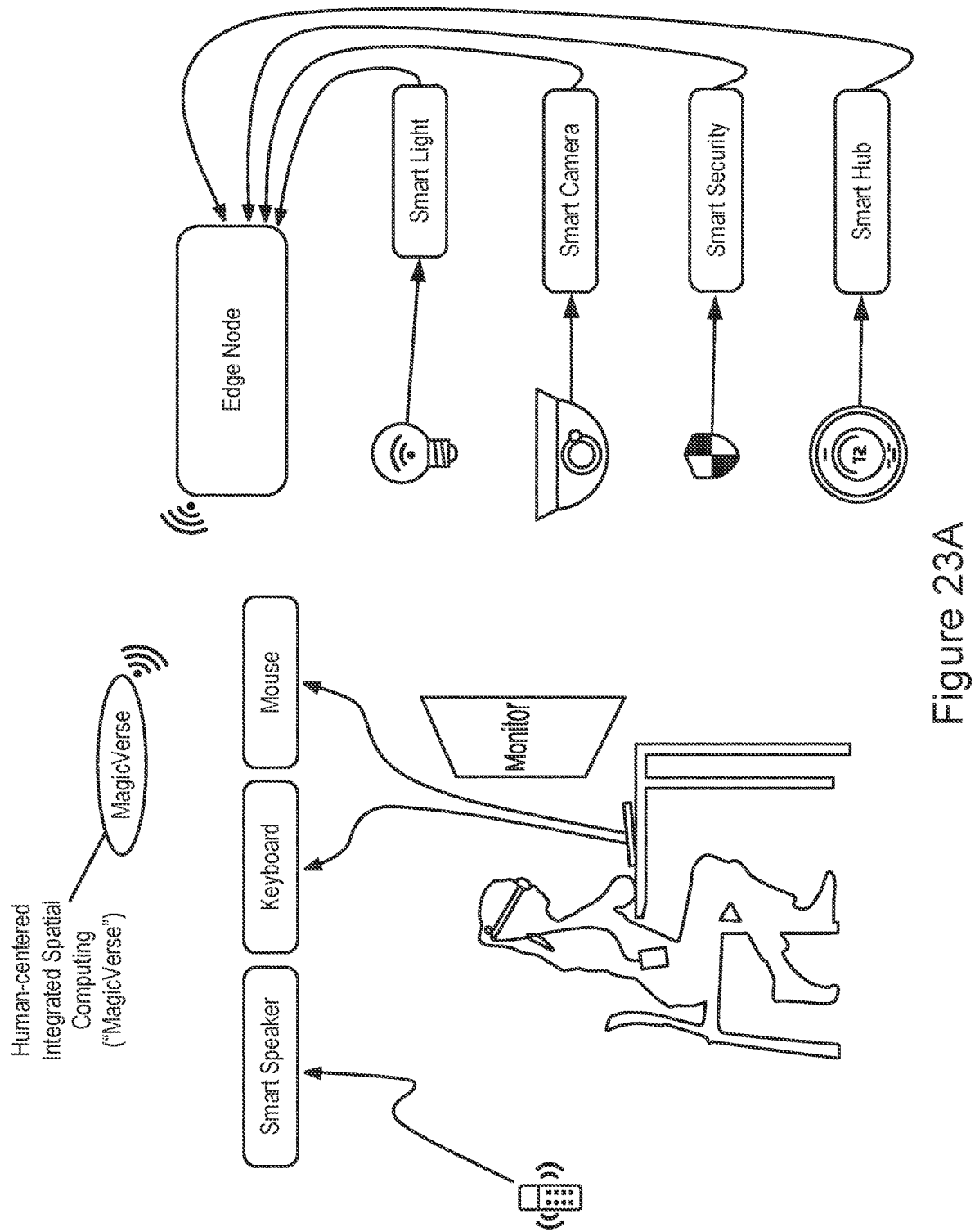
FIGS. 23A and 23B are block diagrams of various "internet-of-things" resources connected to the user's local computing resources via edge computing resources.
Figure 23B:
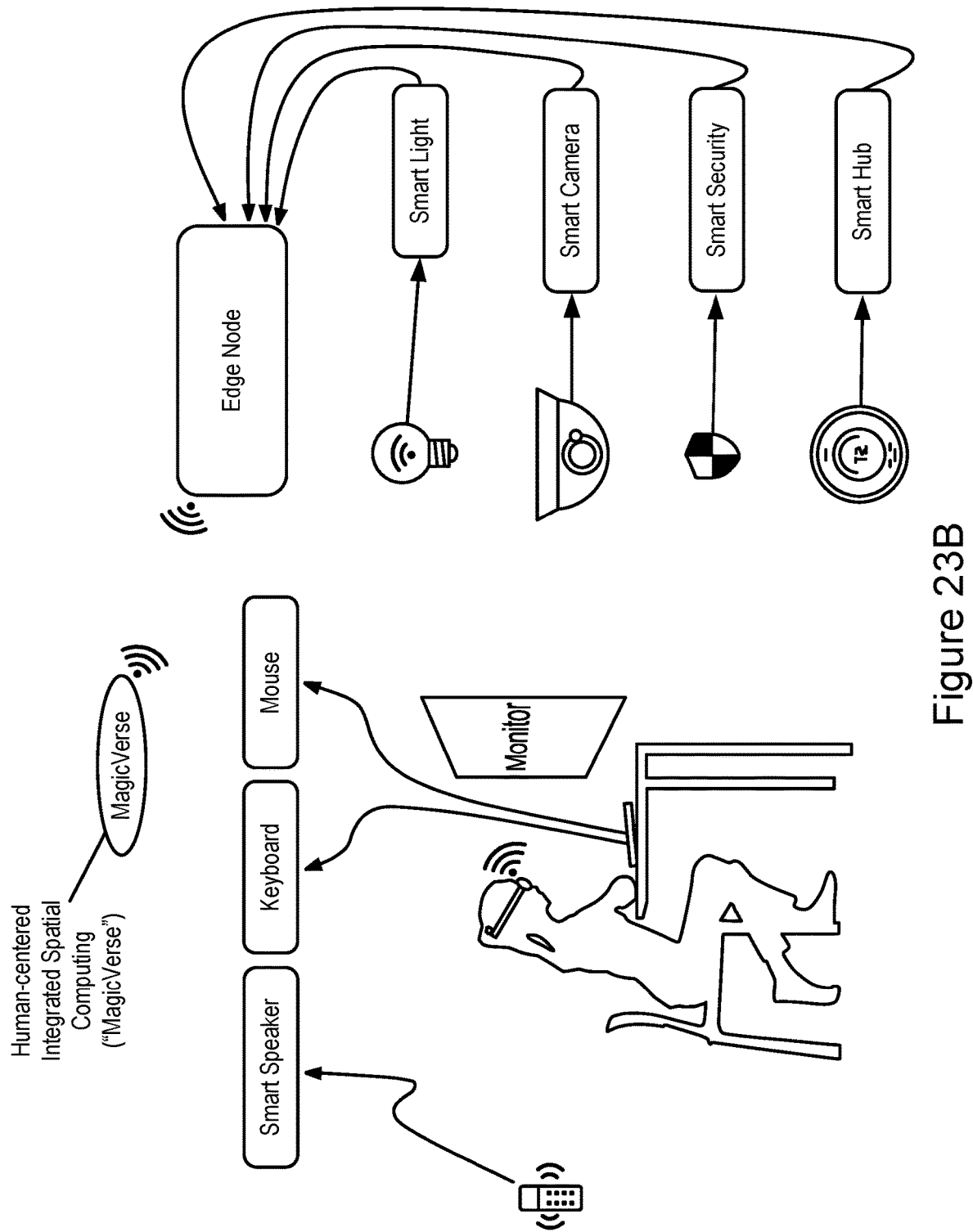

Referring to FIGS. 23A and 23B, various "internet-of-things" (i.e., configured to be easily interfaced with network controls, generally through internet connectivity such as IEEE 802.11-based wireless networking) resources may be connected to the user's local computing resources via edge computing resources, and thus processing and control pertaining to each of these resources may be done, at least in part, off of the wearable computing system.

Figure 24A:
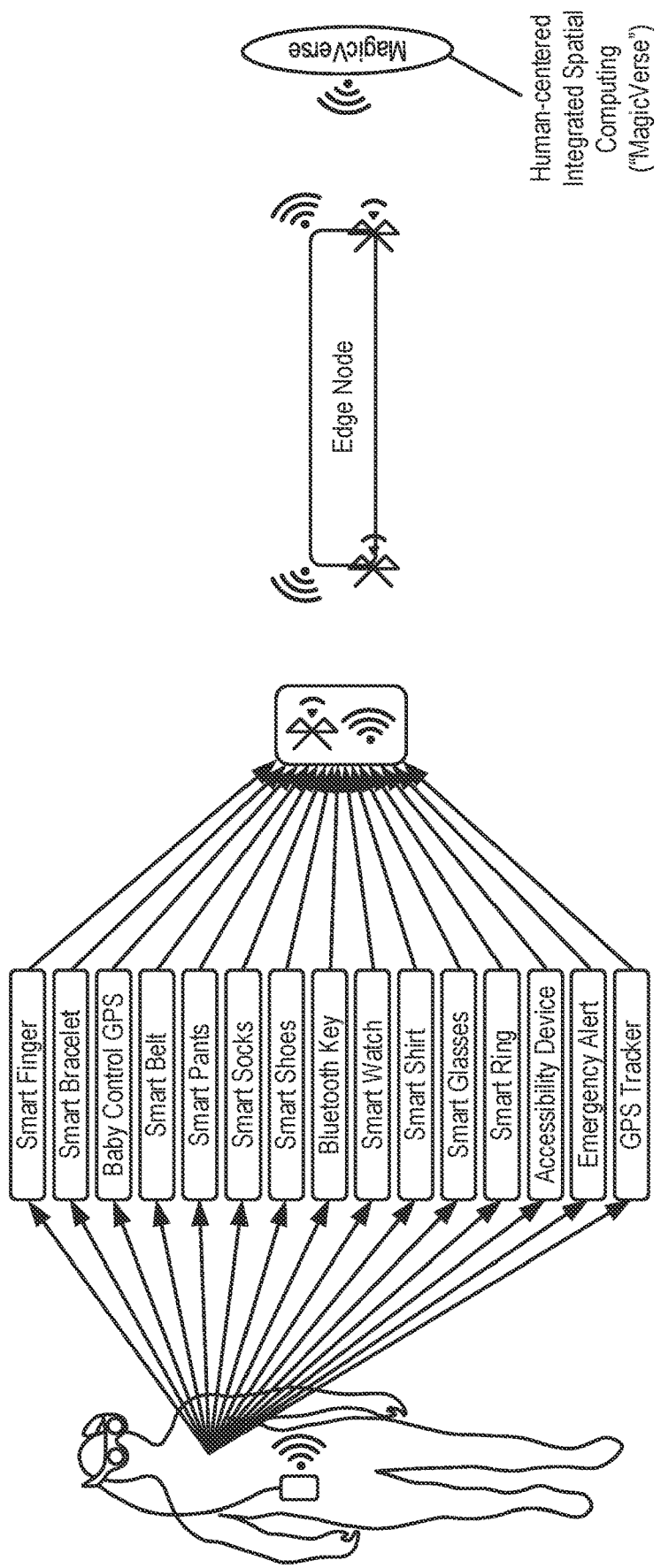
FIGS. 24A and 24B are block diagrams of types of wearable technologies that may be connected to edge computing resources.
Figure 24B:
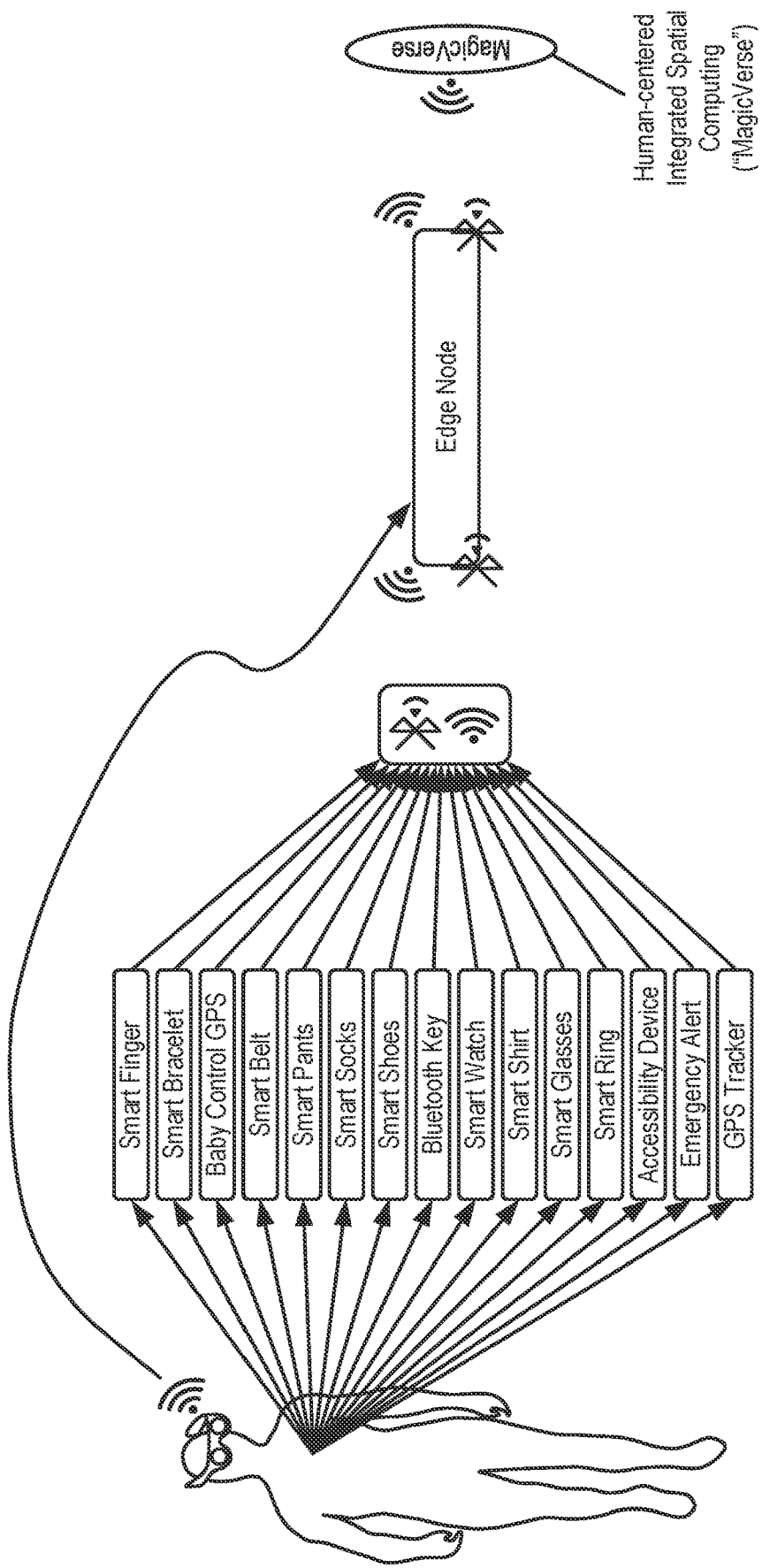

Referring to FIGS. 24A and 24B, many types of wearable technologies may be connected to edge computing resources, such as via available network connectivity modalities, for example IEEE 802.11 Wi-Fi modalities, WiFi-6 modalities, and/or Bluetooth™ modalities.

Figure 25A:
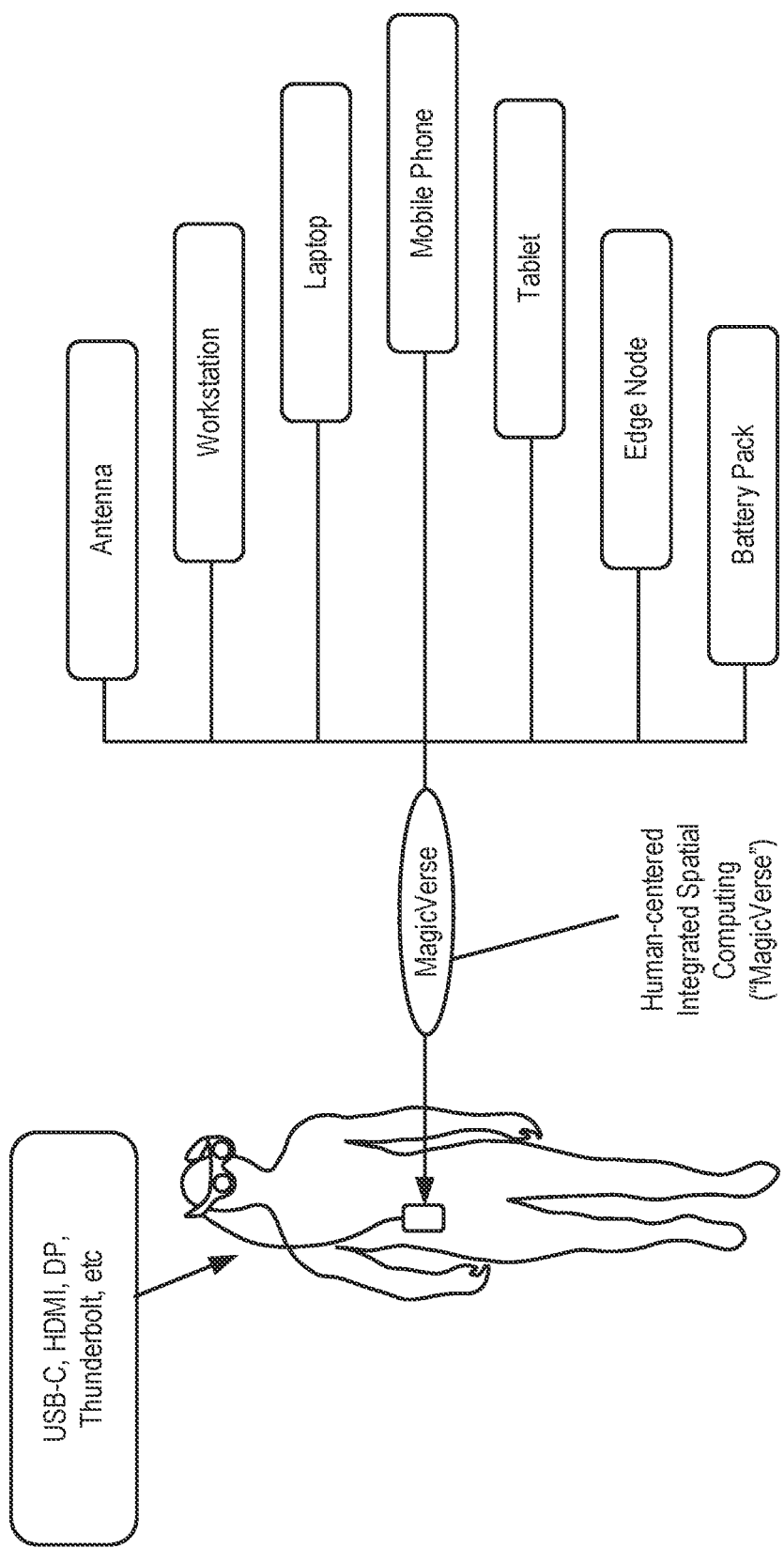
FIGS. 25A to 25E are block diagrams of configurations to allow a user to utilize a wired connection to couple his local system to external resources for additional computer, storage, and/or power, such as via direct coupling to one or more antennae, computing workstations, laptop computers, mobile computing devices such as smartphones and/or tablets, edge computing resources, and power supplies for charging his local computing system power supply (i.e., battery) (FIG. 25A), an interconnected auxiliary computing component (FIG. 25B), intercoupled to other computing resources wirelessly (FIG. 25C), coupled to an automobile (FIG. 25D), and with additional computing and/or storage resources (FIG. 25E)
Figure 25B:
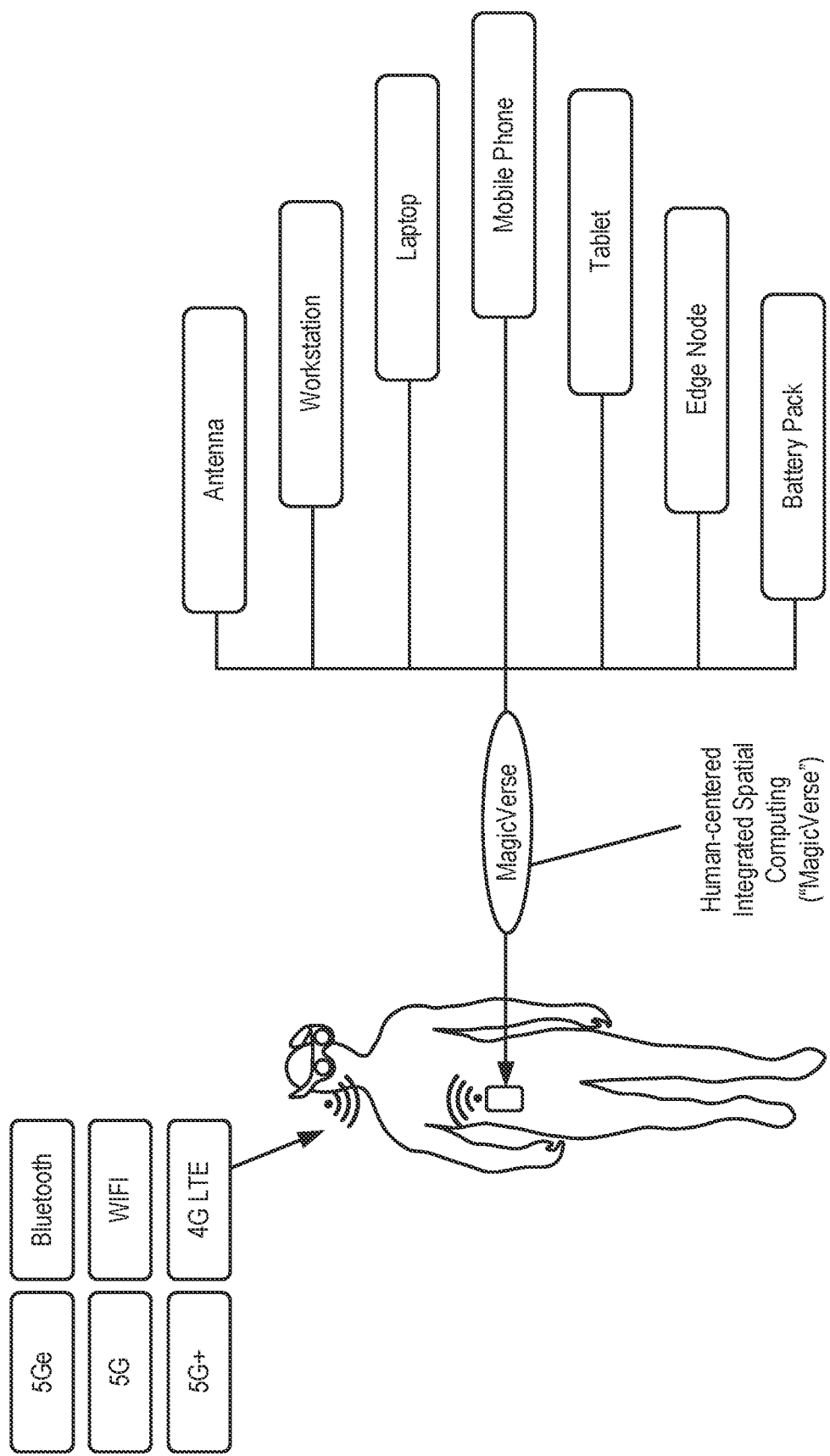
Figure 25C:
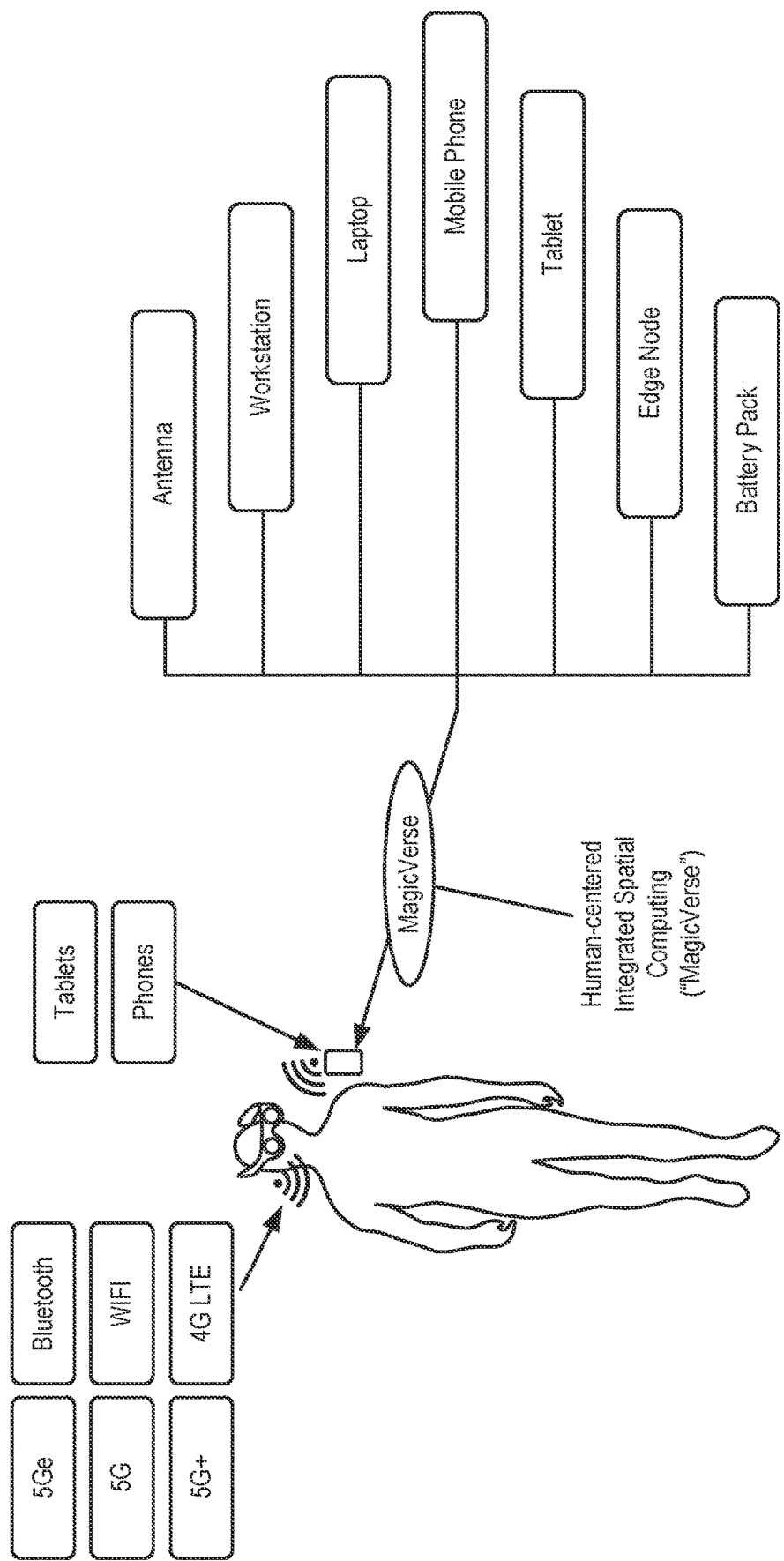
Figure 25D:
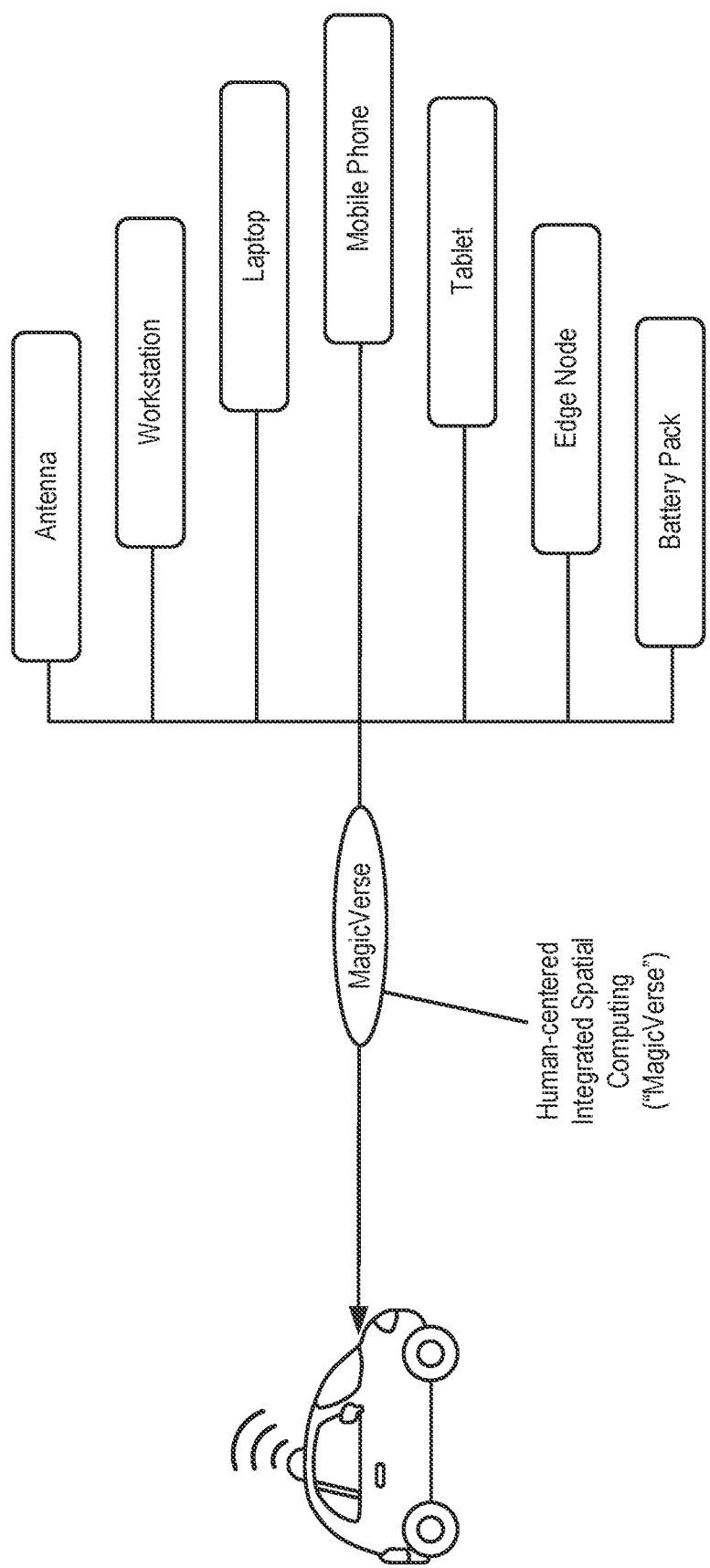
Figure 25E:
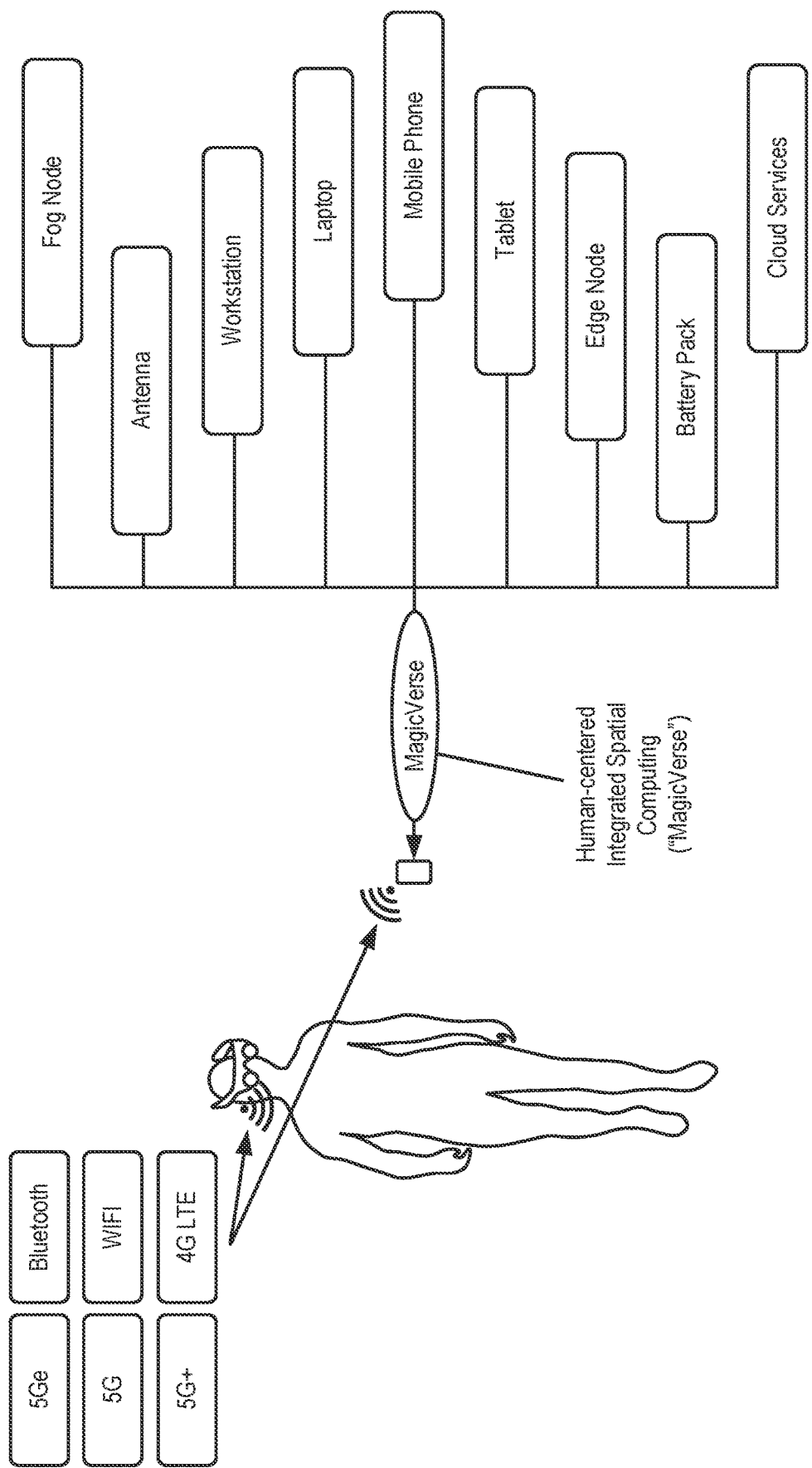

Referring to FIG. 25A, with a system similar to that depicted in FIG. 1, the system may be configured to allow a user to utilize a wired connection to couple his local system to external resources for additional computer, storage, and/or power, such as via direct coupling to one or more antennae, computing workstations, laptop computers, mobile computing devices such as smartphones and/or tablets, edge computing resources, and power supplies for charging his local computing system power supply (i.e., battery). Such connectivity may be facilitated by an API configured to operate as a layer on top of each of the connected resource operating systems, such as Android™, iOS™, Windows™, Linux™, and the like. Preferably such resources may be added or disconnected by the user during operation, depending upon the user's ability to remain proximal and desire to utilize such resources. In another embodiment, multiple such resources may be bridged together in interconnectivity with the user's local computing system. Referring to FIG. 25B, an embodiment is shown that is similar to that of FIG. 25A, with the exception that an interconnected auxiliary computing component (6) may be coupled to the user and wirelessly coupled to a hear wearable component (2), such as via Bluetooth, 802.11, WiFi-6, Wi-Fi Halo, and the like. Such a configuration may be utilized in the contexts above, such as in the configurations shown in FIGS. 19A, 20A, 22A, 23A, and 24A (in other words, with such a "hybrid" configuration, a user still has the interconnected auxiliary computing component 6 on his or her person, but this component is wirelessly connected to the head wearable component 2 rather than connected by a tethered coupling). Referring to FIG. 25C, a user is shown with a head wearable component, such as that shown in FIG. 1 (element 2), that is intercoupled to other computing resources wirelessly, as in the embodiments of FIGS. 19B, 20B, 22B, 23B, and 24B, also shown is an XR device on the user's person that may also be intercoupled with the depicted remote resources, such as by wired or wireless connectivity. FIG. 25D illustrates that such remote resources may be intercoupled not only to a wearable or hand-holdable XR or other device, but to a variety of local computing resources, such as those that may be coupled to, for example, an automobile in which a user may be sitting. Referring to FIG. 25E, a configuration similar to that of FIG. 25C is shown, but also with the reminder that additional computing and/or storage resources may be intercoupled as well, such as fog and/or cloud resources, as discussed, for example, in reference to FIGS. 19B, 20B, 21, 22B, 23B, and 24B.

Figure 26A:
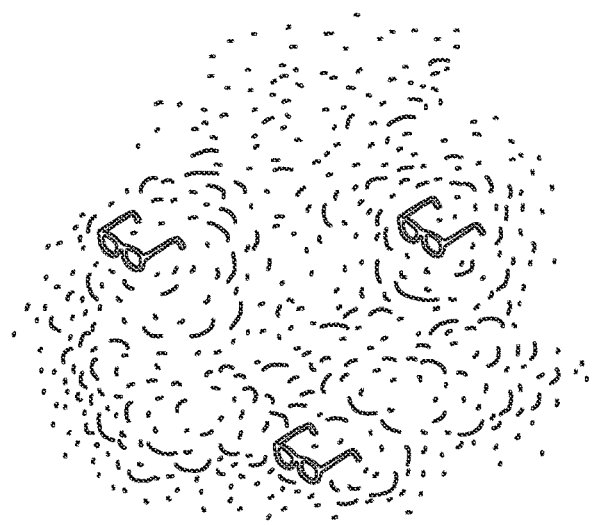
FIGS. 26A to 26C are perspective diagrams of featuring steerable connection and concentrate or focus connectivity toward one or more particular mobile computing devices.
Figure 26B:
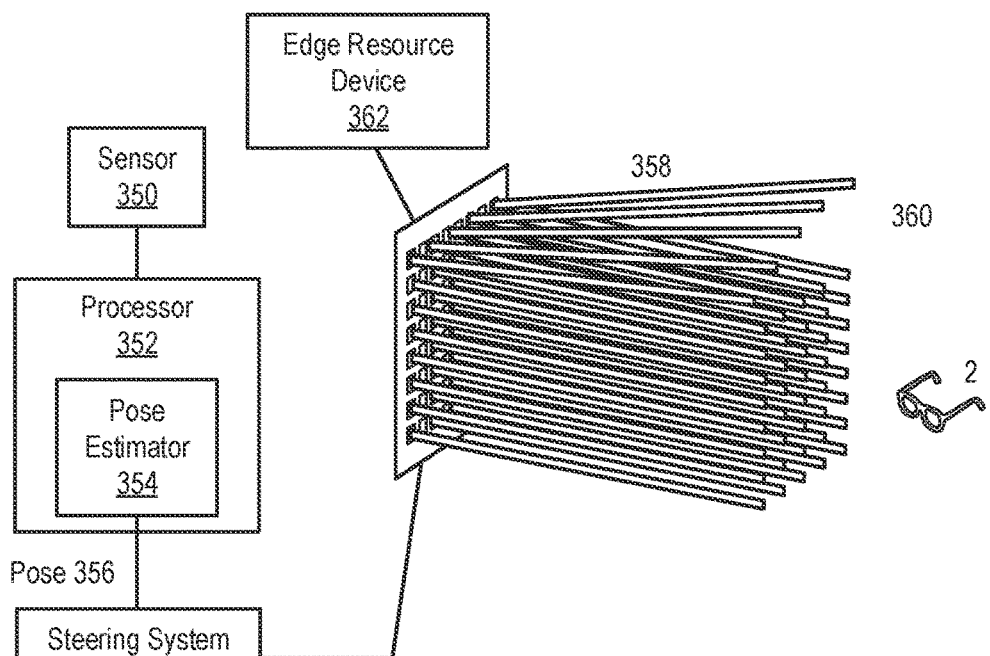
Figure 26C:
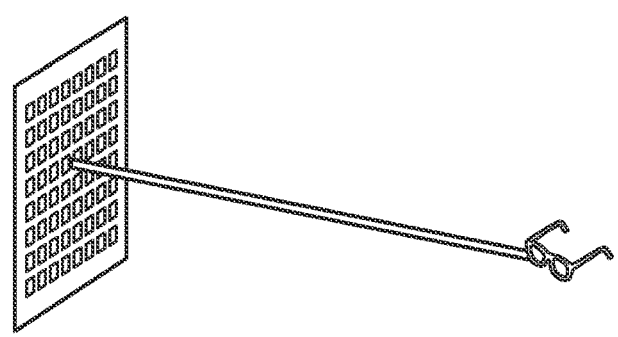

Referring to FIGS. 26A-26C, as relatively high-bandwidth, low latency mobile connectivity becomes more prevalent, rather than or in addition to placing mobile devices in an effective cloud of signals from various sources, as shown in FIG. 26A, beam forming configurations, such as those featuring phased array antennae configurations as shown in FIG. 26B, may be utilized to effectively "steer" and concentrate or focus connectivity toward one or more particular mobile computing devices, as shown in FIG. 26C. With an enhanced knowledge or understanding of a location and/or orientation of particular mobile computing device (for example, in various embodiments due to pose determination techniques, such as those involving cameras positioned upon or coupled to such mobile computing device), connectivity resources may be at least provided in a more directed and conserved manner (i.e., pose may be mapped and fed back to the beam forming antennae to direct connectivity more precisely). In one variation, a configuration as illustrated in FIG. 26C may be accomplished, for example, using a radar hologram type of transmission connector, such that an effective point-to-point communications link is formed using focused signal coherence.

FIGS. 26A to 26C describe additional features of a content provisioning system further including a sensor (350) providing a sensor input into a processor (352), a pose estimator (354), executable by a processor (352), to calculate to a pose (356) of the mobile device (head-worn viewing component (2)), including at least one of a location and an orientation of the mobile device, based on the sensor input, a steerable wireless connector (358) that creates a steerable wireless connection (360) between the mobile device and the edge resource device (362), and a steering system connected to the pose estimator and having an output that provides an input into the steerable wireless connector to steer the steerable wireless connection to at least improve the connection. Although all these features are not present in 26A to 26C they can be inferred from 26A to 26C or other figures and related description herein.

Figure 27:
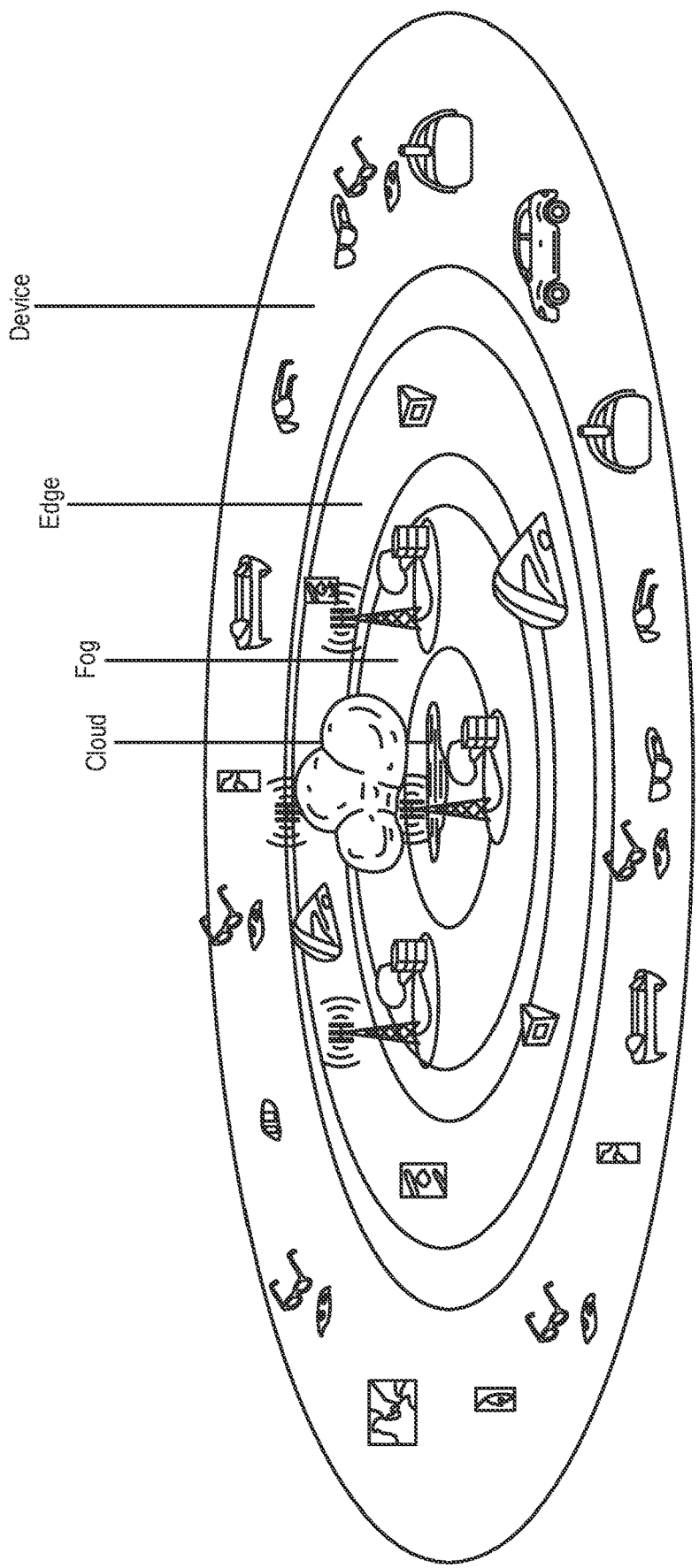
FIG. 27 is a perspective diagram of fog computing, which also may be known as "ambient computing" is shown, with different "rings" of compute which correspond to levels of latency relative to a user device.

Referring to FIG. 27, a depiction of fog computing, which also may be known as "ambient computing" is shown, with different "rings" of compute which correspond to levels of latency relative to a user device, such as the various XR devices, robots, cars, and other devices shown in the outer ring. The adjacent ring inward is illustrative of edge computing resources, which may include various edge node hardware, such as those described above, these may include various forms of proprietary 5G antennae and connectivity modalities. The central ring represents cloud resources.

Figure 28A:
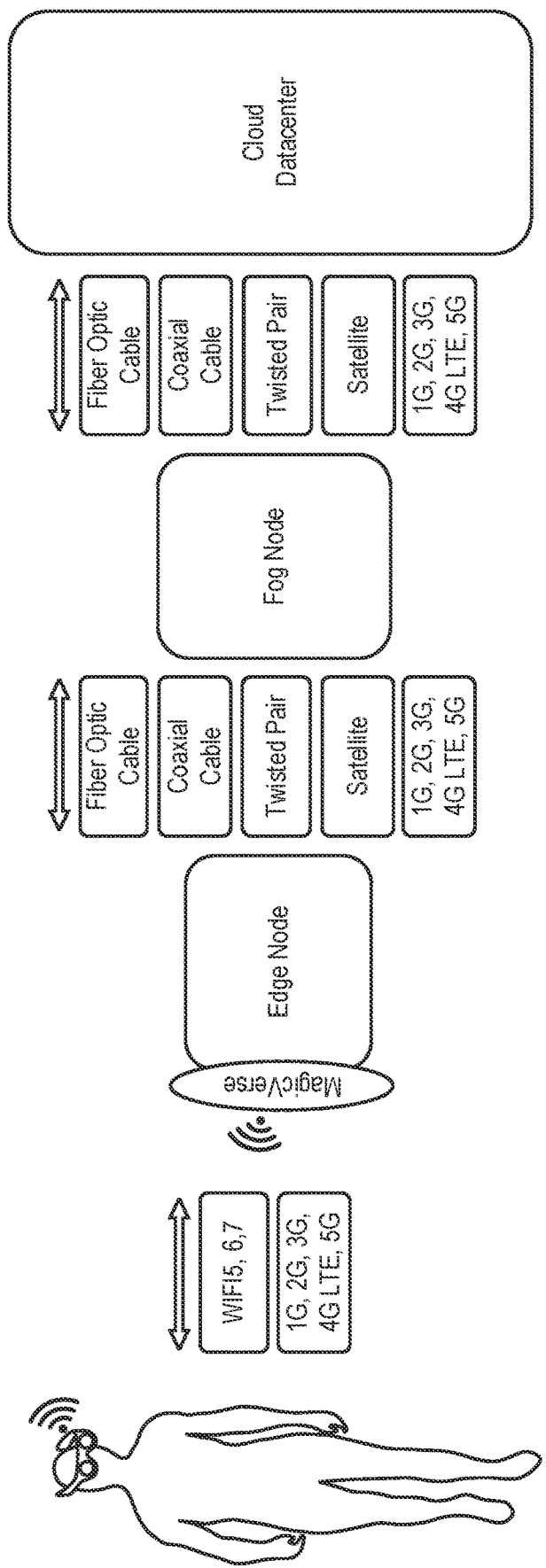
FIGS. 28A to 28C are block diagrams of systems wherein, in between edge, fog, and cloud layers, there may be communication layers comprising various forms of connectivity, including fiber optics, coaxial cabling, twisted pair cabling satellite, various other wireless connectivity modalities.
Figure 28B:
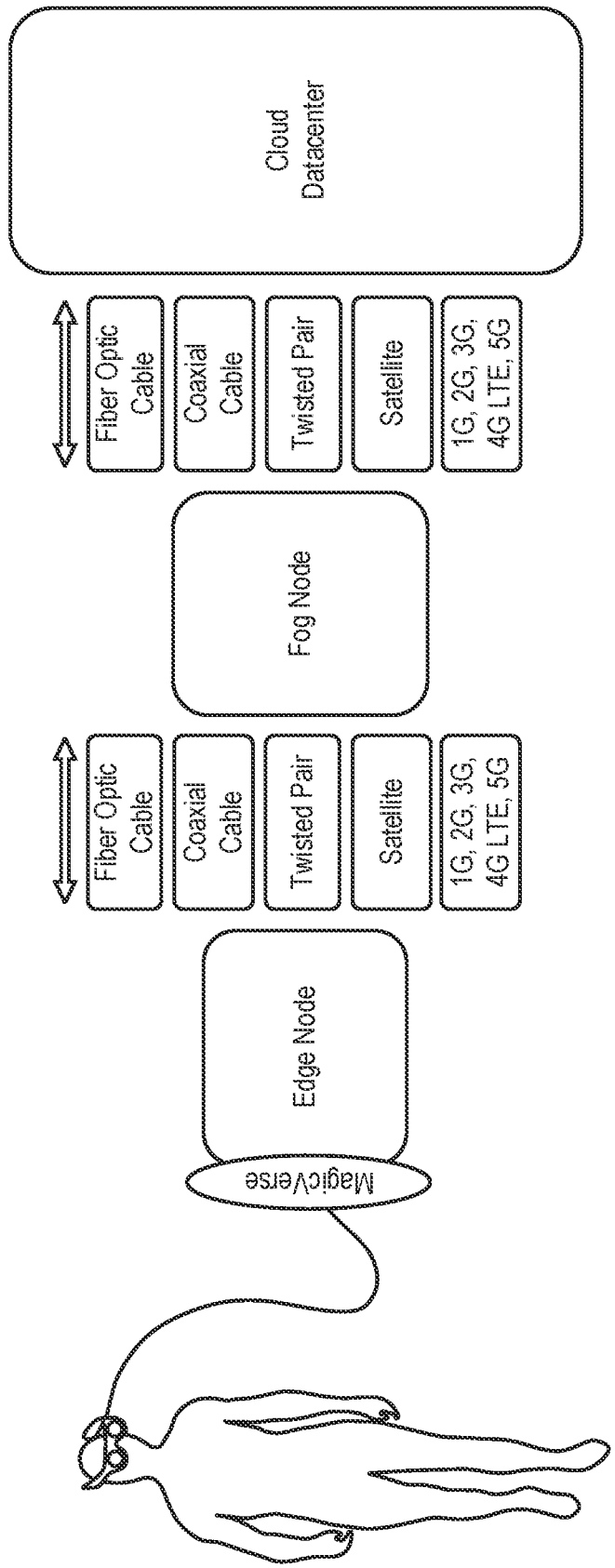
Figure 28C:
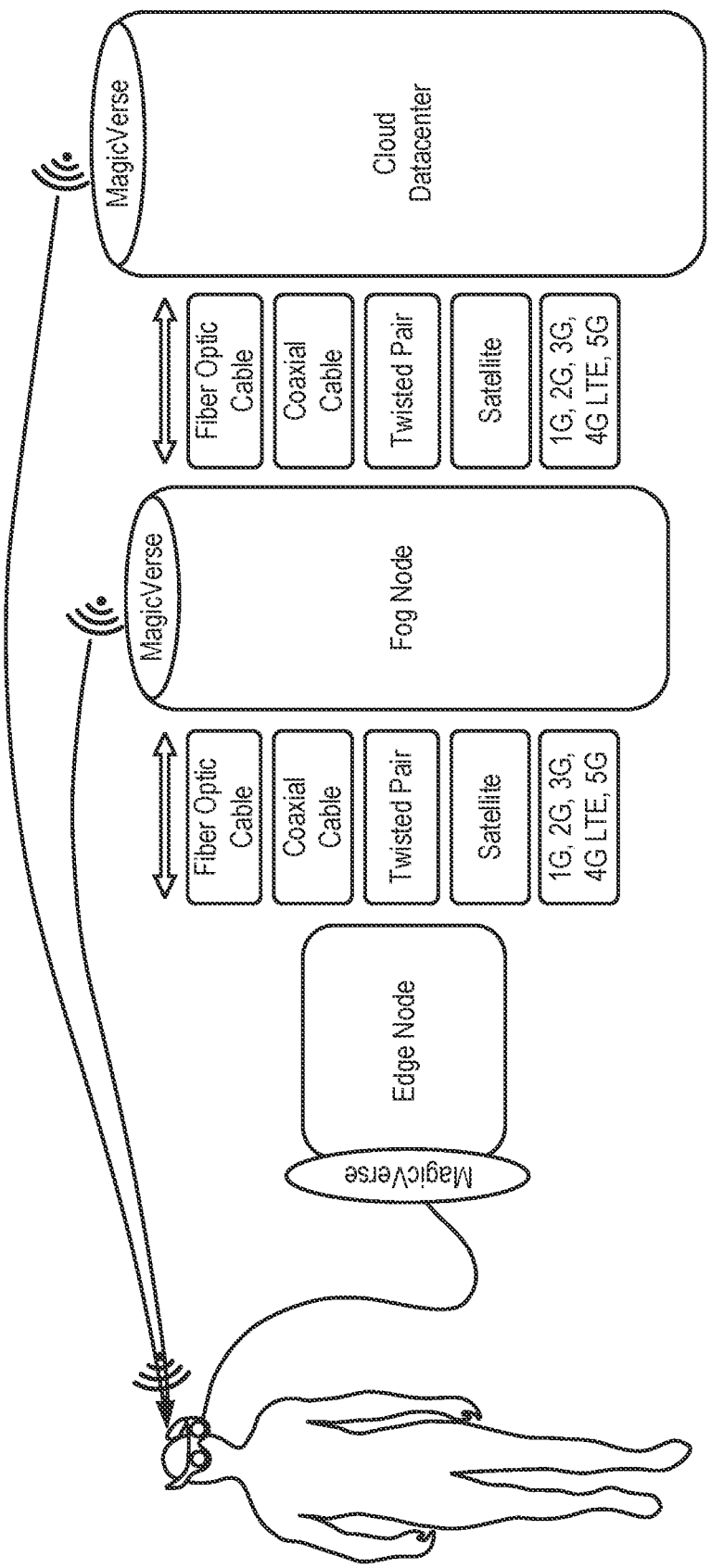

Referring to FIGS. 28A-28C, in between edge, fog, and cloud layers, there may be communication layers comprising various forms of connectivity, including fiber optics, coaxial cabling, twisted pair cabling satellite, various other wireless connectivity modalities. FIG. 28A illustrates the user being wirelessly connected to edge resources, which may be sequentially connected to fog and cloud resources, FIG. 28B illustrates a configuration wherein the user is hardware-connected (i.e., via cabling, fiber optic, or other non-wireless connectivity modality) to edge resources, which may be sequentially connected to fog and cloud resources, FIG. 28C illustrates the user being both wirelessly and hardware-connected to all resources in parallel, thus various such connectivity permutations are envisioned. Referring back to FIG. 21, one challenge with management of such resources is how to move and distribute computing loads up and down the hierarchy between edge, fog, and cloud resources. In various embodiments, a deep arbitration layer may be utilized that is based upon reinforcement learning (i.e., in one variation, functional requests may be sent to edge resources, certain tasks may be sent out to fog resources, the "reward" for the reinforcement learning paradigm may be whatever computing node configuration ends up being fastest, and thus a feedback loop optimizes the responsive arbitration configuration, with the overall functionality being one that improves as the resources "learn" how to optimize).

Referring back to FIG. 15, the physical world is depicted impinging into the edge, cloud, and fog layers, this is meant to represent the notion that the further away something is, the closer it is functionally to the cloud data center, but also these resources may be accessed in parallel.

Figure 29B:
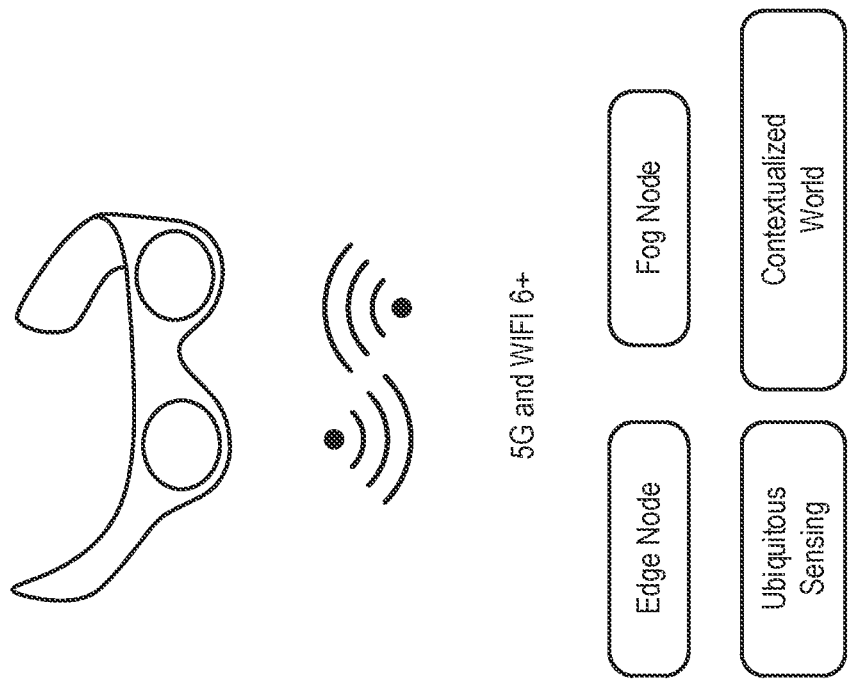
FIGS. 29A and 29B are block diagrams of various types of connectivity resources using hardware-based connectivity as well as various wireless connectivity paradigms.
Figure 29A:
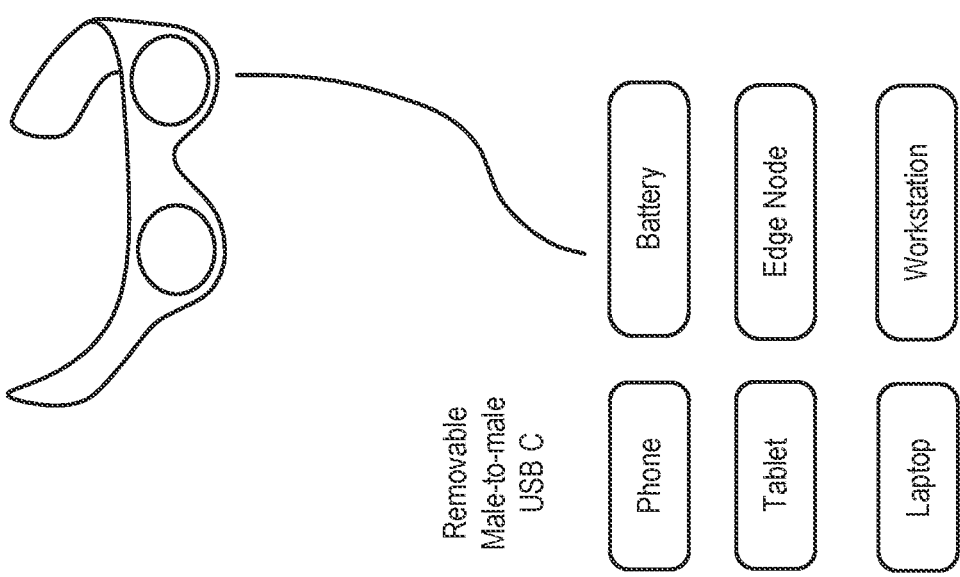
Figure 30B:
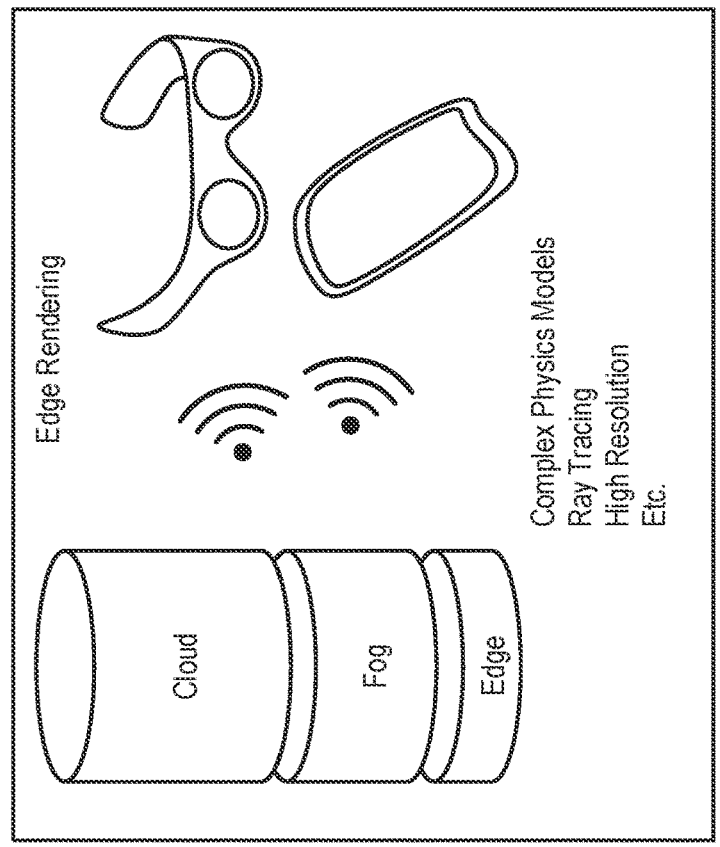
FIGS. 30A and 30B are block diagrams of configuration with a head wearable component hardware-coupled to a belt-pack style computing component (FIG. 30A) or a tablet type of interconnection (FIG. 30B)
Figure 30A:
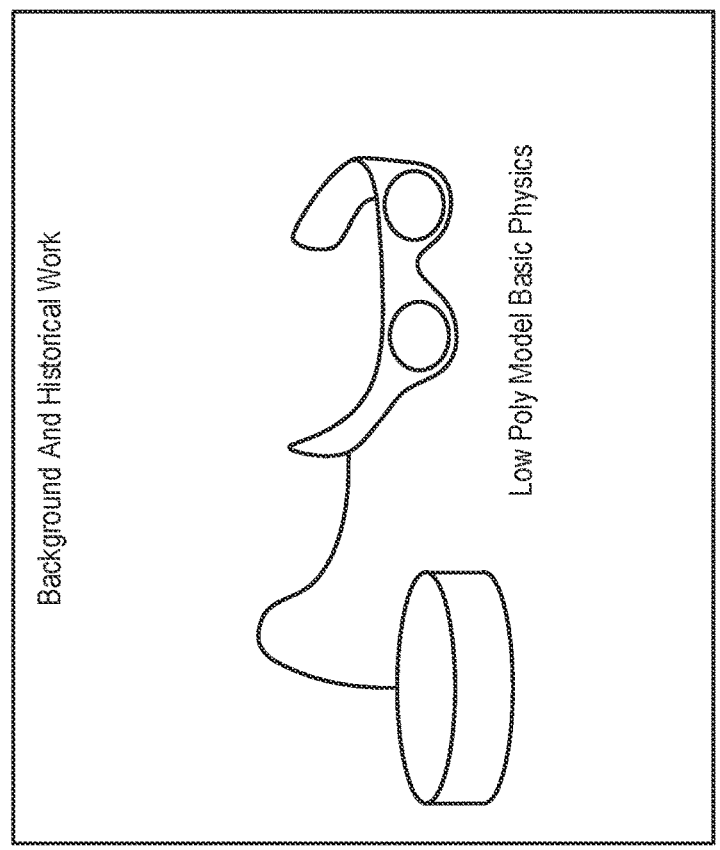

Referring to FIGS. 29A and 29B, various types of connectivity resources are illustrated for an XR device, such as a head wearable component (2) for a system such as that illustrated in FIG. 1, as noted above, such component may be connected to other resources using hardware-based connectivity as well as various wireless connectivity paradigms. Referring to FIG. 30A, a configuration similar to that of FIG. 1, with a head wearable component hardware-coupled to a belt-pack style computing component, may be connected to various off-person resources as described above, for example in reference to FIGS. 19A, 20A, 22A, 24A, and 25A, FIG. 30B illustrates a configuration wherein one or more XR devices, such as a head wearable AR component, or a tablet computer or smartphone, may be connected to external resources as described, for example, in FIGS. 19B, 20B, 22B, 24B, and 25B, 25C, 25D, and 25E.

Figure 31:
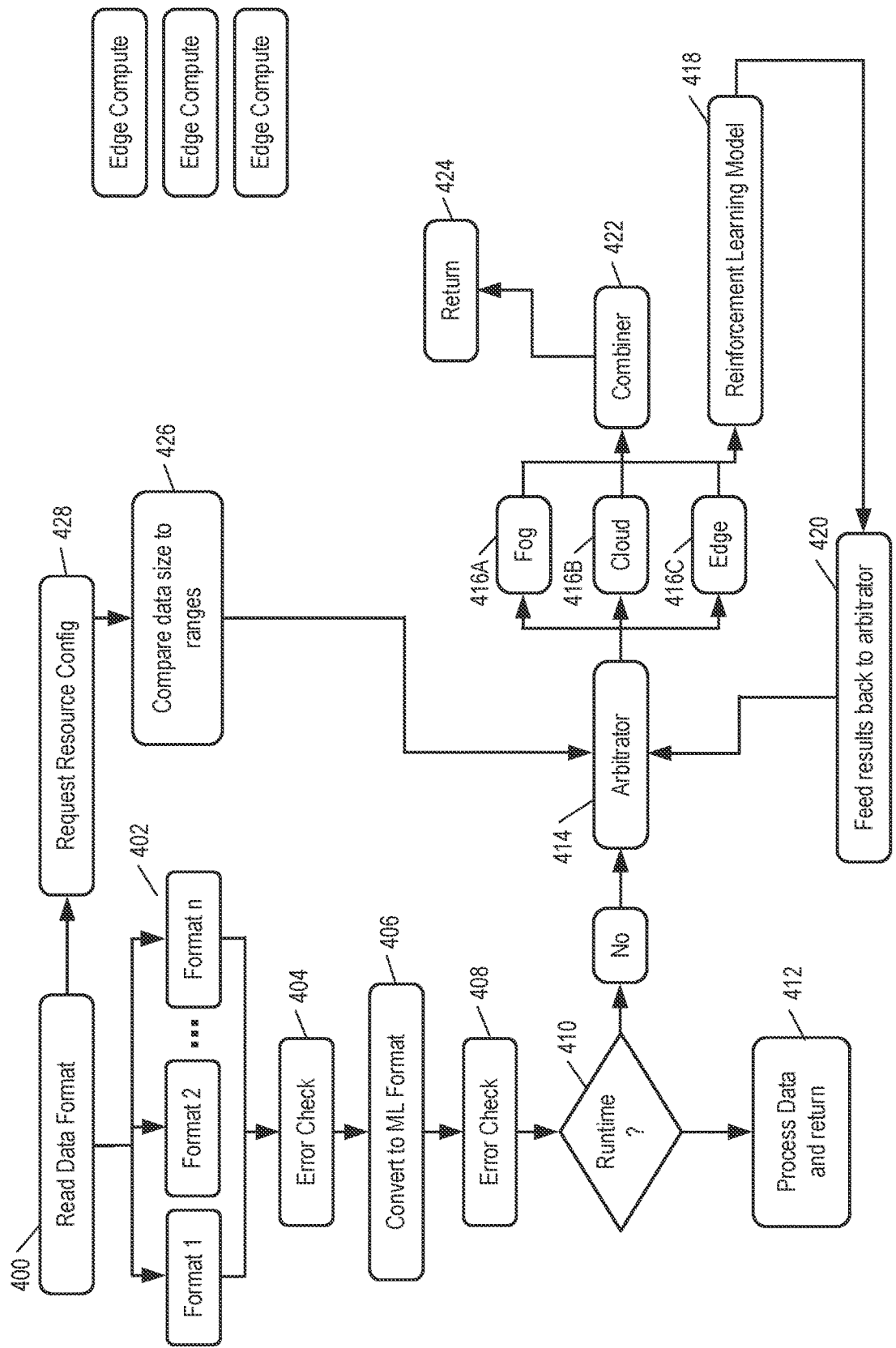
FIG. 31 is a flowchart of a paradigm for arbitrating and allocating relative to external resources such as edge compute, fog compute, and cloud compute resources.

Referring to FIG. 31, a paradigm (400 to 428) is illustrated for arbitrating and allocating relative to external resources such as edge compute (416A), fog compute (416B), and cloud compute (416C) resources. For example, as shown in FIG. 31, data may be received (400) from the XR device local to the user (i.e., such as a wearable computing component, tablet computer, smartphone), a simple logic format check (402) may be conducted, and the system may be configured to verify that the correct choices have been made in the format check with a simple error check (404), the data may then be converted to a preferred format (406) for optimized computing interfacing, alternatively APIs for the various connected resources may be utilized, an additional error check (408) may be conducted to confirm proper conversion, then a decision (410) is presented as to whether the pertinent process is a runtime process or not, if it is, then the system may be configured to process the issue immediately and return (412) it to the connected device. If it is not, then batching to external resources may be entertained, in which case an arbitrator function (414) is configured to analyze how many instances of cloud, edge, and/or fog resources (416A to 416C) are available and to be utilized, and processing tasks are sent out. Once that data is processed, it may be combined (422) back into a single model which may be returned (424) to the device. A copy of the combined model (418) may be taken along with the related resource configuration specifics, and fed back (420) to the arbitrator (414) and run in the background with a different scenario (and will continue to do that as it "learns" and optimizes the configuration to apply for that type of data input, with the error function eventually moving toward zero).

FIG. 31 describes that the content provisioning system (400 to 428) includes an arbitrator function executable by a processor to determine how many edge and fog resources are available through the edge and fog resource devices respectively, send processing tasks to the edge and fog resources according to the determination of the resources that are available, and receive results back from the edge and fog resources. The arbitrator function is executable by the processor to combine the results from the edge and fog resources. The content provisioning system further includes a runtime controller function executable by the processor to determine whether a process is a runtime process or not, if the determination is made that the task is a runtime process then, executing the task immediately without making the determination with the arbitrator function, and if the determination is made that the task is not a runtime process then making the determination with the arbitrator function.

Figure 32:
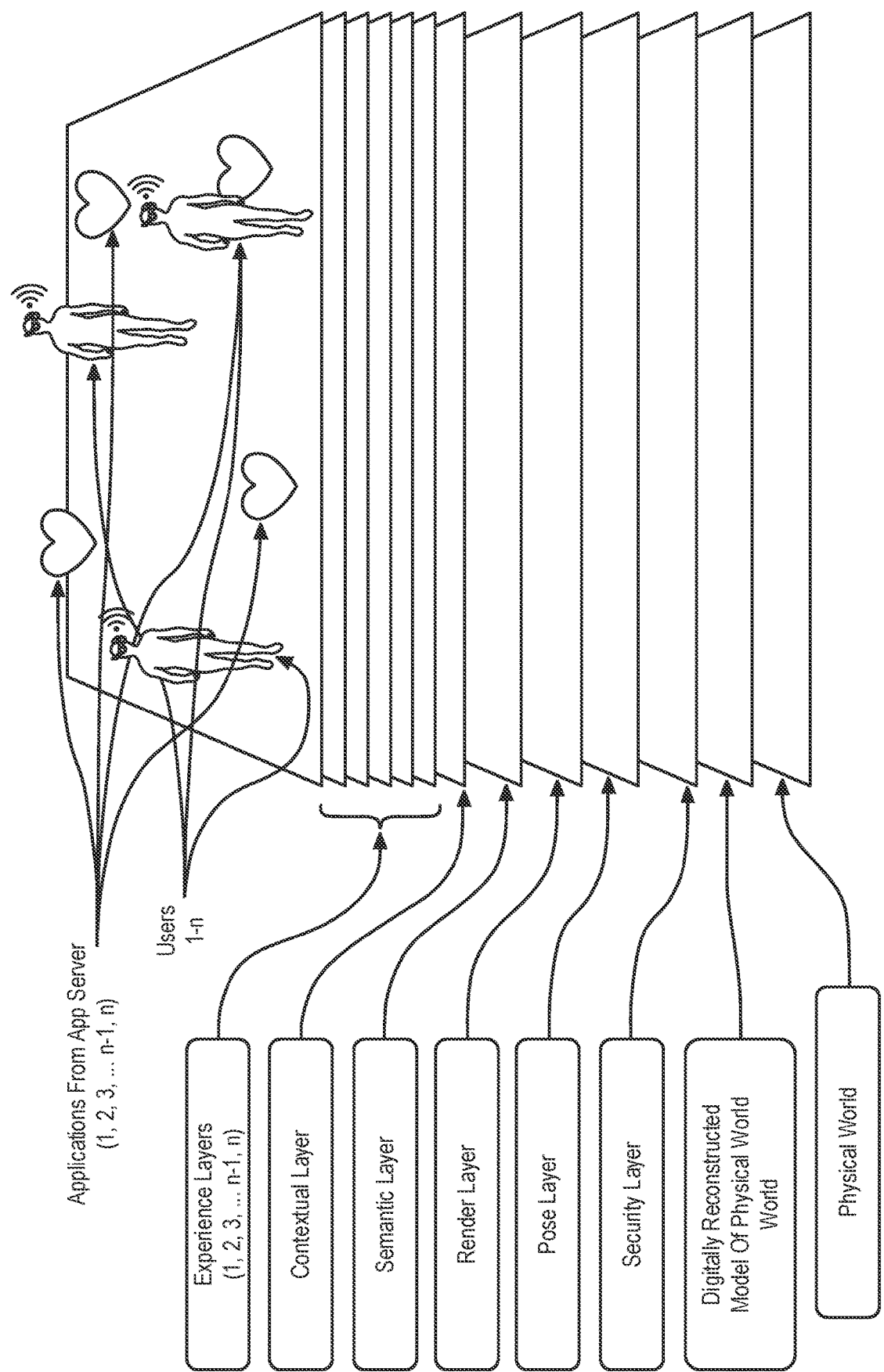
FIG. 32 is a graph illustrating the notion of a human-centered integrated spatial computing ("MagicVerse") generalized operational content provisioning system.

Referring to FIG. 32, one variation of a human-centered integrated spatial computing ("MagicVerse") generalized operational diagram is illustrated. The basic operational elements are illustrated for creating a spatial computing type of experience, in relatively simplified form. For example, referring to the bottom-most depicted layer, the physical world may be recreated geometrically, at least in part, via simultaneous localization and mapping ("SLAM") and visual odometry techniques, the system may also be connected to information pertinent to environmental factors such as the weather, power configurations, internet of things devices nearby, and connectivity factors, such data may be utilized as inputs to create what may be called a "digital twin" of the environment (or digitally reconstructed model of the physical world, as shown in the second layer from the bottom in FIG. 32), which models geometry, mapping, location, orientation, and other factors pertaining to things within the particular environment of interest, which may be a room, a building, or even a city. The security layer may be configured to control access to specific aspects of the spatial computing paradigm, as discussed, for example, above. The security layer may also be configured to protect and manage personal data, unlock doors, buildings, and other structures with "geo fence" type of security management, and the like. The next depicted layer is the "pose" layer, which may be configured to construct an aggregated "pose map" comprising the projection matrices, which are 6 degree-of-freedom (DOF) descriptors pertinent to location and orientation of various other devices capturing such data, such as other XR devices. In other words, the system preferably is configured to take advantage of the presence and data capture of other devices within the same environment or nearby environment, so that an aggregation of these datasets may be presented and utilized to assist with interactions, mapping, localization, orientation, interactions, and analytics relative to such environment. The depicted "render layer" may be configured to aggregate all information being rendered by the local device and other nearby devices which may be interconnected by resources such as edge, fog, and/or cloud. This includes creating zones for starting and stopping predictions, so that more complex and higher-dimensional predictions may be implemented at runtime. Also depicted is a "semantic layer", which may be configured to segment and label objects in the physical world, as represented in the digital model of the world to be displayed to the user or users. This layer generally may be thought of as the basis for natural language processing, as well as other recursive neural network ("RNN"), convolutional neural network ("CNN"), and deep learning methodologies. The "contextual layer" may be configured to provide results returned from the semantic layer in human-relatable terms, based upon inferred actions and configurations. This and the semantic layer may be configured to provide key inputs to "artificial intelligence" functionalities. The "experience layer" and "application layer" are exposed directly to the user in the form of executable user interfaces, for example, using various XR devices, such as systems like the one shown in FIG. 1. These upper layers are configured to utilize information from all of the layers depicted below them, to create multi-user, multi-device, multi-location, multi-application experiences, preferably in a manner as usable as possible by the human operator.

Figure 33:
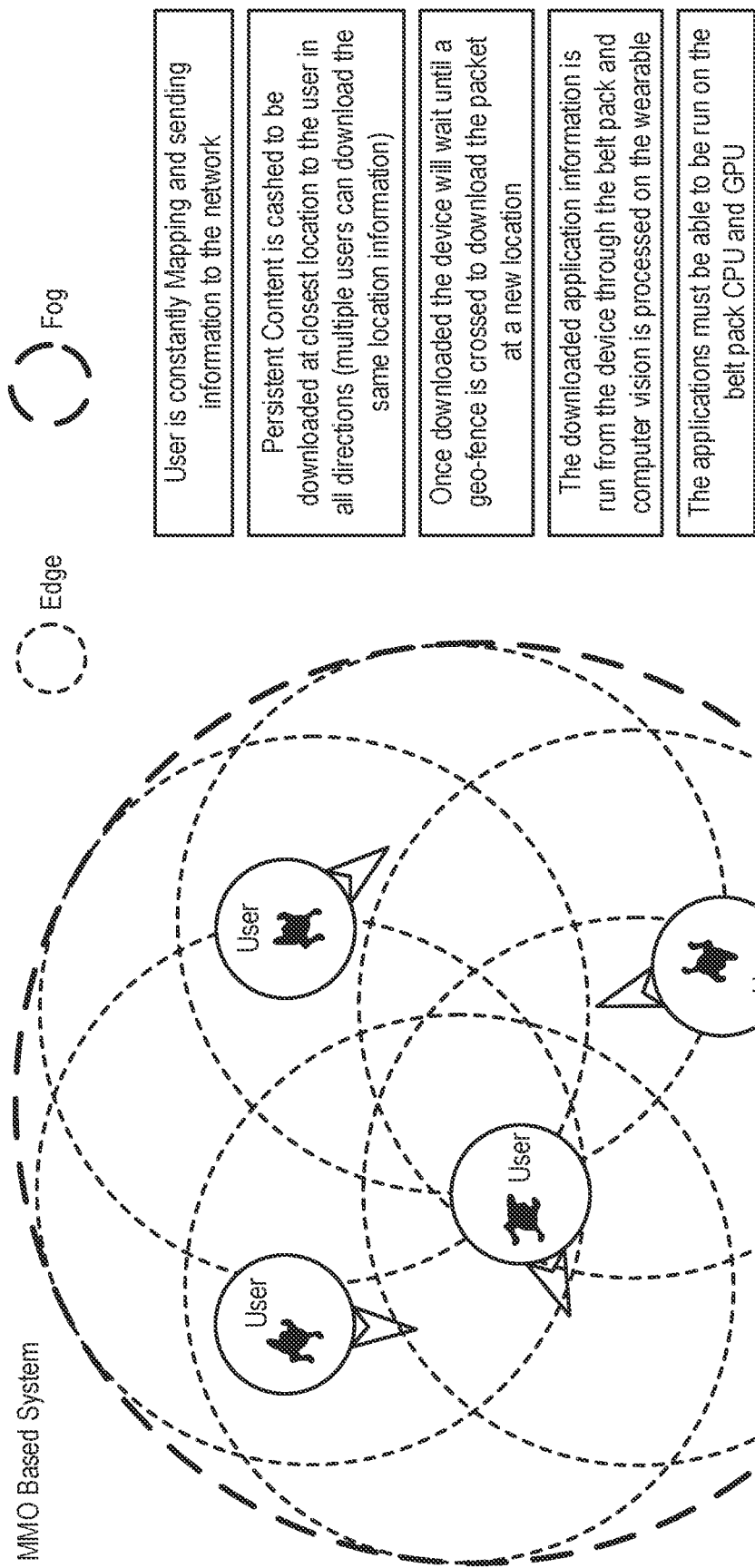
FIG. 33 is a schematic of showing connectivity of multiple overlapping edge computing nodes inside of a larger fog computing node wherein seamless handoffs or transfers are enabled between edge computing devices.

Referring to FIG. 33, a schematic is illustrated to show connectivity of multiple overlapping edge computing nodes inside of a larger fog computing node wherein seamless handoffs or transfers are enabled between edge computing devices. In a system designed for a massively multiplayer online "MMO"-like systems, the various components may be configured to scan the nearby physical world environment in real or near-real time to continually establish more refined meshing and mapping information. In parallel, feature identification used within these meshes and maps may be utilized to create very reliable and high-confidence points, which may be known as "superpoints". These superpoints may be contextualized to represent physical objects in the world, and used to overlap multiple devices in the same space. When the same application is running on multiple devices, these superpoints may be utilized to create anchors which reference a common coordinate system for projection of transformation matrices of content to each user on each pertinent XR device. In other words, each of these users is able to take advantage of the superpoints to assist in pose determination, localization (i.e., location and orientation determination in the local coordinate system relative to the superpoint), they effectively become reliable waypoints for XR users navigating the space in reality or virtually.

As in an MMO-like system, content is stored based upon the coordinate system that the user interacts within. This may be accomplished in a database wherein a specific piece of content may have a JSON (JavaScript object notation) which describes position, orientation, state, time stamp, owner, etc. This stored information is generally is not replicated locally on the user's XR device until the user crosses a location-based boundary and begins download of the content in the predicted future. In order to predict the future, machine learning and/or deep learning algorithms may be configured to use information such as speed, acceleration, distance, direction, behavior, and other factors. This content may be configured to be always located in the same position unless interacted with by one or more users to be re-located, either by manual means (i.e., such as drag and drop using an XR interface) or by programming manipulation. Once new content is downloaded based upon the aforementioned factors, it may be saved onto a local computational device, such as that shown in the form of the computing pack (6) in reference to FIG. 1. Such downloading may be conducted continuously, scheduled, or as needed, depending upon situational factors and available resources.

In various embodiments, such as that depicted in FIG. 1 wherein there are not significant connected compute resources available, all of the rendering (such as for head-pose and other mixed reality general operational runtime components) may be completed on the local computing resources (i.e., such as a CPU and GPU which may be housed locally to the user's person).

FIG. 33 describes that the content provisioning system includes a plurality of edge resource devices, data exchanging between a plurality of the edge resource devices and the fog resource device, the data including points in space captured by different sensors and sent to the edge resource devices, and a superpoint calculation function, executable by a processor, to determine superpoints, being select ones of the points where the data from two or more of the edge resource devices overlap. The content provisioning system further includes a plurality of multiple mobile devices, wherein each superpoint is used in each mobile devices for localization, orientation or pose estimation of the respective mobile device.

Figure 34:
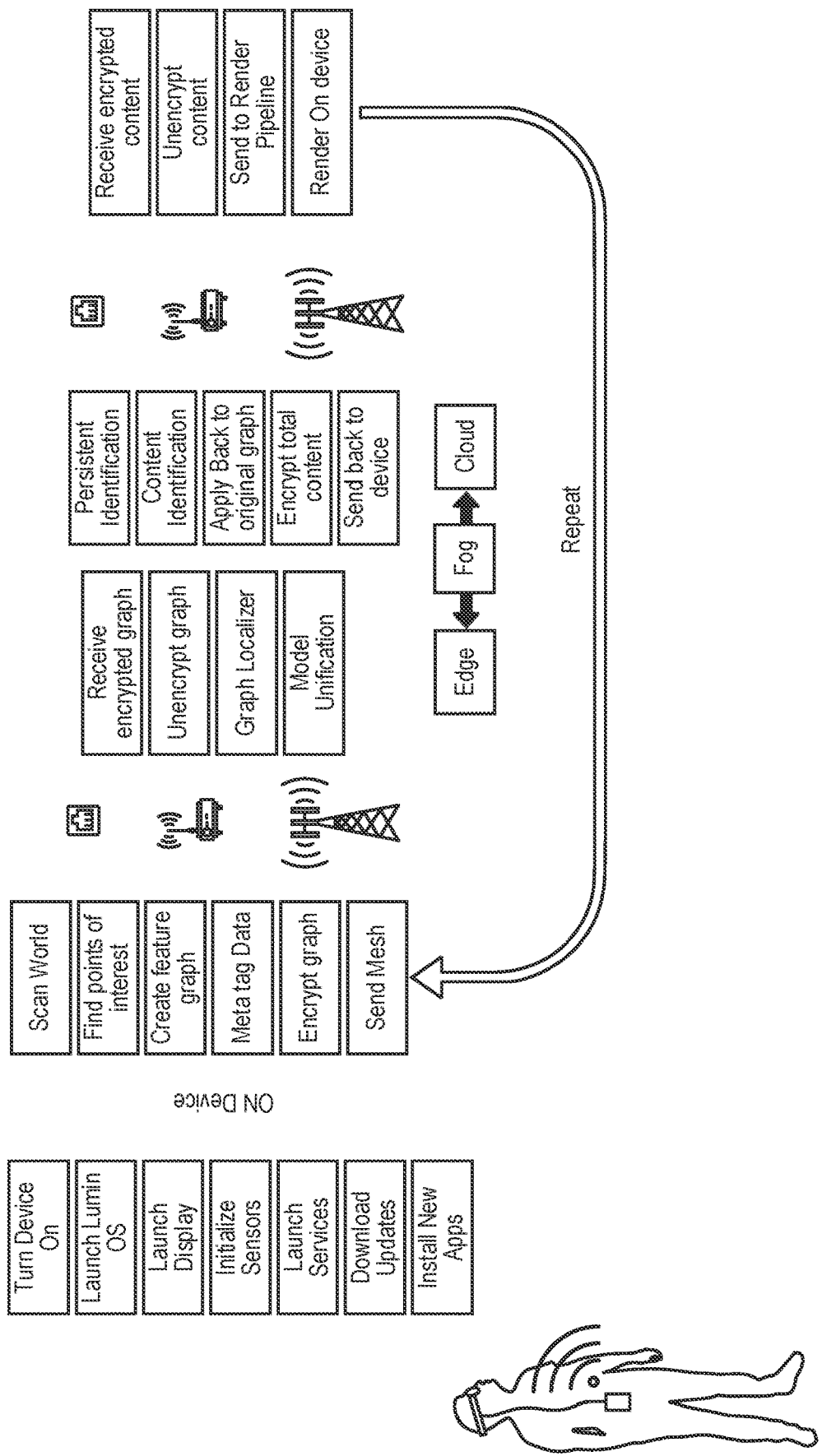
FIG. 34 is a block diagram of the components for a generalized startup/bootup procedure may have distributed resources interconnected.

Referring to FIG. 34, a generalized startup/bootup procedure-to-operation is illustrated for a configuration which may have distributed resources interconnected (i.e., such as edge, fog, and/or cloud resources), as well as point to point encryption therebetween, the connectivity being provided, for example, by wireless or wired connections, such as the aforementioned WiFi, mobile wireless, and other hardware-based and wireless-based connectivity paradigms.

Figure 35:
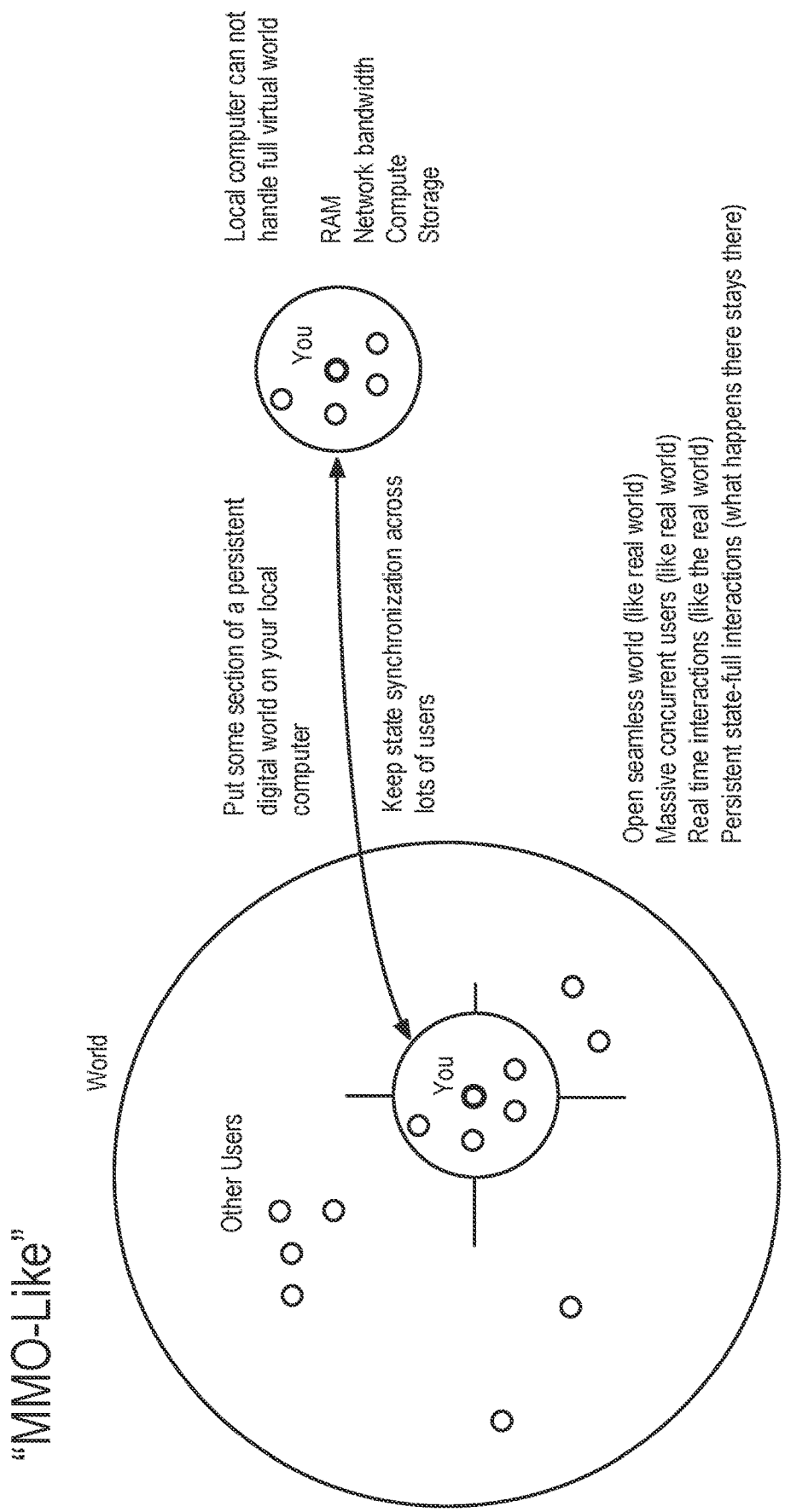
FIG. 35 is a schematic of a massively multiplayer online (MMO) configuration, wherein a generalization of computational requirements relative to the scale of individual XR user nodes is shown.

Referring to FIG. 35, another MMO-like configuration is illustrated, wherein a generalization of computational requirements relative to the scale of individual XR user nodes is shown. In other words, in various embodiments, it takes a relatively large amount of external resource to support each individual XR user node, as also illustrated in FIG. 16, wherein many resources are driven toward each human-centered integrated spatial computing instantiation.

FIG. 35 describes that the content provisioning system includes a context trigger function, executable with a processor, to generate a context trigger for a group of the superpoints and store the context trigger on a computer-readable medium.

Figure 36:
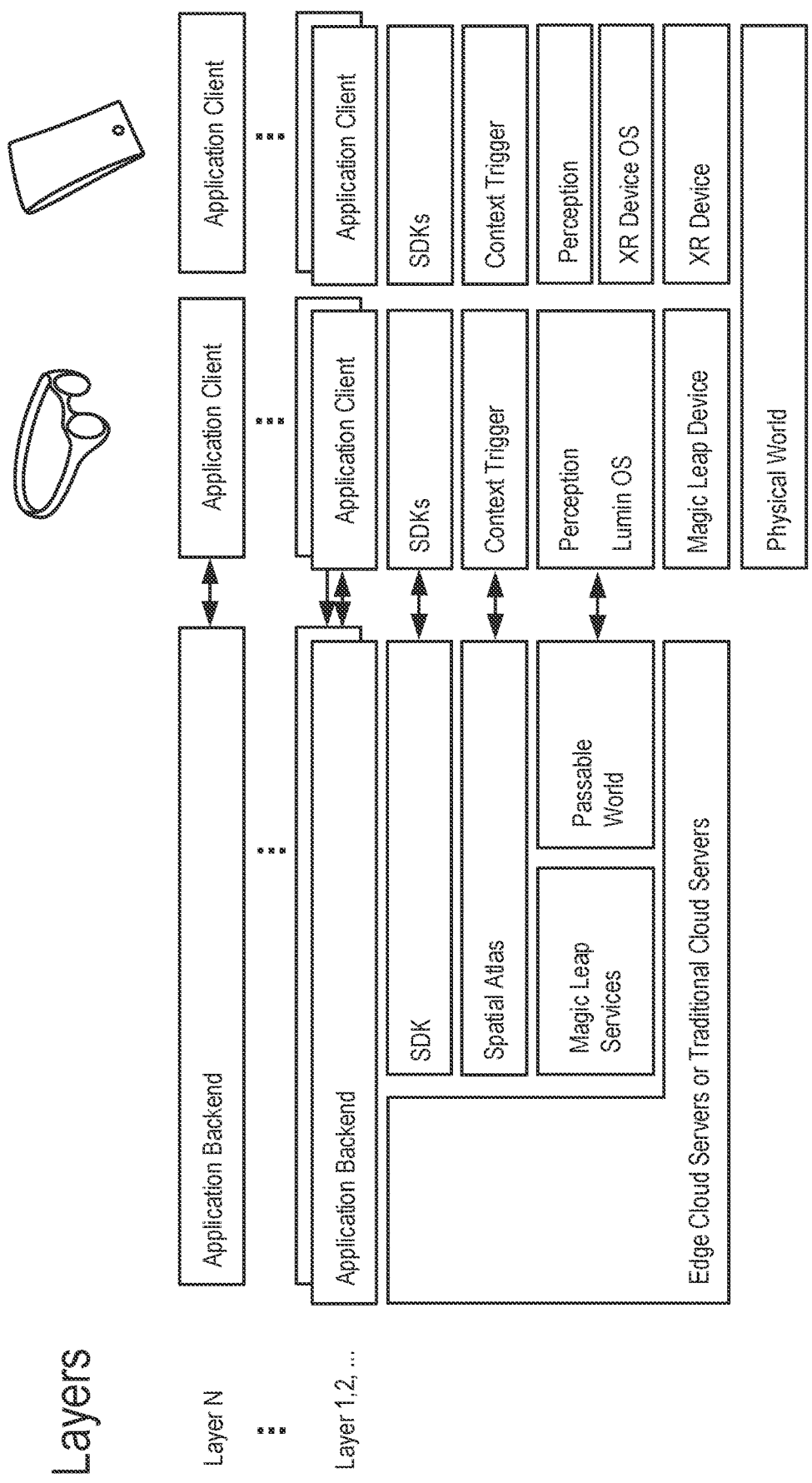
FIG. 36 is a block diagram of various computational stacks of human-centered integrated spatial computing as shown in FIG. 35.

Referring to FIG. 36, various computational stacks are illustrated for an embodiment of human-centered integrated spatial computing as shown in FIG. 35. The physical world is shared by all users, based upon the parameters of each particular XR device used by each user, the system is configured to abstract interaction with each of such devices. For example, an Android™ cellphone will use an Android™ operating system, and may use AR-core™ for perception and anchoring. This allows the system to work with already-developed perception stacks which may be optimized for use with many particular devices for interaction in the human-centered integrated spatial computing world. To enable use with many different devices, a software development kit ("SDK") may be distributed. The term "spatial atlas" may be used in reference to a mesh ownership and operation configuration, whereby various objects, locations, and map features may be labelled, owned, sold, excluded, protected, and administered with a central authoritative database. A "context trigger" is a description of one or more superpoints and related meta-data, which may be utilized to describe what various things are in the real and/or digital world, and how they may be utilized in various ways. For example, four corner superpoints pertaining to the structure of a cellphone may be assigned to have the cellphone structure operate as a sword handle in a digital environment. At the top of the illustrated stack, application client and backend information are shown, which may represent the interaction layer at the XR and/or server levels, for the user to interact with the human-centered integrated spatial computing configuration.

Referring to FIG. 37, a configuration for discovering, switching, and controlling elements within an XR user's immediate radius is illustrated. The rectangular stack refers to an application management tool adapted for spatial computing, the circular stack pertains to an integration of a digital model of the physical world (i.e., the "digital twin"), third party developer content via published SDK and API, and an XR-as-a-service configuration, wherein a user of an XR device may effectively log in to a curated environment to experience augmented or virtual reality imagery, sounds, and the like.

What may be termed "Spatial Understanding" is an important skill for machines that have to either directly interact with the physical 3D world (e.g., a robot that walks and picks up thrash) or machines that indirectly interact with the 3D world (e.g., Mixed Reality glasses that create high-quality 3D graphics that respect 3D world geometry). Humans generally already have excellent spatial reasoning skills, but even "smart glasses" that are worn by a user must perform their own version of spatial reasoning. Computer scientists have developed certain algorithms suitable for extraction of 3D data and spatial reasoning about the world. The notion of "superpoints" has been described above and in the associated incorporated references, herein we describe a superpoint-based formulation of spatial reasoning that heavily relies on a stream of input images.

As noted above, one particular class of 3D-building algorithms that are pertinent to spatial computing configurations are typically referred to as simultaneous localization and mapping ("SLAM"). SLAM systems may be configured to take as input a sequence of images (color or depth images) and other sensor readings (e.g., inertial measurement units ("IMUs")) and provide real-time localization of the current device pose. A pose is typically the rotation matrix R and translation vector t corresponding to the camera coordinate system. A SLAM algorithm may be configured to be able to produce pose because behind the scenes it interleaves two core operations: Map-building and Localization against the map.

The term "Visual SLAM" may be used in reference to a variant of SLAM that heavily relies on camera images. As opposed to 3D scanners such as LIDAR which the robotics community developed to help in performing SLAM for industrial applications, cameras are significantly smaller, are much more prevalent, cheaper, and easier to work with. Modern off-the-shelf camera modules are tiny and with camera images it is possible to build a very small and efficient Visual SLAM systems.

What may be termed "Monocular Visual SLAM" is a variant of Visual SLAM that uses a single camera. The major benefit of using a single camera as opposed to two or more is the reduced client form factor. With two cameras, great care must be taken to keep the multi-camera assembly rigid. The two major drawbacks of monocular visual SLAM are the following:

1. Monocular visual SLAM generally cannot recover the 3D structure when there is no parallax, such as the camera system being rotated about the camera center. This is particularly problematic when the system starts out initially with no 3D structure and there is insufficient parallax motion during the initialization of the 3D map inside the algorithm.

2. The second challenge is that monocular visual SLAM generally is unable to recover the absolute scale of the world. For any given monocular trajectory with recovered point depths $Z_i$, it is possible to multiply all point 3D coordinates by a scalar alpha and scale the translation by alpha as well.

However, a small amount of extra information, such as odometry readings from local IMUs or depth data from an RGBD sensor is sufficient to prevent the monocular algorithms from degenerating in general.

A Visual SLAM system operates on images and produces both poses and a 3D map. The entire algorithm may be broken down into two stages: the frontend and the backend. The goal of the frontend is to extract salient 2D image features and describe them so that the raw RGB images are no longer necessary. The task of the frontend is often referred to as "data abstraction" because high-dimensional images are reduced to 2D points and descriptors whose nearest neighbor relationships hold. For properly trained descriptors, we can take the Euclidean distance between them to determine if the correspond to the same physical 3D point—but Euclidean distances on raw images are not meaningful. The goal of the backend is to take the abstractions from the frontend, namely the extracted 2D points and descriptors, and stitch them together to create a 3D map.

As described above and in the incorporated reference documentation, superpoint is a term that may be used for a convolutional deep learning-based frontend, designed for monocular visual SLAM. Traditional computer vision frontends for visual SLAM may consist of hand-crafted 2D keypoint detectors and descriptors. Traditional methods typically follow these steps: 1.) extract 2D key points, 2.) crop patches from the image around the extracted 2D keypoints, 3.) compute descriptors for each patch. "Deep Learning" configurations allow us to train a single multi-headed convolutional neural network that jointly performs the interest point and descriptor computation.

Given a sequence of 2D points tracked in an image, "bundle adjustment" is a term utilized for algorithms which may be used to optimize jointly for the 3D structure and camera poses that best explain the 2D point observations. The algorithms may be configured to minimize the re-projection errors (or rectification error) of the 3D points using a non-linear least squares formulation.

Superpoint, as a deep learning formulation of feature extraction, may be configured as a network that contains very little manual-engineering (i.e., manual input). While the network may be designed to take an image as input and provide both 2d point locations and associated descriptors, it generally cannot do so until it is first trained on a proper dataset. The knowledge of how to extract those 2D points is never explicitly delineated. The network is trained using back propagation on a labeled dataset.

We previously have described how to train the first part of superpoint: the key point localization head. This may be accomplished by creating a large synthetic dataset of corners and the resulting network (which is just like superpoint but does not contain descriptors), this may be referred to as a "MagicPoint".

Once one has a MagicPoint, one has a way of extracting 2D key points from an arbitrary image. Generally, one still needs to 1.) improve the performance of key point detection on real-world images and 2.) add the descriptor to the network. Improving performance on real-world images means that one must train on real-world images. Adding the descriptor means that one generally must train on pairs of images because one must provide the algorithms with positive and negative pairs of key points to learn their descriptor embeddings.

A so-called MagicPoint configuration may be run on real images using synthetic homographies with a procedure that may be called "Homographic Adaptation". This provides for better labels on those images than running MagicPoint only once per image. Synthetic homographies may be used to take an input image I and create two warped versions I' and I". Since a composition of homographies is still a homography, one may train on the pair of images (I', I") with the homography between them.

The resulting system may be called superpoint_v1 and is the result of running MagicPoint on random real-world images using Homographic Adaptation.

At this point one has what may be termed a "superpoint_v1", a convolutional frontend that provides all that is necessary for a barebones Visual Odometry or Visual SLAM system. However, superpoint_v1 was trained using random (non-temporally ordered images) and all image-image variations were due to synthetic homographies and synthetic noise. In order to make a better superpoint system, one may re-train "superpoint_v2" on real-world sequences using the output of SLAM.

Referring to FIG. 38, superpoint-based SLAM consists of two key components, the deep learning-based frontend (see block two) and the bundle-adjustment-based backend (see blocks three and four). For the frontend, or "feature extraction" stage of the pipeline, one may use the superpoint network, as described above, which produces 2d point locations as well as a real-valued descriptor per-point.

The backend may be configured to perform two tasks: providing the pose of the current measurements (Localization, see block two in FIG. 1), and integrating the current measurements into the current 3D map (Map Update, see block three in FIG. 1). The system is able to utilize auxiliary input in the form of a depth image (as obtained from either a multi-view stereo system, a depth sensor, or a deep-learning based depth regression network) as well as auxiliary pose (as obtained from off-the-shelf Augmented Reality frameworks present in consumer smartphones like Apple's™ ARKit™ and Google's™ ARCore™). The subject system may be configured to not require the auxiliary inputs (see block one, bottom, in FIG. 38), but they can be used to improve both localization and mapping.

The localization module (see block three in FIG. 38), may be configured to take as input the points and descriptors as well as the current 3D map (which is a collection of 3D points and their associated descriptors) and produce a current pose estimate. This module may utilize information from a depth map by associating valid real-world depth values for observed 2d points. Auxiliary pose information from block one also may be fed as input to the localization module. In the absence of auxiliary information such as depth or pose, the module may be configured to use the perspective-n-point ("PnP") algorithm to estimate the transformation between the 3D points in the map and the 2d point observations from the current image.

The map update module may be configured to take as input the current map as well as the current image observations with the estimated pose and produces a new updated map. The map may be updated by minimizing the reprojection error of the 3D points in a large number of keyframes. This may be achieved by setting up a bundle adjustment optimization problem as is commonly done in known "Structure-from-Motion" computer vision literature. The bundle adjustment problem is a non-linear least squares optimization problem and can be efficiently solved using the second order Levenberg—Marquardt algorithm.

Generally, a system which uses superpoint may be configured such that it needs to make certain design decisions regarding the layout of the computations. On one extreme, all computations involved in dealing with the camera sensor and forming a well-behaved intensity image must happen locally (see block One in FIG. 38). Below are described a family of four distributed SLAM systems which perform a subset of the necessary computations locally, and the remainder of operations are performed in the cloud. The four systems are as follows: 1. local on-device, 2. cloud mapping, 3. local superpoint, and 4. all cloud.

Local on-device SLAM (100% local). On one extreme, it is possible to take all that is required for localization and mapping and put that directly on the device with the cameras. In this scenario, blocks one, block two, block three, and block four in FIG. 38 all may be performed locally.

Local superpoint, local localization, cloud mapping SLAM (66.7% local). Another client variation is one wherein super point extraction is performed locally as well as localization against a known map. With such a configuration, the only part that is running on the cloud is the map update operation (block four). The cloud component will update the map (using a potentially much larger set of computational resources) and send a version of the map down to the client. This version allows more seamless tracking in the presence of communication channel interruptions.

Local superpoint, cloud localization, cloud mapping SLAM (33.3% local). In this embodiment, while camera capture must be perform locally on the device (i.e., a camera next to the server racks in a datacenter won't help with SLAM), it is possible to only perform a subset of the computations on the local device and the rest in the cloud. In this version of the client, block one and block two (referring to FIG. 38) are performed locally, while block three and block four are performed in the cloud. For this to work, the local system generally must send the points and descriptors into the cloud for further processing.

Cloud-based SLAM (0% local). On another extreme, it is possible to perform all SLAM computations in the cloud (i.e., edge, fog, cloud resources as described above, for brevity in this section, we refer merely to "cloud") with the device only providing images and a communication channel to the cloud compute resource. With such a thin client configuration, block two, block three, and block four may be performed in the cloud. Block one (image formation and capture) is still performed locally. In order to make such a system real-time (i.e., 30+ frames per second, "fps"), we may need to rapidly encode images and send them to the remote computing resources. The time required to both encode the image into a suitable payload and send the image over the network must be made as small as possible.

Comparison and Bandwidth-requirements. In each of the configurations discussed above that involve a cloud-component, some information from the local device generally must be sent to the cloud. In the case of cloud-slam, one must encode the images and send them to the SLAM system in the cloud. In the case of local super point processing, one may need to send the points and descriptors to the cloud. In the case of a hybrid system with cloud mapping and on-device localization, one may need to send the points, descriptors, and estimated pose to the cloud, but it need not be done at 30+ fps. If the map management is happening in the cloud but a localization module exists locally, then information pertaining to the current map may be periodically sent from the cloud to the client.

TABLE 1

Local vs. Cloud SLAM computation resource allocation.

| | | | | | |
|---|---|---|---|---|---|
| Local SLAM | Local | Local | Local | Nothing | Nothing |
| Cloud Mapping | Local | Local | Cloud | Points + Desc + Pose | Map* |
| Local SuperPoint | Local | Cloud | Cloud | Points + Desc | Pose |
| Cloud SLAM | Cloud | Cloud | Cloud | Image Pose | Pose |

*Map indicates that the updated map does not have to be sent from the cloud very rapidly.

Assistance from other sensors and computational resources. The output of other sensors, such as IMUs and depth sensors, can be used to complement superpoint which generally only deals with raw images (color or grayscale). These additional sensors generally must be located on the same device as the physical image sensor. One may refer to these extra bits of information as auxiliary inputs since they are not a hard-requirement for our approach to work. From a computational resource perspective, one may also add additional compute units (such as more CPUs or more GPUs). Additional computational resources may be places far away from the local device, and may be located right in a cloud datacenter, for example. This way, the additional computational resources may be utilized for other tasks when the load is low.

Superpoint on head-mounted displays, smartphones, and other clients. The subject superpoint-based SLAM framework is designed to work across a broad spectrum devices which we refer to as clients. On one extreme, a client can be a barebones image sensor with a Wi-Fi module, and just enough computation to encode and send images over a network. On another extreme, the client may contain multiple cameras, a head-wearable display, additional locally-coupled compute resources, such as edge notes, etc., as described above.

Image-based localization and relocalization across time. By focusing on the machine learning-based extraction and summarization of visual information, the subject approach is designed to be more robust to lighting changes and environmental variations that are typically across 1-2 days in any given environment. This facilitates a SLAM session to persist across multiple days. Using classical image feature extraction procedures, only a small subset of the extracted 2D features are matchable in a tracking scenario. Because RANSAC and other outlier rejection mechanism are heavily used in traditional SLAM methods, those 2D features generally are not very robust for the task of relocalization across large changes in time.

Cross-device localization and relocalization across time. By focusing on images, it may be easier to build a map using one kind of client, and then utilize that map inside another client.

Multi-user localization and mapping. By performing the Cloud Update operations in the cloud, it may be relatively easy to have multiple clients share and update a single 3D map.

The aforementioned configurations facilitate the development and use of spatial computing systems with highly-distributed resource bases, such as those described below, and also above in reference to the various edge, fog, and cloud resource integrations.

Figure 39:
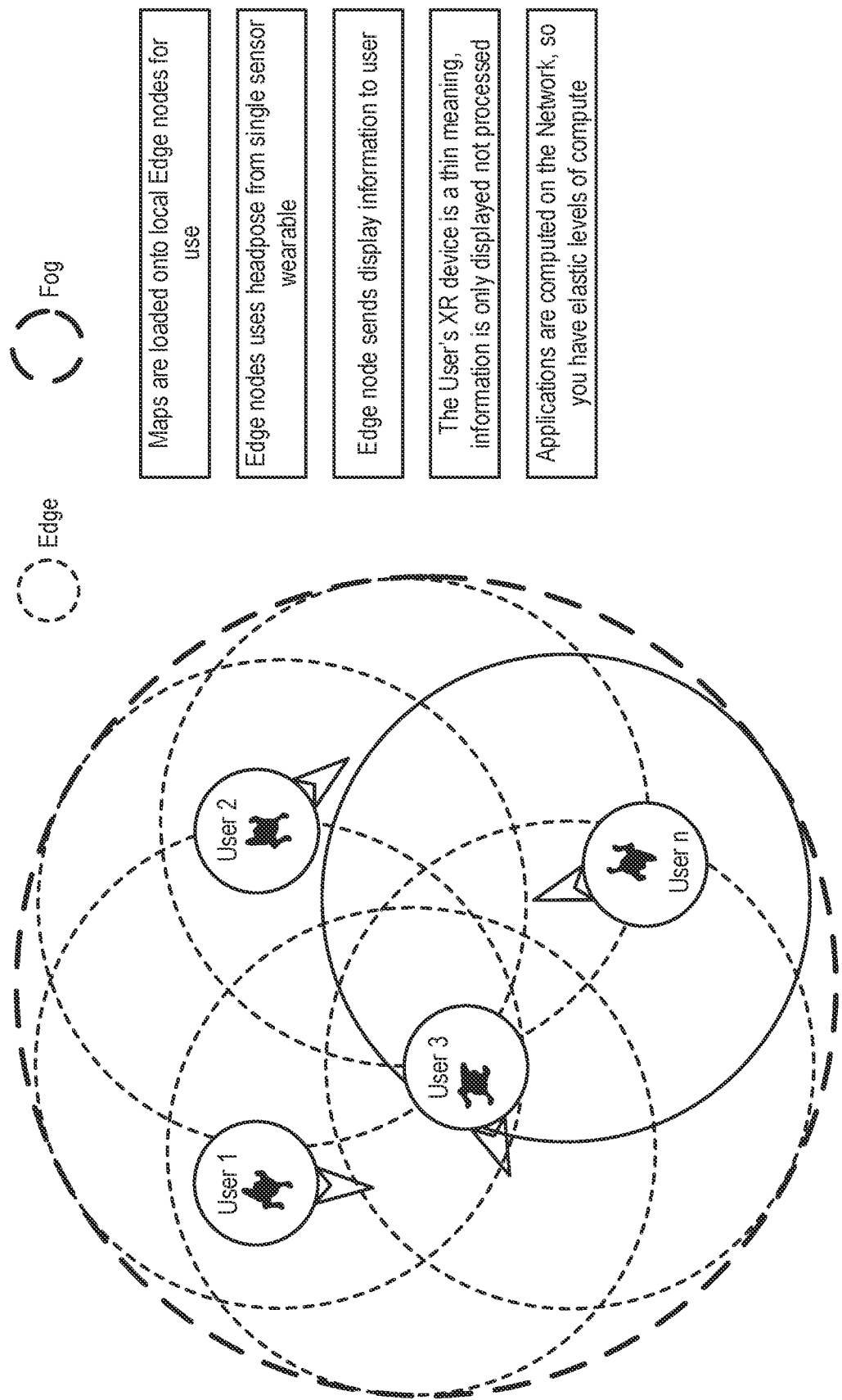
FIG. 39 is a schematic showing further details of connectivity of multiple overlapping edge computing nodes inside of a larger fog computing node wherein seamless handoffs or transfers are enabled between edge computing devices.

Referring to FIG. 39, with the advent of deep learning configurations, increased bandwidth communications, and advanced communications chipsets, one may configure systems to have both low latency and relatively high compute capability. Described below are further details regarding various configurations wherein certain services are moved away from the local computing hardware on the user's person, to more distributed locations. This facilitates effectively turning XR devices associated with users into a type of thin client configuration, wherein the local hardware is relaying computed information, rather than doing all of the "heavy lifting" itself.

Thus in these related embodiments, which may also be termed variations on the theme of "Adaptive Neural Computing", one may pull from many of the same services and sources as in a less connected configuration, and the challenges become more focused on connectivity than on carrying locally all of the requisite computer hardware. With the speeds and bandwidth achievable with IEEE 802.11 ax/ay (i.e., Wi-Fi 6) and 5G, one is able to rethink the ways in which various tasks pertaining to spatial computing may be conducted.

Generally, one of the challenges with Adaptive Neural Computing configurations is to relocate the computational load of the services required to operate the XR device. As described above, in various embodiments, this may be facilitated by creating edge node computational devices and sensors, as well as optimized fog nodes and cloud computing facilities.

An Adaptive Neural Computing edge node may be a comprehensive internet-of-things (i.e., readily connectible using conventional network infrastructure) style device placed at the point of need or the "edge" of compute. Such a device may comprise a small computer capable of high bandwidth connectivity, high speed memory, a GPU, a CPU, and camera interfaces. Suitable edge nodes, as described above, include but are not limited to those marketed by Nvidia™ and Intel™.

Figure 40:
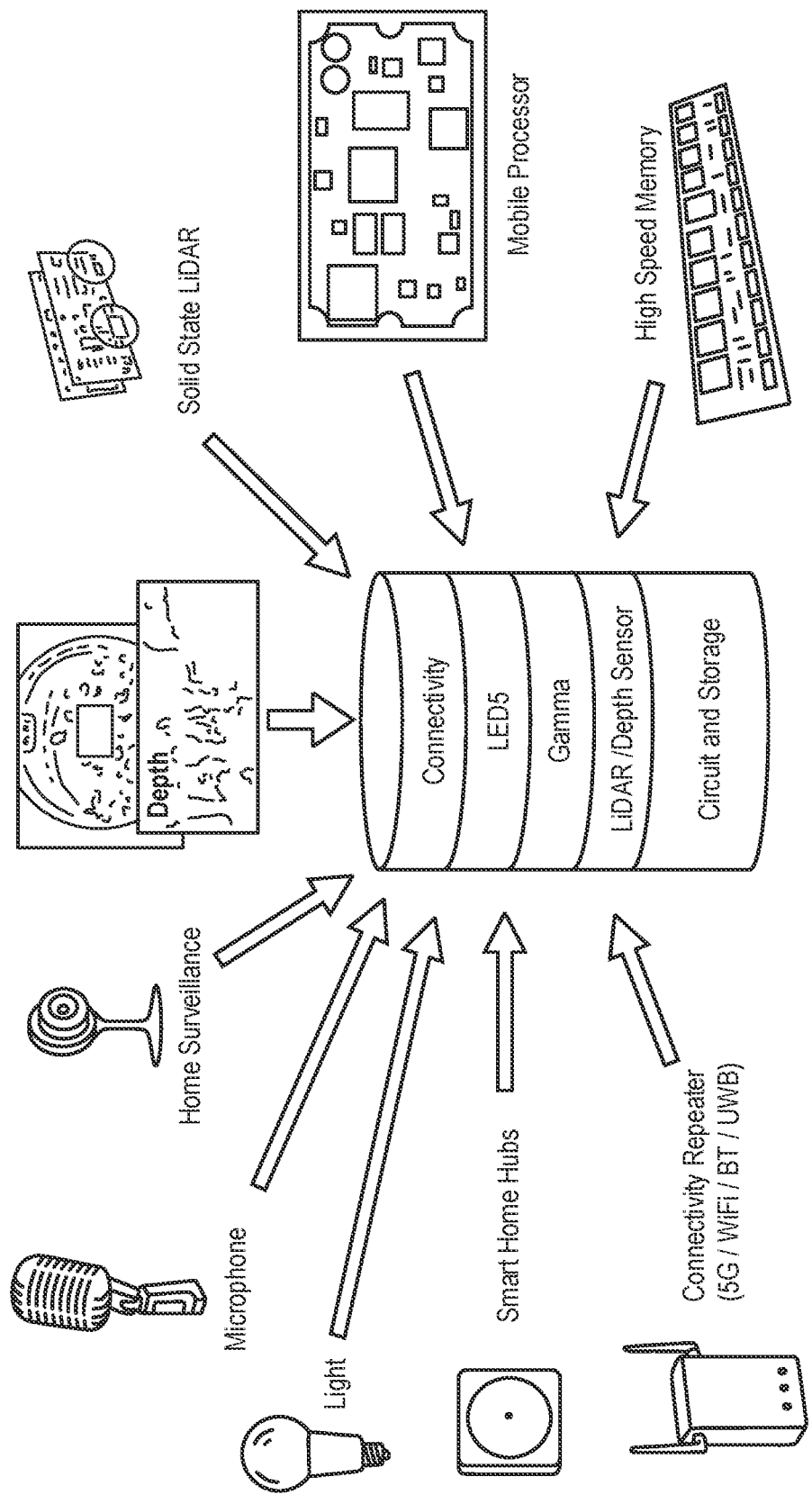
FIG. 40 is a schematic of an edge node that may comprise a sensor capable of creating depth maps of the world, for example, this may include a pair of stereo cameras, an RGB-D camera, a LiDAR device, and/or a structured light sensor, each of which also may include an IMU, microphone array, and/or speaker and/or serve as a Wi-Fi or 5G antenna.

Referring to FIG. 40, a suitable edge node also may comprise a sensor capable of creating depth maps of the world, for example, this may include a pair of stereo cameras, an RGB-D camera, a LiDAR device, and/or a structured light sensor, each of which also may include an IMU, microphone array, and/or speaker. A preferred edge node also may serve as a Wi-Fi or 5G antenna.

Such an edge computational device may be configured to be the primary device for low latency operation to facilitate integration with spatial computing systems. For example, FIGS. 25A-25C illustrate embodiments of progressive enhancement of the capabilities for a user to interface with data and the digital world.

Integrated edge nodes may be configured scale from portable and small up to a full on-premises server capability. As noted above, the purpose of using such a distributed computation across the cloud systems is that at the point of need the lower latency operations will not be performed on a small computer tethered to the wearable.

World reconstruction (i.e., meshing, SLAM) described above in reference to MMO-like configurations with all or most computing resources on board the user's person employ a local-service-based continuous operation configuration. One may utilize an "absolute" coordinate system as a model of the world (the geometry of the digital twin). This model may be fed through a series of transforms until it is laid over the physical environment in a true-scale configuration. These transforms are essentially a calibration file that takes into account the intrinsics and extrinsics of the user's system, the type of device the user is using, or the current state of the user.

Figure 41:
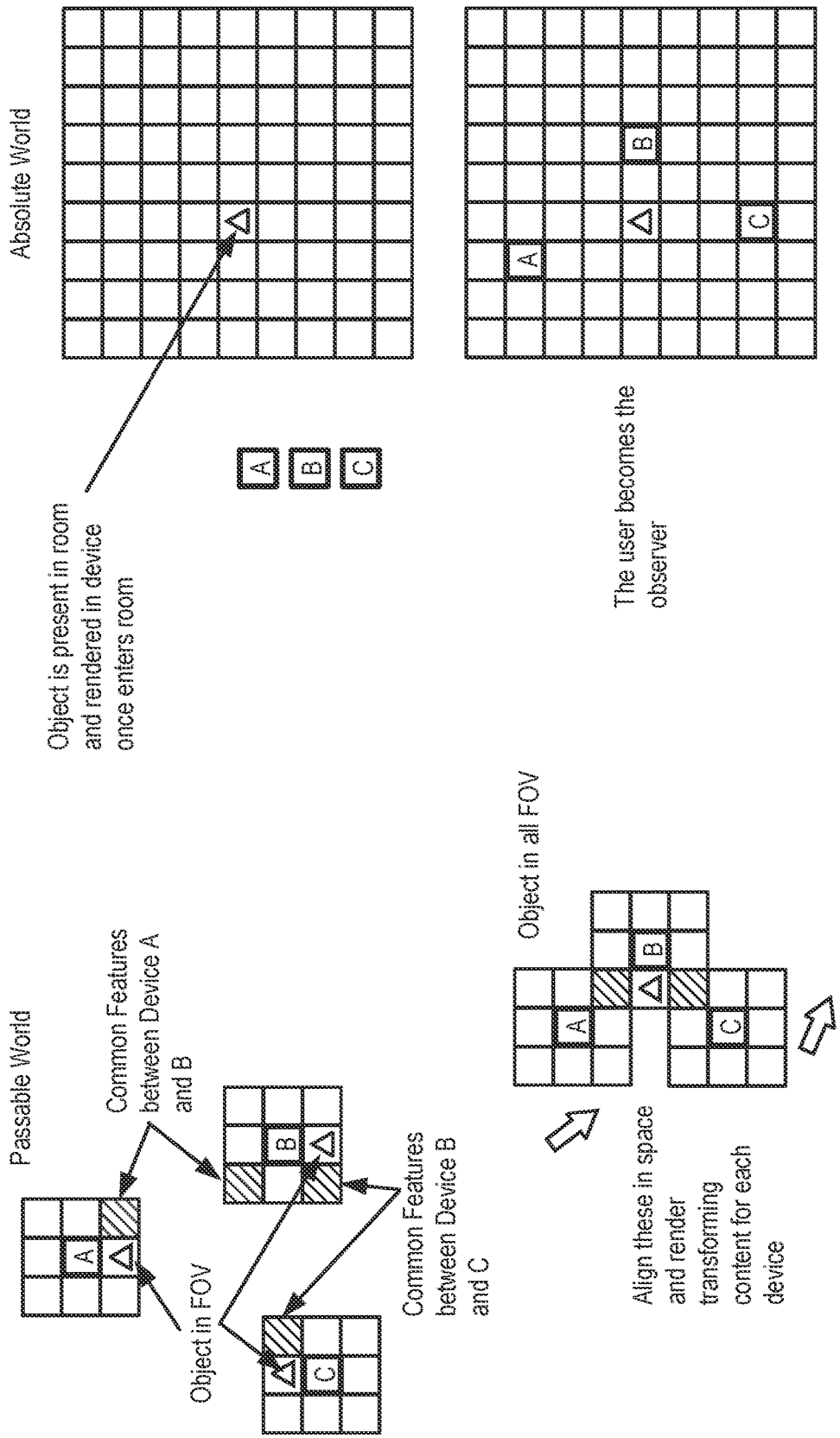
FIG. 41 is a schematic of a "passable world" system wherein each online XR creates a portion of an aggregated model for an environment.

Referring to FIG. 41, with a "passable world" system wherein each online XR creates a portion of an aggregated model for an environment, an additional user is dependent upon the scanning of other devices creating such aggregation. To the contrary, with absolute world model, scans may be captured or created prior to a particular user's runtime use, so that when a user with an XR device enters a given room, there is at least a baseline model of such room which may be utilized, while new/additional scanning may be conducted to improve upon such model. The so-called "baseline" model becomes the raw data, which can be contextualized so that when the XR device of a user enters the space, there is less latency, and the experience is more natural (i.e., a user's XR device already knows something is a "chair", or is able to determine this quickly based upon available information).

Once one has this model of the world in an authoritative server, one may implement uploads and downloads on a timetable determined to be most useful from the Digital Twin server to the edge/fog nodes in the local environments. This ensures that the devices are as up to date as is required for a specific application.

Once a coordinate system has been established, it may be populated with data. There are various ways to accomplish this. For example, data from XR devices of various users may be pipelined or included on the local storage of an XR device new to the locale. In another embodiment, various techniques and hardware, such as robotics, sensor-integrated backpacks, and the like may be utilized to provide periodically updated meshing/scanning of various environments. What these data sources do is capture data in the world and using the passable world object recognizers, temporal features, contrasting features, and supervised feature definition we can align the maps and through sensor fusion techniques such as an Extended Kalman-Bucy Filter (EKF) or Feedback Particle Filter (FPF) we can perform continuous time nonlinear filtering and align these maps at run-time if needed. This combinatorial map may become the basis for how to perform tasks in spatial computing. The primary goal in this implementation is efficiency, so this means we do not need to constantly reconstruct the world we only need to capture the differences or deltas in the mapped world. In other words, if a mesh of a particular environment is stable, the entire mesh need not be replaced, but only the deltas or changes need to be added.

With all of the raw map data in an authoritative mesh storage device, such as a cloud server, one may now take such data and create an intelligently smoothed and textured view of the world which may be expressed in more detail. This is because it may be desirable to not only want to use this map to align digital content to, but also to recreate the world for virtual reality and pass-through XR technologies. Prior to this, one may contextualize the world to facilitate pre-identification prior to consumption of the data, as well as key features in the raw geometry.

Figure 42:
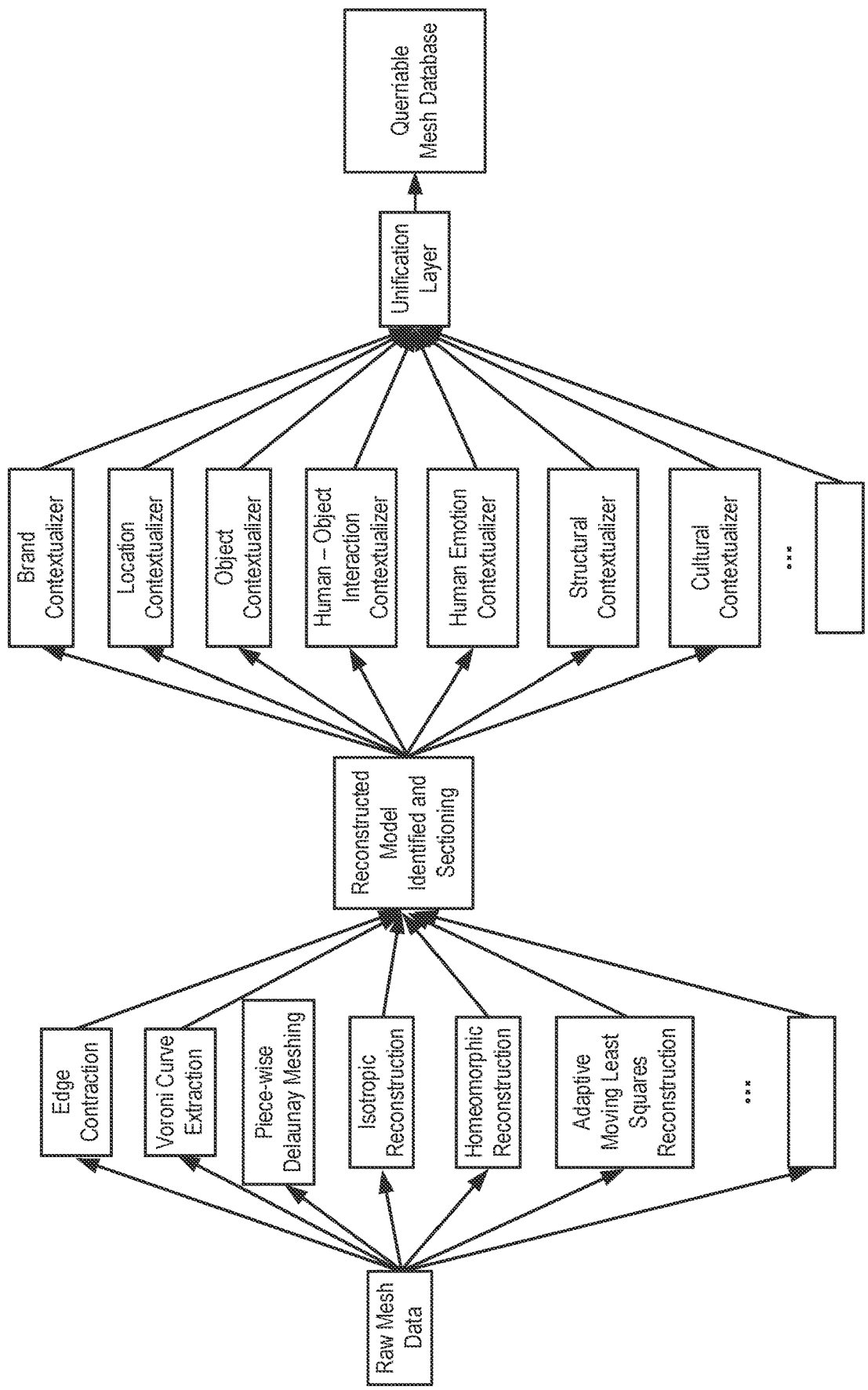
FIG. 42 is a block diagram of a system to recreate the digital twin of the world.
Figure 43:
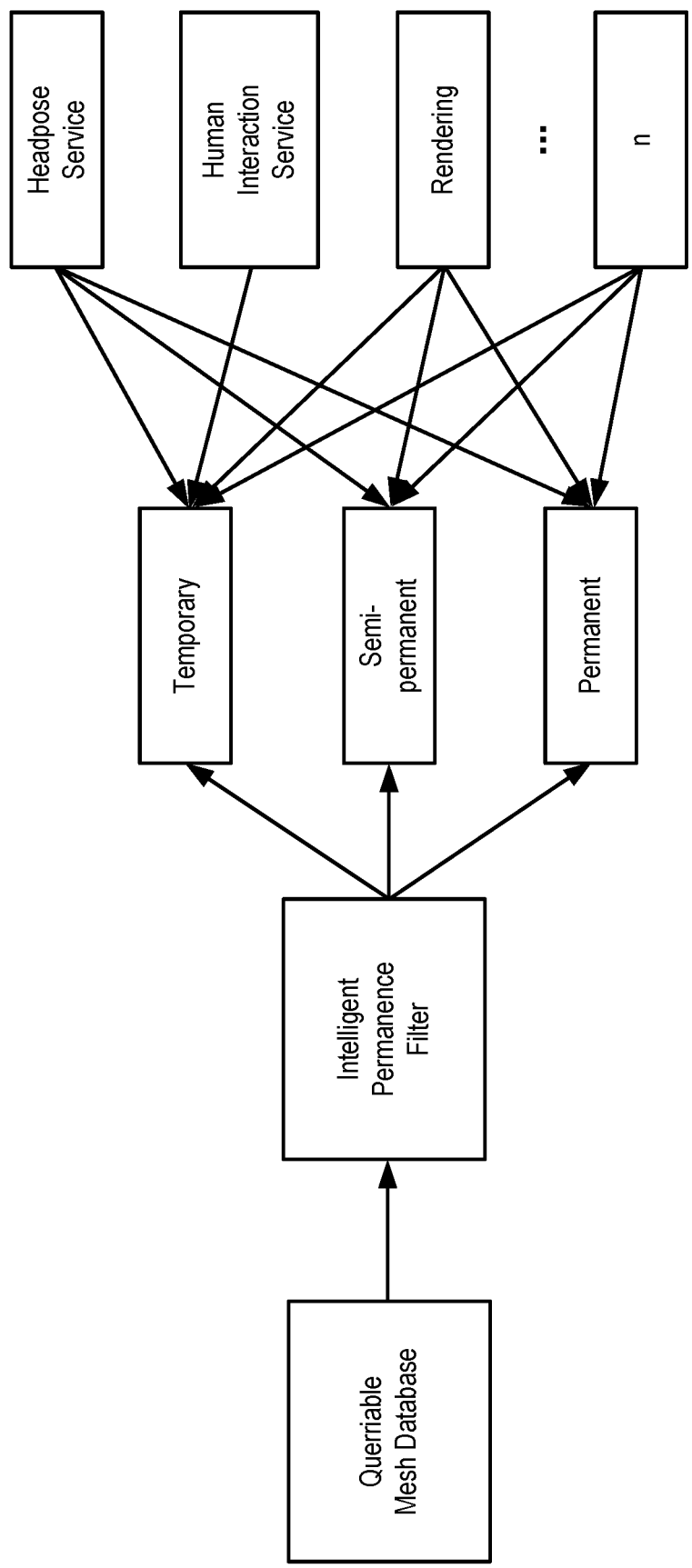
FIG. 43 is a block diagram of a system for filtering of spatial information.

Referring to FIG. 42, one may need to recreate the digital twin of the world, such as by utilizing raw mesh data (shown on very left of FIG. 42), such as from the outdoors, perhaps with many methods and combined into the Mesh database. For example, methods to recreate the outside world may include stereo camera reconstruction, structure from motion, multi-view stereo reconstruction, image based modeling, LiDar based modeling, inverse procedural modeling, façade decomposition, façade modeling, ground reconstruction, aerial reconstruction, and massive model reconstruction. These methods can all contribute the information to the Mesh database. The raw information then may be contextualized. One method for doing this is referred to as "brand recognition" through the process of multilayer language processing, RNNs, CNNs, supervised learning methods, and other methods. One may initially contextualize the information through many layers, firstly one may use techniques such as "edge contraction" to identify and simplify the point cloud and geometric information. One may analyze these changes using a persistent homology framework, for example. Referring again to FIG. 42, one may identify various methods for taking raw point cloud or geometric information and contextualizing it for consumption by connected XR users, hitting on one goal of such a configuration, which is the unification of users and the physical world to the ever-growing and enriching digital one. Employing such processes and configurations leaves the world contextualized, providing the ability to scale to many more algorithms and models. Referring to FIG. 43, one may take this authoritative query-able mesh and extract features which may be identified as permanent, semi-permanent, and temporary. We can determine this with learning algorithms such as automatic parametric model reconstruction from the point cloud. This is another technique which may be used to fill in the gaps or scanning artifacts inside of a room and create a 3-dimensional reconstruction of the interior rooms using common features such as walls and doorways.

A next level may be to identify the semi-permanent structures or things in the room. One implementation accomplishes this with "hierarchal fine-grain segmentation" (i.e., segmenting to smaller and smaller features), which involves semantically labeling features on an object until the features are no longer discernable from one another. An example of this would be to continually segment then label the pieces of a chair.

After understanding the objects in the room, the semi-permanent objects may be identified as those objects, such as a large dining room table, which can move but probably will not frequently move, and/or will take a significant effort to move. Next, one may identify objects that are dynamically moving, such as laptops or clouds in the sky. This may be accomplished with object level scene reconstruction with proactive object analysis, for example. By constantly scanning a room and looking at the dynamic objects, the system may be configured to be able to increase the probability of proper segmentation.

Referring back to FIG. 43, all of this algorithmic rigor facilitates the filtering of spatial information so that the user does not need to use it unless it is important, or the services enabling the XR experience need to compute less as they are only tracking the cluster of points representing the segmented object.

Once the room has been segmented, labeled and contextualized, one may turn to connecting the room to digital "sockets"—which is a metaphor that may be used for forming intersections between a digital world and the physical world. A digital socket may be an object, device, robot, or anything that plugs the digital world to the physical world. Intent to interact with the underlying digital world and how it effects the physical world may be conveyed through these sockets, such as by meta-data to each particular socket. If the physical world is too dark for example, the user interfaces for XR devices to utilize such socket may be paired with an internet-of-things ("IoT") controller integrated with an application and user interface ("UI") which changes the light settings of the device. As another example, when a particular remotely-located XR device user is considering which port or socket to join as he wants to view a particular building, he may choose the socket which, based upon the meta data, will take him virtually straight into a very well-meshed room with a significant amount of pre-existing data pertaining to all features of the room, in full color. This interaction may require many processes, and the combination of such processes into a tool which a user can use to change their understanding of a perceived world.

Figure 44:
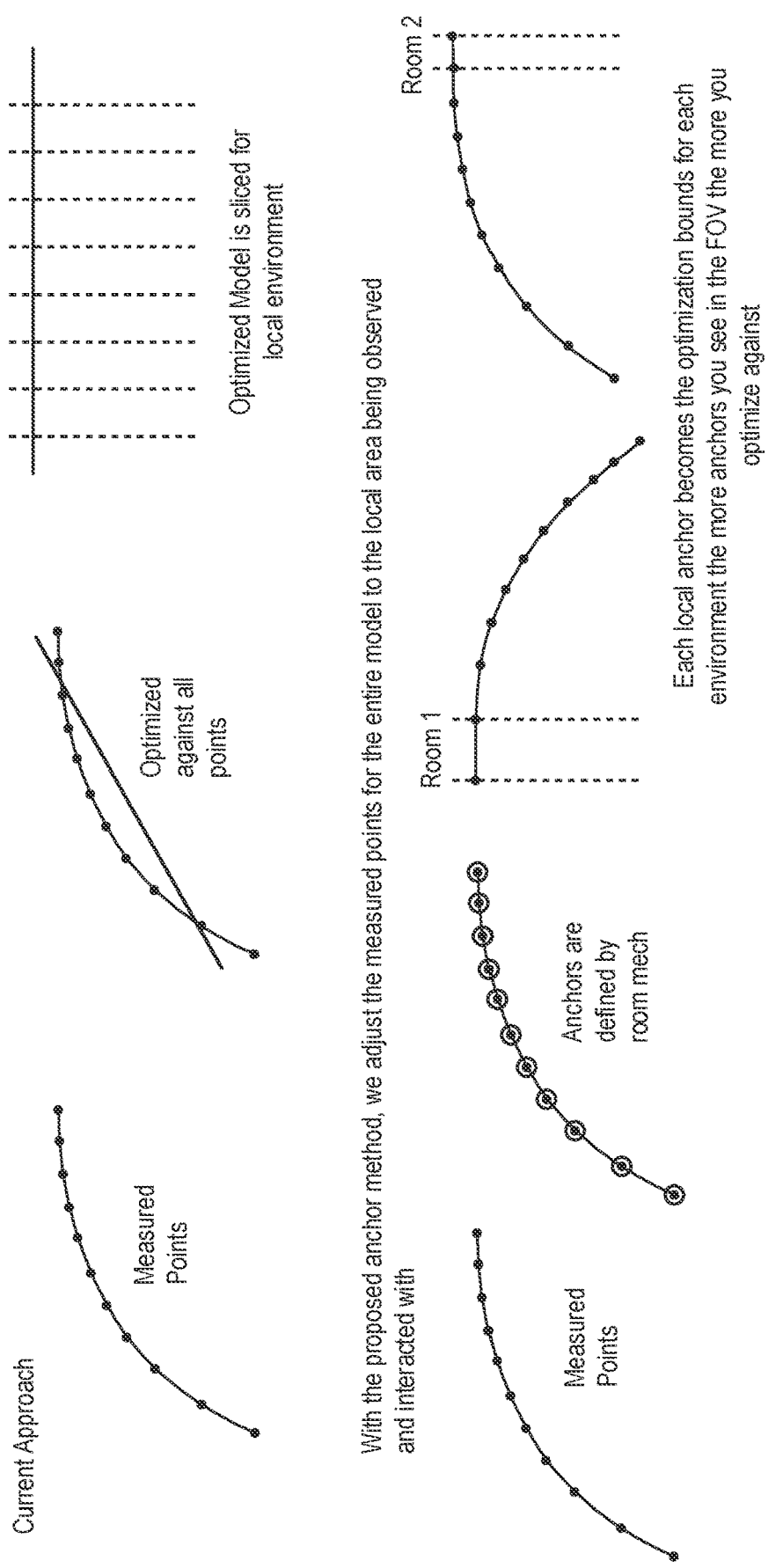
FIG. 44 is a schematic of a classic implementation of pose determination is shown against a world reconstruction phase of operation, anchor points, or superpoints.

One now may have a fully contextualized and robust digital twin of the physical world. Referring to FIG. 44, one process that is of paramount importance to runtime comfort with many XR devices, such as those which feature a head-wearable display component as in the system of FIG. 1, is the relatively low-latency determination of head pose, or pose of whatever pertinent system relative to the actual or virtual world (i.e., not all systems have head-wearable XR configurations for the user), with a reasonable level of accuracy. As shown in FIG. 44, headpose may be occurring on the device, where there are limited compute resources, but since the pertinent space already has been predefined or pre-populated in terms of world reconstruction, such that one may use the permanent, semi-permanent, and temporary features already identified and within this classification to identify anchor points, such as superpoints, as described above. Superpoints are computational graphs which may be used to describe a mathematical relationship between specific regions whose properties are related to other features that increase the probability of identification of those regions. Using the superpoints to lock pose varies from conventional pose determination methods. Referring again to FIG. 44 pertaining to head pose with head-wearable XR user configuration, the system may be configured to optimize the feature that is tracked for the pose of the head in 6 DOF so that errors propagated from other spaces, or residual fitting errors to the world map, are spatially filtered out of the equation. The system may be configured to conduct pose computation on a local processor, such as a customized ASIC, packaged with the sensor (i.e., camera).

Pose-related data may be streamed from the user's XR device, or from other XR devices, to available edge nodes, fog nodes, or to the cloud. As noted above, such distribution may be configured to only require a small amount of information, and in times where the computational load is low, the device can stream images back to the edge node to ensure that the localization has not drifted.

In FIG. 44 a classic implementation of pose determination is shown. The user's XR device, which may be configured to be constantly mapping the environment, builds a world map, or assists in building one. Such world map is what the pose is referenced against. A one-dimensional line to represent the sparse points discovered during meshing procedures is shown in FIG. 44. This line is then fit with a model in order to simplify the computation, and this allows residuals of the fit, and error propagation to play a significant role in the registration. These errors may cause mis-registration, scale ambiguity, and jitter which destroy the interaction paradigm because the digital objects conflict with the physical world. The fit model may now be dis-aggregated into reasonable pieces for transport and memory management based on the local scan coming from the device in each space. These dis-aggregated models are by definition mis-registered due to the aforementioned residual errors. The amount of mis-registration depends on the global error, as well as the quality of the scan acquiring the geometry and point cloud information.

Figure 45:
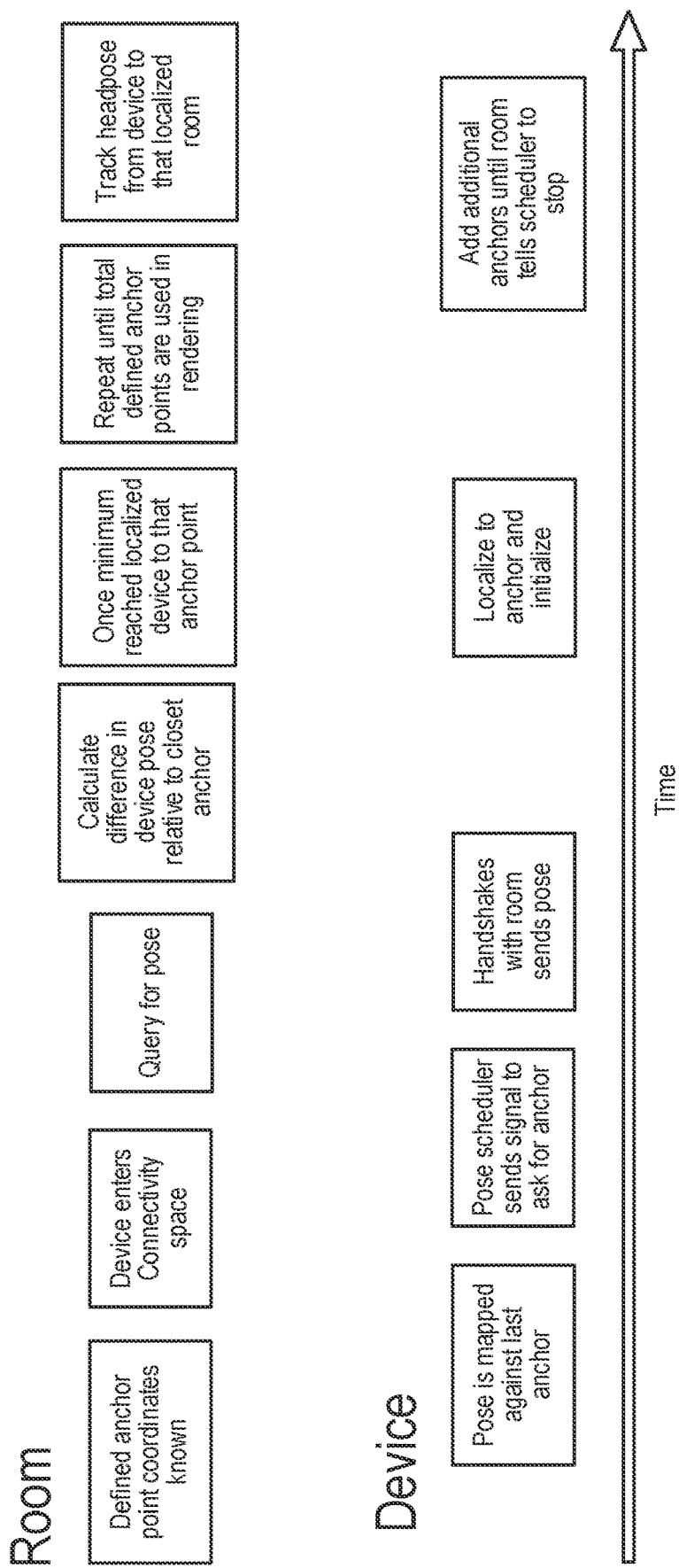
FIG. 45 is a timeline of one implementation for pose estimation using anchor graphs.

The second row in FIG. 44 illustrates how during the world reconstruction phase of operation, anchor points, or superpoints, are defined. These anchor points may become the localization tool for all devices across a series of XR devices to localize to the absolute coordinate system. FIG. 45 illustrates one implementation for pose estimation using anchor graphs.

A next element in this implementation of spatial computing is the route taken to render objects to the XR device. Since these devices can have multiple types of operating systems, one may adapt a streaming or Edge rendering protocol configured to take advantage of the spatial nature of the digital world and physical world, with distributed compute resources and various levels of latency, as described above. This being said, generally it is known where the device is in the room based on the pose methodology described above. The room is also known, due to the reconstructed world.

Edge Rendering may be facilitated by modern connectivity availability and should become more and more prevalent as more and more XR systems become utilized. Remote rendering can be accomplished through many variations of classical render pipelines, but generally will provide more latency than is acceptable in most spatial computing configurations to effectively communicate the inferred data.

One method for accomplishing remote rendering for spatial computing systems is to take advantage of conventional rendering and streaming techniques utilized by companies who stream movies or tv shows (i.e., such as Netflix™). In other words, a system may be utilized to implement the current render pipeline on distributed edge/fog/cloud resources, and then take this output, convert the 3D content to 2D video, and stream that to the device.

Figure 46:
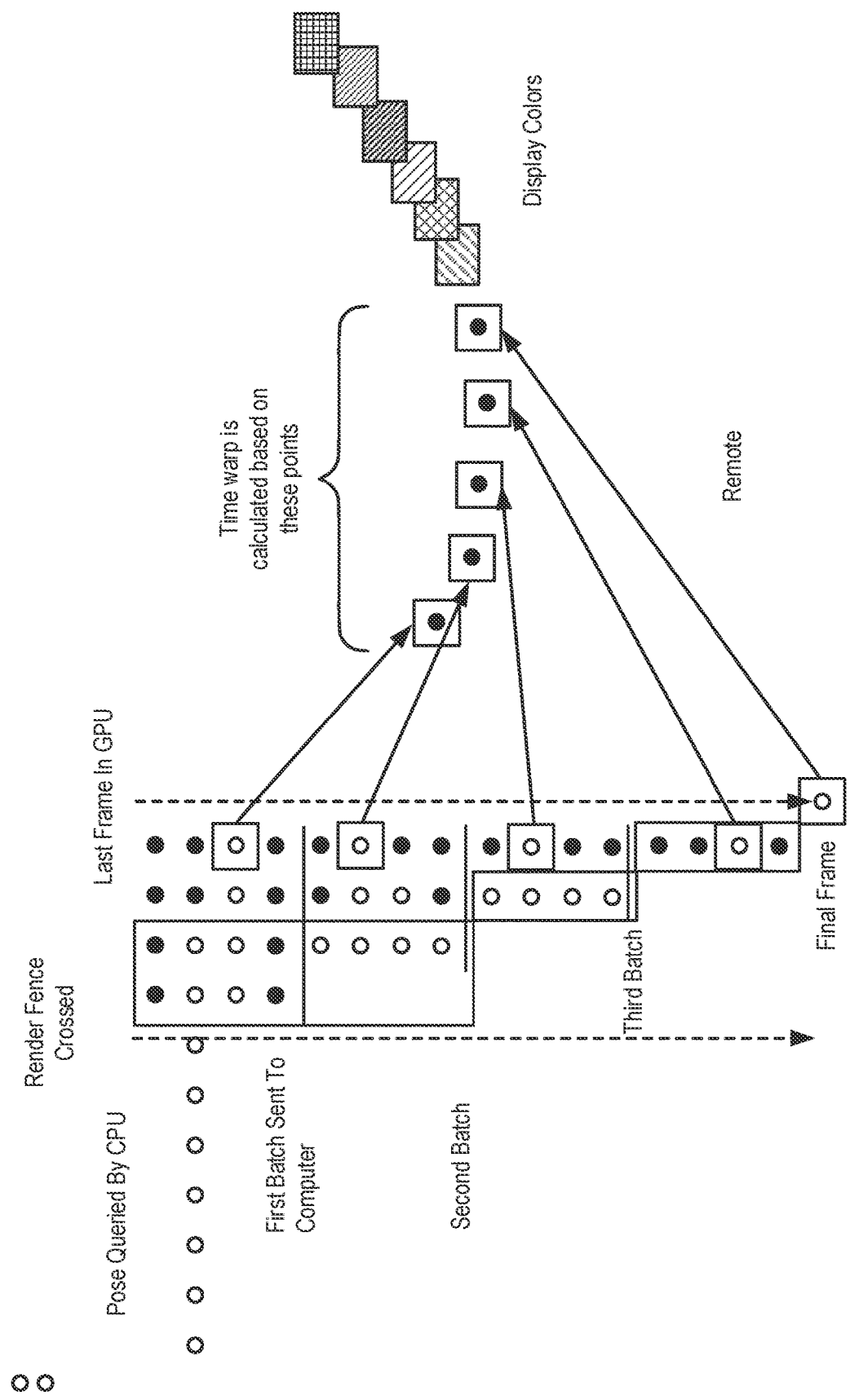
FIG. 46 is a timeline of a system that uses of the adaptive computational capabilities edge/fog/cloud resources to render parallel frames as predictions, and select, at the last moment, the frames that are closest to the actual values.

FIG. 46 shows another embodiment wherein one may take advantage of the adaptive computational capabilities edge/fog/cloud resources to render parallel frames as predictions, and select, at the last moment, the frames that are closest to the actual values. Due to the nature of spatial computing (i.e., that one can detect proximity of pose to rendered content), a system may be configured such that for a given number of frames (such as four, for example) in advance of real-time, the system may render multiple copies based upon the head pose measurement, and content placement in the absolute world. This process may be repeated for a given number of frames, and directly before rendering onto the device, the last pose value from the device may be taken and the model best matching that may have its related frames sent to the device. This allows for the system to have a polynomial prediction for rendering frames into the future where the XR device is predicted to be posed or "looking".

As noted above, for the configurations described herein one may take advantage of recent developments in wireless connectivity, including but not limited to WiFi-6, which also may be known as IEEE 802.11ax standards compliant, or any successor which will be able to effectively transmit the signals to the device.

One overall schema for rendering on a particular XR device may comprise computing all of the relevant processes in the distributed cloud, streaming the results to the XR device—directly to the frame buffer of said device, and producing imagery on the display for the user.

The aforementioned superpoint techniques may be utilized in aggregating meshes, or forming geometric relationships between them.

The physical world is not only an interaction element in spatial computing—it is also one of the primary inputs for the computational architecture. In order for this simplification of data to occur we need to understand the environment in which a user or experience (Location Based Experience LBE) is located in.

FIG. 46 describes that the content provisioning system further includes a rendering function executable by the mobile device processor to connect the mobile device to a plurality of resource devices transmit one or more rendering requests, wherein each resource device receives a respective rendering request, receive, a rendering from each one of the remote devices based on the respective rendering requests; compare the renderings to determine a preferred rendering, and select, with the mobile device communication interface under control of the mobile device processor, the preferred rendering first content transmitted by the first resource device transmitter. The renderings form a system having a polynomial prediction for rendering frames into the future where the mobile device is predicted to be posed or looking.

Figure 47:
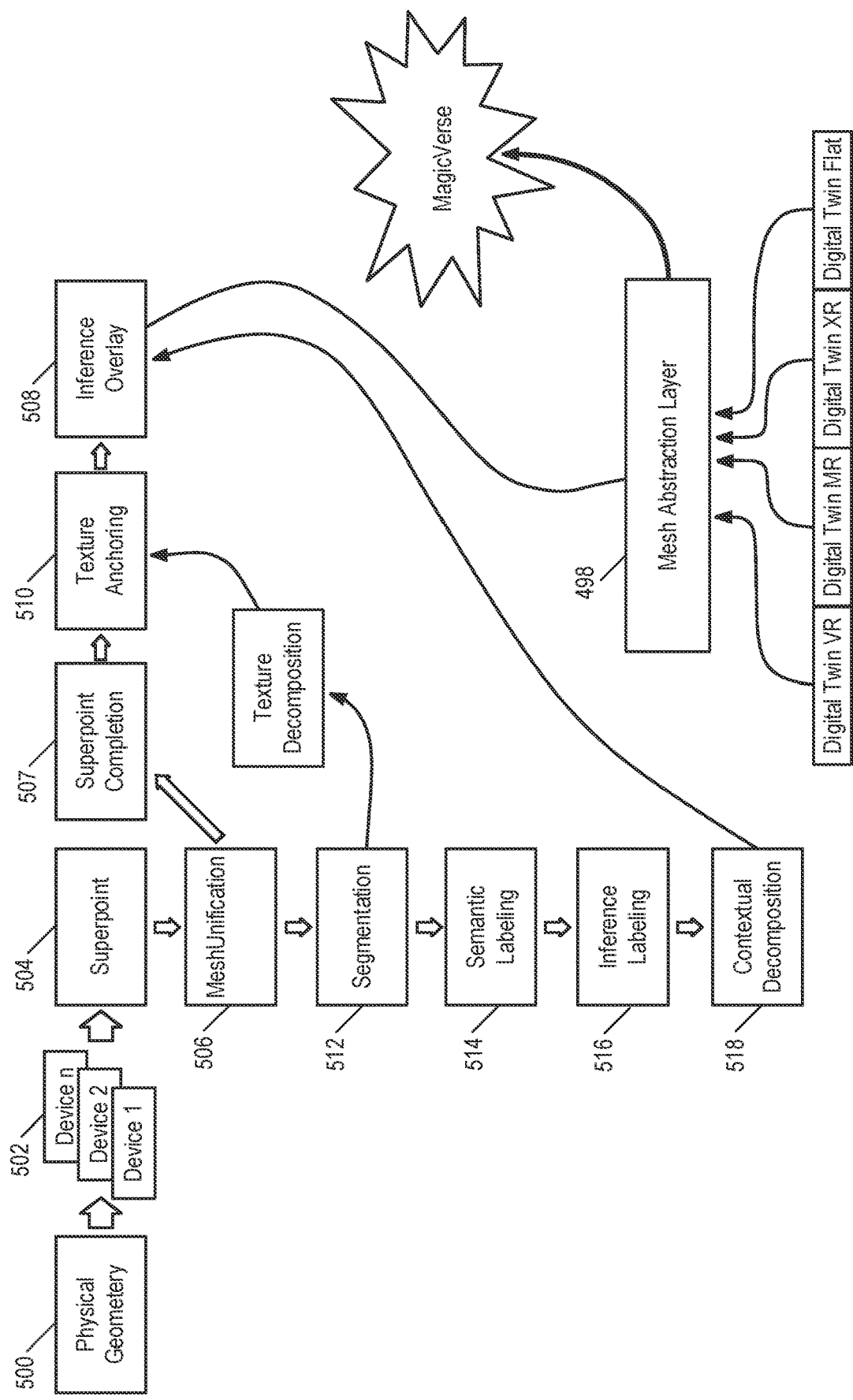
FIG. 47 is a flowchart of the physical world is simplified wherein we use the framework described above at different levels for different processes in spatial computing.

FIG. 47 shows the required steps to simplify the physical world wherein we use the framework described above at different levels for different processes in spatial computing. The physical world is complex and stochastic, thus the requirement for a dynamic framework for creating an accurate and precise reconstruction of the world that simplifies and infers meaning from a mesh abstraction layer (498). In order to map the physical world for this process one generally prefers hardware that recreates the geometry of the world (500). Prior work on this has proven to be efficient, but fully convolved neural networks have proven to increase the accuracy of this and decrease the computational load. The hardware (502) one may use to recreate the physical world geometrically can include RGB cameras, RGB-D cameras, thermal cameras, Short Wave Infra-Red (SWIR) cameras, Midwave Infra-Red (MWIR) cameras, laser scanning devices, structured light modules, arrays and combinations of these, and procedural recreation and completion. These images, point clouds, and geometric representations of the world may be captured for many different areas and environments with many different devices. They are capable of being stored in various modern image formats, at full image resolutions, sub-sampled, or super-sampled.

Once one has raw information from the sensor or sensors, either at run-time, or saved and then processed, or some combination thereof, one may find the points of interest. As noted above one may use superpoint techniques (504), which employ a self-supervised interest point detector and descriptor, thus allowing for features of interest to be identified.

To optimize ingesting or processing data from multiple sources into a single mesh (506) which is the digital representation of the world, one may need to conduct a few backend processes (512, 514, 516, 518). One may be utilized to populate any new area of the world into what may be termed an "Authoritative Intelligent Mesh Server" (or "AIMS"), which also may be termed a "Spatial Atlas". If data does exist, then one may perform sensor fusion to combine the information into one single mesh. Sensor fusion of this type can be done in traditional methods such as the many variations of Kalman Filters, or we can use Deep Learning techniques to use the found superpoint features of interest and conduct feature level fusion for each one of the sensor types and formats, by using the superpoint fully-convolutional neural network architecture we can create synthetic datasets with each type of sensor and then use that to train each of the individual CNNs. Once the superpoint algorithm has been tuned for each sensor type, a feature level fusion may occur following the general pattern of the image below, where one has implemented a mode-specific neural network.

Once the unified mesh is calculated we are faced with the challenge of what to do with the mesh. In one framework, one may seek further contextualization, in another the system may be configured to create an intelligent mesh (507). A superpoint intelligent mesh may employ using a superpoint algorithm and taking advantage of the homographic adaption implemented to create an intelligent interpolation of the primary mesh, and adding data points by enabling larger probability of additional features. In order to accomplish this one may follow the same process as with a superpoint feature detector, thereby increasing the training set to include the three dimensional mesh of the 2D shapes in the original superpoint. The reason this may be needed is after the mesh unification is that the same superpoints may not be entirely consistent and one may want all features in the frame to be extracted as the system is going to use them to overlay (508) the texture on the wireframe. A homographic adaptation of the feature plane may result in one set of superpoints, and since the entire map is in 3D space, one can rotate the user perspective as well about the super point along the arc created by the depth from the user to that point to create more perspectives of the features identified by superpoint. We then will use all of the points we create to attach the texture (510) to the surface of the 3D map and pseudo-depth-image.

Figure 48:
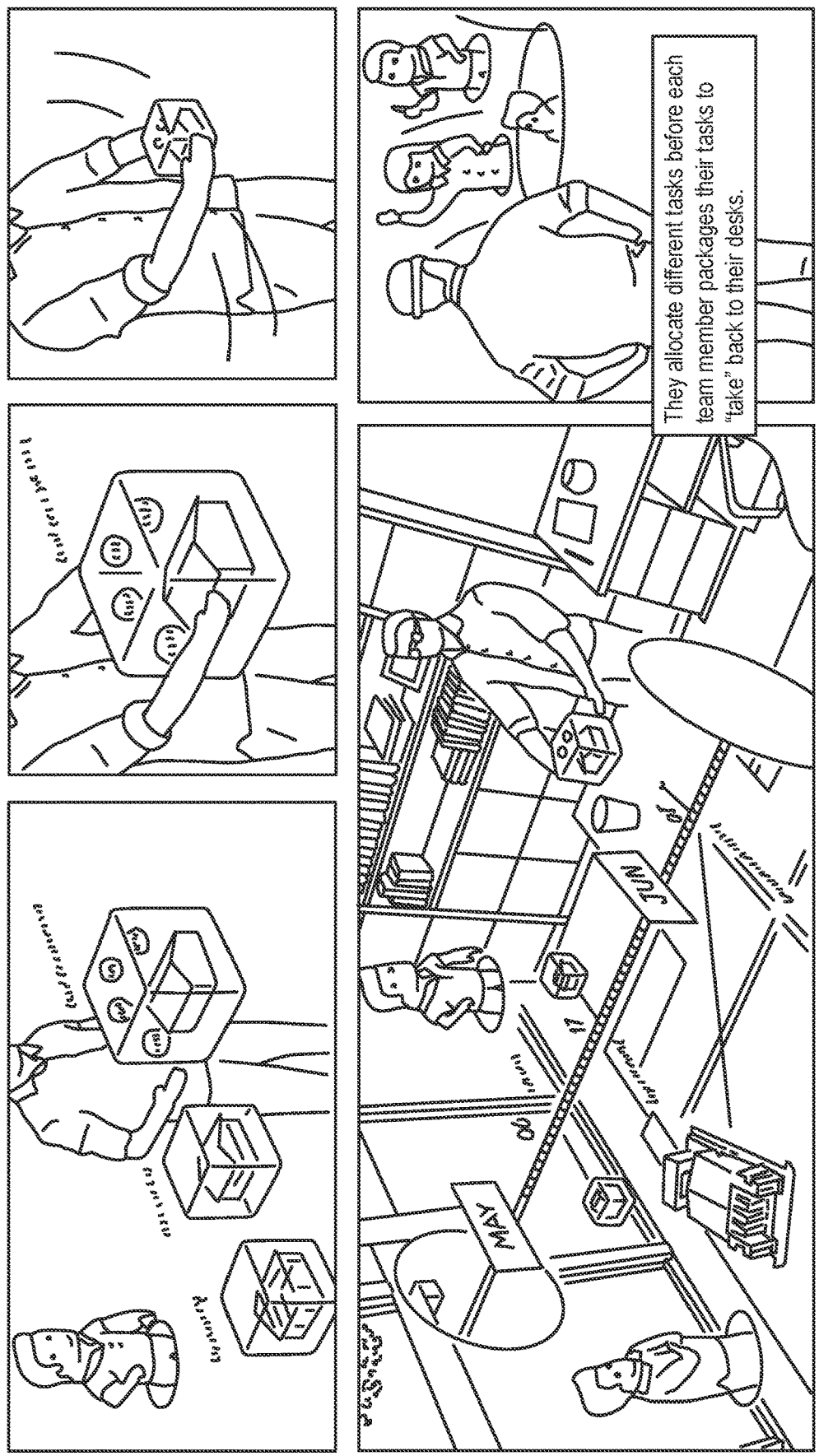

Referring to FIGS. 48-66, various exemplary embodiments are illustrated, featuring various XR devices being utilized in various scenarios. For example, referring to FIG. 48, an office environment is illustrated wherein corporate information is aggregated with spatial computing for collaboration, scheduling, and productivity by various users with various XR devices.

Figure 49:
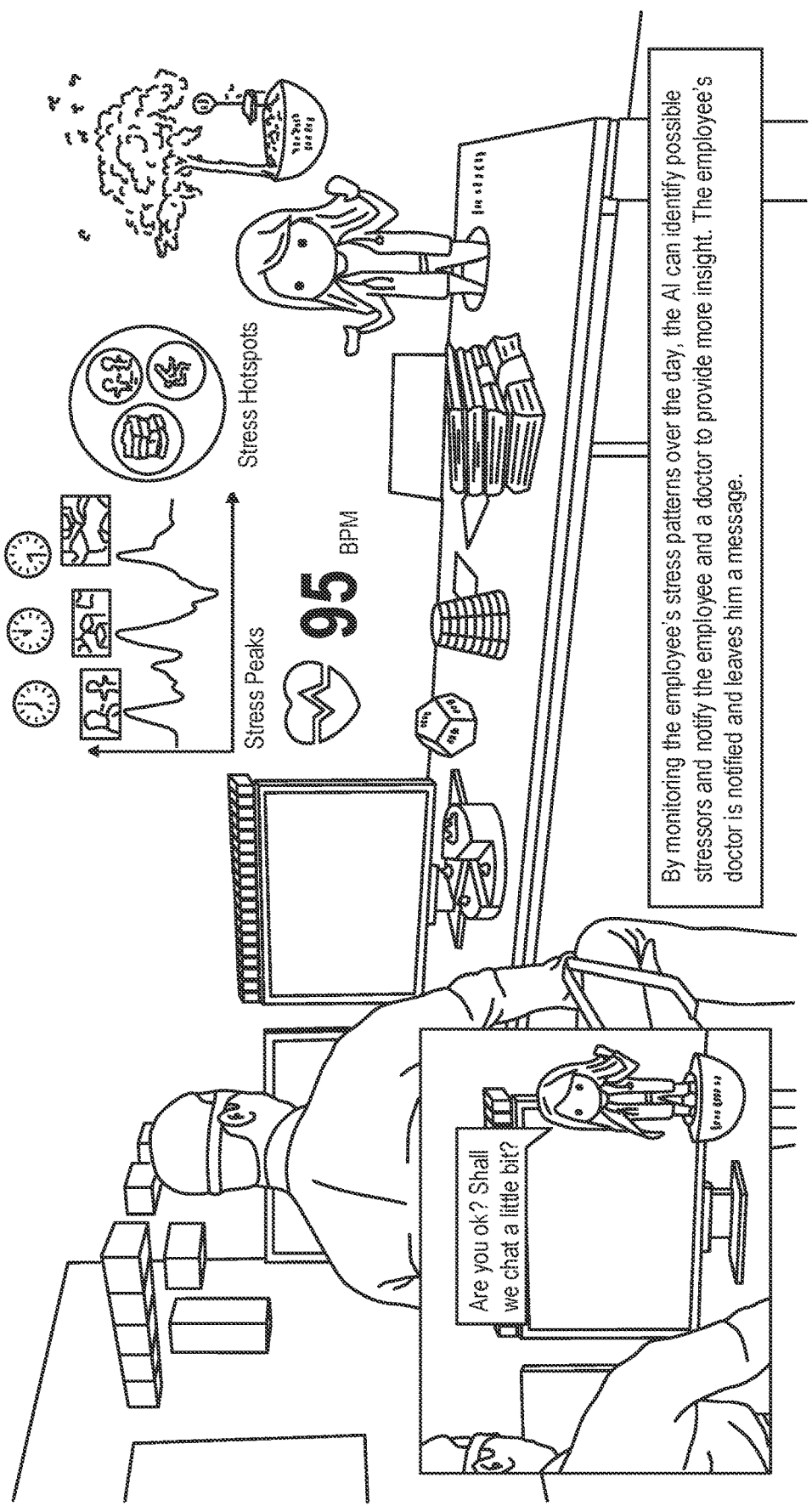

Referring to FIG. 49, a XR user is shown being interrupted by a remotely located doctor who was alerted by the XR user's integrated health sensing capabilities, so that the remote physician can notify the local XR user that he seems to be encountering relatively high cardiovascular stress levels.

Figure 50:
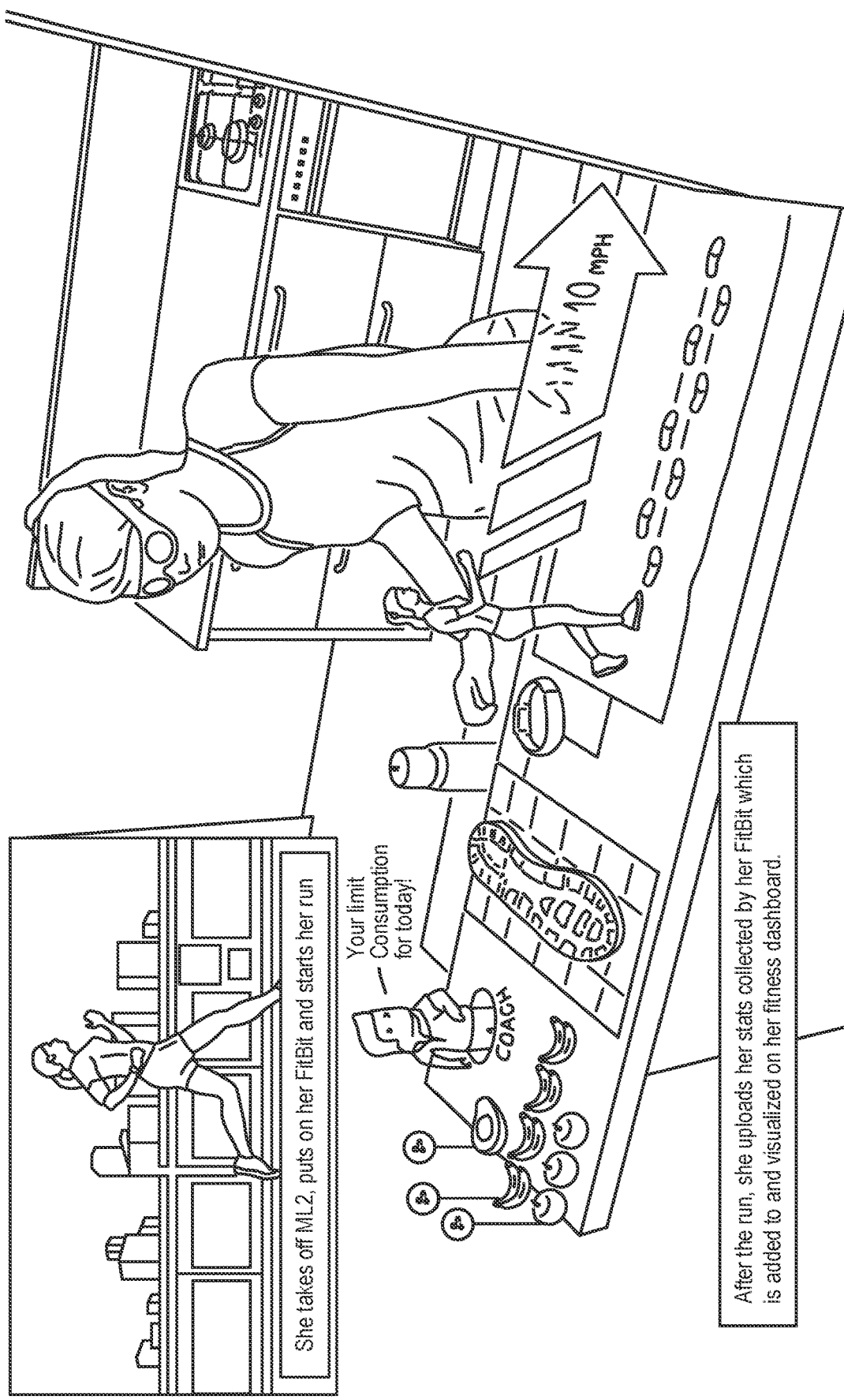

Referring to FIG. 50, an XR user is illustrated working with smart appliances and wearable systems which are integrated into a spatial computing paradigm such that analysis may be performed on the health and fitness routines of the user so that suggestions may be made for improvement based upon such data.

Figure 51:
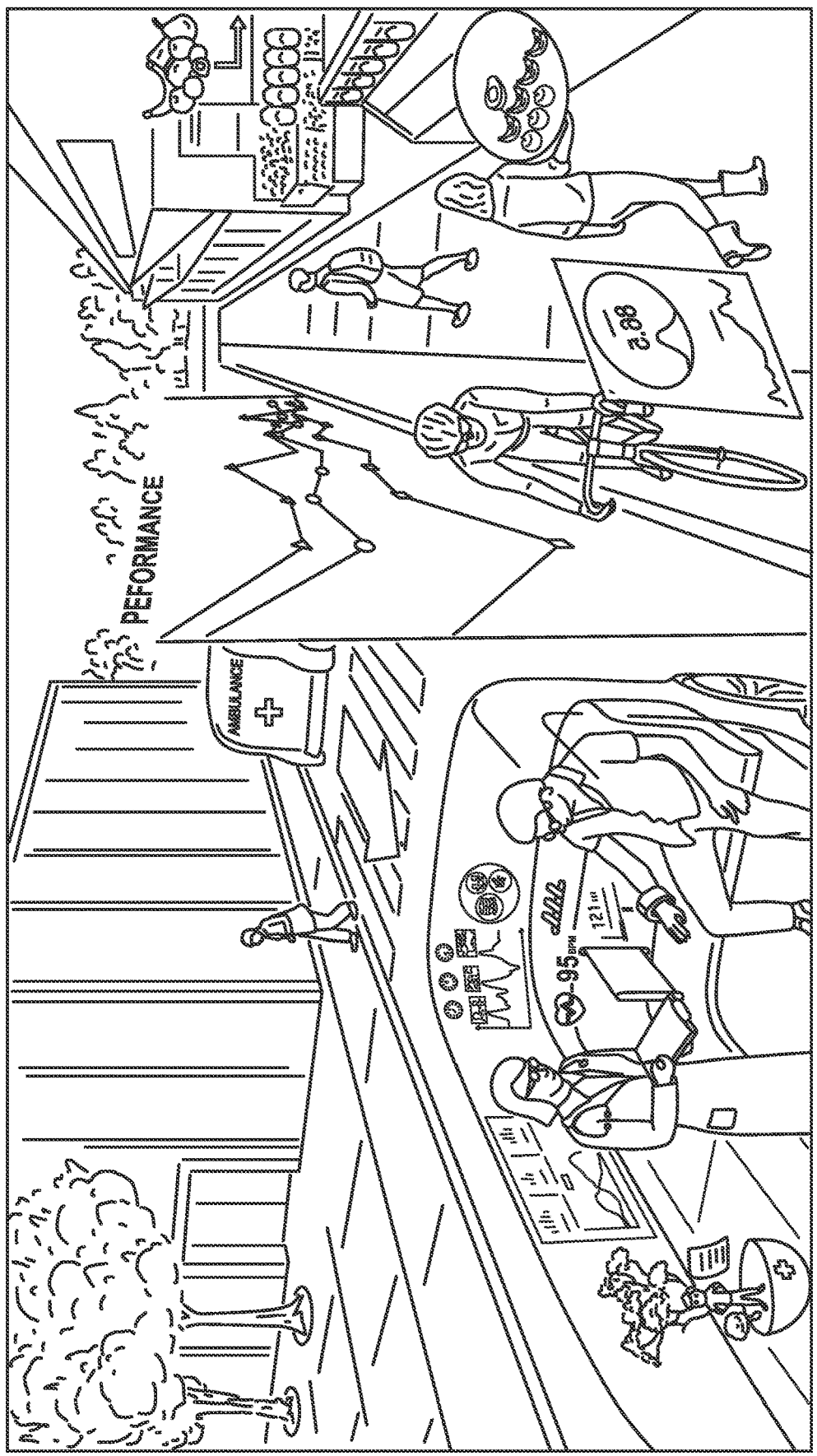

Referring to FIG. 51, an illustrated outdoor life scenario is shown, pulling together data from multiple sources so that many users may either physically or virtually experience the same scenario.

Figure 52:

Referring to FIG. 52, socalled "lifestream" data pertaining to a particular user identifies low blood sugar for a user based upon current activities and previous activities, to include caloric intake, sleep, physical activity, and other factors.

Figure 53:
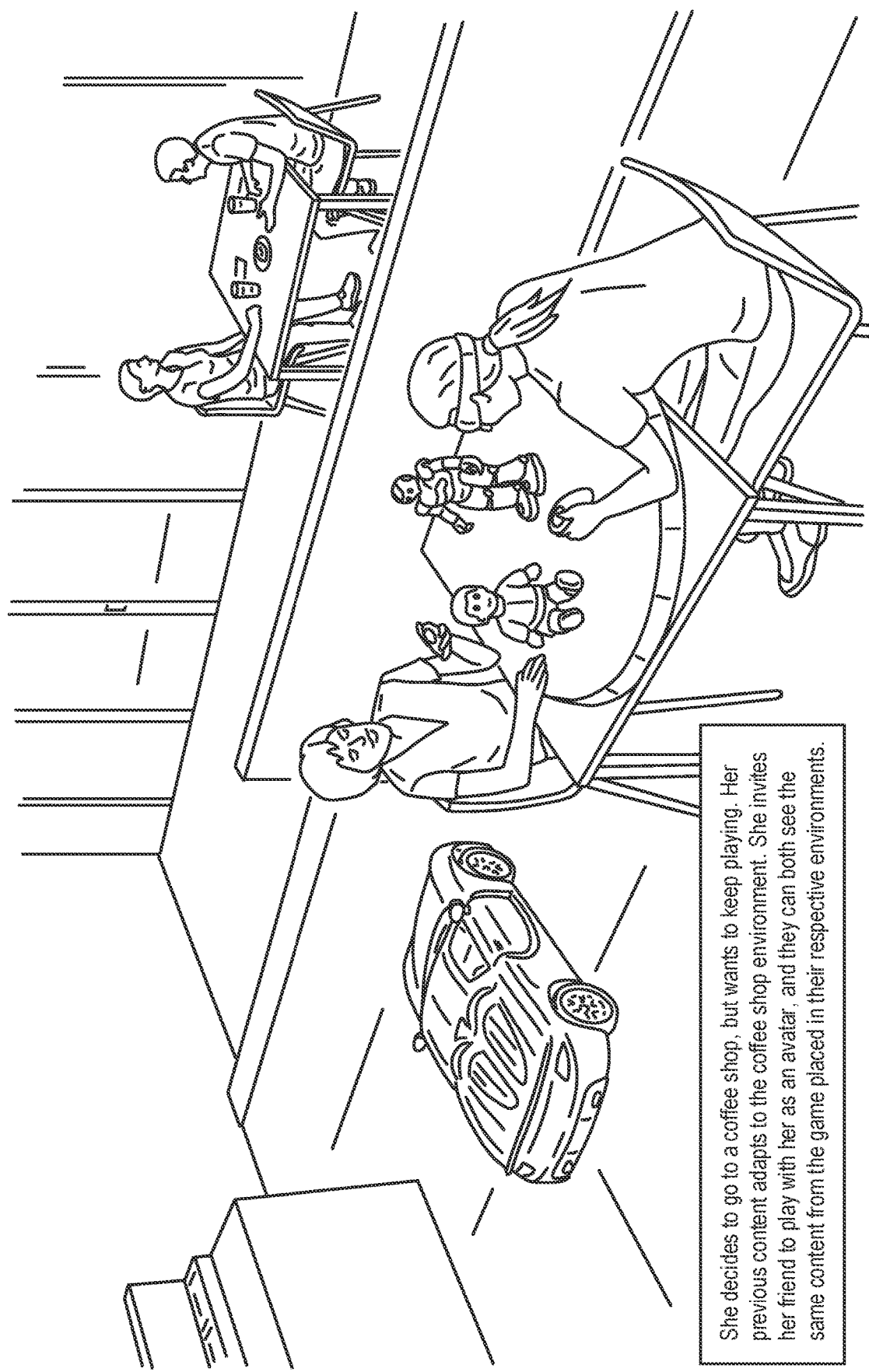

Referring to FIG. 53, various XR users are shown through virtual presence in a common physical space, with spatial computing integration such that they may manipulate physical objects in the common physical space around them, such as chess pieces.

Figure 54:
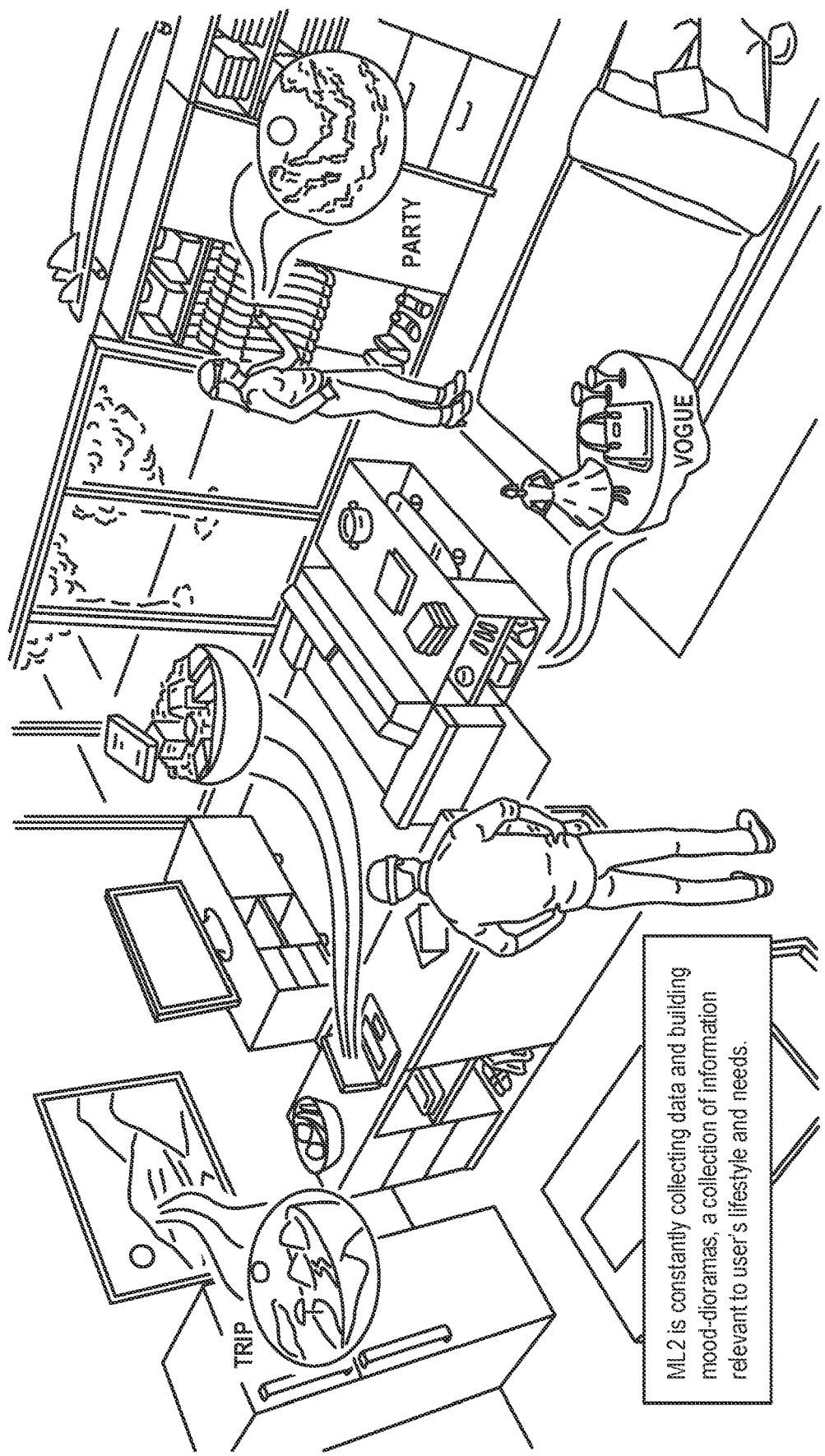

Referring to FIG. 54, a shopping scenario is illustrated, such that users of XR devices are able to compare clothes that they have at home or that are located at some other location with clothes that they are able to visualize in a physical store, and while virtually at the store, "try" clothing items out as their virtual selves in said physical store.

Referring to FIG. 55, an XR user is sitting down to play an actual physical piano and asks for instructions regarding how to play a particular sonata. Information pertaining to execution of the sonata is localized to the appropriate keys of the physical piano to assist the user, and also even advise the user regarding how to improve their playing.

Figure 56:
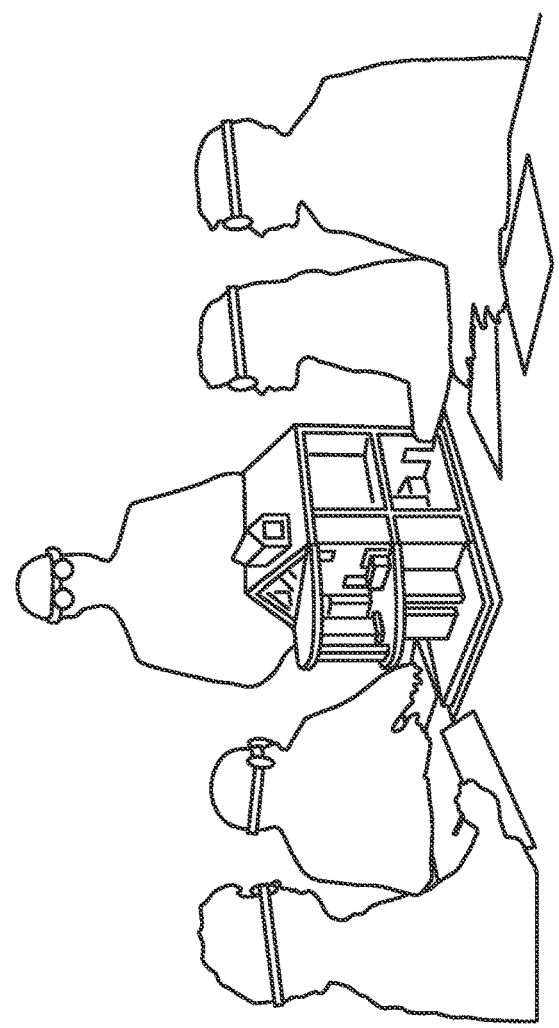

Referring to FIG. 56, a collaboration scenario is illustrated wherein five XR users are able to visualize a virtual home model retrieved from a remote corporate database, they are able to change aspects of the home model at runtime and save these changes on remote computing resources for future use.

Figure 57:
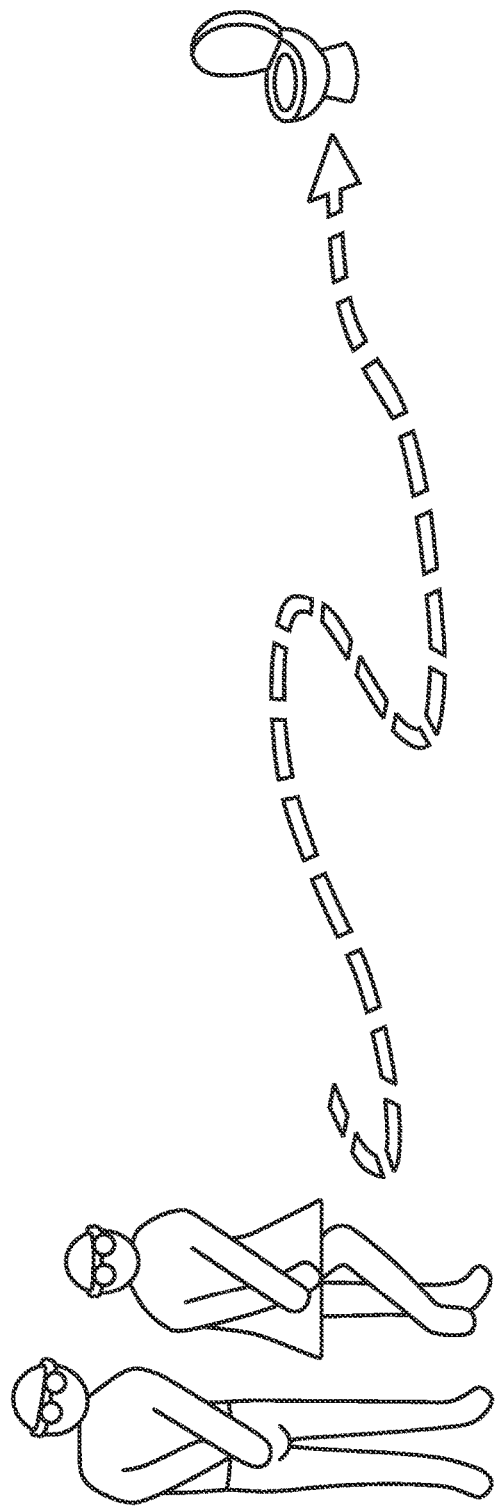

Referring to FIG. 57, some XR users are shown trying to find the closest actual public restroom. A regression of their current location information assists the system in determining the location of the closest available restroom, the system may then be configured to provide the users with virtual visual guidance as they walk to said restroom.

Figure 58:
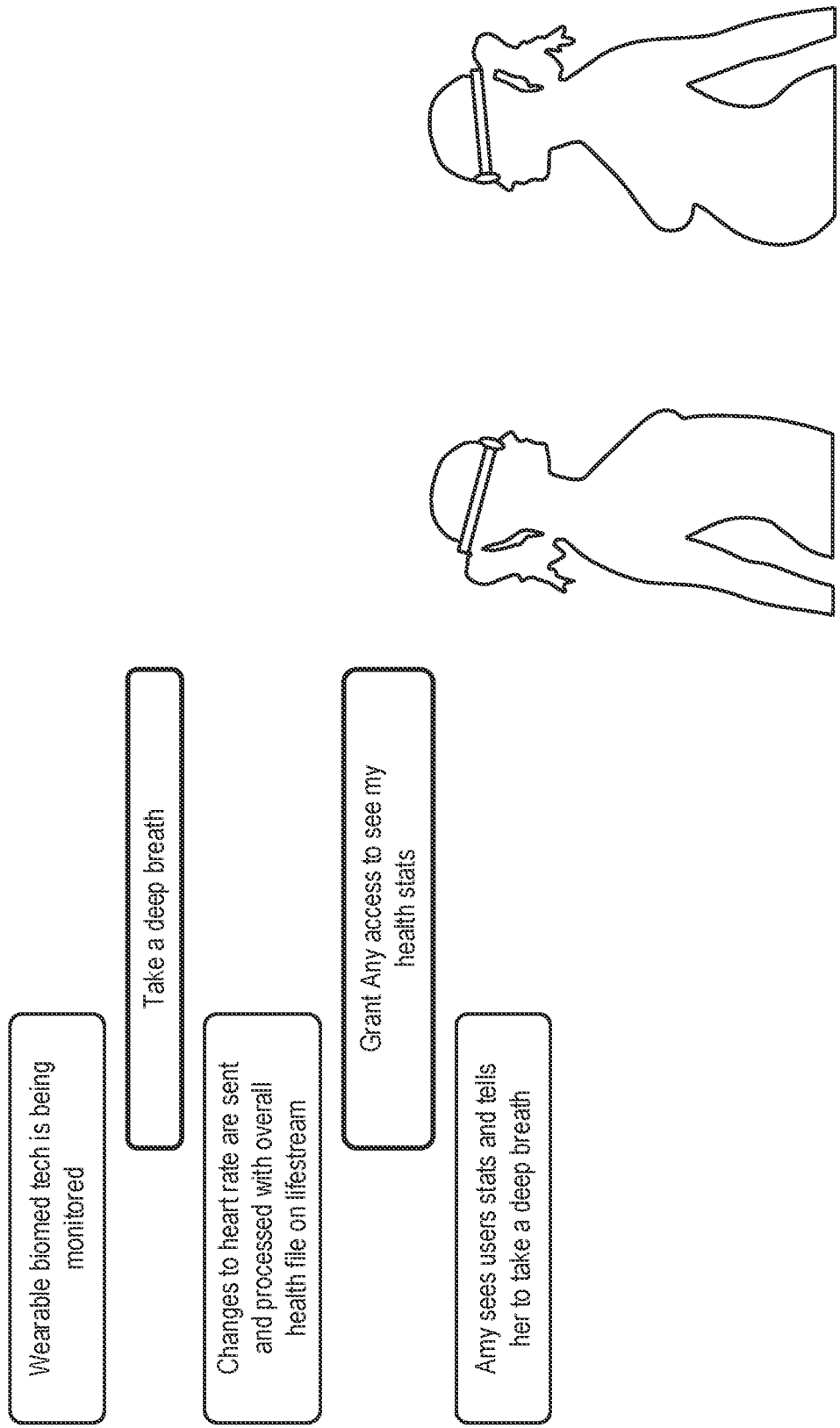

Referring to FIG. 58, two XR device users are illustrated in a pre-natal yoga instructor scenario, wherein the instructor, once granted access by the client, can monitor both mother and child vital signs for safety.

Figure 59:
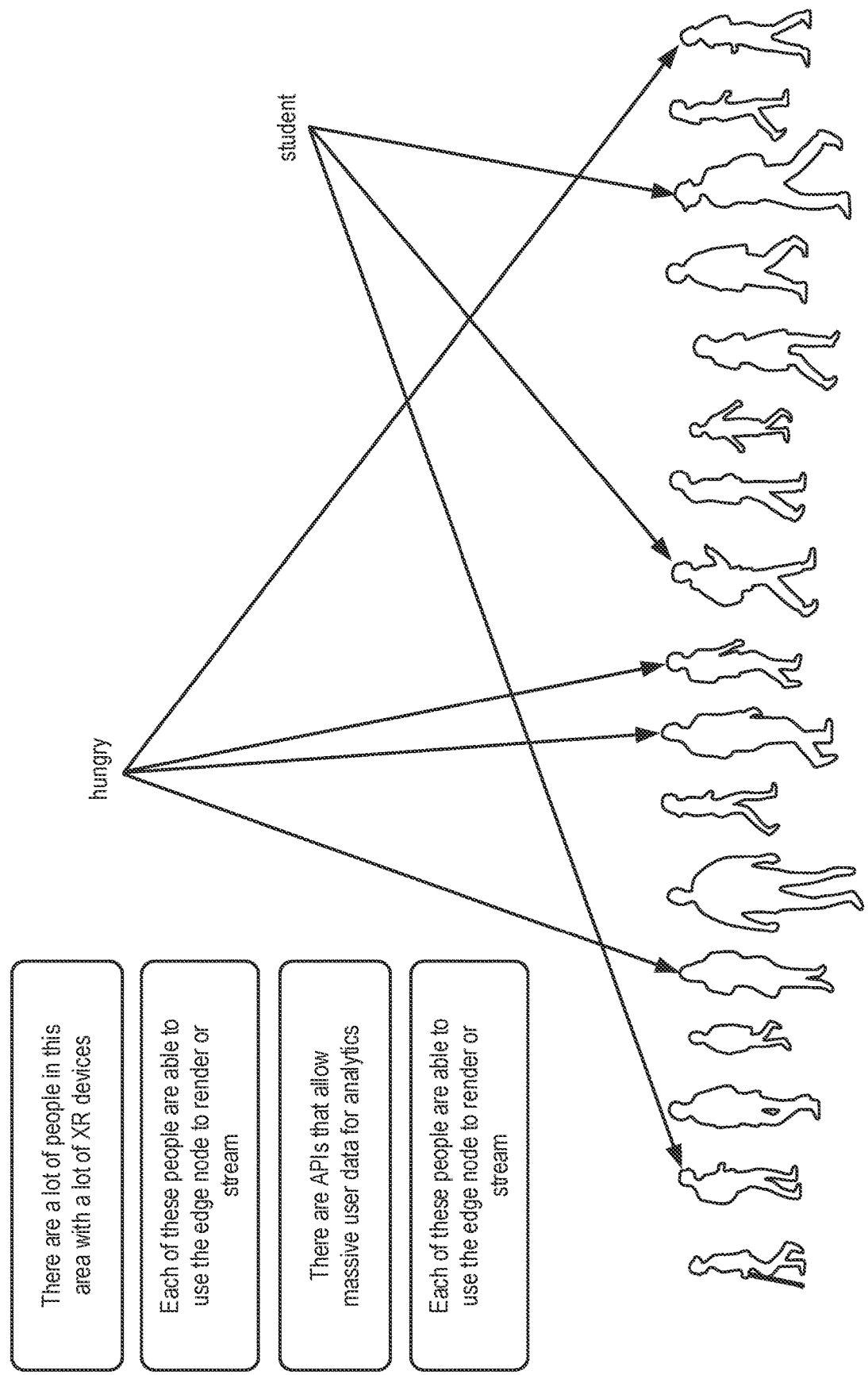

Referring to FIG. 59, a connected spatial computing system may harness, subject to appropriate permissions, the data of many interconnected XR users, to assist these users in day to day interactions, by utilizing not only their own data, but the aggregation of all of their data, for example, for traffic and congestion analysis.

Figure 60:
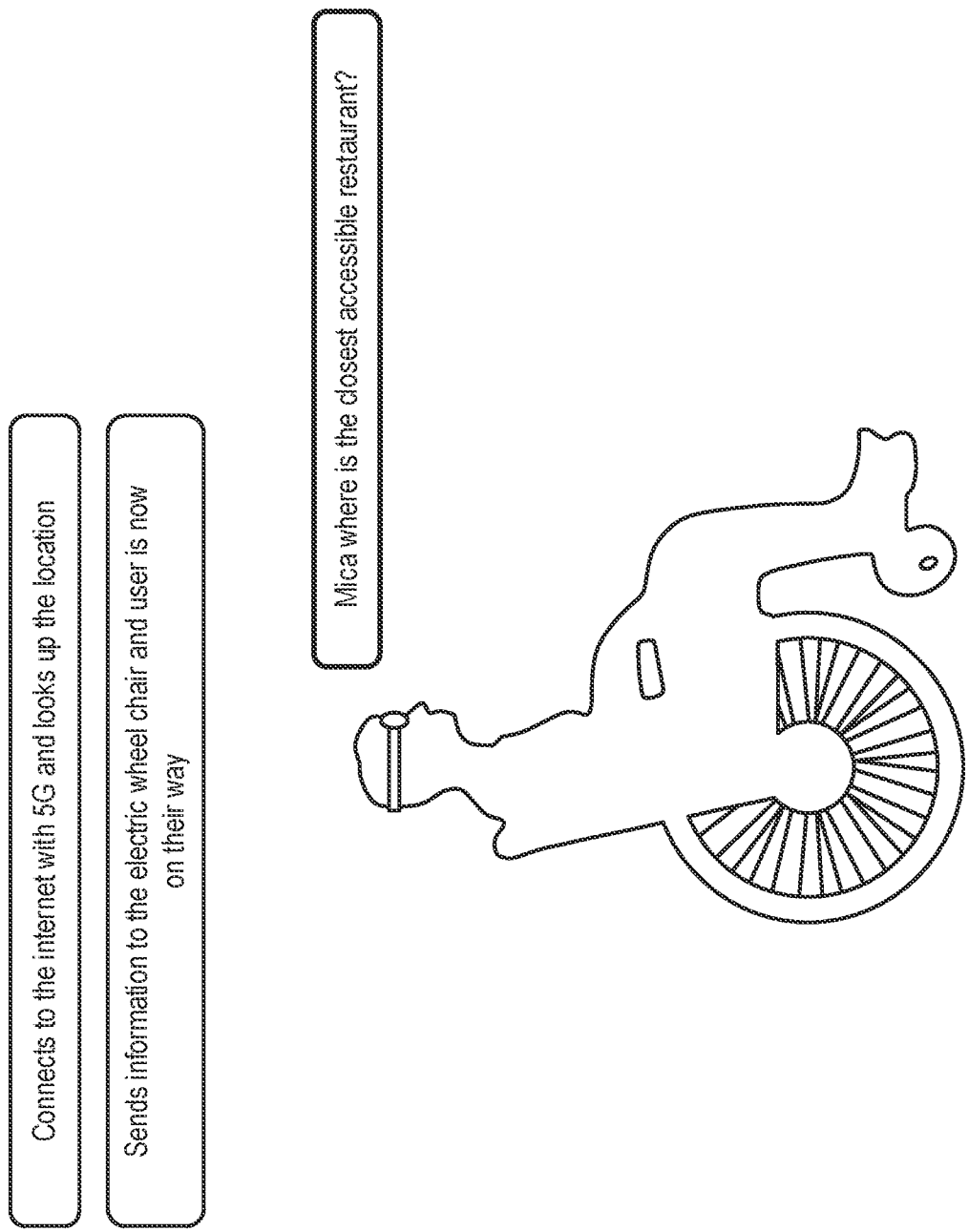

Referring to FIG. 60, an XR user with a mobility challenge is shown speaking to her XR device, wherein her XR device is configured to be responsive to spoken commands and queries such that it can return information pertaining to the query, and also preferably assist in controlling and even navigating her mobility assistance devices. In other words, she may ask the spatial computing system to take her to the restroom in an autonomous or semi-autonomous manner, while also preferably avoiding not only structures but also traffic, such as the activity of other people.

Figure 61:
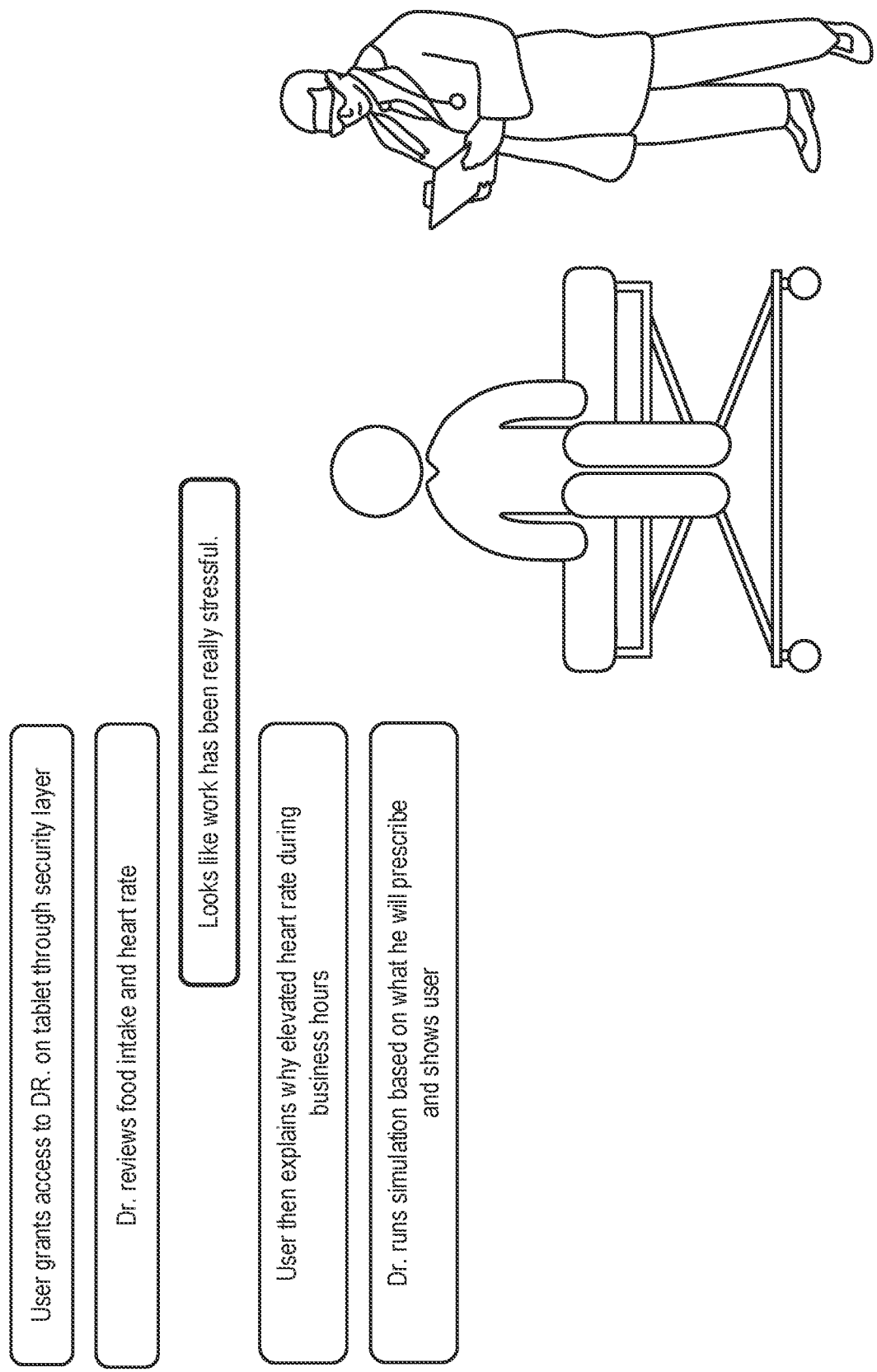

Referring to FIG. 61, an XR user visits his primary care physician, and aggregate data since the last visit is discussed and utilized to simulate, and provide for visualization of, different courses of action for the patient. For example, the physician may assist the XR user in understanding what he or she will look like after a knee replacement surgery.

Figure 62:
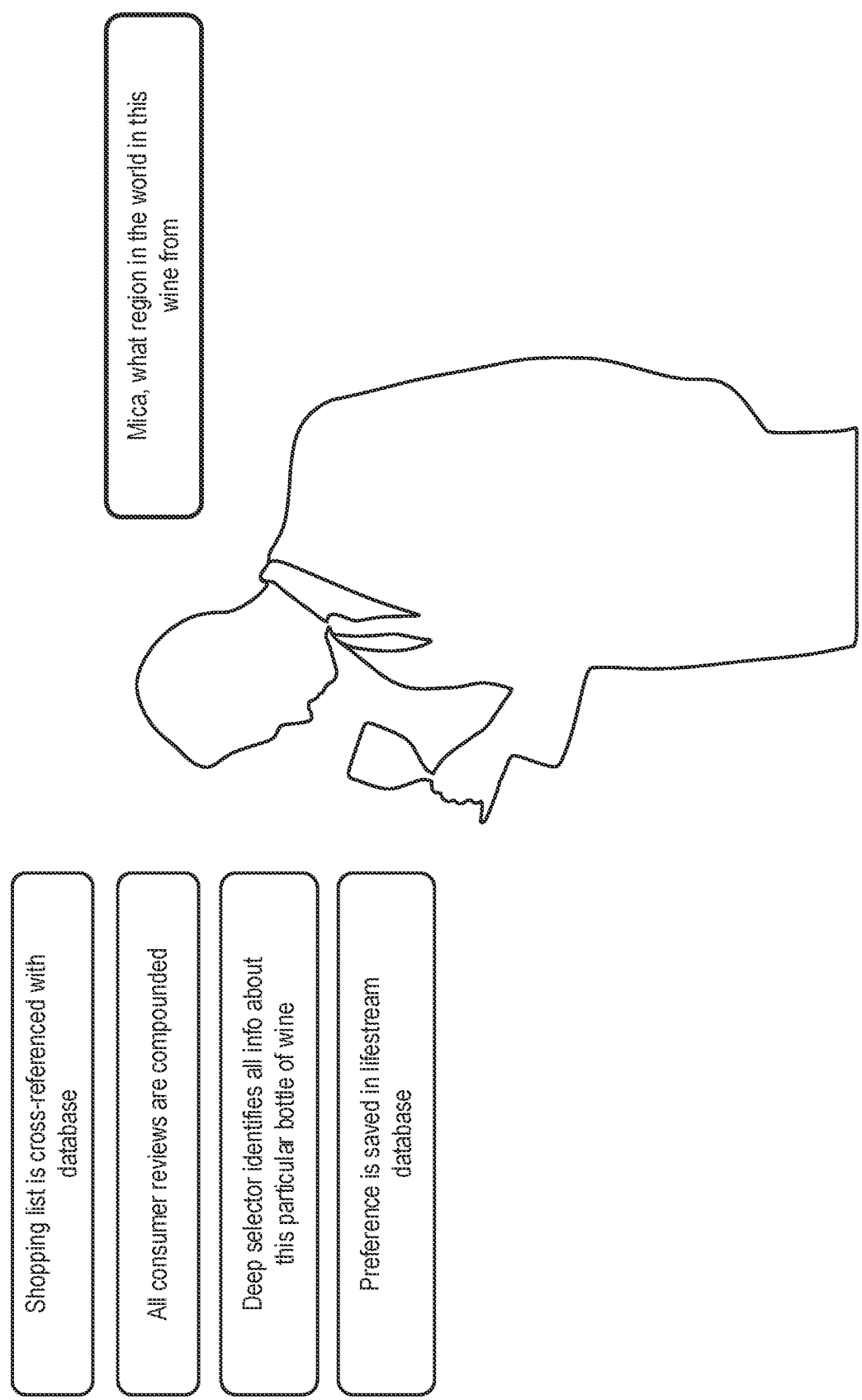

Referring to FIG. 62, an user is illustrated talking through a verbal interface (i.e., not necessarily a visualization XR system, but merely an audio-based spatial computing system), he asks the system regarding specific wine details pertaining to what he is drinking and receives responsive information based upon not only cloud-based internet style information, but also his own particular meta data, such as his own wine interests.

Referring to FIG. 63, spatial computing systems may be utilized for realtime or near-realtime tracking of others, such as children or elderly, by utilizing GPS locator devices (i.e. a small GPS transmitter, generally battery powered and portable, may be coupled to clothing, a backpack, shoes, or the like).

Figure 64:
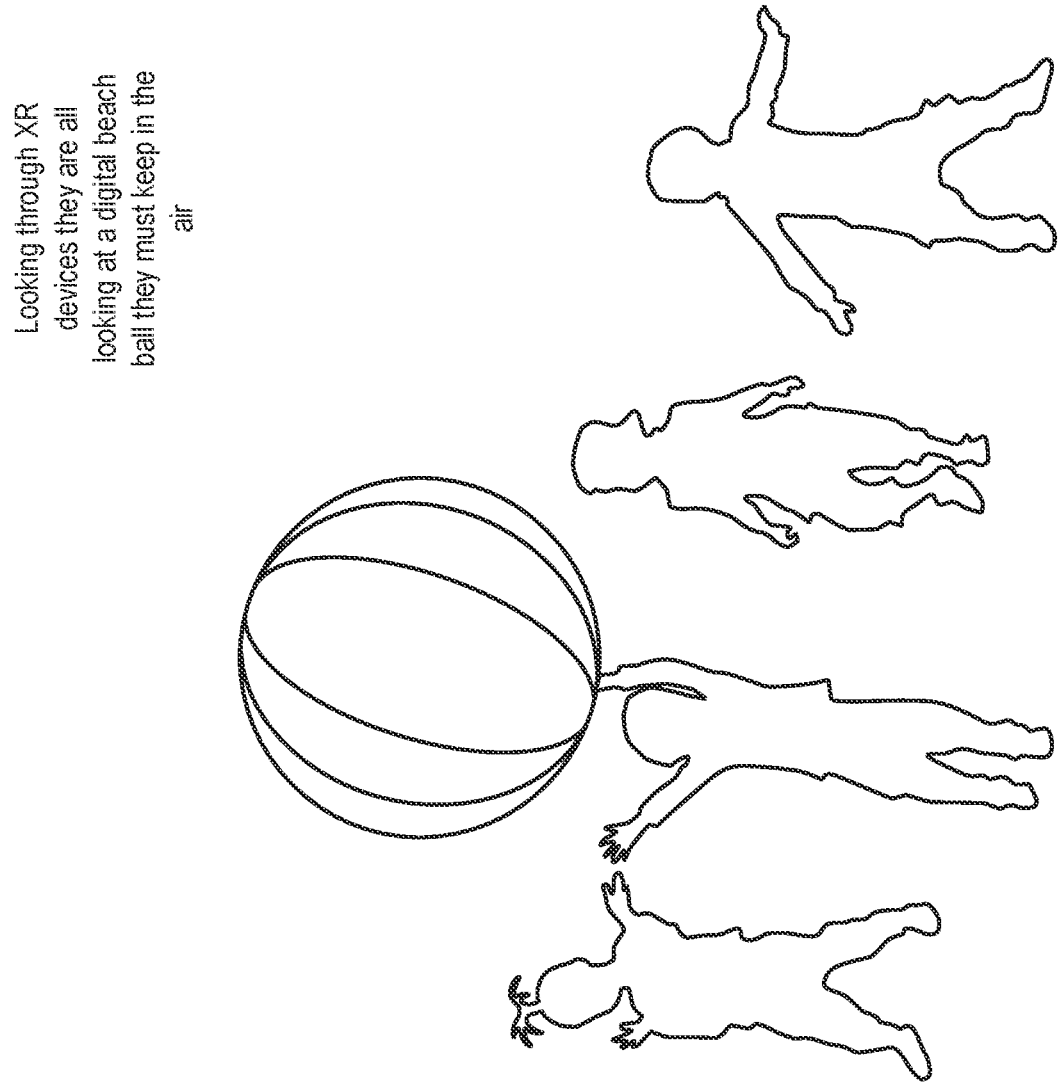

Referring to FIG. 64, multiple XR users are shown engaged in a game of virtual volleyball, such that each user, looking through their XR device, must intersect the virtual ball and impart a virtual force upon the ball based upon the physical pose change and rate of change of their XR device (i.e., they can use their smartphone or tablet has their paddle).

Figure 65:
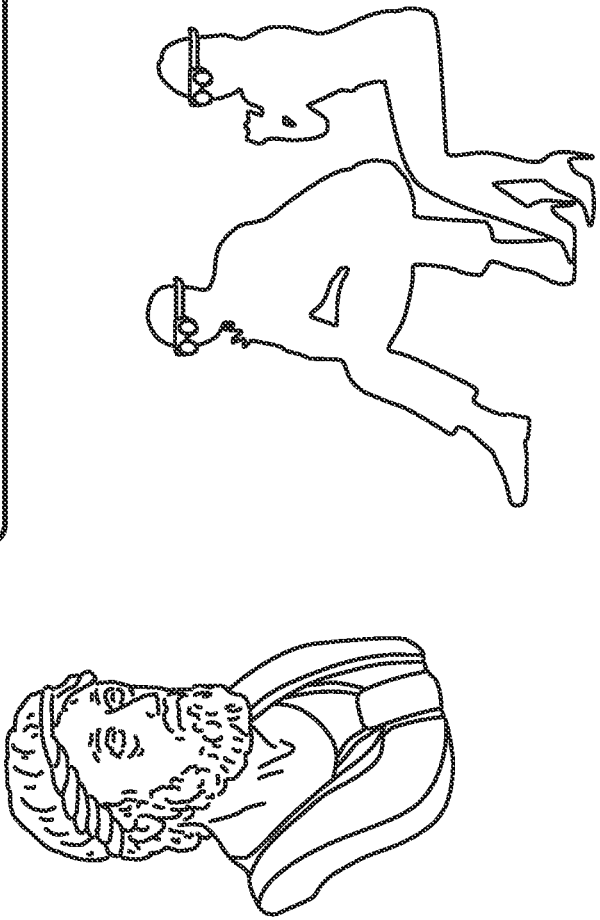

Referring to FIG. 65, two XR users are shown sitting outside in a sculpture garden and wish to know more information regarding a particular sculpture, they can use visual search tools to gather and examine information on the internet using the visualization tools of their XR devices, and may share and/or save their findings.

Figure 66:
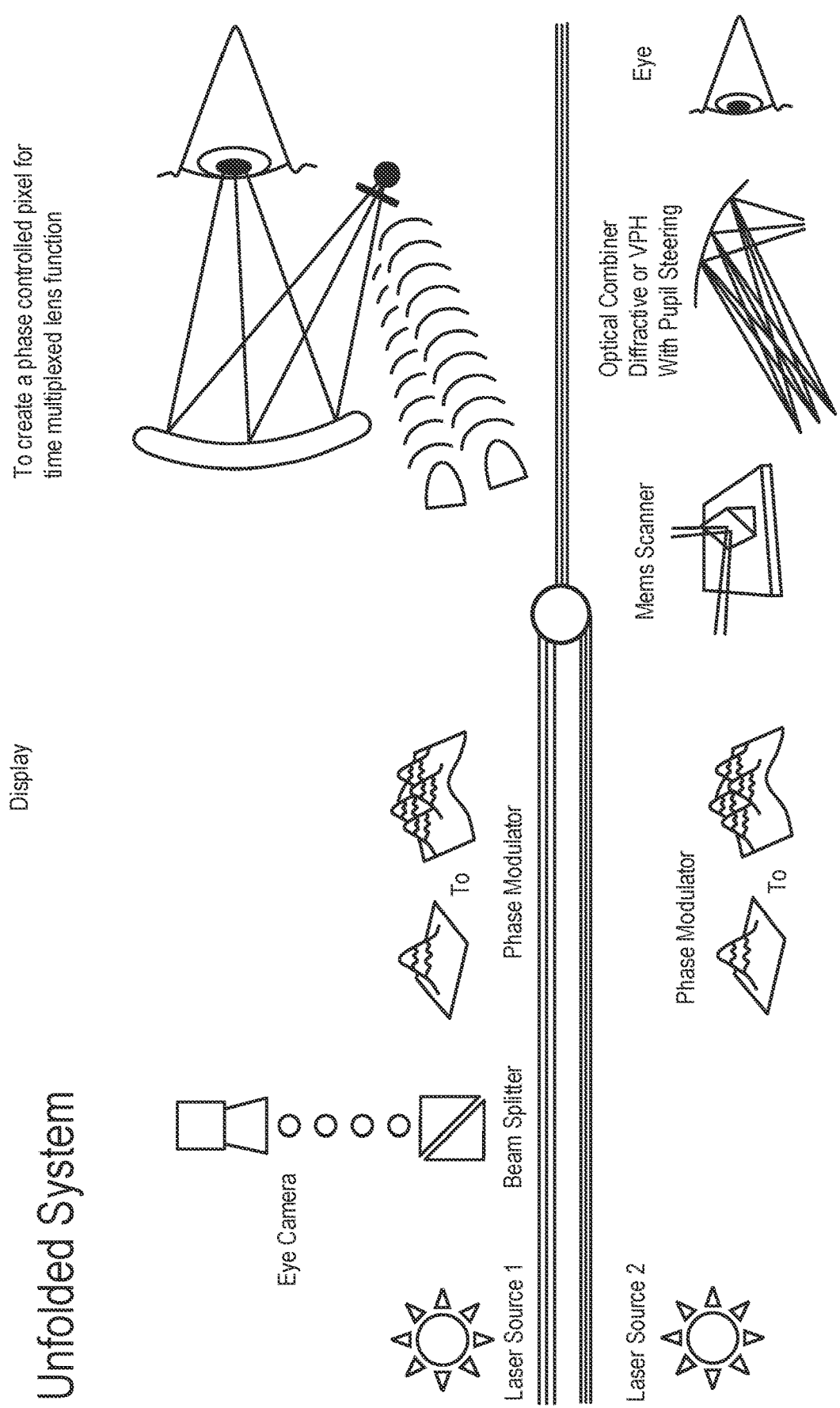

Referring to FIG. 66, a system may be configured to have an optical system which uses a variety of light relays, (i.e. waveguides, "bird bath"-style optics, volume phase holograms, or the like) to take a stitched-together (i.e., aggregated), time-multiplexed image, and in one configuration display it to the user. This same system may be used to relay the eye information back to a camera where in some instances one may look at gaze vector, foveation, in a manner which is not exclusively dependent upon the user's pupil diameter. One may create one or more sources of red, green, and, blue light, and reflect, refract, diffract-off-of/or/ through a phase modulation device, such as a phase liquid crystal on silicon ("LCOS", a form a spatial light modulator), or 2D or 3D light valve. Each one of these laser-plus-modulator pairs may be coupled to a scanning or beam forming array of mirrors at which the extent of the field of view may be governed by the entrance (i.e., incident) angle to the system. One embodiment may employ this information to time multiplex a full field of view at a range of framerates to include ones which create a comfortable viewing experience. This time multiplexed image has the capability of being presented to the user at various depths (i.e., perceived focal planes or focal depths).

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of providing content comprising:
   storing, under control of a first resource device processor, a first resource device data set including first content on a first resource device storage medium connected to the first resource device processor;
   transmitting, with a first resource device communication interface connected to the first resource device processor and under the control of the first resource device processor the first content;
   connecting, under control of a mobile device processor of a mobile device, a mobile device communication interface of the mobile device to the first resource device communication interface of a first resource device at a first location so that the mobile device communication interface creates a first connection with the first resource device;
   receiving, with the mobile device communication interface under control of the mobile device processor, first content transmitted by the first resource device transmitter, wherein the first content, stored on the first resource device storage medium before the mobile device communication interface connects to the first resource device communication interface and is transmitted with the first resource device communication interface, is specific to a first geographic parameter associated with a communications protocol of the first connection between the mobile device processor and the first resource device, wherein the first content can be sensed by a user;
   storing, under control of a second resource device processor, a second resource device data set including second content on a second resource device storage medium connected to the second resource device processor; and
   transmitting, with a second resource device communication interface connected to the second resource device processor and under the control of the second resource device processor, the second content,
      wherein the second resource device is at second location,
      wherein the mobile device communication interface creates a second connection with the second resource device, and
      wherein the second content, stored on the second resource device storage medium before the mobile device communication interface connects to the second resource device communication interface and is transmitted with the second resource device communication interface, is specific to a second geographic parameter associated with a communications protocol of the second connection between the mobile device processor and the second resource device, and the second geographic parameter is different from the first geographic parameter to differentiate the second connection from the first connection and, due to the differentiation of the second connection from the first connection, differentiate the second content from the first content.

2. The method of claim 1, wherein the mobile device includes a head-worn viewing component which is couplable to the head of the user and the first and second content provide the user with at least one of additional content, enhanced content and information that pertains to a particular view of the world as seen by the user.

3. The method of claim 1, wherein the user enters a localization island wherein specific features have been preconfigured to be located and interpreted by the mobile device to determine the geographic parameter relative to the world around the user.

4. The method of claim 3, wherein the specific features are visually-detectable features.

5. The method of claim 3, wherein the specific features are wireless connectivity-related features.

6. The method of claim 3, wherein a plurality of sensors connected to the head-worn viewing component that are used by the mobile device to determine the geographic parameter relative to the world around the user.

7. The method of claim 3, further comprising:
   receiving through a user interface an input from the user to at least one of intake, utilize, view, and bypass certain information of the first or second content.

8. The method of claim 1, wherein the connection is a wireless connection.

9. The method of claim 1, wherein the mobile device has a sensor that detects a first feature at the first location and the first feature is used to determine the first geographic parameter associated with the first feature, and wherein the first content is specific to a first geographic parameter.

10. The method of claim 9, wherein the second resource device is at second location, wherein the mobile device has a sensor that detects a second feature at the second location and the second feature is used to determine a second geographic parameter associated with the second feature, and wherein the first content is updated with second content specific to a second geographic parameter.

11. The method of claim 10, wherein the mobile device includes a head-worn viewing component which is couplable to the head of the user and the first and second content provide the user with at least one of additional content, enhanced content and information that pertains to a particular view of the world as seen by the user.

12. The method of claim 1, further comprising:
receiving, by a spatial computing layer between the mobile device and a resource layer having a plurality of data sources, data resources;
integrating, by the spatial computing layer, the data resources to determine an integrated profile; and
determining, by the spatial computing layer, the first content based on the integrated profile.

13. The method of claim 12, wherein the spatial computing layer includes:
a spatial computing resource device having:
a spatial computing resource device processor;
a spatial computing resource device storage medium; and
a spatial computing resource device data set on the spatial computing resource device storage medium and executable by the processor to:
receive the data resources;
integrate the data resources to determine an integrated profile; and
determine the first content based on the integrated profile.

14. The method of claim 12, further comprising:
making, with an abstraction and arbitration layer interposed between the mobile device and the resource layer, workload decisions; and
distributing, with the abstraction and arbitration layer, tasks based on the workload decisions.

15. The method of claim 12, further comprising:
taking, with a camera device, images of a physical world around the mobile device, wherein the images are used to make the workload decisions.

16. The method of claim 12, further comprising:
taking, with a camera device, images of a physical world around the mobile device, wherein the images form one of the data resources.

17. The method of claim 1, wherein the first resource device is an edge resource device, further comprising:
connecting, under control of a mobile device processor of a mobile device and in parallel with the connection with the first resource device, a mobile device communication interface of the mobile device to a second resource device communication interface of a second resource device; and
receiving, with the mobile device communication interface under control of the mobile device processor, second content transmitted by the second resource device transmitter.

18. The method of claim 17, wherein the second resource device is a fog resource device having a second latency that is slower than the first latency.

19. The method of claim 18, further comprising:
connecting, under control of a mobile device processor of a mobile device and in parallel with the connection with the second resource device, a mobile device communication interface of the mobile device to a third resource device communication interface of a third resource device, wherein the third resource device is a cloud resource device having a third latency that is slower than the second latency; and
receiving, with the mobile device communication interface under control of the mobile device processor, third content transmitted by the third resource device transmitter.

20. The method of claim 18, wherein the connection to the edge resource device is through a cell tower and the connection to the fog resource device is through a Wi-Fi connection device.

21. The method of claim 20, wherein the cell tower is connected to the fog resource device.

22. The method of claim 20, wherein the Wi-Fi connection device is connected to the fog resource device.

23. The method of claim 17, further comprising:
capturing at least first and second images with at least one camera, wherein the mobile device processor transmits the first image to the edge resource device and the second image to the fog resource device.

24. The method of claim 23, wherein the at least one camera is a room camera that takes the first image of the user.

25. The method of claim 17, further comprising:
receiving, by a processor, a sensor input;
determining, with the processor, a pose of the mobile device, including at least one of a location and an orientation of the mobile device, based on the sensor input; and
steering, with the processor, a steerable wireless connector that creates a wireless connection between the mobile device to the edge resource device based on the pose to at least improve the connection.

26. The method of claim 25, wherein the steerable wireless connector is a phased array antennae.

27. The method of claim 25, wherein the steerable wireless connector is a radar hologram type of transmission connector.

28. The method of claim 17, further comprising:
determining, with an arbitrator function executed by a processor, how many edge and fog resources are available through the edge and fog resource devices respectively;
sending, with the arbitrator function processing tasks to the edge and fog resources according to the determination of the resources that are available; and
receiving, with the arbitrator function, results back from the edge and fog resources.

29. The method of claim 28, further comprising:
combining, with the arbitrator function, the results from the edge and fog resources.

30. The method of claim 28, further comprising:
determining, by the mobile device processor, whether a process is a runtime process or not;
if the determination is made that the task is a runtime process then, executing the task immediately without making the determination with the arbitrator function; and
if the determination is made that the task is not a runtime process then making the determination with the arbitrator function.

31. The method of claim 17, further comprising:
exchanging data between a plurality of edge resource devices and the fog resource device, the data including points in space captured by different sensors and sent to the edge resource devices; and determining superpoints, being select ones of the points where the data from two or more of the edge resource devices overlap.

32. The method of claim 31, further comprising:
using each superpoint in multiple mobile devices for localization, orientation or pose estimation of the respective mobile device.

33. The method of claim 32, further comprising:
generating, with at processor, a context trigger for a group of the superpoints; and
storing, with the processor, the context trigger on a computer-readable medium.

34. The method of claim 33, further comprising:
using the context trigger as a handle for a rendering of an object based on the first content.

35. The method of claim 1, further comprising:
connecting, under control of the mobile device processor, the mobile device to a plurality of resource devices;
transmitting, by the mobile device processor, one or more rendering requests, wherein each resource device receives a respective rendering request;
receiving, with the mobile device processor, a rendering from each one of the remote devices based on the respective rendering requests;
comparing, with the mobile device processors, the renderings to determine a preferred rendering; and
selecting, with the mobile device communication interface under control of the mobile device processor, the preferred rendering as the first content transmitted by the first resource device transmitter.

36. The method of claim 35, wherein the renderings form a system having a polynomial prediction for rendering frames into the future where the mobile device is predicted to be posed or looking.

* * * * *